US012706535B2

(12) United States Patent
Ravi et al.

(10) Patent No.: US 12,706,535 B2
(45) Date of Patent: Aug. 11, 2026

(54) SIMO DC TO DC CONVERTER FOR DYNAMICALLY PROVIDING A REGULATED OUTPUT VOLTAGE WITHIN A PRE-DEFINED RANGE

(71) Applicant: Intel Corporation, Santa Clara, CA (US)

(72) Inventors: Ashoke Ravi, Portland, OR (US); Ofir Degani, Haifa (IL); Harish Krishnamurthy, Beaverton, OR (US); Shahar Wolf, Haifa (IL); Sally Amin, Hillsboro, OR (US); Suhwan Kim, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 788 days.

(21) Appl. No.: 17/999,856

(22) PCT Filed: Jun. 26, 2020

(86) PCT No.: PCT/US2020/039733
§ 371 (c)(1),
(2) Date: Nov. 24, 2022

(87) PCT Pub. No.: WO2021/262185
PCT Pub. Date: Dec. 30, 2021

(65) Prior Publication Data
US 2023/0216409 A1 Jul. 6, 2023

(51) Int. Cl.
*H02M 3/158* (2006.01)
*H02M 1/00* (2006.01)
*H02M 1/08* (2006.01)

(52) U.S. Cl.
CPC ....... *H02M 3/1582* (2013.01); *H02M 1/0025* (2021.05); *H02M 1/0045* (2021.05);
(Continued)

(58) Field of Classification Search
CPC ............ H02M 3/1582; H02M 1/0025; H02M 1/0045; H02M 1/007; H02M 1/0032;
(Continued)

(56) References Cited

U.S. PATENT DOCUMENTS

| | | | | |
|---|---|---|---|---|
| 6,194,887 | B1 | 2/2001 | Tsukada | |
| 7,723,965 | B2 * | 5/2010 | Lesso | H02M 3/158 323/225 |

(Continued)

FOREIGN PATENT DOCUMENTS

| | | | |
|---|---|---|---|
| CN | 105119482 | A | 12/2015 |
| CN | 105515376 | A | 4/2016 |

(Continued)

OTHER PUBLICATIONS

JP Notice of Reasons for Refulsal issued for the corresponding JP patent application No. JP 2022-571766, dated Jan. 22, 2025, 12 pages (For informational purposes only).

(Continued)

*Primary Examiner* — Yusef A Ahmed
(74) *Attorney, Agent, or Firm* — Viering, Jentschura & Partner mbB

(57) ABSTRACT

Disclosed herein is a single inductor multiple output (SIMO) DC-to-DC converter for dynamically providing a regulated output voltage within a pre-defined range. The converter may be configured as a buck-boost converter that includes an inductor, switches coupled to the inductor to control energizing and deenergizing phases of the inductor, and output rails. Each of the output rails may include an output switch that selectively connects the output rail to the inductor. Depending on the energizing and deenergizing patterns of the inductor; and the selection state of the switches, the output rails may be supplied with different output voltages and/or output currents. Any number of regulating strategies
(Continued)

may be utilized to control the output voltages and/or the output currents.

15 Claims, 81 Drawing Sheets

(52) U.S. Cl.
CPC ........... *H02M 1/007* (2021.05); *H02M 1/009* (2021.05); *H02M 1/08* (2013.01); *H02M 3/158* (2013.01)

(58) Field of Classification Search
CPC ........ H02M 1/0048; H02M 1/14; H02M 3/07; H02M 1/009; H02M 3/158; H02M 1/08; Y02B 70/10; G06F 1/26
See application file for complete search history.

(56) References Cited

U.S. PATENT DOCUMENTS

| | | | | |
|---|---|---|---|---|
| 9,647,554 | B1 * | 5/2017 | Oh | H02M 1/08 |
| 10,097,017 | B2 * | 10/2018 | Greening | H02M 3/158 |
| 10,103,620 | B1 * | 10/2018 | Wei | H02M 3/156 |
| 10,211,730 | B2 * | 2/2019 | Toyama | H02M 3/158 |
| 10,291,126 | B1 * | 5/2019 | Wei | H02M 3/158 |
| 10,622,900 | B1 * | 4/2020 | Wei | H02M 3/1584 |
| 11,456,611 | B2 * | 9/2022 | Gambetta | H02J 7/02 |
| 2003/0184269 | A1 * | 10/2003 | Nishimori | H02M 3/158 323/282 |
| 2004/0201281 | A1 * | 10/2004 | Ma | H02M 3/158 307/38 |
| 2008/0231115 | A1 * | 9/2008 | Cho | H02M 3/33561 307/41 |
| 2009/0015218 | A1 | 1/2009 | O'Driscoll et al. | |
| 2009/0079404 | A1 * | 3/2009 | Pigott | H02M 3/1584 323/271 |
| 2009/0237854 | A1 * | 9/2009 | Mok | H02M 3/156 361/111 |
| 2010/0194359 | A1 * | 8/2010 | Notman | H02M 3/1588 323/267 |
| 2011/0043181 | A1 * | 2/2011 | Jing | H02M 3/158 323/288 |
| 2012/0286576 | A1 * | 11/2012 | Jing | H02M 3/158 307/43 |
| 2012/0326691 | A1 * | 12/2012 | Kuan | H02M 3/158 323/299 |
| 2013/0207467 | A1 * | 8/2013 | Fernald | H02J 1/14 307/31 |
| 2013/0229058 | A1 * | 9/2013 | Chen | H02J 1/082 307/31 |
| 2014/0285014 | A1 | 9/2014 | Calhoun et al. | |
| 2014/0368035 | A1 | 12/2014 | Lofthouse | |
| 2015/0008742 | A1 * | 1/2015 | Huang | H02M 3/158 307/31 |
| 2015/0155783 | A1 * | 6/2015 | Li | H03F 3/2173 323/271 |
| 2015/0372526 | A1 | 12/2015 | Greening | |
| 2016/0064986 | A1 * | 3/2016 | Langlinais | H02J 7/0068 320/134 |
| 2016/0072400 | A1 | 3/2016 | Alexander | |
| 2017/0025955 | A1 * | 1/2017 | Hang | H02M 3/1582 |
| 2017/0187187 | A1 * | 6/2017 | Amin | H02M 3/1588 |
| 2017/0194857 | A1 * | 7/2017 | Hang | H02M 3/02 |
| 2017/0279276 | A1 * | 9/2017 | Amin | H02J 7/35 |
| 2018/0062515 | A1 | 3/2018 | Jung | |
| 2018/0367101 | A1 | 12/2018 | Chen et al. | |
| 2019/0028029 | A1 * | 1/2019 | Bieber | H02M 3/33561 |
| 2019/0302817 | A1 * | 10/2019 | Rosolowski | H02M 3/07 |
| 2019/0386565 | A1 * | 12/2019 | Rosolowski | H03F 1/0211 |
| 2021/0067041 | A1 * | 3/2021 | Cho | H02M 3/156 |
| 2021/0313936 | A1 * | 10/2021 | Garrett | H02M 3/158 |
| 2024/0333155 | A1 * | 10/2024 | Yang | H02M 3/1582 |
| 2024/0429818 | A1 * | 12/2024 | Perreault | H02M 1/007 |

FOREIGN PATENT DOCUMENTS

| | | | |
|---|---|---|---|
| CN | 107070220 | A | 8/2017 |
| CN | 105634279 | B | 3/2018 |
| CN | 107769552 | A | 3/2018 |
| JP | S56-002022 | A | 1/1981 |
| JP | 2000148263 | A | 5/2000 |
| JP | 2000349603 | A | 12/2000 |
| JP | 2003289666 | A | 10/2003 |
| JP | 2010193603 | A | 9/2010 |
| JP | 2018042461 | A | 3/2018 |
| JP | 2019195168 | A | 11/2019 |
| KR | 20160069603 | A | 6/2016 |
| KR | 10-1981212 | B1 | 5/2019 |
| TW | 201503564 | A | 1/2015 |

OTHER PUBLICATIONS

TW Search Report issued for the corresponding TW patent application No. TW109140175, dated Jun. 26, 2020, 1 page (For informational purposes only).

Yanqi Zheng et al.: "A Single-Inductor Multiple-Output Auto-Buck-Boost DC-DC Converter With Tail-Current Control" IEEE Transactions on Power Electronics, Institute of Electrical and Electronics Engineers, USA, 31, No. 11, Nov. 1, 2016, 17 pages.

Extended European search report issued for the corresponding European patent application No. 20942201.3, dated Feb. 20, 2024, 10 pages (for informational purposes only).

Dutch search report issued for the corresponding Dutch patent application No. 2028264, dated Mar. 22, 2022, 1 page (for informational purposes only).

International search report issued for the corresponding patent application No. PCT/US2020/039733, dated Mar. 24, 2021, 11 pages (for imformational purposes only).

Search Report of corresponding Japanese Patent Application No. 2022571766, dated Jun. 6, 2024, 11 pages (for informational purposes only).

* cited by examiner

102
$V_{IN}$
104
302a
Push-pull Regulator
Push-pull Regulator
Push-pull Regulator
Push-pull Regulator
302n
SIMO Buck Converter
108a
$V_{O1}$
$V_{O2}$
$V_{O3}$
108n
$V_{O4}$ 102 $V_{IN}$
206 $S_{HS}$
208 $S_{LS}$
202
204a $S_{O1}$
210 $S_{ENG}$
402
405a $V_{O1}$
404 $V_{ref.L}$
406 $V_{ref.H}$
408
410
302a
104

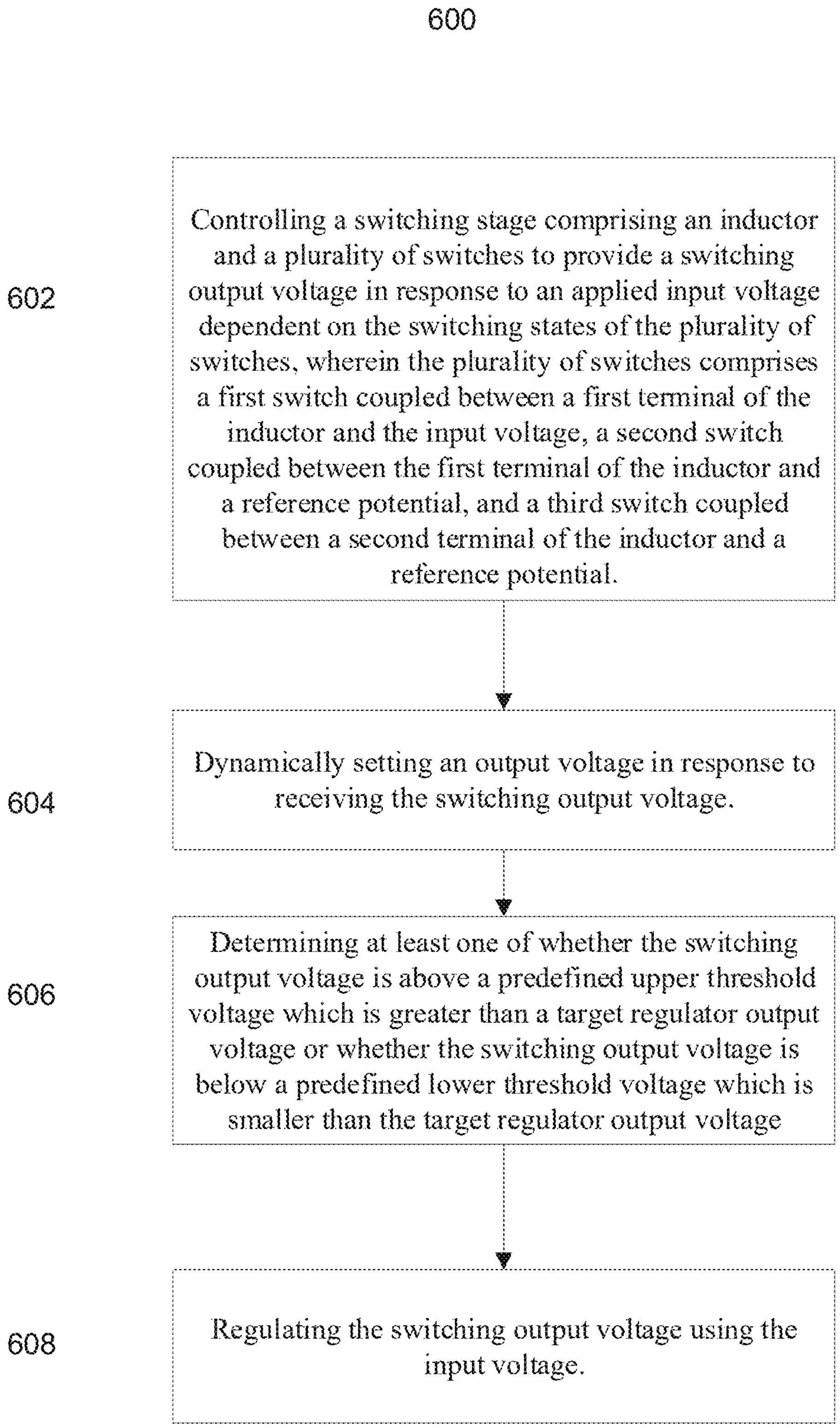

Controlling a switching stage comprising an inductor and a plurality of switches to provide a switching output voltage in response to an applied input voltage dependent on the switching states of the plurality of switches, wherein the plurality of switches comprises a first switch coupled between a first terminal of the inductor and the input voltage, a second switch coupled between the first terminal of the inductor and a reference potential, and a third switch coupled between a second terminal of the inductor and a reference potential.

604

Dynamically setting an output voltage in response to receiving the switching output voltage.

606

Determining at least one of whether the switching output voltage is above a predefined upper threshold voltage which is greater than a target regulator output voltage or whether the switching output voltage is below a predefined lower threshold voltage which is smaller than the target regulator output voltage

608

Regulating the switching output voltage using the input voltage.

700
102
VIN
402
206
SHS
202
204a
SO1
204a
VO1
208
SLS
210
SENG
704
Vref.L
Dig.
gate ctrl
Dig.
gate ctrl
Vref.H
706
708
710
702a
Switching VR
Digital Push-pull
Regulator

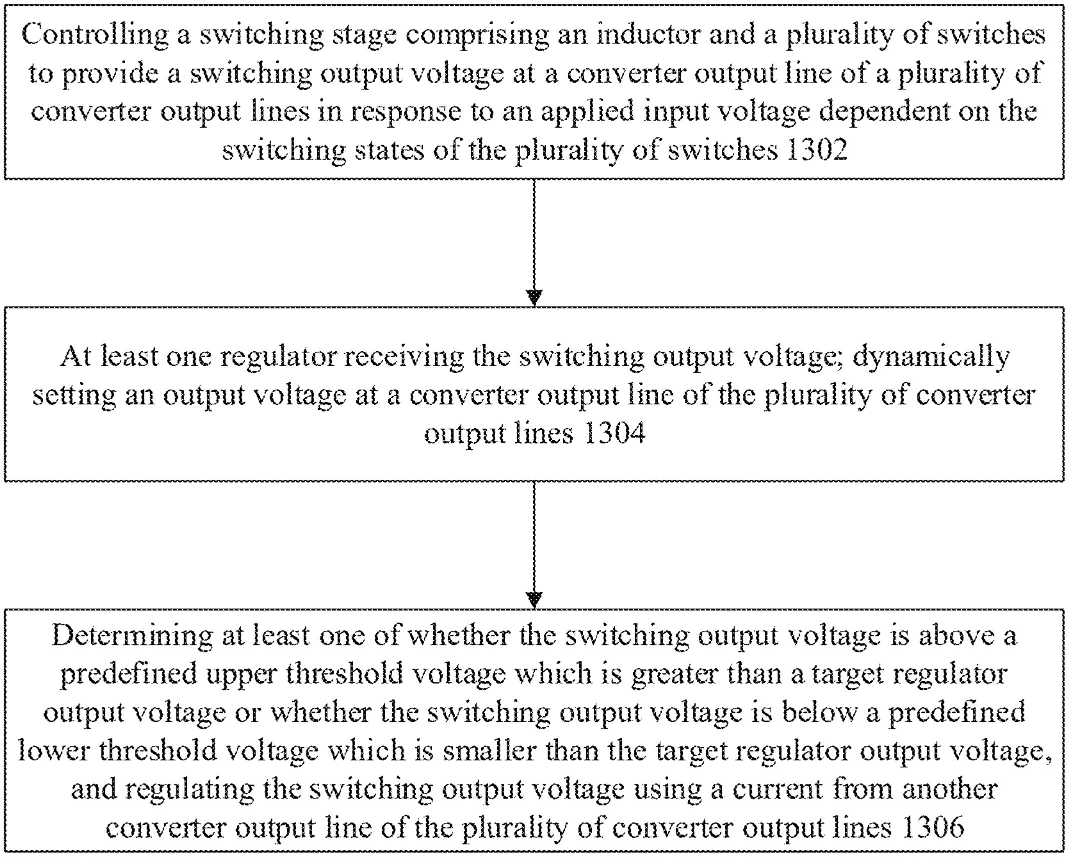

FIG. 13

Controlling a switching stage comprising an inductor and a plurality of switches to provide a switching output voltage at a converter output line of a plurality of converter output lines in response to an applied input voltage dependent on the switching states of the plurality of switches 1302

At least one regulator receiving the switching output voltage; dynamically setting an output voltage at a converter output line of the plurality of converter output lines 1304

Determining at least one of whether the switching output voltage is above a predefined upper threshold voltage which is greater than a target regulator output voltage or whether the switching output voltage is below a predefined lower threshold voltage which is smaller than the target regulator output voltage, and regulating the switching output voltage using a current from another converter output line of the plurality of converter output lines 1306

Figure 40:
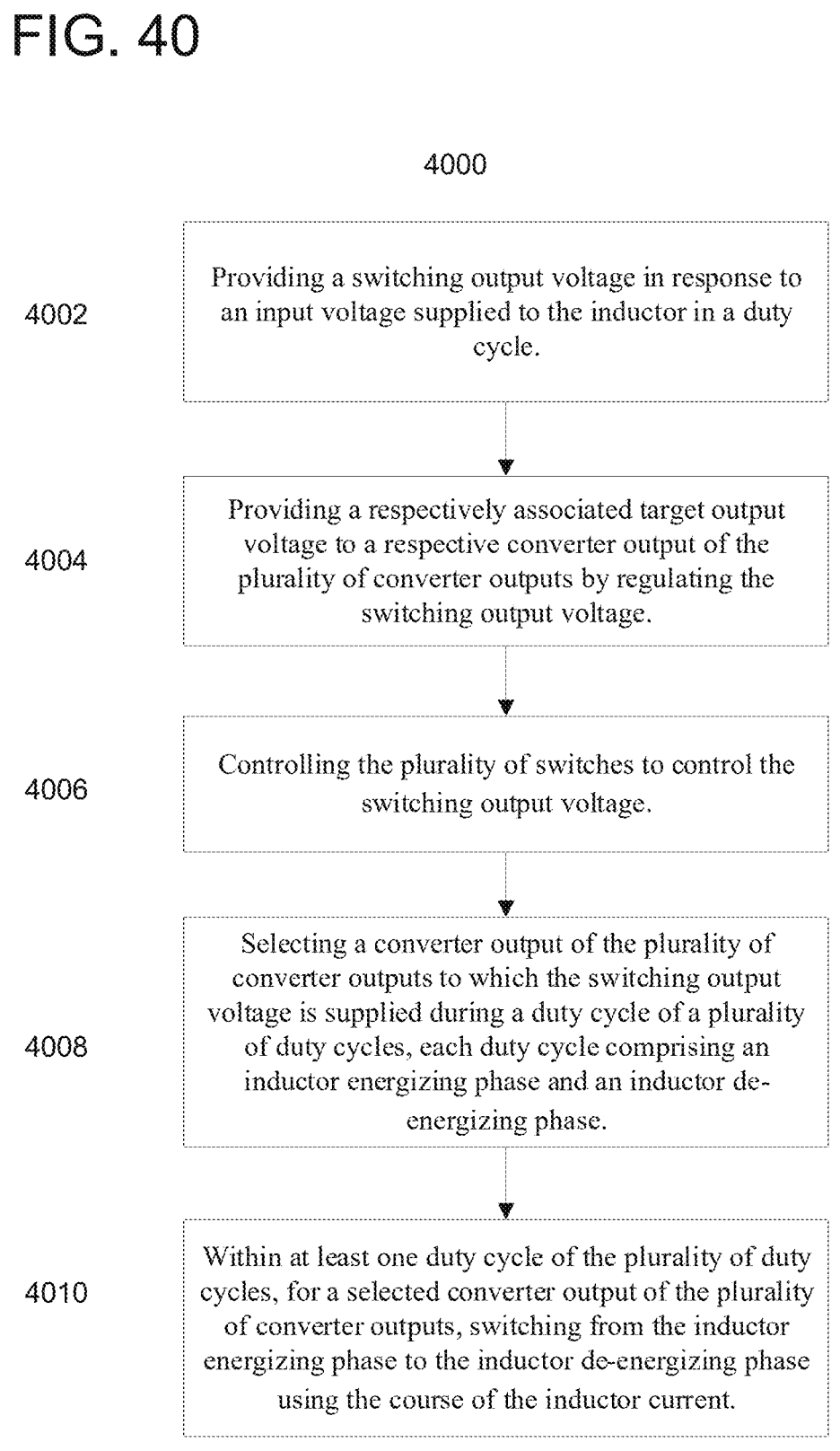

4002 Providing a switching output voltage in response to an input voltage supplied to the inductor in a duty cycle.

↓

4004 Providing a respectively associated target output voltage to a respective converter output of the plurality of converter outputs by regulating the switching output voltage.

↓

4006 Controlling the plurality of switches to control the switching output voltage.

↓

4008 Selecting a converter output of the plurality of converter outputs to which the switching output voltage is supplied during a duty cycle of a plurality of duty cycles, each duty cycle comprising an inductor energizing phase and an inductor de-energizing phase.

↓

4010 Within at least one duty cycle of the plurality of duty cycles, for a selected converter output of the plurality of converter outputs, switching from the inductor energizing phase to the inductor de-energizing phase using the course of the inductor current.

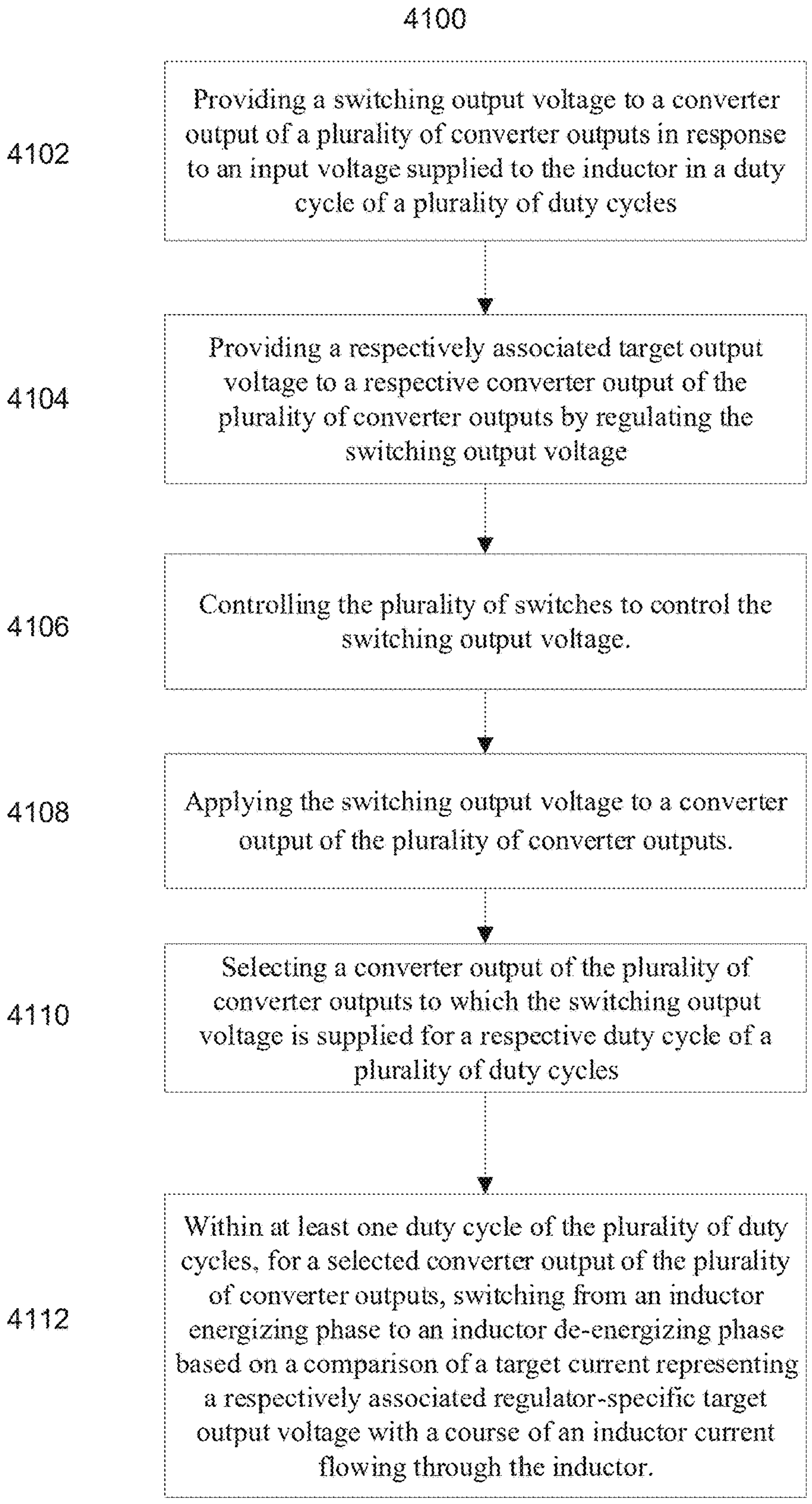

FIG. 41

4102 Providing a switching output voltage to a converter output of a plurality of converter outputs in response to an input voltage supplied to the inductor in a duty cycle of a plurality of duty cycles 4104 Providing a respectively associated target output voltage to a respective converter output of the plurality of converter outputs by regulating the switching output voltage 4106 Controlling the plurality of switches to control the switching output voltage.

4108 Applying the switching output voltage to a converter output of the plurality of converter outputs.

4110 Selecting a converter output of the plurality of converter outputs to which the switching output voltage is supplied for a respective duty cycle of a plurality of duty cycles 4112 Within at least one duty cycle of the plurality of duty cycles, for a selected converter output of the plurality of converter outputs, switching from an inductor energizing phase to an inductor de-energizing phase based on a comparison of a target current representing a respectively associated regulator-specific target output voltage with a course of an inductor current flowing through the inductor.

4200
V_IN
S_HS
S_LS
SIMO Power Stage
104
204a-n
108a
108n
S_O1
S_O2
S_O3
S_O4
S_O5
V_O1
V_O2
V_O3
V_O4
V_O5
4215a
4215b
4215c
4215d
4215e
4217
Switch Controller
V_CLK
4230
4219
Level Shifter / Gate Driver
V_GATEn
4213

4300

$V_{IN}$
$S_{HS}$
$S_{LS}$
SIMO Power Stage
104
4306
Lin. Regulator
Lin. Regulator
Lin. Regulator
Lin. Regulator
Lin. Regulator
108a
108n
$V_{O1}$
$V_{O2}$
$V_{O3}$
$V_{O4}$
$V_{O5}$
4215a
4215b
4215c
4215d
4215e
4217
Switch Controller
4230
$V_{CLK}$
4219
Level Shifter / Gate Driver
$V_{GATEn}$
4213

4400
$V_{IN}$
$S_{HS}$
$S_{LS}$
4406
Switched Cap Network
108a
108n
$V_{O1}$
$V_{O2}$
$V_{O3}$
$V_{O4}$
$V_{O5}$
SIMO Power Stage
104
4215a
4215b
4215c
4215d
4215e
4217
Switch Controller
4230
$V_{CLK}$
4219
Level Shifter / Gate Driver
$V_{GATEn}$
4213

6500

6502

Transmitting radio signals, via a radio transmitter directly galvanically coupled to the first output to receive power from the single inductor multiple output converter.

6504

Receiving radio signals, via a radio receiver and galvanically coupled to the second output to receive power from the single inductor multiple output converter.

6600

7100

104

108a-n $V_{O1}$ $V_{O2}$ $V_{O3}$ $V_{O4}$

7102

SWITCH MATRIX 7104a-n 204a-n 7107a-n 7112 7114 7116 7118

210

202

102

$V_{IN}$

206

208

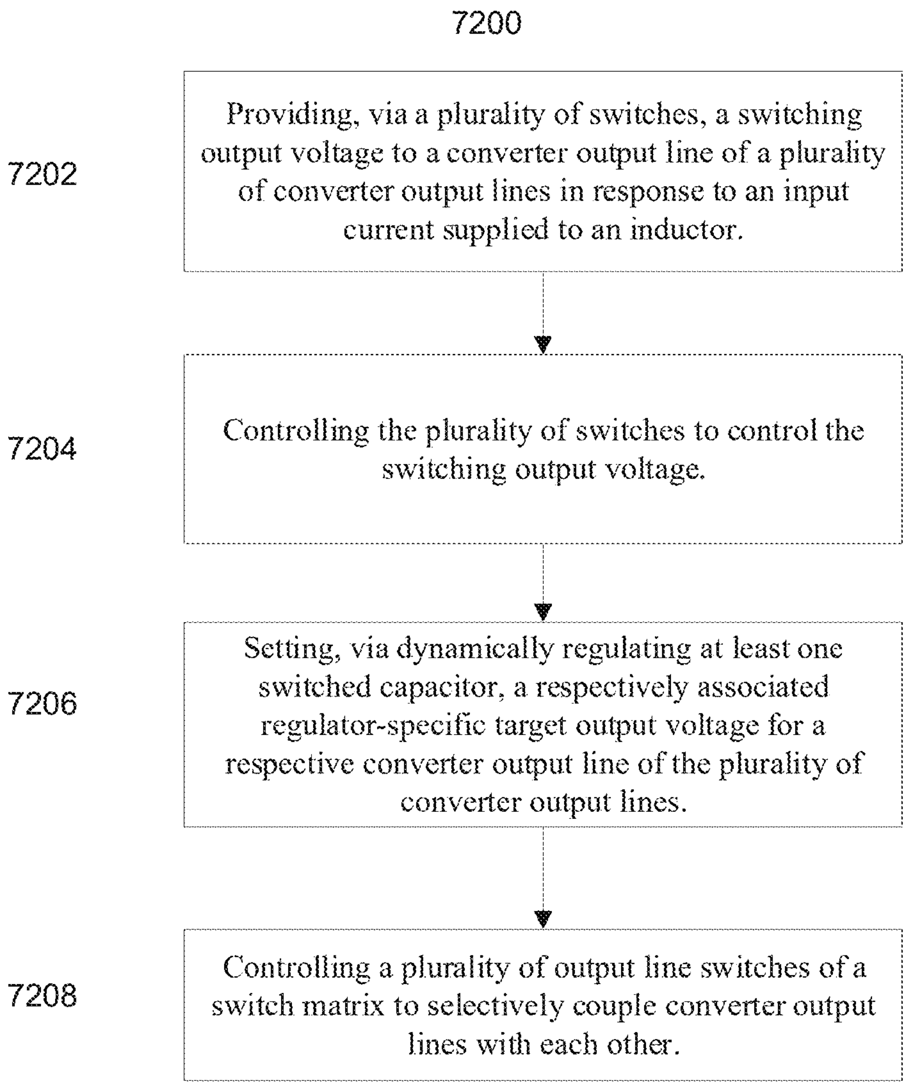

Providing, via a plurality of switches, a switching output voltage to a converter output line of a plurality of converter output lines in response to an input current supplied to an inductor.

7204

Controlling the plurality of switches to control the switching output voltage.

7206

Setting, via dynamically regulating at least one switched capacitor, a respectively associated regulator-specific target output voltage for a respective converter output line of the plurality of converter output lines.

7208

Controlling a plurality of output line switches of a switch matrix to selectively couple converter output lines with each other.

SIMO DC TO DC CONVERTER FOR DYNAMICALLY PROVIDING A REGULATED OUTPUT VOLTAGE WITHIN A PRE-DEFINED RANGE

CROSS-REFERENCE TO RELATED APPLICATION(S)

This application is a national phase application of PCT/US2020/039733 filed on Jun. 26, 2020, the contents of which are fully incorporated herein by reference.

TECHNICAL FIELD

Various embodiments relate generally to Single Inductor Multiple Output (SIMO) DC (Direct Current) to DC converters and implementations and uses of same.

BACKGROUND

In modern computing applications, including but not limited to wireless, different supply voltages for different applications and/or functions are required within the same integrated circuit (IC), which may be powered on and off independently. For maximum efficiency, this requires the creation of multiple power islands on a single IC. As modern devices increase in complexity, cost and size savings become essential factors in power management design. Ideally, in order to provide maximum efficiency in the delivery of power, each power island would have its own DC-DC converter. This would require many bulky and expensive discrete components, particularly off-chip inductors. Modern devices commonly employ switched mode power supplies to efficiently convert a first DC voltage to a second DC voltage. Many devices, however, include multiple electronic components with a plurality of different voltage requirements. These divergent voltage requirements may be satisfied by utilizing a plurality of switched mode DC to DC converters; however, this may be impractical or otherwise undesirable. For example, switched mode DC to DC converters generally utilize an inductor for voltage conversion, and cost and space considerations may make it desirable to reduce the number of inductors required for a given application. Alternatively, power-efficient single-input multiple-output converters or systems with various forms of gate charge sharing methods or switching converters can be used.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 6 exemplarily shows a flowchart of a method of operating a SIMO;

FIG. 13 shows a first method of operating a SIMO circuitry;

FIG. 40 exemplarily shows a flowchart of a method of operating a SIMO according to some aspects;

FIG. 41 exemplarily shows a flowchart of a method of operating a SIMO according to some aspects;

FIG. 72 exemplarily illustrates a flowchart of a method of operating a single inductor multiple output circuitry according to some aspects of the disclosure;

DESCRIPTION

Figure 1:
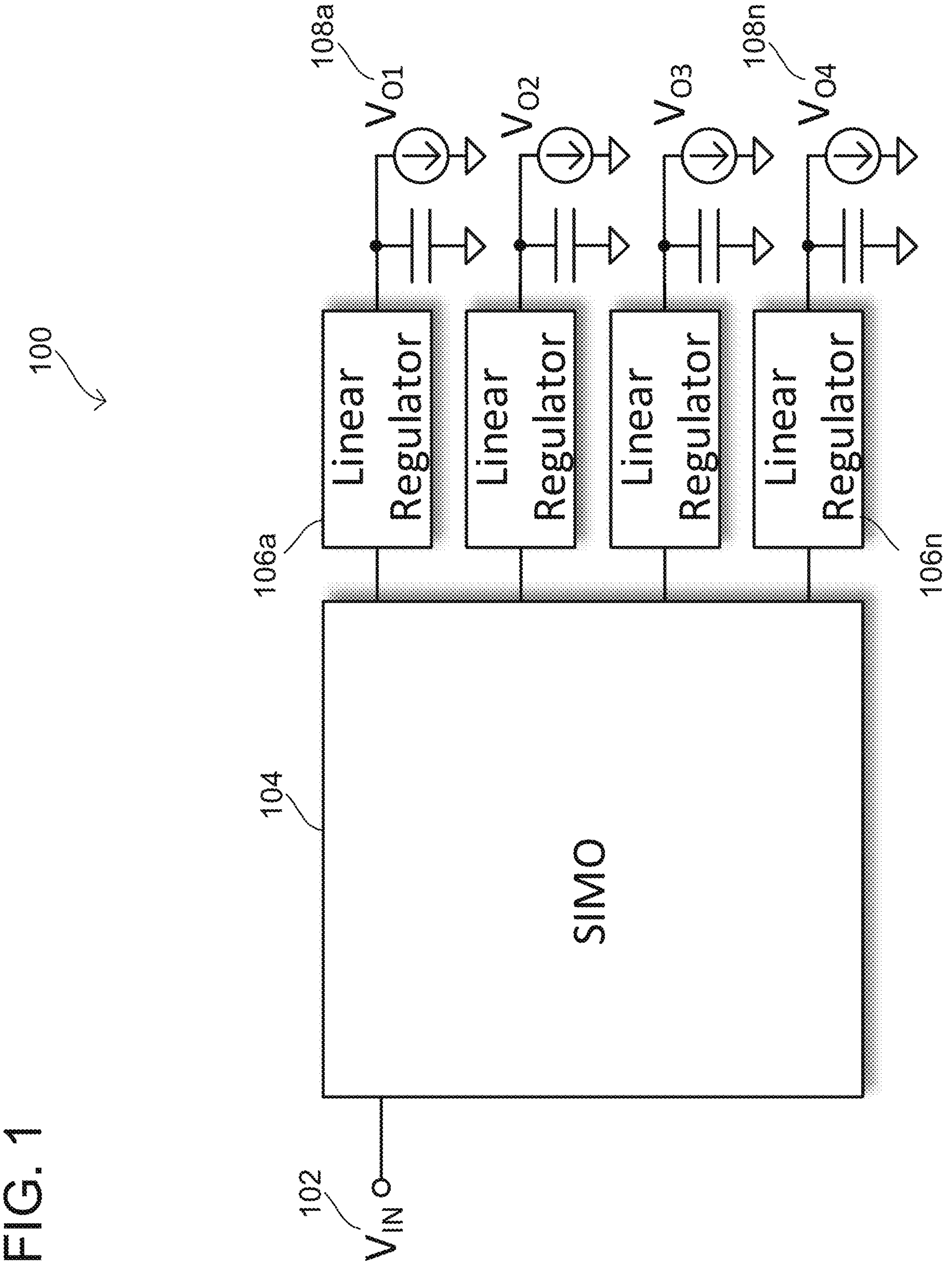
FIG. 1 exemplarily illustrates a block diagram of a SIMO system.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

The SIMO converter may utilize linear regulators to dynamically provide a regulated output voltage within a pre-defined range for a target converter output. The regulators may receive an input voltage to dynamically regulate the output voltage or voltages within the pre-defined range.

The regulators may regulate the output voltage or voltages to stay within its pre-defined range while SIMO switches are configured to provide the SIMO output with an output voltage.

Electronic device are subject to ever-increasing demands, such as requirements for miniaturization, increased connectivity, faster processor speed, and improved battery longevity, to name a few. These demands require, inter alia, robust power management capabilities, which can, at least in some situations, be implemented in small devices while maintaining cost-competitiveness. SIMO architecture is well-suited to these demands, as it is highly energy efficient, thereby extending battery life in space-constrained products. SIMO architectures also function well in ultra-low power environments, thereby making them an outstanding candidate for hearables, wearables, sensors, smart home hubs, etc.

SIMO architecture is also well-suited to satisfy another commonly-recognized need in such devices—that is, the requirement to power multiple devices or circuits with different voltage or current requirements (e.g. 2.5 V, 5 V, 10 V, etc.). SIMO architecture may be employed in the context of a DC to DC converter (e.g., a buck-boost converter) having a plurality of output rails. Using the principles and methods described herein, a buck-boost converter using SIMO can be configured to generate a plurality of different output voltages and/or currents, which may then be applied to any of a plurality of output rails using a plurality of switches. In this manner, a single DC to DC converter using SIMO technology can generate a plurality of power outputs to power a plurality of components (e.g. one or more processors, a motor, one or more speakers, etc.,) within a device (e.g. a hearable, a wearable, a sensor, a smart home hub, etc.) having differing power requirements.

The SIMO buck-boost converter and can be configured to output one or more desired voltages or currents on any of a plurality of output rails. That is, the SIMO buck-boost converter may be configured to output as many as n different voltages or currents on n output rails, or alternatively, fewer than n different voltages or currents on n output rails. As will be described in greater detail, infra, the SIMO buck-boost converter may change the selected voltage or current to be output on a given rail. Although this is demonstrated in, for example, FIG. 2 with four output rails, the number of rails is not limited to four and can be selected to be greater than or fewer than four, as desired for the implementation. For example, the SIMO buck-boost converter may be required to power a plurality of components having differing voltage and/or current requirements, and the number of rails may be selected based on the number of different voltage/current requirements of the components. These concepts may be applied to any of the SIMO buck-boost converter configurations disclosed herein, or to any other aspects of this disclosure.

As an extension of these concepts, SIMO architecture may confer valuable benefits to wireless communication devices or devices with wireless communication capabilities. Computing devices with wireless functionality, such as laptops, smartphones and tablet computers, are ubiquitous and subject to the above-referenced demands of increased miniaturization, speed, functionality, and battery life. Moreover, wireless communication functionality is being newly added to ever-more devices (e.g. Internet of Things (IoT) devices). Such wireless communication functionality often includes a variety of other components (e.g. data processing circuitry (e.g., using ADC), sensors, transceivers/power amplifiers, System on Chip (SOC) applications), which may each have their own rigid power requirements, thereby increasing the number of devices that require high-levels of power efficiency, often in the ultra-low power ranges. SIMO architecture is well-suited to meet these devices' power-efficiency needs. Moreover, considering that many such devices demand multiple different voltages and/or currents for their respective components, SIMO architecture in the context of a buck-boost DC to DC converter with multiple outputs is an outstanding option to provide efficient power management of a limited power resource (e.g., a small lithium battery) while powering a device with multiple, different voltage and/or current demands.

The SIMO converter may be configured as a SIMO system. As will be described in greater detail infra, the SIMO (e.g., an inductor and multiple outputs) may be configured as a DC to DC converter, such as a buck-boost converter. One or more output rails of the converter may include one or more regulators (e.g. one or more linear regulators, one or more push-pull regulators, one or more low dropout regulators, or any combination thereof), which may be configured to regulate a voltage and/or a current relative to the respective output rail. Each or any of the SIMO and regulators may include additional components for its operation (e.g., one or more controllers, adders, amplifiers, comparators, logic gates, etc.) The SIMO system may include the SIMO along with the components of the DC to DC converter, the components of the one or more regulators, and/or any of the additional components for operation of the SIMO and/or regulation.

FIG. 1 exemplarily illustrates a block diagram of a SIMO converter or SIMO converter architecture or SIMO system (also referred to as "SIMO" or system or SIMO circuitry sometimes hereinafter) according to some aspects, which may include input terminal 102, SIMO buck-boost converter 104, regulators 106*a-n* which may include push-pull regulators, linear regulators (such as low dropout regulators (also referred to as LDOs)), and/or voltage regulators, and output voltages 108*a-n*, in accordance with at least one aspect described in the present disclosure. The input terminal 102 may be electronically coupled to a terminal of SIMO converter 104. Each regulator of the regulators 106*a-n* may be electronically coupled to a respectively associated output of multiple outputs of SIMO converter 104. Regulators 106*a-n* may regulate a plurality of output voltages 108*a-n* (to thereby providing a supply of different voltage domains for different electrical loads). Regulators 106*a-n* may be linear regulators. As shown in FIG. 1, the (e.g. linear) regulators 106*a-n* may be connected in series with the SIMO converter 104 with respect to input terminal 102.

Different electronic devices electronically or operably coupled with one or more of the SIMO converter output rails may require different input voltages that correspond to a predefined voltage range provided at a respective output rail (also referred to as output or converter output line, for example). By way of example, a SIMO converter may be electronically coupled with a transmitter, a USB port, a Wi-Fi module, Bluetooth chip, etc. It should be noted that a other electronic devices may be coupled to a the SIMO converter. Furthermore, even different technologies, e.g. different types of transistors (e.g. thin oxide transistor vs thick oxide transistors) may require different voltage domains provided by the SIMO. All these devices or technologies may have different requirements with respect to its respective supply voltage and e.g. also the ripple of the supply voltage. A SIMO should fulfill all the requirements of connected electronic devices coupled thereto. The SIMO should be robust, simple, cheap, flexible and reliable as much as possible.

In addition to the power requirements of various device components, some devices and/or some device components may be configured to operate according to one or more operational states, wherein the operational states may also correspond to differing power requirements. For example, various devices, and/or one or more components of the various devices, may operate in any of a plurality of active modes, a plurality of inactive modes, a plurality of standby modes, a plurality of sleep modes, or otherwise. These modes may correspond to differing current consumption and/or voltage requirements. Moreover, devices and/or their components may require rapid switching between operational modes. For example, a transceiver may switch between a listing mode (e.g. active mode) and a non-listing mode (e.g. inactive mode or standby mode) many times per second. Thus, power management solutions for such devices and/or components must rapidly respond to changing power requirements and/or be configured to changes its power output according to components' anticipated power needs. The SIMO buck-boost converters described herein are well-suited to these demands.

Therefore, many different challenges have to be addressed in this technical field. By way of example, a SIMO should provide some voltages with a low voltage ripple, and/or should be flexible to be suitable for many different loads, and/or should be compact and energy efficient to fit even into devices with a small form factor such as a smartphone or other wearable electronic devices.

By way of example, each device may require a different input voltage to operate. For example, Bluetooth Low Energy (BLE) device may require an input voltage between 1.8V and 3.6V. A SIMO converter output voltage rail coupled to the BLE device may be associated with a predefined range for its switching output voltage that aligns with the input voltage requirements of the BLE device. The predefined range may also be narrower to ensure that the voltage falls within the predefined range. This may be necessary if there is a possibility that the switching output voltage is susceptible to noise.

Furthermore, a Wi-Fi module may work best a 3.3V, but may be able to operate within a predefined range of 1.7V-3.6V. The SIMO converter output voltage rail connected to the Wi-Fi module may be configured to have a smaller predefined range to ensure that the Wi-Fi module operates optimally. Each of these output voltage rails may be configured to work independently of one another, or concurrently or simultaneously based on the voltage requirement of a given connected device for a pre-determined period of time based on the function or application requirement.

Moreover, a USB port or micro-USB port may be configured to receive an 5V input voltage. However, devices plugged into the USB port may operate within a range of input voltages. For example, a micro-USB fan plugged into the USB port may operate within the input voltage range of 4.45V-5.25V. Therefore, the predefined range for the SIMO converter output rail associated with a USB port may be larger than the exact 5V defined for USB ports.

Examples of input voltage requirements may include:

| Device | Input Voltage |
|---|---|
| Bluetooth Low Energy (BLE) | 1.8 V-3.6 V |
| Radio Frequency Transmitter | 3 V-12 V |
| Wi-Fi module | 1.7 V-3.6 V |
| USB port | 5 V |

Various aspects of this disclosure are directed to improve a SIMO with respect to one or more of the above challenges or to one or more of the challenges as explained in more detail below.

According to one aspect of the disclosure, the switch controller may control the switches within the SIMO converter to provide the switching output voltage within a voltage domain of an electronic device coupled to the converter output during disjunct inductor cycles.

Figure 2:
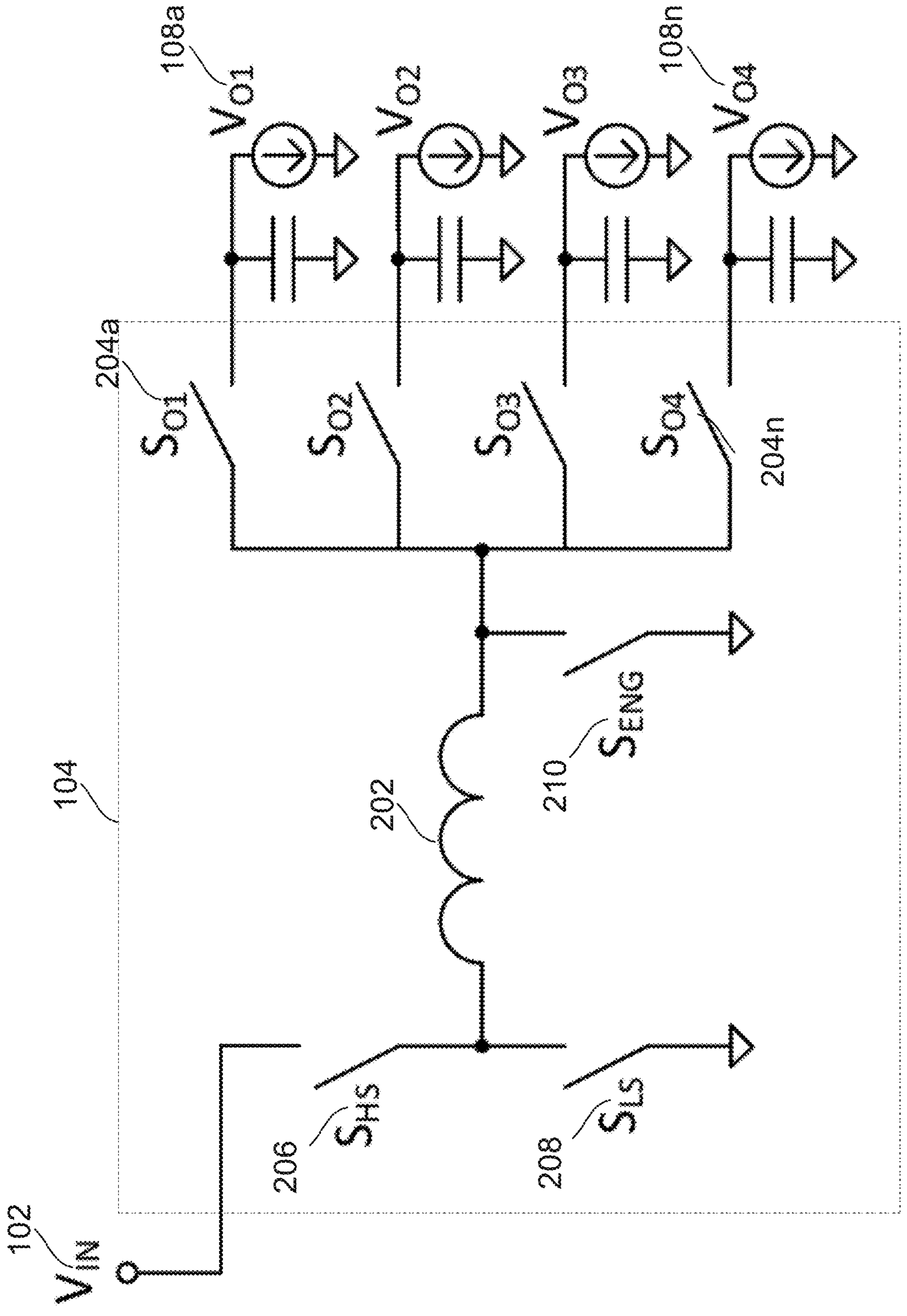
FIG. 2 illustrates a block diagram of a detailed SIMO, according to an aspect of the disclosure.

FIG. 2 illustrates an exemplary block diagram of a SIMO converter 104 according to some aspects in more detail. SIMO converter 104 may include multiple switches as illustrated (the shown example implements a buck-boost converter—it is to be noted that the switch structure would be different when implementing a different type of a SIMO converter such as a SIMO boost converter, or any other desired type of SIMO converter). For simplicity, transistors in the switches are not illustrated. It should be understood that each switch may include a transistor or may be implemented by a transistor. For example, switch 206 may be electronically coupled between the input terminal of inductor 202 and input terminal 102. Switch 208 may be electronically coupled with the input terminal of inductor 202 and a reference potential, such as ground. Switch 210 may be electronically coupled with the output terminal of the inductor and a reference potential, such as ground. Switches 204*a-n* may be electronically coupled with the output terminal of inductor 202 and a plurality of outputs of SIMO 104.

One or more switch controllers, not illustrated in FIG. 2, may control the switches. For example, the switch controller may control switches 204*a-n* to control a voltage ripple of a switching output voltage of the switching output voltages 108*a-n* as provided to an associated output of the outputs of the SIMO converter 104. Additionally, a controller can control power switches 206 and 210 to close to energize inductor 202. The controller may control those switches to remain closed for a pre-determined period of time or until inductor 202 has reached a defined level of energy. Furthermore, a controller can control switch 208 and one of switches 204*a-n* to close to supply one of output voltages 108*a-n* to the output terminals 110*a-n*. The controller may control those switches to remain closed for a pre-determined period of time or until the defined output voltage is reached. As the number of outputs of SIMO converter increases, one or more additional output branches may be added.

Switches 204*a-n*, 206, 208, and 210 may be independently and/or collectively controlled by one switch controller, independently by an individual switch controller, or any combination thereof. Additionally, switches 204*a-n*, 206, 208, and 210 may all be part of the same circuit or individual circuits.

Although FIG. 2 is depicted as including an inductor, the SIMO buck-boost converter 104 may be optionally configured without an inverter, according to various aspects of the disclosure. In this configuration, the SIMO buck-boost converter 104 may receive an output voltage or current of an external inductor, the external inductor not being considered as part of the SIMO buck-boost converter in this particular implementation. In this configuration, the inductor's output voltage or current may be applied to any of one or more output terminals 110*a-n* through switches 204*a-n*, and the output voltages or currents may be regulated as otherwise described herein. In this manner, the SIMO buck-boost controller 104 may be configured as an integrated circuit or chip. According to some aspects of the disclosure, in implementations in which the SIMO buck-boost converter is configured as an integrated circuit or chip without including an inductor as part of the converter, the SIMO buck-boost converter may include one or more switch controllers and/or one or more switches to control the energizing and deenergizing phases of the inductor as described herein (e.g. switches 208 and 210, or any other switches described herein to control the inductor's duty cycle).

Figure 3:
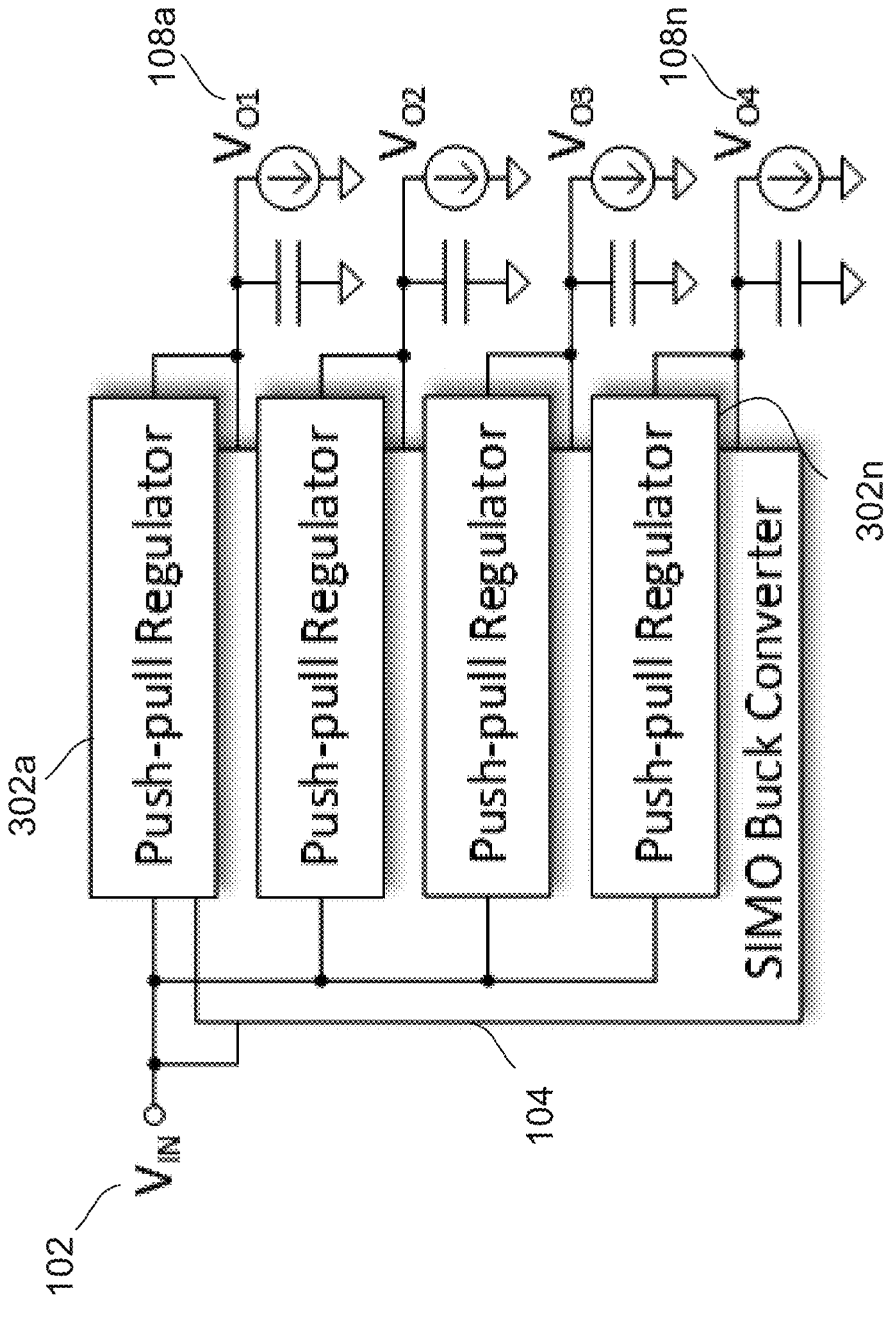
FIG. 3 exemplarily shows a SIMO with push-pull linear regulators.

FIG. 3 exemplarily shows a SIMO converter 104 with push-pull regulators 302*a-n*, which may include push-pull linear regulators and/or voltage regulators, according to some aspects. Push-pull regulators 302*a-n* may be the regulators 106*a-n* of FIG. 1. As shown in FIG. 3, the push-pull regulators 302*a-n* may be connected in parallel with one another, and/or implemented to be in parallel with the SIMO buck-boost converter 104 with respect to input terminal 102.

Figure 4:
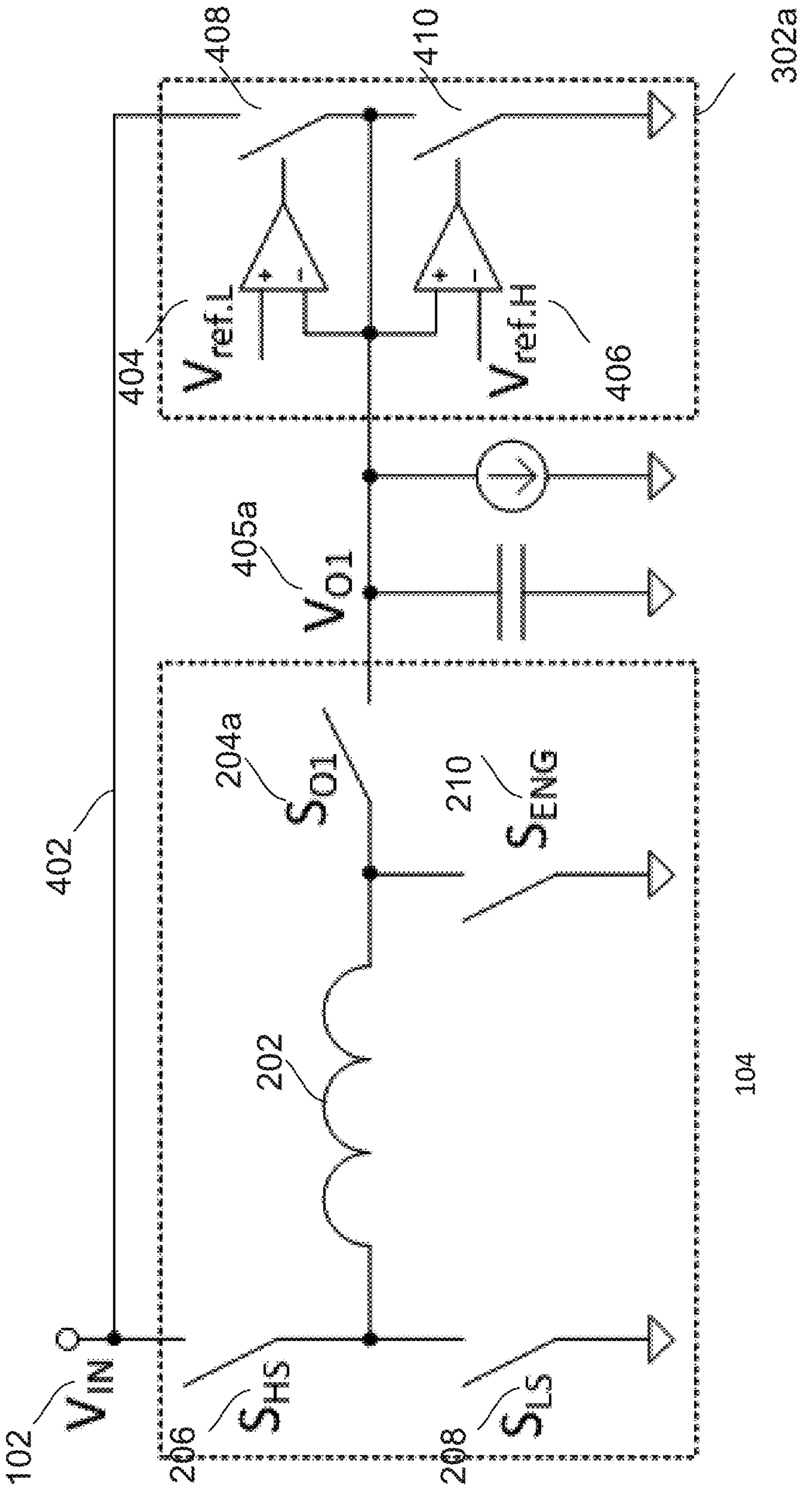
FIG. 4 illustrates a detailed block diagram of a linear regulator.

FIG. 4 illustrates a detailed block diagram of a regulator according to some aspects. For example, regulator 106*a* of FIG. 1 may be a push-pull regulator 302*a*. As illustrated in FIG. 4, the push-pull regulator 302*a* may be electronically coupled to input terminal 102 and an output of SIMO converter. Push-pull regulator 302*a* may regulate target output voltage 405*a* Voi. Push-pull regulator 302*a* may include comparators (e.g. a first comparator 404 and a second comparator 406) to compare a low reference voltage and a high reference voltage respectively with an output voltage on an associated output (e.g. an associated output rail of the SIMO converter). A single push-pull regulator 302*a* is illustrated for simplicity. In some aspects of the disclosure multiple push-pull regulators may be included to regulate different output voltages. In this case, exactly one push-pull regulator of multiple push-pull regulators may be assigned to each output of multiple outputs of the SIMO converter. Furthermore, in various aspects of this disclosure, only one comparator may be provided for a respective output of multiple outputs of the SIMO converter. Thus, in some implementations, one or more outputs may include exactly one comparator 404 to compare an output voltage on the associated output with a low reference voltage. Furthermore, in some implementations, one or more outputs may include exactly one comparator 406 to compare an output voltage on the associated output with a high reference voltage. Moreover, any kind of hybrid implementation with one or more comparators per output of the SIMO converter may be provided.

Push-pull regulator 302*a* may also include switches 408 and 410. The voltages fed forward from the first comparator 404 and the second comparator 406 may be used to control switches 408 and 410. If the output voltage 204*a* is below a low reference voltage (which may be applied to a non-inverting input of the first comparator 404), first comparator 404 may close switch 408 to regulate output voltage and bring it up within a pre-defined voltage range. If the output voltage 405*a* is above a high reference voltage (which may be applied to an inverting input of the second comparator 406), second comparator 406 may close switch 410 to regulate output voltage and bring it down within a pre-defined voltage range. If the output voltage 405*a* is within a pre-defined voltage range, the switches 408 and 410 will remain open and regulator 302*a* will not regulate the output voltage.

Comparators 404 and 406 may receive a low reference voltage and a high reference voltage respectively. The low and high reference voltages set the low and high limits for the pre-defined range of the output voltage. While the SIMO output voltage is within the pre-defined range, the regulator 302*a* is not operating, increasing the efficiency of system 400.

Regulator 302*a* operates when the SIMO output voltage 405*a* falls outside of the pre-defined range. If output voltage 405*a* is greater than the high reference voltage, regulator 302*a* may engage a sink circuit to regulate output voltage 405*a* within the pre-defined range. If output voltage 405*a* is lower than the low reference voltage, regulator 302*a* may engage a source circuit to regulate output voltage 405*a* within the pre-defined range.

Operating regulator 302*a* is less efficient than operating the SIMO converter and should be minimized. For efficiency-critical outputs (efficiency is more critical than ripple or regulation), the pre-defined range may be configured to be large to engage the push-pull regulators less. For ripple-critical outputs (ripple is more critical than efficiency), the pre-defined range may be configured to be small to more precisely regulate the output voltage. For fast droop/overshoot, the low reference voltage can be higher to protect from fast droop, or the high reference voltage can be lower for fast overshoot.

Dynamic programming of pre-defined range may also be possible. This may be necessary when one SIMO output may experience different load activities. That is, operating regulator 302*a* may be capable of operating within a plurality of pre-defined ranges, and these pre-defined ranges may be selected using any of at least a pre-defined timing, an on-demand response, or using adaptive selection. In a timing-based selection, the pre-defined range of operating regulator 302*a* (or of any regulator on any output rail) may be selected based on a pre-defined timing (e.g. a first pre-defined range for a first duration, a second pre-defined range for a second duration, a third pre-defined range for a third duration, etc.). Although this pre-defined timing selection model may be used in a wide variety of implementations, one such implementation may be in the event that a component is expected to switch between operational modes (e.g. modes having different current and/or voltage requirements) on a known schedule. In this manner, the pre-defined timing may be selected to correspond to the current and/or voltage requirements that correspond to the operational modes. According to another aspect, the pre-defined range may be selected based on an on-demand requirement. In this manner, one or more components to select the pre-defined range (e.g. a controller) may be configured in a feed-back loop to receive a measurement of a current drawn by the load, a voltage across a known resistor, or other source of information to identify one of the plurality of pre-defined settings corresponding to the current and/or voltage requirement of the load. Using this information, one or more components to select the pre-defined range may select the corresponding pre-defined range to meet the load's requirements. According to another aspect, the pre-defined range may be adaptively selected. In this manner, one or more processors may be configured to use one or more calculations to anticipate a power requirement and to adapt accordingly. In the manner, the one or more processors may receive power demands of the output rail (e.g. a drawn current, a voltage across a known resistor, etc.) and to compare this information to historical power demands of the rail and/or load to identify a likely next power demand. The one or more processors may be configured to recognize one or more patterns of the power demands and to identify a likely next power demand based on a current power demand and/or one or more recent power demands. The one or more processors may be configured to execute one or more artificial neural nets or other artificial intelligence, which may adaptively select a pre-defined range based on a current power demand and/or one or more recent power demands in light of historical power demand information.

In some aspects of the disclosure, the switch 410 may be connected to ground or any other reference potential. Additionally, push-pull regulator 302*a* may include other elements not illustrated in FIG. 4.

Figure 5:
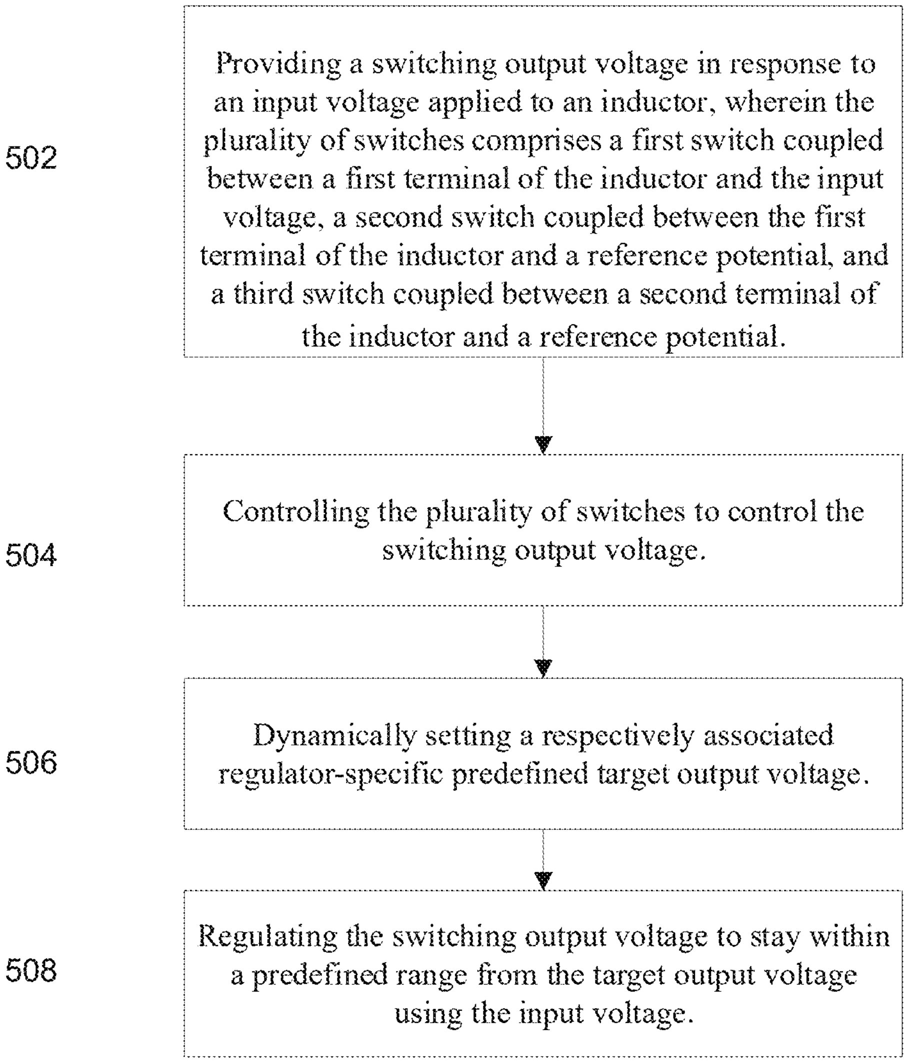
FIG. 5 exemplarily shows a flowchart of a method of operating a SIMO.

FIG. 5 exemplarily shows a flowchart of a method of operating a SIMO converter according to some aspects. Method 500 includes providing a switching output voltage in response to an input voltage applied to an inductor. The SIMO includes a plurality of switches which may include a first switch coupled between a first terminal of the inductor and the input voltage, a second switch coupled between the first terminal of the inductor and a reference potential, and a third switch coupled between a second terminal of the inductor and a reference potential 502. The method may further include controlling the plurality of switches to control the switching output voltage 504; dynamically setting a respectively associated regulator-specific pre-defined target output voltage 506; and regulating the switching output voltage to stay within a pre-defined voltage range from the target output voltage using the input voltage 508.

FIG. 6 exemplarily shows a flowchart of a method of operating a SIMO according to some aspects. Method 600 includes controlling a switching stage including an inductor and a plurality of switches to provide a switching output voltage in response to an applied input voltage dependent on the switching states of the plurality of switches. The plurality of switches may include a first switch coupled between a first terminal of the inductor and the input voltage, a second switch coupled between the first terminal of the inductor and a reference potential, and a third switch coupled between a second terminal of the inductor and a reference potential. The method may further include dynamically setting an output voltage in response to receiving the switching output voltage 604; determining at least one of whether the switching output voltage is above a pre-defined upper threshold voltage which is greater than a target regulator output voltage or whether the switching output voltage is below a pre-defined lower threshold voltage which is smaller than the target regulator output voltage 606; and regulating the switching output voltage using the input voltage 608.

Figure 7:
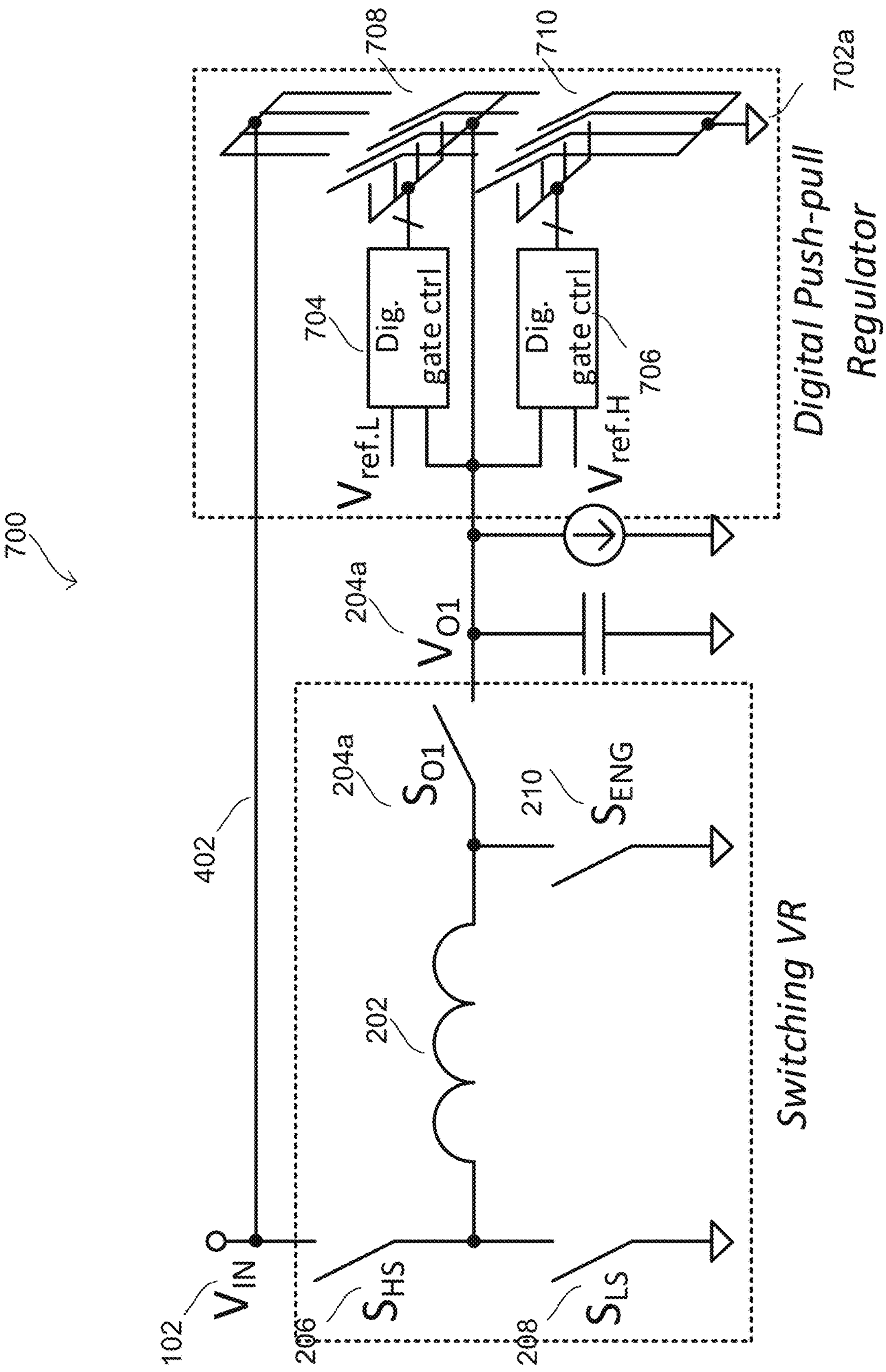
FIG. 7 shows a detailed block diagram of a regulator.

FIG. 7 illustrates a detailed block diagram of an example system 700 including a regulator according to some aspects. For example, regulator 106*a* of FIG. 1 may be a digital push-pull regulator 702*a*. As illustrated in FIG. 7, the digital push-pull regulator 702*a* may be electronically coupled to input terminal 102 and an output of SIMO converter. Digital push-pull regulator 702*a* may regulate target output voltage 405*a*. Digital Push-pull regulator 702*a* may include digital gate controllers (e.g. a first digital gate controller 704 and a second digital gate controller 706) to compare a low reference voltage and a high reference voltage respectively with an output voltage on an associated output (e.g. an associated output rail of the SIMO converter). A single Digital push-pull regulator 702*a* is illustrated for simplicity. In some aspects of the disclosure multiple push-pull regulators may be included to regulate different output voltages. In this case, exactly one push-pull regulator of multiple digital push-pull regulators may be assigned to each output of multiple outputs of the SIMO converter. Furthermore, in various aspects of this disclosure, only one digital gate controller may be provided for a respective output of multiple outputs of the SIMO converter. Thus, in some implementations, one or more outputs may include exactly one digital gate controller 704 to compare an output voltage on the associated output with a low reference voltage. Furthermore, in some implementations, one or more outputs may include exactly one digital gate controller 706 to compare an output voltage on the associated output with a high reference voltage. Moreover, any kind of hybrid implementation with one or more digital gate controllers per output of the SIMO converter may be provided.

Digital push-pull regulator 702*a* may also include switches 708 and 710. The voltages fed forward from the first gate controller 704 and the second gate controller 706 may be used to control switches 708 and 710. If the output voltage 405*a* is below a low reference voltage (which may be applied to the first controller 704, e.g. a non-inverting input of a comparator), first controller 704 may close one or more switches 708 to regulate output voltage and bring it up within a pre-defined voltage range. If the output voltage 405*a* is above a high reference voltage (which may be applied to the second controller 706, e.g. an inverting input of a comparator), second controller 706 may close one or more switches 710 to regulate output voltage and bring it down within a pre-defined voltage range. If the output voltage 405*a* is within a pre-defined voltage range, the switches 708 and 710 will remain open and regulator 302*a* will not regulate the output voltage.

The SIMO system may regulate the output voltages with Digital push-pull regulators and analog push-pull regulators. A digital push-pull regulator may regulate the output voltage with the use of a number of power switches (708 and 710). An analog push-pull regulator may regulate the output voltage with a gate voltage of switches (408 and 410).

The system including the SIMO converter, the regulators, may operate to dynamically set an output voltage within a pre-defined range for a target SIMO output. The SIMO converter may include an input terminal to charge an inductor. Closing a switch connected between the input terminal and an input terminal of the inductor along with a switch connected to the output terminal of the inductor and ground energize the inductor. Once energized, the SIMO may include switches and a switch controller to supply an output with an output voltage from the energized inductor. The regulators may regulate the output voltage to stay within its pre-defined range while switches supplying the output are closed (on). The regulators may use the input voltage from the input terminal to regulate the output voltages. Using the input voltage to regulate the output voltage (e.g. using the first comparator) allows a fast regulation of the output voltage to re-enter the pre-defined voltage range (e.g. pre-defined by the low reference voltage) when the output voltage exits the same. Furthermore, using a reference potential such as the ground potential to regulate the output voltage (e.g. using the second comparator) also allows a fast regulation of the output voltage to re-enter the pre-defined voltage range (e.g. pre-defined by the high reference voltage) when the output voltage exits the same.

A regulator connected to the input terminal and an output terminal of the SIMO may be used to regulate the output voltage of the respective output terminal (or output rail). Using the input voltage from the input terminal, the regulator can maintain the output voltage within its pre-defined range while the switch connected to the output is closed.

The inductor may be implemented on a separate chip from the switches of the SIMO and the linear regulators. The switches of the SIMO and the linear regulators may be implemented on the same chip.

A plurality of switches may be electronically or operably coupled between or to the output terminal of the inductor and outputs of the SIMO. An additional switch may be electronically coupled between the output terminal of the inductor and the input terminal.

The SIMO system may include a capacitor electronically or operably coupled between or to the output voltage and a reference potential such as ground. Each capacitor may have a configurable capacity range. The capacity range may vary between different output voltages.

The inductor of the SIMO system may have a dynamically configurable inductance range. Additionally, the SIMO may be configured to output a voltage less than the input voltage, for example as a buck converter. Alternatively, the SIMO may be configured to output a voltage to match the load voltage, for example as a boost converter.

As described above, the regulators used to regulate the output voltages may be configured as push-pull regulators. The regulator may use a switch electronically coupled between the input voltage and the output voltage to regulate the output voltage within its pre-defined range. Additionally, the regulator may include one or more comparators to regulate the output voltage.

For example, the regulator may include a low reference comparator and/or a high reference comparator. If the output voltage is below its respective pre-defined range, a switch controller may control a switch between the input voltage and the output voltage to elevate the output voltage to within its pre-defined range.

If the output voltage is above its respective pre-defined range, a switch controller may control a switch between the output voltage and a reference potential, such as ground, to drop the output voltage to within its pre-defined range. Alternatively, the switch may be between the input voltage and a reference potential.

The regulator may also include a capacitor electronically coupled between the switching output voltage and a potential reference, such as ground. The capacitor may be dynamically configured to have a pre-defined capacity range.

Various implementations of a hysteric comparator are possible. For example, the hysteric comparator may be configured with an intentional mismatch between the transistor's pair of inputs. This implementation eliminates additional power loss. However, this may cause a high variation in the hysteresis voltage and affect the voltage offset.

As another example, the hysteric comparator may be configured to receive a current injection at one of the transistor's inputs. This implementation allows for accurate control of the hysteresis voltage and does not affect the voltage offset. However, it requires the addition of extra circuitry and extra current. Additional implementations of a hysteric comparator, other than those previously listed, are possible.

The output switches of the SIMO converter 104 may be configured to operate as either as an on/off switch or a linear regulator. The switches may operate as on/off switches to provide the switching output voltage on a corresponding converter output. In addition, the switches may operate as linear regulators to regulate the switching output voltage on a different converter output.

EFFICENC IS ONE THING; BUT ALS NEED WITH DIFFERNE LAOD ON NEIBORING RAILS: CAN LEAR TO CROSS-REGULATING: NEEE DTO CHANGE CAN BE CHANGED THOUGHT

Figure 8:
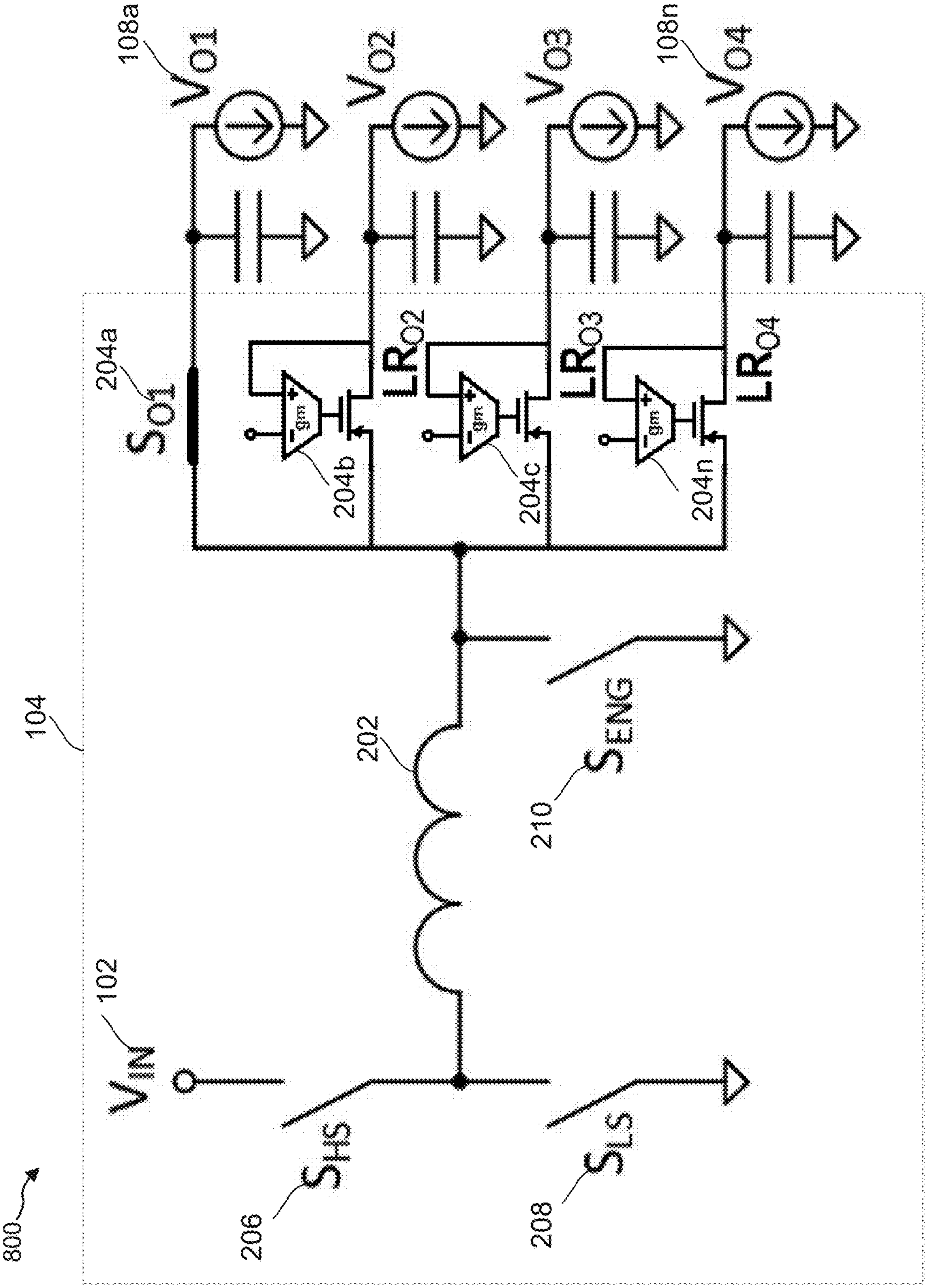
FIG. 8 exemplarily illustrates a block diagram of a system that includes the SIMO.

FIG. 8 illustrates a block diagram of an example system 800 that includes the SIMO converter 104, in accordance with at least one aspect described in the present disclosure. In some aspects of the present disclosure, the SIMO converter 104 may correspond to the SIMO converter 104 described elsewhere in the present disclosure. In some aspects of the present disclosure, the SIMO converter 104 may include multiple outputs to provide the switching output voltage 108*a-n* at different values at two or more of the converter outputs (or output rails or output voltage rails). In some aspects of the present disclosure, the system 800 may include one or more low dropout regulators (also referred to as LDOs) (not illustrated). In some aspects of the present disclosure, the LDOs may correspond to the regulators 106 described elsewhere in the present disclosure.

The switches 204*a-n* (e.g., secondary switches 204*a-n*) may each include at least one transistor. The transistors may be configured to operate in a first operation mode or a second operation mode. In the first operation mode, the corresponding switches 204*a-n* may operate as on/off switches. For example, the switches 204*a-n* may transition between an open state (e.g., a non-conducting state) and a closed state (e.g., a conducting state). In the first operation mode, the system 800 may operate as a hybrid SIMO converter as discussed elsewhere in the present disclosure.

In the second operation mode (illustrated in FIG. 8), one or more secondary switches 204*b-n* (as illustrated in FIG. 8) may operate as regulators and one or more secondary switches 204*a* (as illustrated in FIG. 8) may operate as on/off switches. The secondary switch 204*a* is illustrated in FIG. 8 as being on for ease of discussion and illustration.

In some aspects of the present disclosure, one or more the transistors of the switches 204*a-n* may operate in the linear region (e.g., the active region) and operate as the regulators. In FIG. 8, the secondary switches 204*b-n* are illustrated as regulators for ease of discussion and illustration. When operating a switch 204*b-n* as a regulator, one terminal (source) may receive the switched output voltage at the output terminal of the inductor 202. The other terminal (drain) of the switch 204*b-n* may be connected to the associated output terminal 110*b-n* to provide the output voltage 108*b-n*. The other terminal of the switch 204*b-n* may be connected to an input of a comparator, which may compare the potential at the other terminal of the switch 204*b-n* and a reference voltage. The output of the comparator may be connected to the gate of the switch 204*b-n* to drive the switch 204*b-n* in the linear region. In the second operation mode, in some aspects of the present disclosure, the system 800 may operate as a single input single output (SISO) converter. In some aspects of the present disclosure, in the second operation mode, the first secondary switch 204*a* may operate in the closed state (e.g., the on position) and the other secondary switches 204*b-n* may operate as regulators. In these and other aspects of the present disclosure, for the other secondary switches 204*b-n*, one or more LDOs may set the associated regulator-specific target output voltage. Alternatively, for the other secondary switches 204*b-n*, one or more of the other secondary switches 204*b-n* may set the associated regulator-specific target output voltage from the first converter output VO1 108*a* to regulate the switching output voltage on the first converter output.

Figure 9:
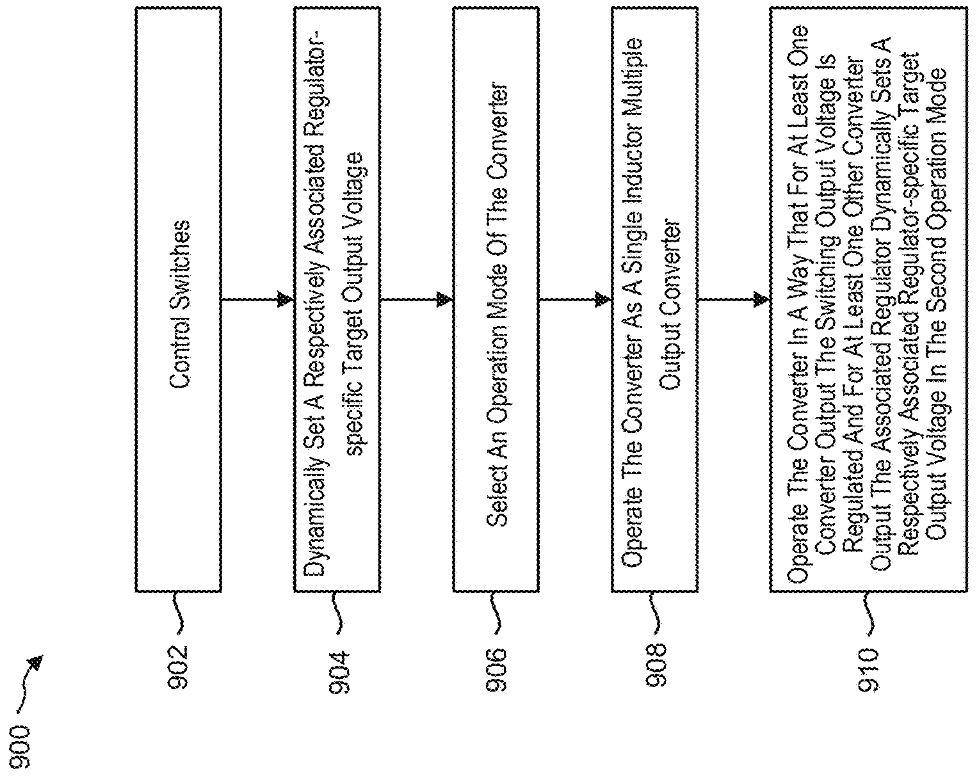
FIG. 9 exemplarily shows a flowchart of a method of operating a switched converter.

FIG. 9 illustrates a flowchart of an example method 900 of operating a switched converter, in accordance with at least one aspect described in the present disclosure. The method 900 may include one or more blocks 902, 904, 906, 908, or 910. Although illustrated with discrete blocks, the operations associated with one or more of the blocks of the method 900 may be divided into additional blocks, combined into fewer blocks, or eliminated, depending on the particular implementation.

At block 902, method may include controlling switches. In some aspects of the present disclosure, method may include controlling the switches to control the switching output voltage. In these and other aspects of the present disclosure, method may include controlling the switches to apply the switching output voltage to a converter output.

At block 904, method may include dynamically setting a respectively associated regulator-specific target output voltage. In some aspects of the present disclosure, method may include dynamically setting the associated regulator-specific target output voltage to a respective converter output.

At block 906, method may include selecting an operation mode of a converter. In some aspects of the present disclosure, method may include selecting the operation mode of the converter from a first operation mode or a second operation mode.

At block 908, method may include operating the converter as a single inductor multiple output converter. In some aspects of the present disclosure, method may include operating the converter as a SIMO converter in the first operation mode.

At block 910, method may include operating the converter in a way that for at least one converter output the switching output voltage is regulated and that for at least one output, its serial switch is constant ON/conducting and being regulated by the primary switches serving as primary SISO output. In some aspects of the present disclosure, the converter may be operated in a way that for at least one converter output, the corresponding secondary switch constantly operates in the closed position, and the switching output voltage on the corresponding converter output is regulated by other secondary switches operating as regulators. In these and other aspects of the present disclosure, method may include operating the converter in the way that for at least one converter output the switching output voltage is regulated and include operating the converter in the way that for at least one converter output.

Modifications, additions, or omissions may be made to the method 900 without departing from the scope of the present disclosure. For example, the operations of the method 900 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

Electronic devices that are electrically or operably coupled to the converter outputs may include different input voltage or input voltage optimization settings. In some aspects of the present disclosure, one or more electronic devices may include high efficiency settings while other electronic devices may include high noise and regulation settings for the switching output voltage. In some aspects of the present disclosure, operating the DC to DC converter (e.g., the system 800) as a SIMO converter may provide the switching output voltage (e.g., the input voltage for the electronic devices) at a high efficiency. In these and other aspects of the present disclosure, operating the DC to DC converter as a SISO that includes the switches operating as regulators may reduce noise and increase regulation (e.g., cross-regulation) of the switching output voltage.

In some aspects of the present disclosure, one or more of the secondary switches may operate in two or more operation modes. In these and other aspects of the present disclosure, a first operation mode of the secondary switches may include an on/off operation mode. In these and other aspects of the present disclosure, a second operation mode of the secondary switches may include a regulation operation mode. In the second operation mode, the secondary switch between the inductor and the first converter output may operate as an on/off switch and one or more of the other secondary switches may operate as regulators. Operating the secondary switches in either the first operation mode or the second operation mode may permit the system to operate as a SIMO converter or as a SISO converter.

In some aspects of the present disclosure, the secondary switches may include a plurality of transistors. In these and other aspects of the present disclosure, the transistors of the secondary switches may be configured to operate in a saturation region or an active region/linear region. During operation in the saturation region, the transistors may operate as the on/off switches. Operation of the transistors as the on/off switches may permit (e.g., conduct) or prevent (e.g., not conduct or pause or mute) current from propagating the transistors. During operation in the linear region, the transistors may operate as regulators. Operation of the transistors as the regulators may cause the transistors to regulate the switching output voltage on one or more of the converter outputs.

In some aspects of the present disclosure, the transistors of the secondary switches that operate as regulators may operate as linear regulators. In other aspects of the present disclosure, the transistors of the secondary switches that operate as regulators may operate as digital regulators.

In some aspects of the present disclosure, one or more processors may control operation of the system. In these and other aspects of the present disclosure, the processors may select the operation mode (e.g., the first operation mode or the second operation mode) of the system. In the first operation mode, the secondary switches may operate as on/off switches and the system may operation as a SIMO converter as discussed elsewhere in the present disclosure. In the first operation mode, the secondary switches may operate in the cut-off region (e.g., non-conducting state) or the saturation region (e.g., conducting state). In the second operation mode, the transistors of the secondary switches may operate as on/off switches or regulators.

In the second operation mode, the transistor of the first secondary switch between the inductor and the first converter output may operate as an on switch. In these and other aspects of the present disclosure, in the second operation mode, the first secondary switch may provide the switching output voltage (e.g., the first secondary switch may be defined as the main output voltage rail of the SISO converter).

In some aspects of the present disclosure, in the second mode of operation, the transistors of one or more of the other secondary switches may operate as the on switches and the transistor of the first secondary switch may operate as the regulator. In addition, in some aspects of the present disclosure, the transistors of more than one of the secondary switches may operate as the on switch at the same time.

In some aspects of the present disclosure, the system (e.g., the converter), in the second operation mode, may operate such that at least one converter output is regulated. The transistor of the secondary switch of the converter output that is regulated may operate as an on switch. In addition, the transistors of one or more other secondary switches may operate as regulators and may set the output voltage (e.g., the switching output voltage) to the regulator-specific target output voltage.

In some aspects of the present disclosure, exactly one converter output of the system may be regulated. In these and other aspects of the present disclosure, for the other converter outputs, the regulator may dynamically set the associated regulator-specific target output voltage.

In some aspects of the present disclosure, the converter outputs may be regulated using the transistors that make up corresponding secondary switches. In these and other aspects of the present disclosure, the transistors may operate in the linear region as the regulators. In some aspects of the present disclosure, one or more of the converter outputs may be regulated by causing the corresponding transistors to operate in the saturation region.

In some aspects of the present disclosure, one or more of the transistors of the secondary switches may operate as linear regulators. In these and other aspects of the present disclosure, one or more of the transistors of the secondary switches may operate as digital regulators.

Accordingly, one or more aspects described in the present disclosure may provide the switching output voltage (e.g., a single device may provide the switching output voltage) at different values and settings for electronic devices that include different levels of efficiency and regulation settings.

As already mentioned, one difficulty in a SIMO architecture or SIMO converter is cross-regulation. Cross-regulation may be understood as a change in output voltage of a multi-voltage power supply, when the change in output voltage results from a load change at one or more output voltage rails of a SIMO converter (which may include a plurality of output rails). Resulting noise from such cross-regulation in a regulated output supply perturbation can translate into a output voltage ripple in one or more other output voltage rails. Various components and/or loads may be intolerant to such ripples, and it may generally be desired to avoid, minimize, or mitigate such ripples.

Output voltage ripples due to cross-regulation noise may be reduced or mitigated, or even eliminated by configuring two or more SIMO output rails with one or more parallel push-pull regulators. Where such a parallel push-pull regulator is present at two or more SIMO output rails, such a configuration may be further expanded to have the parallel regulator with improved power supply rejection ration (PSRR) supplied in series by another SIMO output rail, such as a higher voltage output rail.

PSRR, which may also be known as supply-voltage rejection ratio, may be understood as the capability of an electronic circuit to suppress power supply variations to its output signal. PSRR may be defined as the ratio of the change in supply voltage to the equivalent (differential) output voltage it produces. Such an output voltage will depend on the feedback circuit, as is true with regular input offset voltages.

This configuration of having parallel push-pull regulators between rails (one push-pull regulator may be provided between respective two output rails for different output voltages) may result in increased efficiency and/or reduced size. This configuration is expected to improve output supply regulation and reduce cross-regulation of noise-sensitive outputs, especially in Analog/RF domains.

According to some aspects of the disclosure, it may be desirable to obtain a regulator's equalizing current from a one of the plurality of output rails rather than from the input terminal (e.g. Vin). Similarly, it may be desired for a regulator to regulate by shunting current from an output rail to another output rail. Using either or both of these concepts (receiving equalizing current from, or shunting current to, another output rail) may improve overall efficiency compared to receiving equalizing current from the input terminal or shunting current to ground. These concepts may be implemented on a single output rail or any combination of rails, as desired.

Figure 10:
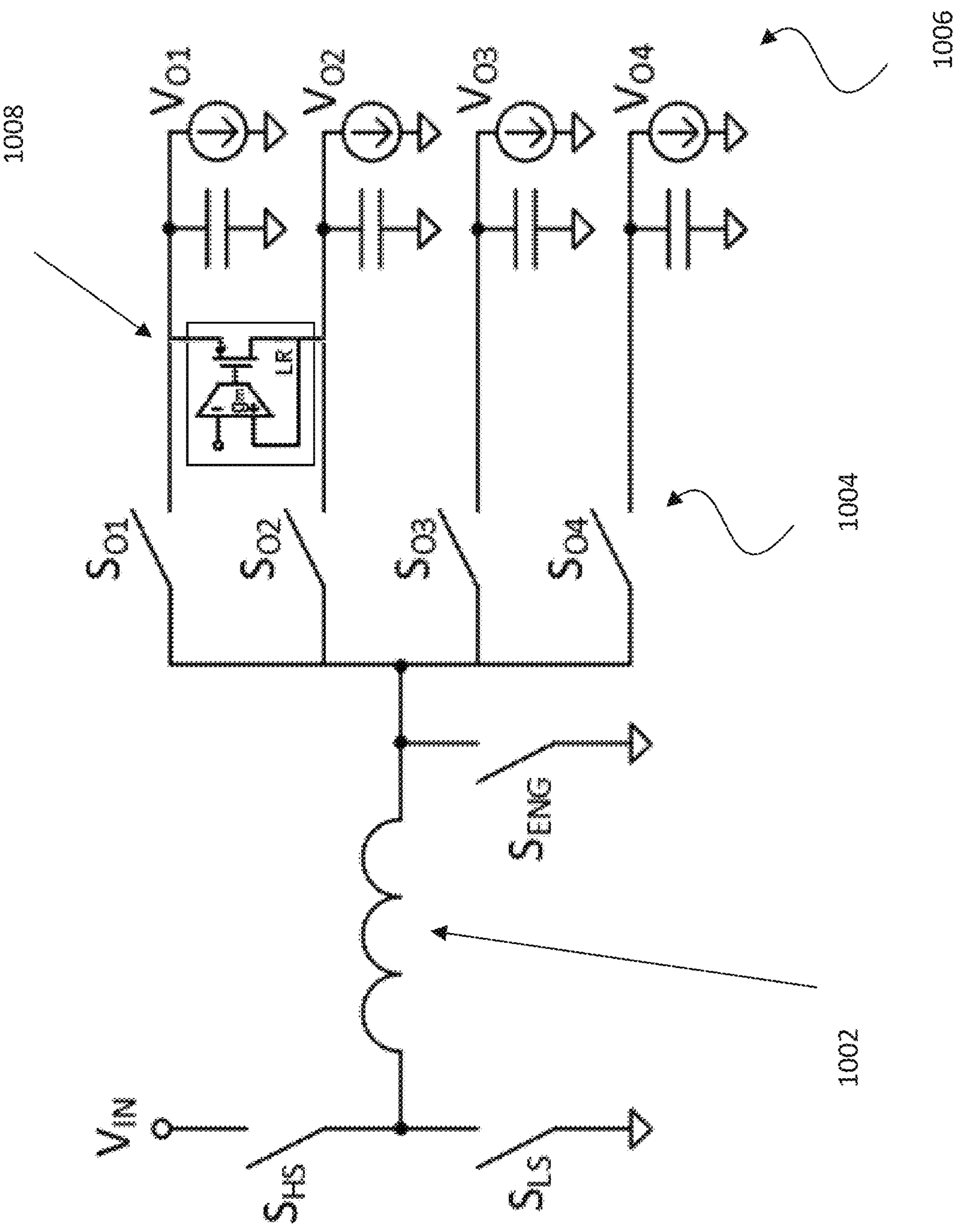
FIG. 10 shows a SIMO circuitry according to an aspect of the disclosure.

FIG. 10 shows an exemplary SIMO circuitry according to an aspect of the disclosure. In this circuitry, a single inductor 1002 is connected via a plurality of switches 1004 (depicted as S01 through S04) to a plurality of converter output lines 1006 (also referred to as converter output rails or converter output voltage rails). A switch controller may be configured to control the switches. The switches in turn may control the switching output voltage by switching one or more switches of the plurality of switches on or off in accordance with the control by the switch controller based on the output voltage requirement for a pre-determined period of time.

According to this aspect of the disclosure, at least two of the output lines may be connected by at least one regulator 1008. The regulator 1008 may include or be a linear regulator. The at least one regulator may be configured to dynamically set a respectively associated regulator-specific pre-defined target output voltage at an associated converter output line of the plurality of converter output lines. The at least one linear regulator may be further configured to regulate the switching output voltage to stay within a pre-defined range from the target output voltage using a current from another converter output line (e.g., S02) of the plurality of converter output lines.

The at least one regulator may include or be a push-pull regulator and may include a switch coupled between or to the two converter output lines (see e.g., transistor between V01 and V02). The at least one regulator of the plurality of regulators may include a first comparator circuit (see e.g., comparator between S01 and S02), configured to compare the switching output voltage with a pre-defined first threshold voltage (See e.g., reference voltage connected to negative (inverting) terminal of comparator) and to control the switch coupled between the two converter output lines such that the switch is closed if the switching output voltage is smaller than the pre-defined first threshold voltage and such that the switch is open if the switching output voltage is higher than the pre-defined first threshold voltage.

Figure 11:
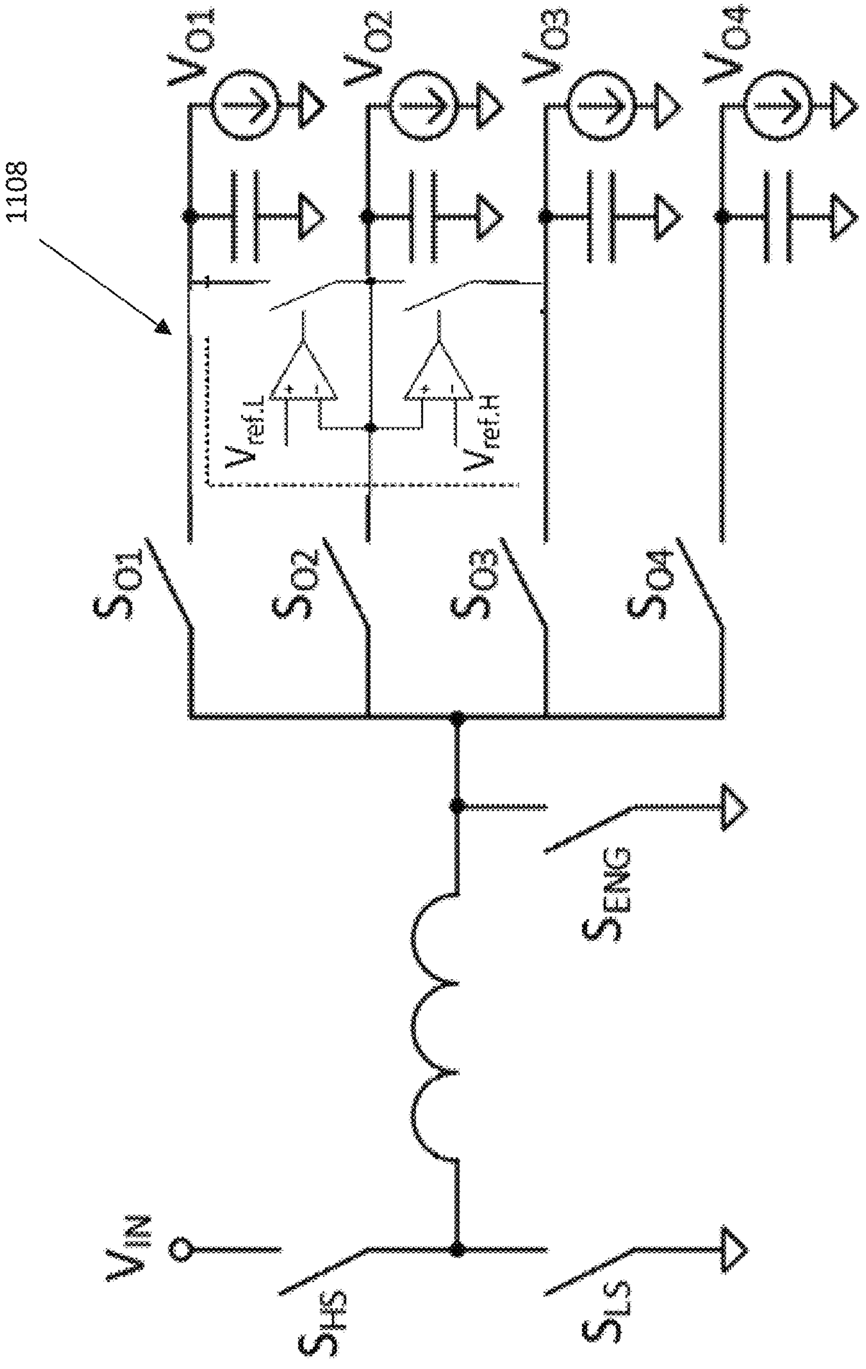
FIG. 11 shows a SIMO circuitry according to an additional aspect of the disclosure.

FIG. 11 shows a SIMO circuitry according to an additional aspect of the disclosure. According to this additional aspect of the disclosure, at least one voltage rail of the plurality of voltage rails ($V_{01}$-$V_{04}$) may include a set of parallel push-pull regulators 1108. As depicted herein, the pair of parallel push-pull regulators may include at least one amplifier pair, organized as a high-side amplifier and a low-side amplifier. The positive terminal of the low-side amplifier may be connected to a low reference voltage, and the negative terminal of the high-side amplifier may be connected to the high reference voltage. The amplifiers may each be configured to activate a switch (shown to the right of the amplifiers, wherein an output of the low-side amplifier opens or closes a connection between $V_{01}$ and $V_{02}$, and wherein an output of the high-side amplifier opens or closes a connection between $V_{02}$ and $V_{03}$). In this manner, an output of the inductor during its deenergizing phase may be connected to an output rail (in this example, to output rail $V_{02}$ via switch $S_{02}$), and the voltage may be further modified via the parallel amplifiers based on a predetermined low reference voltage and a predetermined high reference voltage. According to an aspect of the disclosure, the low reference voltage and the high reference voltage may optionally be selected to be similar, with only a small range between the high reference voltage and the low reference voltage. In so doing, an output of the parallel amplifiers as described herein is between the high reference voltage and the low reference voltage, and assuming the range between the reference voltages is sufficiently small, the output may approximate that of a linear regulator. The SIMO circuitry may include at least one regulator configured to receive a switching output voltage and to dynamically set an output voltage at a converter output line of the plurality of converter output lines. The at least one regulator may include a circuit configured to determine at least one of whether the switching output voltage is above a pre-defined upper threshold voltage which is greater than a target regulator output voltage or whether the switching output voltage is below a pre-defined lower threshold voltage which is smaller than the target regulator output voltage. The at least one regulator may be configured to use a current from another converter output line of the plurality of converter output lines to regulate the switching output voltage.

In various aspect of this disclosure, a push-pull regulator may be provided between each pair of converter output rails having different potentials to control the output voltage of one converter output rail of the pair of converter output rails. Furthermore, to control the output voltage of one converter output rail to be controlled a first comparator may be provided to control a first switch coupled between the converter output rail to be controlled and a first neighboring (e.g. adjacent) converter output rail (carrying a higher voltage than the converter output rail to be controlled) and a second comparator may be provided to control a second switch coupled between the converter output rail to be controlled and a second neighboring (e.g. adjacent) converter output rail (carrying a lower voltage than the converter output rail to be controlled).

Figure 12:
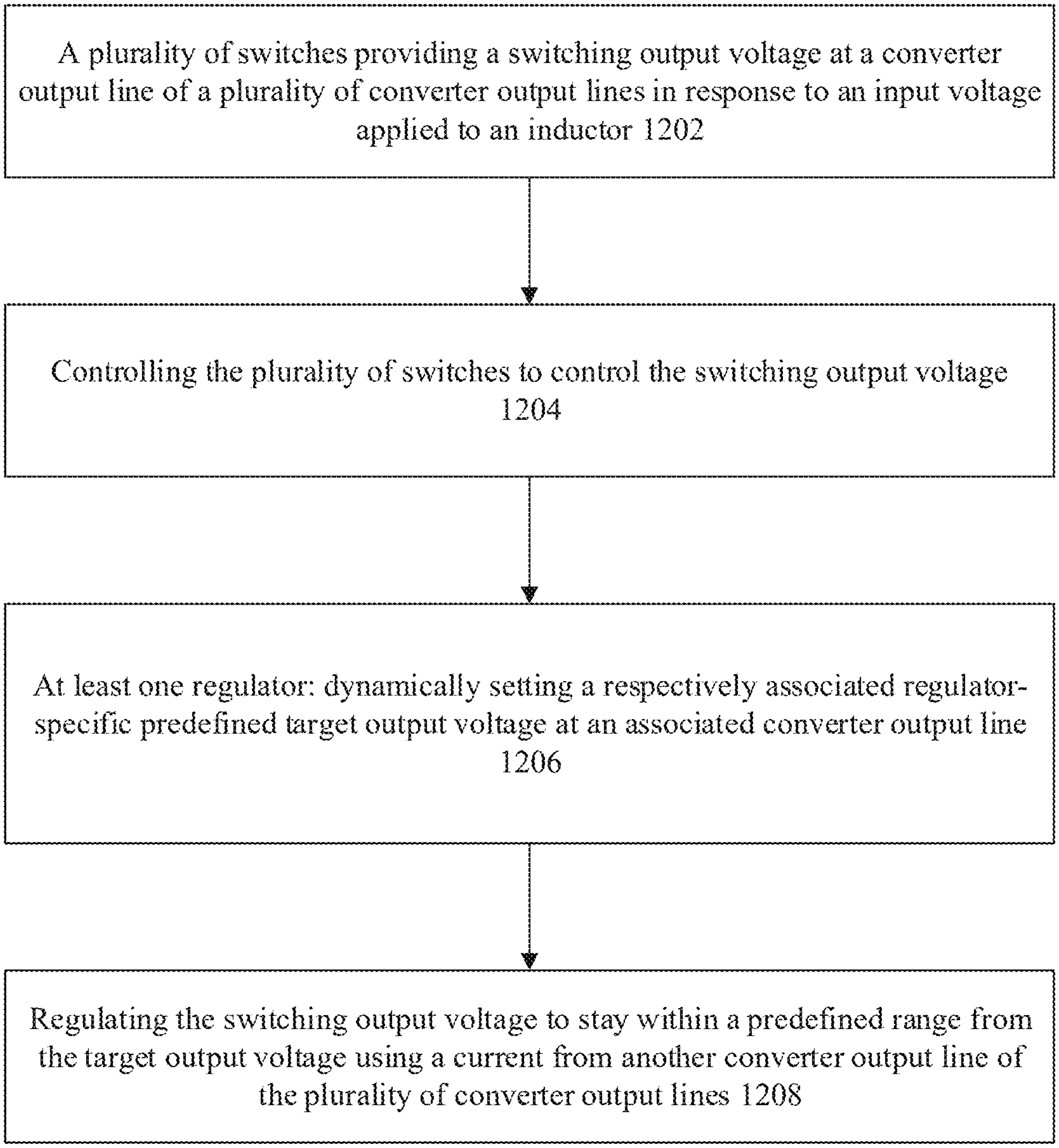
FIG. 12 shows a first method of operating a SIMO circuitry.

FIG. 12 shows a method of operating a SIMO circuitry as described herein, the method including: a plurality of switches providing a switching output voltage at a converter output line of a plurality of converter output lines in response to an input voltage applied to an inductor 1202; controlling the plurality of switches to control the switching output voltage 1204; at least one regulator: dynamically setting a respectively associated regulator-specific pre-defined target output voltage at an associated converter output line of the plurality of converter output lines 1206, and regulating the switching output voltage to stay within a pre-defined range from the target output voltage using a current from another converter output line of the plurality of converter output lines 1208. The SIMO circuitry described herein may be configured according to a non-transitory computer readable medium storing instructions which, when executed by one or more processors, implement the above method of operating a single inductor multiple output circuitry.

FIG. 13 shows a method of operating a SIMO circuitry as described herein, the method including: controlling a switching stage including an inductor and a plurality of switches to provide a switching output voltage at a converter output line of a plurality of converter output lines in response to an applied input voltage dependent on the switching states of the plurality of switches 1302; and at least one regulator: receiving the switching output voltage; dynamically setting an output voltage at a converter output line of the plurality of converter output lines 1304; determining at least one of whether the switching output voltage is above a pre-defined upper threshold voltage which is greater than a target regulator output voltage or whether the switching output voltage is below a pre-defined lower threshold voltage which is smaller than the target regulator output voltage, and regulating the switching output voltage using a current from another converter output line of the plurality of converter output lines 1306.

The SIMO circuitry described herein may be configured according to a non-transitory computer readable medium storing instructions which, when executed by one or more processors, implement the above method of operating a single inductor multiple output circuitry.

The switch controller may control the switches within the SIMO converter 104 to cause the inductor cycles to occur at a constant rate. The switch controller may control the switches within the SIMO converter 104 based on a constant switching frequency. In addition, the switch controller may control the switches within the SIMO converter 104 such that the inductor cycles are discontinuous (e.g., the SIMO converter 104 operates according to a discontinuous conduction mode (DCM)). Discontinuous inductor cycles may reduce or eliminate impact of inductor cycles on subsequent inductor cycles.

Figure 14:
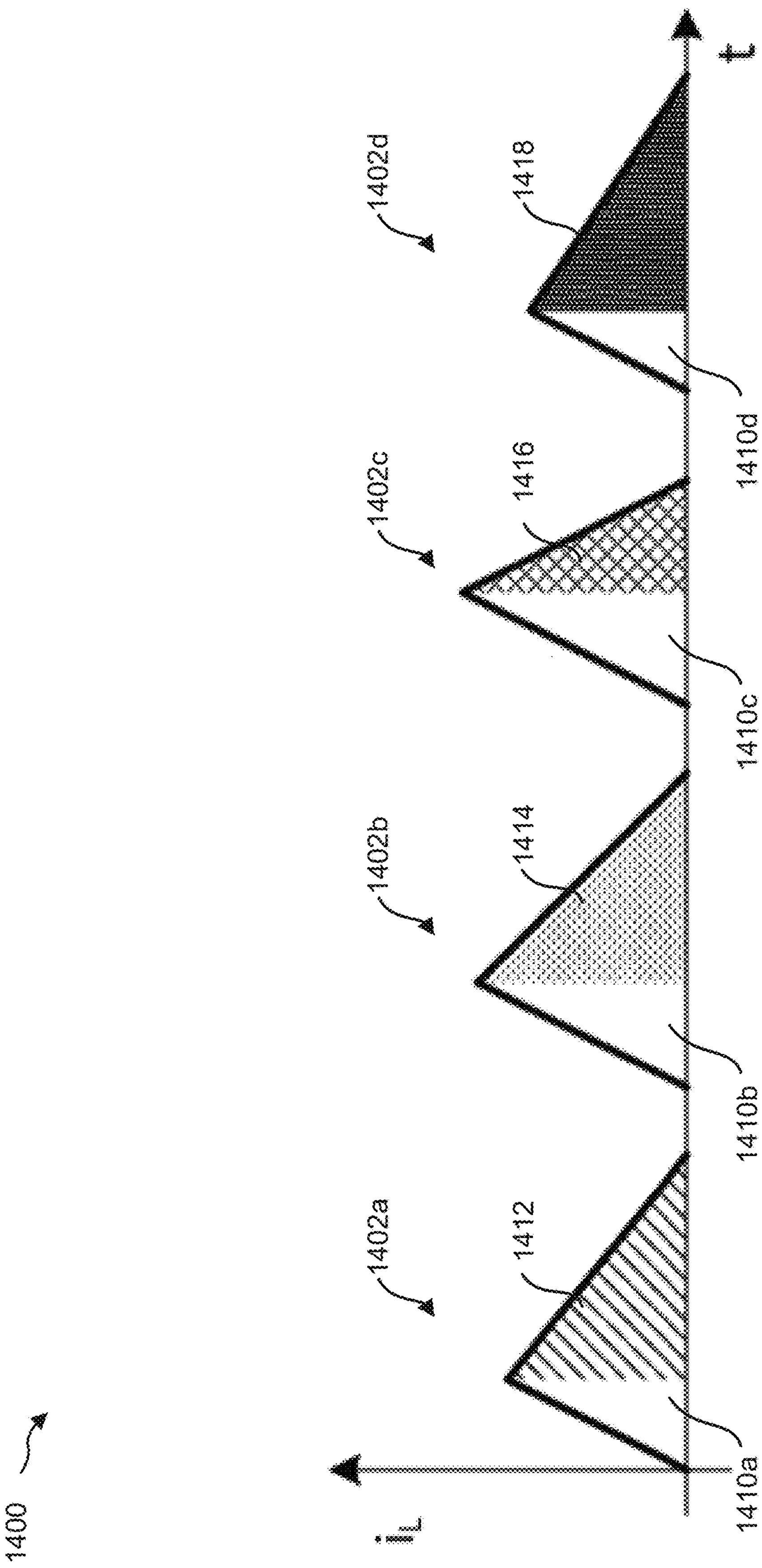
FIG. 14 illustrates a graphical representation of a simulation of disjunct inductor cycles.

FIG. 14 illustrates a graphical representation 1400 of a simulation of disjunct inductor cycles (referred to in the present disclosure also as inductor cycles, disjunct inductor cycles, or disjunct inductor switching cycles), in accordance with at least one aspect described in the present disclosure. In FIG. 14, waveforms 1402*a-d* represent current on the inductor during the inductor cycles. The waveforms 1402*a-d* illustrate how the current on the inductor changes over time during the inductor cycles.

The inductor cycles may include charge portions and conduction portions. The charge portions are illustrated in FIG. 14 as portions 1410*a-d* and the conduction portions are illustrated in FIG. 14 as portions 1412, 1414, 1416, 1418. For example, the charge portion of a first inductor cycle (e.g., waveform 1402*a*) includes portion 1410*a* and the conduction portion of the first inductor cycle includes portion 1412.

The charge portions 1410*a-d* illustrate an increase in the current on the inductor due to charging of the inductor using the input voltage as a positive voltage. The conduction portions 1412, 1414, 1416, 1418 illustrate a decrease in the current on the inductor due to disconnecting the inductor from the input voltage and electrically coupling to an electrical device via an output of the SIMO system during the conduction portions 1412, 1414, 1416, 1418. For example, the conduction portions 1412, 1414, 1416, 1418 may correspond to electrically coupling the inductor to a first electrical device via a first output, a second electrical device via a second output, a third electrical device via a third output, or a fourth electrical device via a fourth output, respectively. Due to electrically coupling a single electrical device to the inductor during each inductor cycle, the current on the inductor may decrease during the inductor cycles at a smooth or continuous rate.

Figure 15:
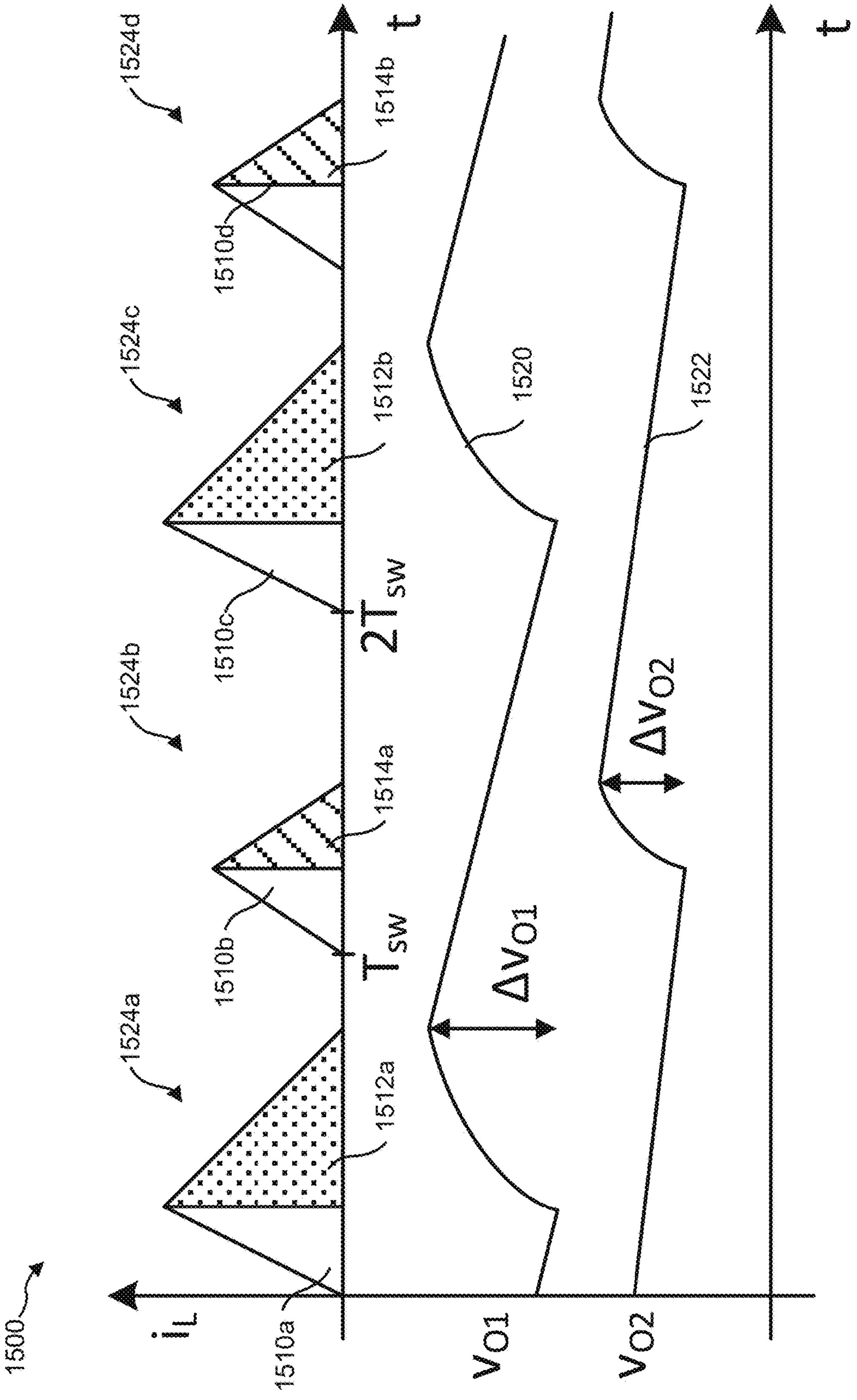
FIG. 15 illustrates a graphical representation of a simulation in which the inductor is electrically coupled to a single electrical device during disjunct inductor cycles.

FIG. 15 illustrates a graphical representation 1500 of a simulation in which the inductor is electrically coupled to a single electrical device during disjunct inductor cycles, in accordance with at least one aspect described in the present disclosure. In FIG. 15, waveforms 1524*a-d* represent current on the inductor during the inductor cycles. The waveforms 1524*a-d* illustrate how the current on the inductor changes over time during the inductor cycles. The charge portions are illustrated in FIG. 15 as portions 1510*a-d* and the conduction portions are illustrated in FIG. 15 as portions 1512*a,b* and 1514*a,b*. For example, the charge portion of the first inductor cycle includes portion 1510*a* and the conduction portion of the first inductor cycle includes portion 1512*a*.

The charge portions 1510*a-d* illustrate an increase in the current on the inductor due to the inductor being charged using the input voltage as a positive voltage. The conduction portions 1512*a,b* and 1514*a,b* illustrate a decrease in the current on the inductor due to the inductor being disconnected from the input voltage and being electrically coupled to an electrical device via an output of the SIMO converter during the conduction portions 1512*a,b* and 1514*a,b*. For example, the conduction portions 1512*a,b* may correspond to electrically coupling the inductor to a first electrical device via a first output and the conduction portions 1514*a,b* may correspond to electrically coupling the inductor to a second electrical device via a second output.

Curve 1520 and curve 1522 illustrate how the switching output voltage changes due to the inductor being charged or conducting during the inductor cycles. Curve 1520 corresponds to a voltage level of the switching output voltage on a first output and curve 1522 corresponds to the voltage level of the switching output voltage on a second output. As illustrated in FIG. 15, the voltage level of the switching output voltage of the first output (e.g., curve 1520) and the switching output voltage of the second output (e.g., curve 1522) increase during the corresponding conduction portions 1512*a,b* and 1514*a,b*. For example, the voltage level of the switching output voltage of the first output increases (e.g., curve 1520) during the conduction portions 1512*a,b* and the voltage level of the switching output voltage of the second output (e.g., curve 1522) increases during the conduction portions 1514*a,b*.

When the current on the inductor either reaches substantially zero amps or the corresponding inductor cycle ends (e.g., the switches move such that a subsequent charge portion occurs), the voltage level of the switching output voltage on the corresponding output starts to decrease. The voltage level of the switching output voltage may gradually decrease when the current reaches substantially zero amps or the corresponding inductor cycle ends due to the voltage stored of the second capacitor. For example, as illustrated in FIG. 15, when the conduction portion 1512*a* ends, the voltage level of the switching output voltage of the first output begins to decrease (e.g., curve 1520 drops). As another example, as illustrated in FIG. 15, when the conduction portion 1514*a* ends, the voltage level of the switching output voltage of the second output begins to decrease (e.g., curve 1522 drops).

Figure 16:
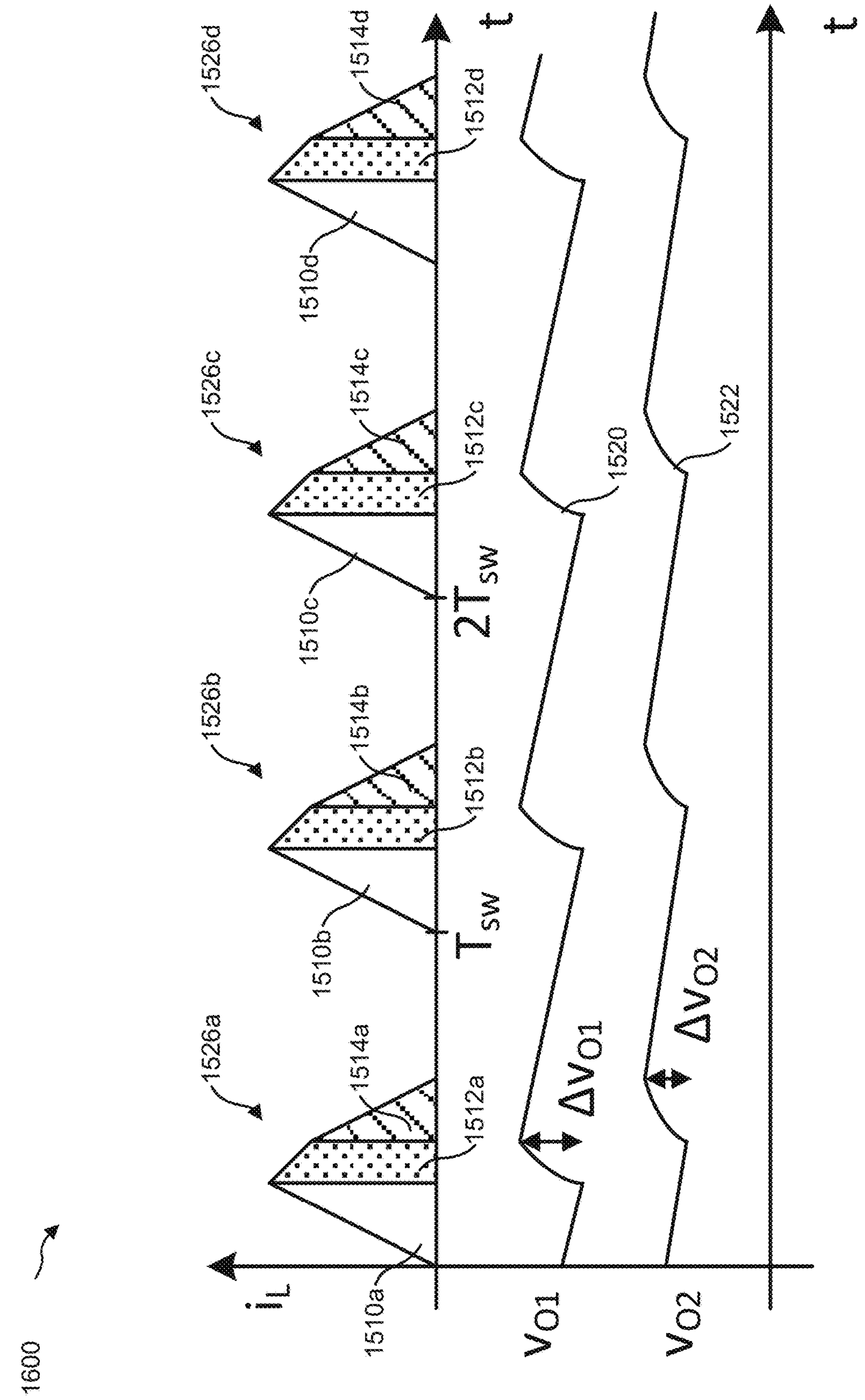
FIG. 16 illustrates a graphical representation of a simulation in which the inductor is electrically coupled to two electrical devices during disjunct inductor cycles.

FIG. 16 illustrates a graphical representation 1600 of a simulation in which the inductor is electrically coupled to two electrical devices during disjunct inductor cycles, in accordance with at least one aspect described in the present disclosure. In FIG. 16, waveforms 1526*a-d* represent current on the inductor during the inductor cycles. The waveforms 1526*a-d* illustrate how the current on the inductor changes over time during the inductor cycles. The charge portions are illustrated in FIG. 16 as portions 1510*a-d* and the conduction portions are illustrated in FIG. 16 as portions 1512*a-d* and 1514*a-d*. For example, the charge portion of the first inductor cycle includes portion 1510*a* and the conduction portion includes portion 1512*a* and portion 1514*a*.

The conduction portions illustrate a decrease in the current on the inductor due to the inductor being disconnected from the input voltage and being electrically coupled to the electrical devices via two outputs of the SIMO converter during the conduction portions 1512*a-d* and 1514*a-d*. For example, the conduction portions 1512*a-d* may correspond to electrically coupling the inductor to the first electrical device via the first output and the conduction portions 1514*a-d* may correspond to electrically coupling the inductor to the second electrical device via the second output.

As illustrated in FIG. 16, the voltage level of the switching output voltage of the first output (e.g., curve 1520) and the switching output voltage of the second output (e.g., curve 1522) increase during corresponding conduction portions 1512*a-d* and 1514*a-d*. For example, the voltage level of the switching output voltage of the first output (e.g., curve 1520) increases during the conduction portions 1512*a-d* and the voltage level of the switching output voltage of the second output (e.g., curve 1522) increases during the conduction portions 1514*a-d*.

As illustrated in FIG. 16, each inductor cycle may include conduction portions that correspond to different electrical devices being electrically coupled to the inductor. For example, the inductor cycles may include the charge portions 1510*a-d* followed by the conduction portions 1512*a-d* followed by the conduction portions 1514*a-d*. Due to electrically coupling multiple electrical devices to the inductor during each inductor cycle, the current on the inductor may decrease at an uneven or non-continuous rate. For example, the current on the inductor may decrease at a first rate during the conduction portions 1512*a-d* and a second rate during the conduction portions conduction portions 1514*a-d*.

As illustrated in FIG. 15 and FIG. 16, an amount of time between the peak voltage levels of the first voltage and the second voltage (illustrated in FIG. 15 and FIG. 16 as ΔV01 and ΔV02 in relation to curves 1520 and 1522) occurring may be increased when electrically coupling the inductor to a single electrical device per inductor cycle (as illustrated in FIG. 15) versus electrically coupling the inductor to multiple electrical devices per inductor cycle (as illustrated in FIG. 16). In addition, as illustrated in FIG. 15 and FIG. 16, a voltage ripple of the switching output voltage on the outputs may increase when electrically coupling the inductor to a single electrical device per inductor cycle versus multiple electrical devices per inductor cycle.

Example switching times for initiation of the inductor cycles are illustrated in FIG. 15 and FIG. 16 as TSW and 2TSW. Additional switching times may occur that are not illustrated in FIG. 15 (e.g. switching times for the first inductor cycle and the fourth inductor cycle).

In some aspects of the present disclosure, a switching frequency of the inductor switching cycles may vary based on the inductance rating of the inductor 202, the switching output voltage, or some combination thereof. In these and other aspects of the present disclosure, if the inductance rating of the inductor 202 is between one nanoHenry (nH) and ten microHenrys (μH), the switch controller may set the switching frequency to between one kHz and five hundred MHz. For example, the switching frequency may be set to one kHz when the switching output voltage is being provided to electronic devices that include lower loading conditions. As another example, the switching output frequency may be set between one hundred and five hundred MHz when the switching output voltage is being provided to electronic devices that include higher loading conditions. The de-energizing phase of the inductor cycles (e.g., $T_{on}$) may include a range of time that may be any value that is less than the max value at the boundary of continuous conduction mode (CCM) or DCM operation. Table I illustrates example switching frequencies and example Ton ranges for the de-energizing phases.

| Switching Frequency | $T_{on}$ Range |
|---|---|
| 1 kHz | 0 s to~0.5 ms |
| 10 kHz | 0 s to~50 μs |
| 100 kHz | 0 s to~5 μs |

-continued

| Switching Frequency | $T_{on}$ Range |
|---|---|
| 1 MHz | 0 s to~500 ns |
| 10 MHz | 0 s to~50 ns |
| 100 MHz | 0 s to~5 ns |
| 500 MHz | 0 s to~1 ns |

Figure 17:
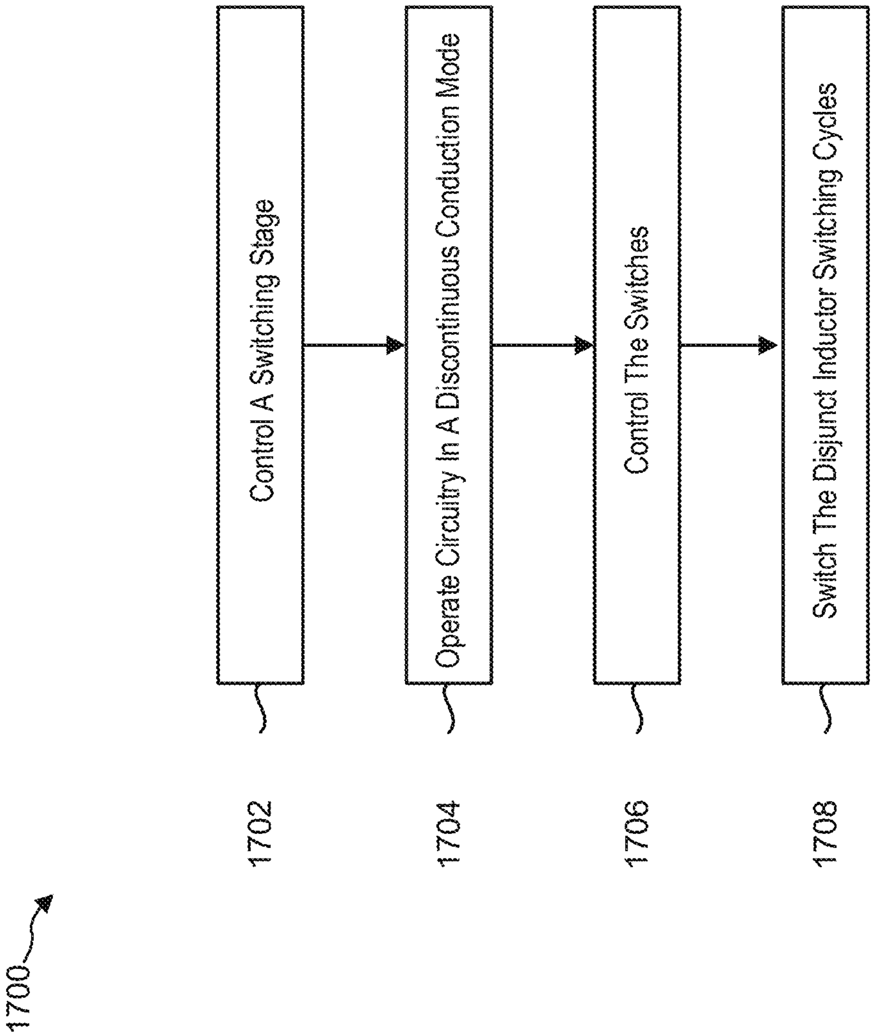
FIG. 17 exemplarily illustrates a flowchart of a method of operating single inductor SIMO circuitry.

FIG. 17 illustrates a flowchart of an example method 1700 of operating SIMO circuitry, in accordance with at least one aspect described in the present disclosure. The method 1700 may include one or more blocks 1702, 1704, 1706, or 1708. Although illustrated with discrete blocks, the operations associated with one or more of the blocks of the method 1700 may be divided into additional blocks, combined into fewer blocks, or eliminated, depending on the particular implementation.

At block 1702, a switching stage may be controlled. In some aspects of the present disclosure, the switching stage may include an inductor and multiple switches. In these and other aspects of the present disclosure, the switches and the inductor may provide a switching output voltage. Additionally or alternatively, the switching output voltage may be provided in response to an input voltage applied to the inductor. The switches may include a first switch coupled between a first terminal of the inductor and the input voltage. The switches may also include a second switch coupled between the first terminal of the inductor and a reference potential. In addition, the switches may include a third switch coupled between a second terminal of the inductor and the reference potential.

At block 1704, method may include operating circuitry in a discontinuous conduction mode. The discontinuous conduction mode (DCM) may cause a current on the inductor to be substantially equal to zero amps prior to a subsequent inductor cycle occurring.

At block 1706, method may include controlling the switches. In some aspects of the present disclosure, method may include controlling the switches to provide the switching output voltage in disjunct inductor switching cycles to different outputs. In these and other aspects of the present disclosure, method may include controlling the switches to provide the switching output voltage to one electrical device per disjunct inductor switching cycles.

At block 1708, method may include switching the disjunct inductor switching cycles. In some aspects of the present disclosure, method may include switching the disjunct inductor switching cycles at a constant switching frequency.

Modifications, additions, or omissions may be made to the method 1700 without departing from the scope of the present disclosure. For example, the operations of the method 1700 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

Electrically coupling the inductor to multiple electrical devices each inductor cycle may increase a complexity to and difficulty for tracking settings and states of the voltage level being provided to each electrical device. In addition, electrically coupling the inductor to multiple electrical devices each inductor cycle may increase an amount of time for the voltage on the output or current on the inductor to recover. For example, a power level of the first output may transition from 0.5 Watts (W) to one W and the power level of the second output may transition from one W to 0.5 W during a single inductor cycle, which may cause a summation of the current on the outputs to remain constant until the first voltage level or the second voltage level decrease even more. The summation of the current on the output remaining constant may cause the amount of time for the voltage on the output or the current on the inductor to recover.

Further, electrically coupling the inductor to multiple electrical devices each inductor cycle may increase a complexity of the SIMO system relative to the SIMO system that includes the inductor being electrically coupled to one electrical device per inductor cycle. In addition, electrically coupling the inductor to multiple devices during a single inductor cycle may increase a cross regulation for releasing the current stored on the inductor. For example, the voltage level on the outputs may change due to a load on the inductor (e.g., the load due to the electrical devices being electrically coupled) changing.

According to at least one aspect of the present disclosure, the switches may be controlled such that the switching output voltage is provided to an electrical device via a single output of the SIMO system per disjunct inductor switching cycle. In some aspects of the present disclosure, the switches or the inductor may operate in a discontinuous conduction mode (DCM) to cause the disjunct inductor cycles. Operation of the switches or the inductor in the DCM may cause a period of time in which the current on the inductor is substantially zero amps prior to a charge portion of a subsequent inductor cycle occurring.

Method may include controlling the switches and the inductor such that a single electrical device is electrically coupled to the inductor per inductor cycle (e.g. may cause the inductor cycles to be disjunct). In some aspects of the present disclosure, causing the induction cycles to be disjunct may include causing a period of time in which the current on the inductor is substantially zero amps prior to a charge portion of a subsequent inductor cycle starting. Each disjunct inductor cycle may include a charge portion, a conduction portion, and the amount of time in which the current on the inductor is substantially zero amps. Method may include controlling the switches such that the inductor either receives the input voltage (e.g., during the charge portion) or electrically coupling the inductor to an electrical device and conducting via an output of the SIMO converter (e.g., during the conduction portion or the amount of time in which the current on the inductor is substantially zero amps).

Operation of the inductor in the DCM may reduce or eliminate an impact caused by the inductor cycles on other inductor cycles. In some aspects of the present disclosure, the impact caused by the inductor cycles on the other inductor cycles may be due to the electrical devices receiving the switching output voltage during the inductor cycles. For example, operation of the inductor in the DCM may reduce or eliminate an impact caused by the first electrical device on the second inductor cycle due to the first electrical device receiving the switching output voltage during the first inductor cycle.

The inductor cycles may occur such that the switching output voltage is provided during each inductor cycle to an electrical device via a separate output of the SIMO system. Some aspects of the present disclosure may, during the disjunct inductor cycles, provide the switching output voltage to only one electrical device via an output during each disjunct inductor cycle. For example, method may include controlling the switches to provide the switching output voltage to the first electrical device via the first output of the SIMO system during the first disjunct inductor cycle and to provide the switching output voltage to the second electrical device via the second output of the SIMO converter during the second disjunct inductor cycle. In some aspects of the present disclosure, the second disjunct inductor cycle may occur subsequent to the first disjunct inductor cycle.

In some aspects of the present disclosure, the disjunct inductor cycles may occur at a constant switching frequency. In these and other aspects of the present disclosure, the constant switching frequency may cause the switches to transition between an open state and a closed state at a constant rate to provide either the input voltage to the inductor or the switching output voltage to an electrical device via one of the outputs of the SIMO converter. In these and other aspects of the present disclosure, the constant switching frequency may be within a frequency range of about one kHz to about 500 MHz.

In some aspects of the present disclosure, each disjunct inductor cycle may include a substantially similar time duration. For example, the first disjunct inductor cycle may include a substantially similar time duration as the second disjunct inductor cycle. In some aspects of the present disclosure, the disjunct inductor cycles may include a time duration within a time range of about two ns to about one ms. The time duration of the disjunct inductor cycles may be based on an amount of time the switches are in particular states (e.g., positions).

In some aspects of the present disclosure, the first electrical device, the second electrical device, the third electrical device, or the fourth electrical device may include electrical devices positioned within a single circuit. In other aspects of the present disclosure, the first electrical device, the second electrical device, the third electrical device, or the fourth electrical device may include electrical devices positioned within two or more circuits.

In some aspects of the present disclosure, the peak current on the inductor during each induction cycle may be the same. In other aspects of the present disclosure, the peak current on the inductor during two or more of the induction cycles may be different.

In some aspects of the present disclosure, the switching frequency for controlling the switches may cause a switching noise spur to be predictable (e.g., controllable). The switching noise spur being predictable may permit the SIMO system to be designed to account for the switching noise spur. Designing the SIMO system to account for the switching noise spur may reduce or eliminate interference due to the switching noise spur.

Providing the switching output voltage to a single electrical device per inductor cycle may permit the load due to each electrical device to be treated separately. Treating the load due to each electrical device separately may permit the conduction by the inductor to the electrical devices to occur quicker versus systems that provide the switching output voltage to multiple electrical devices per inductor cycle. For example, treating the load due to each electrical device separately may permit the peak current for each electrical device to be controlled different for each electrical device. As another example, treating the load due to each electrical device separately may permit cross regulation of the current on the inductor per inductor cycle to decrease due to providing the switching output voltage to a single electrical device per inductor cycle. As another example, treating the load due to each electrical device separately may reduce complexity of the SIMO system versus SIMO systems that provide the switching output voltage to multiple electrical devices per inductor cycle.

The SIMO converter 104 and the LDOs 106 may operate in conjunction to provide the switching output voltage on the converter outputs. In some aspects of the present disclosure, the LDOs 106 may implement feed forward techniques to regulate the switching output voltage, operation of the LDOs 106, or some combination thereof. The LDOs 106 may feed voltages, current, or some combination thereof forward to either increase or decrease the duty cycles of the switches within the SIMO converter 104.

As described above, the voltages of the deenergizing phase of the inductor 202 may be applied to one or more of the output rails using the one or more switches **204*a*. In this manner, the voltages applied to the various output rails may be independent of one another or otherwise rail-specific. That is, a magnitude of a voltage applied to one or more output rails may depend, at least in part, on a portion of the deenergizing phase in which the one or more switches 204*a* are closed. By selecting the switches to correspond to different period of the deenergizing phase, the various output rail voltages may by independently controlled, thereby allowing, for example, a first output rail to receive a first voltage and a second output rail to receive a second voltage, different from the first voltage. Multiple switches 204*a* may be simultaneously or concurrently closed, thereby simultaneously or concurrently providing an identical voltage (based on the parallel connection to the inductor 202**) to the corresponding output rails.

According to an aspect of the disclosure, the LDO regulator may regulate the switching output voltage using feed forward techniques. The LDOs may feed voltages, current, or some combination thereof forward to control the switches within the SIMO converter to provide the switching output voltage within a voltage domain of the electronic device coupled to the converter output.

As described herein, regulators may be utilized to regulate a voltage or current received from the discharge cycle of the inductor. These regulators may employ rapid transitions to maintain the output voltage or current within a pre-defined range. Although the regulators may be very effective in regulating the output voltage or current as described herein, the rapid regulator switching may represent a certain reduction in efficiency. According to an aspect of the disclosure, and as described herein at least with respect to FIGS. 18 to 23, the actions of the regulators can be appreciated by detecting equalizing current, either added to or shunted from the output rail. Using the overall equalizing current detected (e.g. the difference of the added equalizing current and the shunted current), along with a modified output rail current, the duty cycle of the inductor may be altered to more closely approximate the desired regulated voltage or regulated current, thereby resulting in few regulator transitions and thud greater efficiency.

Figure 18:
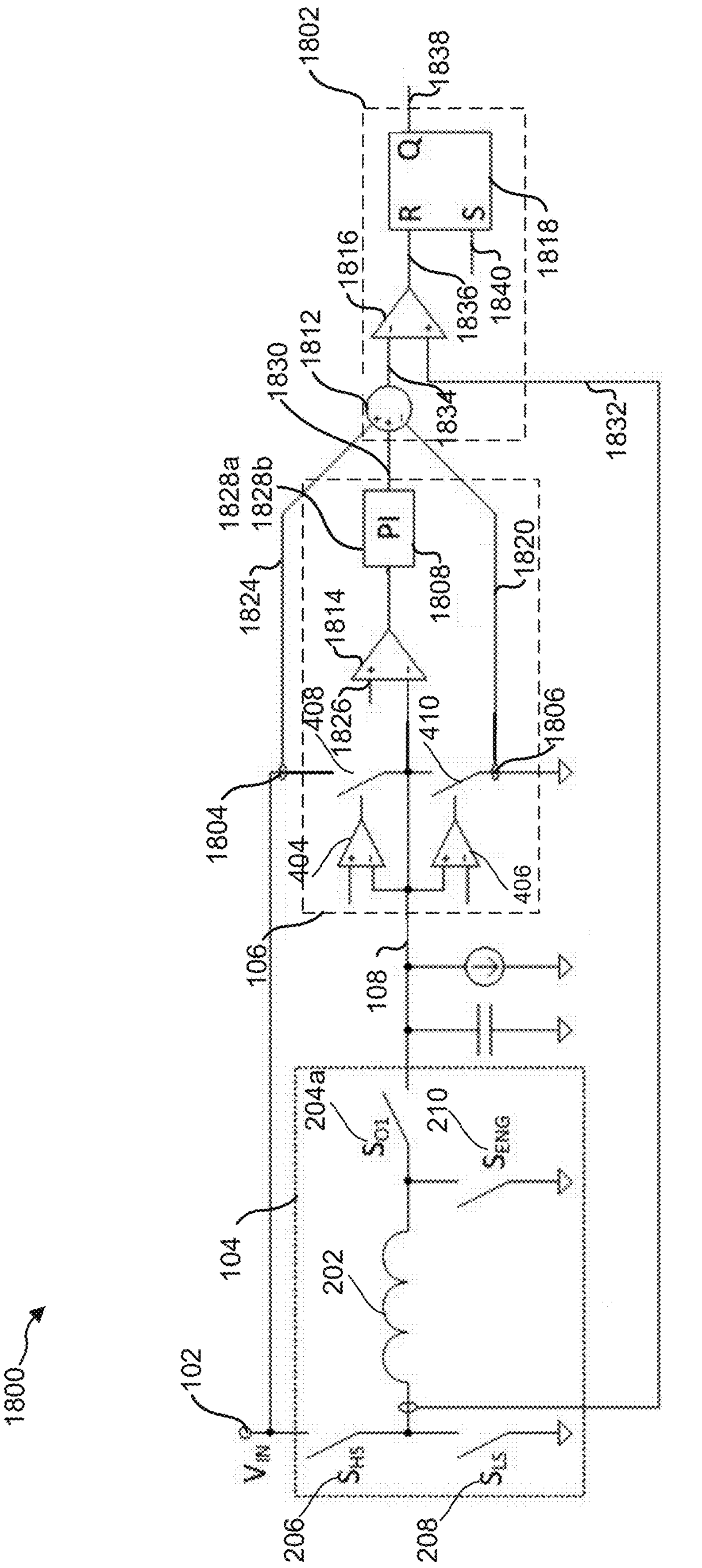
FIG. 18 exemplarily illustrates a block diagram of an operational environment for operating a single inductor multiple output converter.

FIG. 18 illustrates a block diagram of an example system 1800 that includes the SIMO converter 104 and the LDO 106, in accordance with at least one aspect described in the present disclosure. The system 1800 may also include a switch controller 1802. The SIMO converter 104 may correspond to the SIMO converter 104 described above in relation to FIG. 4. In addition, the LDO 106 may correspond to the regulator **302*a* discussed above in relation to FIG. 4**.

In FIG. 18 a single LDO 106 and a single switch controller 1802 are illustrated and discussed for simplicity of illustration and discussion. In some aspects of the present disclosure, the system 1800 may include a single LDO 106 and a single switch controller 1802 as illustrated in FIG. 18. In other aspects of the present disclosure, the system 1800 may include multiple LDOs 106 and multiple switch controllers 1802 or a single switch controller 1802.

In some aspects of the present disclosure, the LDOs 106 may be electrically coupled to different outputs of the SIMO converter 104. For example, the system 1800 may include two LDOs 106 electrically coupled to different outputs of the SIMO converter 104 as described elsewhere in the present description. In addition, in these and other aspects of the present disclosure, the switch controllers 1802 may each be electrically coupled to a different LDO 106. Alternatively, a single switch controller 1802 may be electrically coupled to the outputs of the LDOs 106.

In some aspects of the present disclosure, the system 1800 may operate as a feed forward system. In these and other aspects of the present disclosure, the system 1800 may feed currents or voltages representative of currents or voltages within the LDO 106 to the switch controller 1802. The switch controller 1802 may use the currents or voltages that are fed forward to control duty cycles of the switches 204, 206, 208, or 210 within the SIMO converter 104. In some aspects of the present disclosure, various elements illustrated within the LDO 106 may be positioned within the switch controller 1802. In these and other aspects of the present disclosure, functions described as being performed by the LDO 1806 or components within the LDO 1806 may be performed by the switch controller 1802 or components within the switch controller 1802.

The LDO 106 may include an amplifier 1814 electrically coupled to the output of the SIMO converter 104, a sixth switch 408, and a seventh switch 410. The amplifier 1814 may receive the switching output voltage 108 and a reference voltage. In some aspects of the present disclosure, a first regulator terminal 1804 may be electrically coupled to the input terminal 102. The amplifier 1814 may receive the reference voltage via terminal 1826. In some aspects of the present disclosure, the amplifier 1814 may generate a regulator-specific target output voltage **1828*b*** (e.g., a compensated output voltage) based on the switching output voltage and the reference voltage.

In some aspects of the present disclosure, the LDO 106 may include a proportional integration (PI) regulator 1808. In these and other aspects of the present disclosure, the PI regulator 1808 may include a proportional portion (not illustrated) and an integration portion (not illustrated). In some aspects of the present disclosure, the PI regulator 1808 may regulate the regulator-specific target output voltage of the LDO 106 to provide a regulated target output voltage 1830. The PI regulator 1808 may perform various functions to the regulator-specific target output voltage **1828*b* to generate the regulated target output voltage 1830. In some aspects of the present disclosure, the PI regulator 1808 may generate a regulator-specific target output current 1828*a* based on the various functions performed to the regulator-specific target output voltage 1828*b***.

The switch controller 1802 may include an adder 1812. The adder 1812 may be electrically coupled to a sensor positioned by the first regulator terminal 1804, an output of the PI regulator 1808, and a sensor positioned by a second regulator terminal 1806. In some aspects of the present disclosure, the adder 1812 may add the target output voltage 1830 and at least one of a first voltage 1824 generated by the sensor by the first regulator terminal 1804 based on a current at the first regulator terminal 1804 and a second voltage 1820 generated by the sensor by the second regulator terminal 1806 based on a current at the second regulator terminal 1806. The adder 1812 may provide an added voltage 1834 based on the addition. In some aspects of the present disclosure, the adder 1812 may add the regulator-specific target output current **1828*a* and at least one of a current generated by the sensor at the first regulator terminal 1804 based on the current at the first regulator terminal 1804 and a current generated by the sensor at the second regulator terminal 1806 based on the current on the second regulator terminal 1806. The adder 1812** may provide an added current based on the addition.

The switch controller 1802 may also include a comparator circuit 1816 electrically coupled to an output of the adder 1812 and a sensor positioned by the first terminal of the inductor 202. In some aspects of the present disclosure, the comparator circuit 1816 may receive the added voltage 1834 and a voltage 1832 generated by the sensor based on a current at the first terminal of the inductor 202. The comparator circuit 1816 may compare the added voltage 1834 and the voltage 1832 based on the current sensed at the first terminal. In addition, the comparator circuit 1816 may generate a comparison voltage 1836 based on the comparison. In other aspects of the present disclosure, the comparator circuit 1816 may receive the added current and a current generated by the sensor based on the current at the first terminal of the inductor 202. The comparator circuit 1816 may compare the added current and the current generated based on the current sensed at the first terminal. In addition, the comparator circuit 1816 may generate the comparison voltage 1836 based on the comparison.

The switch controller 1802 may further include a set reset (SR) latch circuit 1818 electrically coupled to an output of the comparison circuit 1816. In some aspects of the present disclosure, an output of the SR latch circuit 1818 may be electrically coupled to one or more of the switches 204, 206, 208, or 210 within the SIMO converter 104. The SR latch circuit 1818 may receive the comparison voltage 1836 and a clock signal 1840. The SR latch circuit 1818 may generate a duty cycle voltage 1838 based on the comparison voltage 1836 and the clock signal 1840.

In some aspects of the present disclosure, the SIMO may include a switch (e.g., a fifth switch) (not illustrated) electrically coupled between the second terminal of the inductor and the input voltage. In these and other aspects of the present disclosure, the regulator may include a capacitor (e.g., a second capacitor) electrically coupled between the switching output voltage and the reference potential. The capacitor may include a capacity in the range from about one nF to 10 μF.

Figure 19:
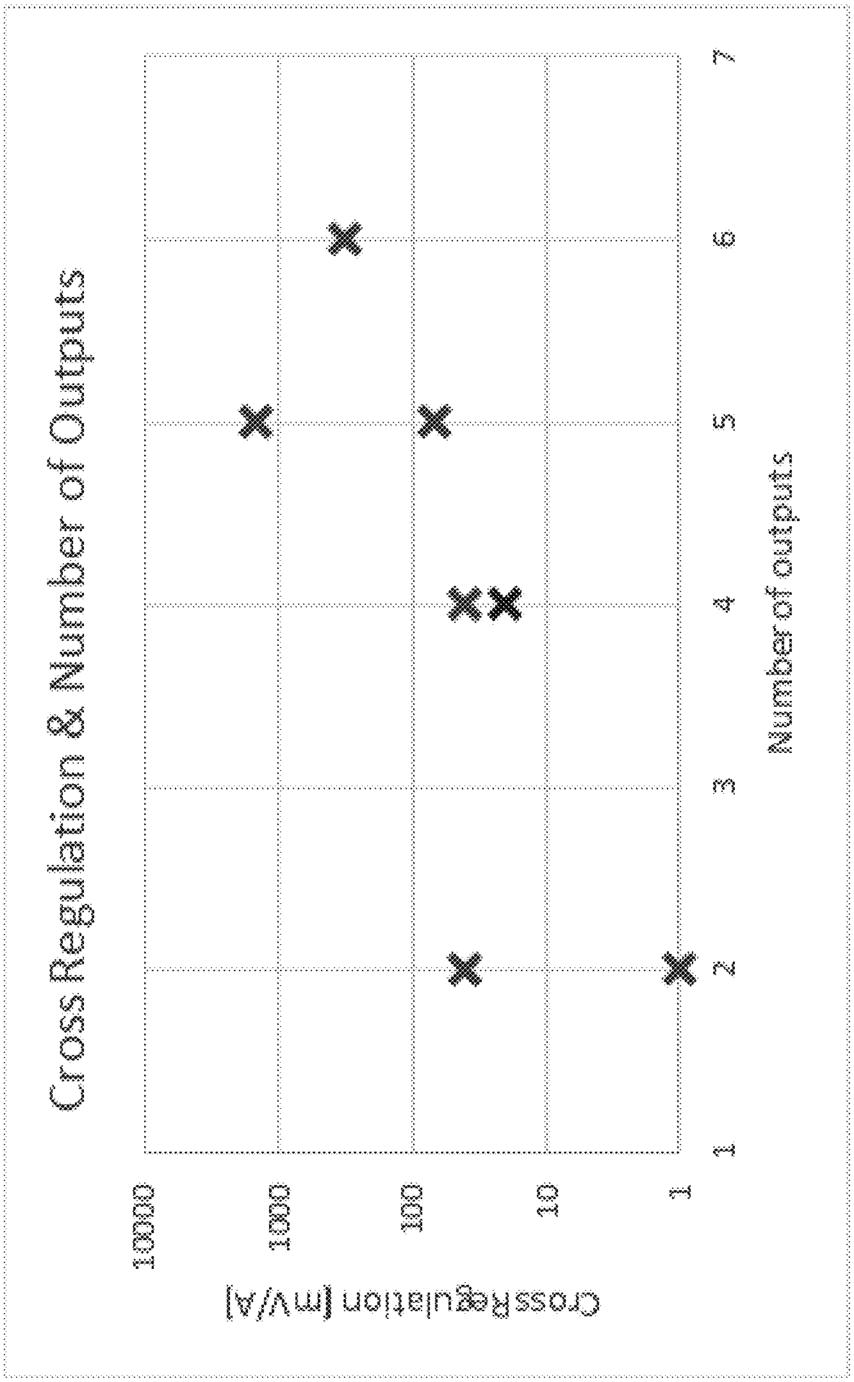
FIG. 19 exemplarily illustrates a graphical representation of cross regulation of SIMO systems versus a number of outputs that the inductor is electrically coupled to per inductor cycle.

FIG. 19 illustrates a graphical representation 1900 of cross regulation of SIMO systems versus a number of outputs that the inductor is electrically coupled to per inductor cycle, in accordance with at least one aspect described in the present disclosure. For the simulation, the SIMO systems were electrically coupled to between two and six electrical devices per inductor cycle. As illustrated in FIG. 19, the cross regulation may vary based on the number of outputs that the inductors are electrically coupled to per inductor cycle.

Figure 20:
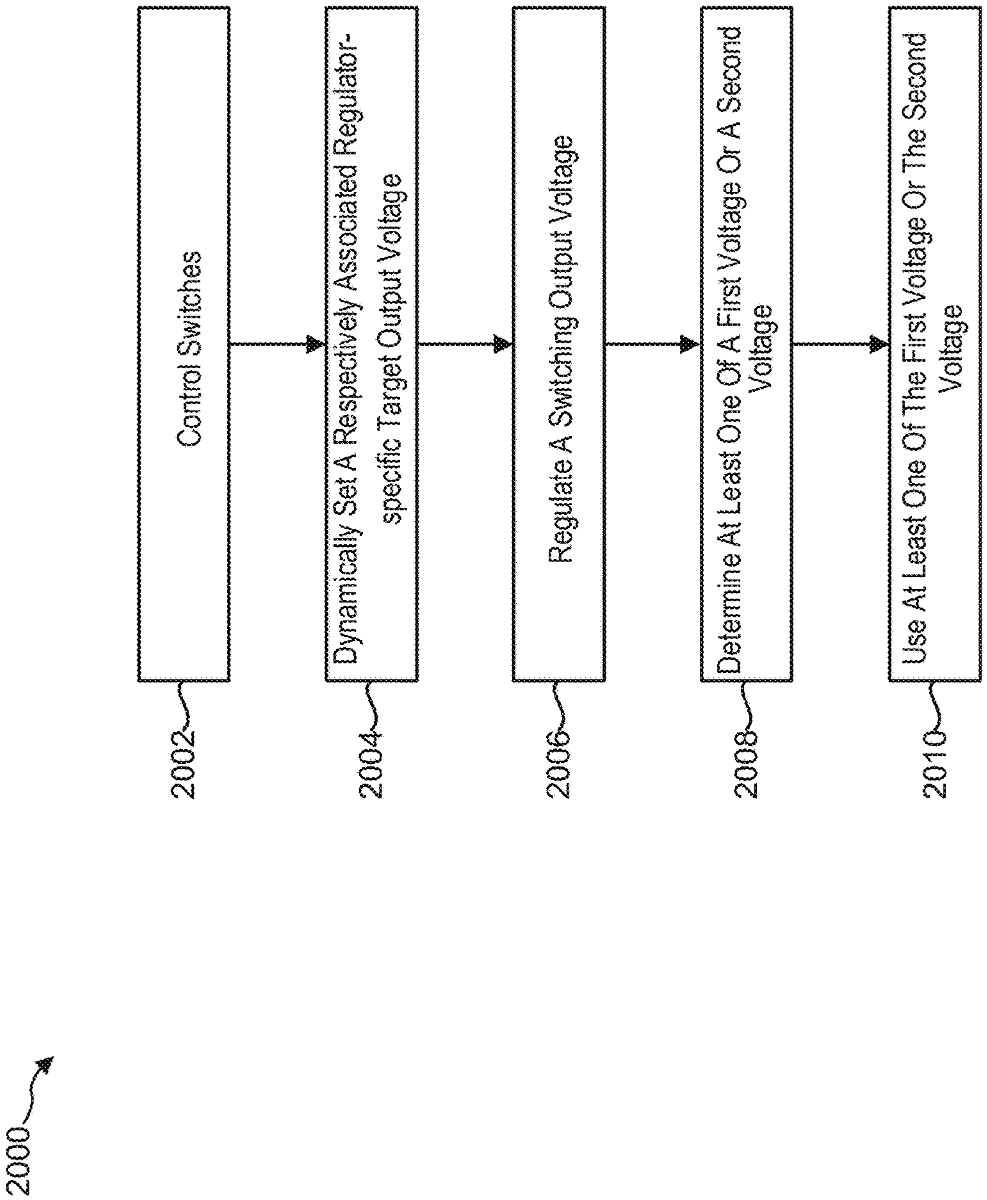
FIG. 20 exemplarily illustrates a flowchart of a method of operating a single inductor multiple output converter.

FIG. 20 illustrates a flowchart of an example method 2000 of operating a single inductor multiple output converter, in accordance with at least one aspect described in the present disclosure. The method 2000 may include one or more blocks 2002, 2004, 2006, 2008, or 2010. Although illustrated with discrete blocks, the operations associated with one or more of the blocks of the method 2000 may be divided into additional blocks, combined into fewer blocks, or eliminated, depending on the particular implementation.

At block 2002, method may include controlling switches. In some aspects of the present disclosure, the switches may provide a switching output voltage in response to an input current supplied to an inductor. The method may include controlling switches to control the switching output voltage.

At block 2004, method may include dynamically setting a respectively associated regulator specific target output voltage. In some aspects of the present disclosure, an LDO may dynamically set the respectively associated regulator specific target output voltage.

At block 2006, method may include regulating the switching output voltage. In some aspects of the present disclosure, method may include regulating the switching output voltage using the input current. In these and other aspects of the present disclosure, the input current may flow through the LDO from a first regulator terminal to a second regulator terminal.

At block 2008, at least one of a first voltage or a second voltage may be determined. In some aspects of the present disclosure, method may include determining the first voltage at the first regulator terminal and determining the second voltage at the second regulator terminal.

At block 2010, method may include using at least one of the first voltage or the second voltage. In some aspects of the present disclosure, the method may include using the first voltage or the second voltage to control the switches.

Modifications, additions, or omissions may be made to the method 2000 without departing from the scope of the present disclosure. For example, the operations of method 2000 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

Figure 21:
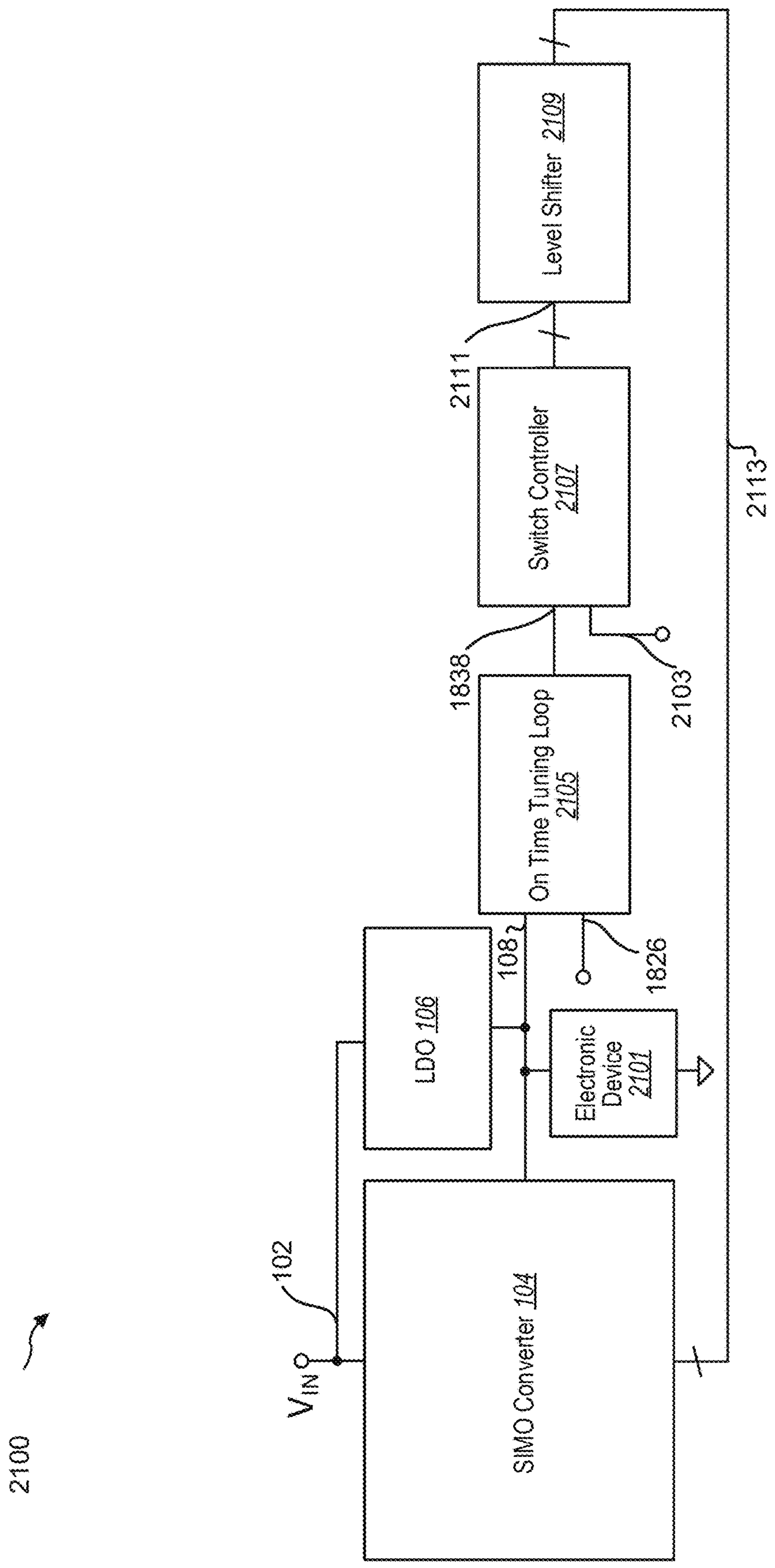
FIG. 21 exemplarily illustrates another block diagram of an operational environment for operating a SIMO converter.

FIG. 21 illustrates another block diagram of an example operational circuitry 2100 for operating the SIMO converter 104, in accordance with at least one aspect described in the present disclosure. The circuitry 2100 may include the SIMO converter 104, the LDO 106, an electronic device 2101, an on time tuning loops 2105, a switch controller 2107, and a level shifter 2109.

In FIG. 21 a single LDO 106 and a single switch controller 2107 are illustrated and discussed for simplicity of illustration and discussion. In some aspects of the present disclosure, the circuitry 2100 may include a single LDO 106 and a single switch controller 2107 as illustrated in FIG. 21. In other aspects of the present disclosure, the circuitry 2100 may include multiple LDOs 106 and multiple switch controllers 2107 or a single switch controller 2107.

The SIMO converter 104 may correspond to the SIMO converter 104 described elsewhere in the present disclosure. The LDO 106 may correspond to the LDOs 106 described elsewhere in the present disclosure. In some aspects of the present disclosure, the SIMO converter 104 may include multiple outputs to provide the switching output voltage 108 at different values at the converter output. In some aspects of the present disclosure, the electronic device 2101 may be electrically coupled to the converter output. The SIMO converter 104 and the LDO 106 may operate to provide the switching output voltage 108 to the electronic device 2101.

In some aspects of the present disclosure, the on time tuning loop 2105 may include a portion or all of the LDO 106 of FIG. 18. In these and other aspects of the present disclosure, the on time tuning loop 2105 may include a portion or all of the switch controller 1802 of FIG. 18.

The on time tuning loop 2105 may receive the switching output voltage 108 and the reference voltage via terminal 1826. The on time tuning loop 2105 may compare the switching output voltage 108 to the reference voltage. The on time tuning loop 2105 may provide the duty cycle voltage 1838 (e.g., $V_{T}ON$) based on the comparison of the switching output voltage 108 and the reference voltage.

The switch controller 2107 may be configured to control the switches within the SIMO converter 104. The switch controller 2107 may control the switches within the SIMO converter 104 to selectively apply the switching output voltage 108 to the converter output.

The switch controller 2107 may generate one or more switching voltages 2111 based on the duty cycle voltage 1838 and a clock voltage 2103. In some aspects of the present disclosure, when the duty cycle voltage 1838 is a logical high and the clock voltage 2103 is being received, the switch controller 2107 may generate the switching voltages 2111 such that a high-side switch (e.g. switch 206 in FIG. 2) within the SIMO converter 104 turns off and a low-side switch (e.g. switch 208 in FIG. 1) and the output switch (e.g. switch **204*a* in FIG. 1) within the SIMO converter 104** turn on.

In some aspects of the present disclosure, the switch controller 2107, prior to controlling one or more switches to transition to the closed position (e.g., turn on), may insert a dead time ($t_{DEAD}$) in the switching voltages 2111 to prevent shoot through current from occurring within the SIMO converter 104.

The level shifter 2109 may receive the switching voltages 2111. The level shifter 2109 may shift a voltage level of one or more of the switching voltages 2111 to levels sufficient to cause corresponding switches within the SIMO converter 104 to transition between the open position and the closed position. The level shifter 2109 may generate the gate voltages 2113 based on the switching voltages 2111. In some aspects of the present disclosure, the level shifter 2109 may delay the gate voltages 2113 based on corresponding stages of the SIMO converter 104 that are to receive the gate voltages 2113.

The SIMO converter 104 may receive the gate voltages 2113 and the switches implemented with the SIMO converter 104 may operate accordingly.

In some aspects of the present disclosure, the on time tuning loop 2105, the switch controller 2107, the level shifter 2109, or some combination thereof may be optimized for efficiency.

Figure 22:
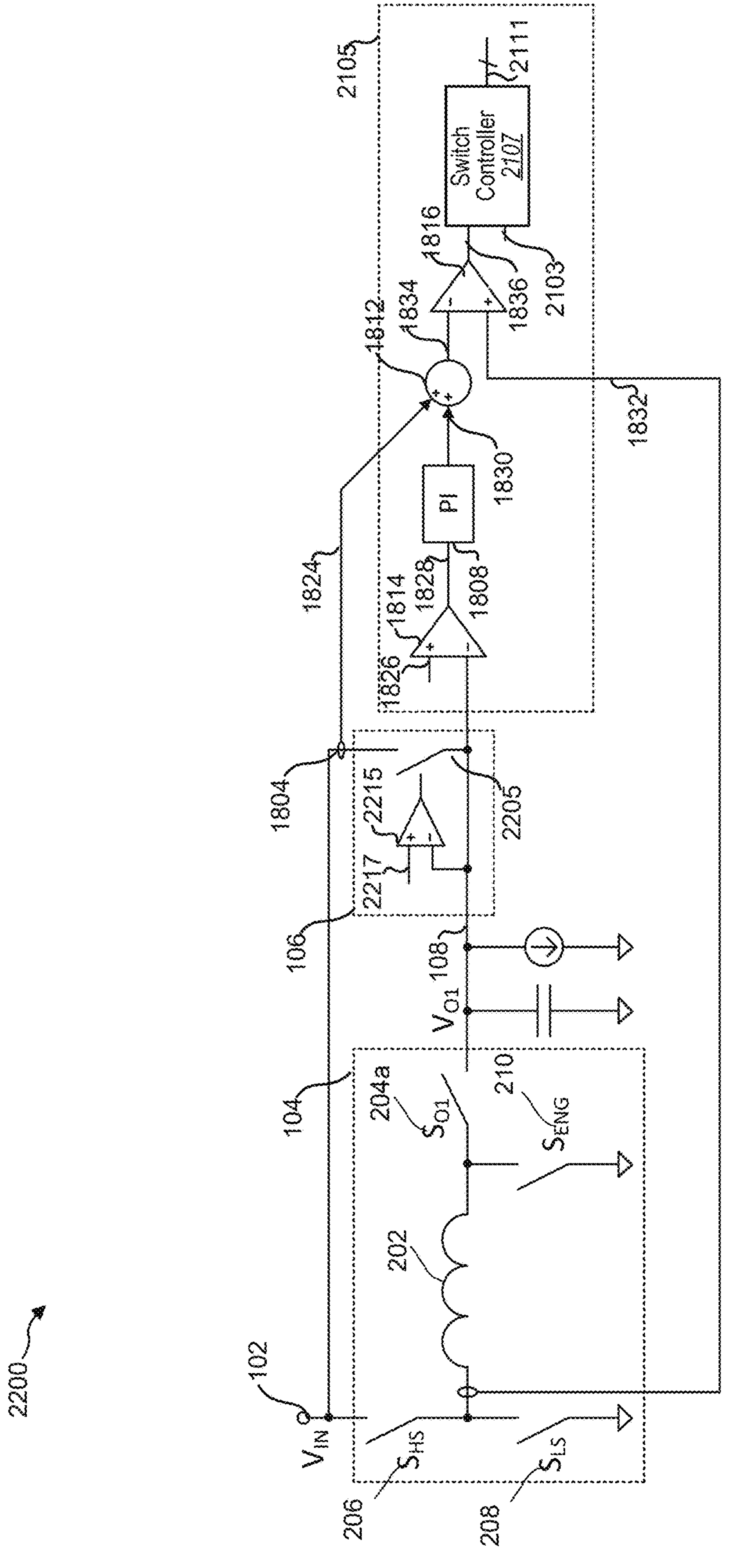
FIG. 22 exemplarily illustrates another block diagram of an operational environment for operating a SIMO converter.

FIG. 22 illustrates another block diagram of an example operational environment or system 2200 for operating the SIMO converter 104, in accordance with at least one aspect described in the present disclosure. The environment 2200 may include the SIMO converter 104, the LDO 106, the on time tuning loop 2205, and the switch controller 2207.

The SIMO converter 104 may correspond to the SIMO converter 104 described above in relation to FIG. 4. In addition, the LDO 106 may correspond to the regulator **302*a* discussed above in relation to FIG. 4**.

In FIG. 22, a single LDO 106 is illustrated and discussed for simplicity of illustration and discussion. In some aspects of the present disclosure, the environment 2200 may include a single LDO 106 as illustrated in FIG. 22. In other aspects of the present disclosure, the environment 2200 may include multiple LDOs 106.

The LDO 106 may include a comparator 2215 electrically coupled to the output of the SIMO converter 104. The comparator 2215 may receive the switching output voltage 108. The comparator 2215 may receive a reference voltage via terminal 2217. The comparator 2215 may compare the reference voltage with the switching output voltage. In some aspects of the present disclosure, the comparator 2215 may control the sixth switch 2205 to regulate the switching output voltage based on the comparison.

The on time tuning loop 2105 (depicted in FIG. 21) may include the amplifier 1814. The amplifier 1814 may receive the switching output voltage 108. The amplifier 1814 may receive the reference voltage via terminal 1826. The amplifier 1814 may compare the reference voltage with the switching output voltage. In some aspects of the present disclosure, the amplifier 1814 may generate the regulator-specific target output voltage 1828*b* based on the comparison.

In some aspects of the present disclosure, the on time tuning loop 2105 may include the PI regulator 1808. The PI regulator 1808 may regulate the regulator-specific target output voltage 1828*b* (or current) of the LDO 106 to provide the regulated target output voltage 1830. The PI regulator 1808 may perform various functions to the regulator-specific target output voltage 1828*b* (or current) to generate the regulated target output voltage 1830 (or current).

The on time tuning loop 2105 may also include an adder 1812. The adder 1812 may be electrically coupled to a sensor positioned by the first regulator terminal 1804 and an output of the PI regulator 1808. In some aspects of the present disclosure, the adder 1812 may add the target output voltage 1830 and a first voltage 1824 generated by the sensor by the first regulator terminal 1804 based on a current at the first regulator terminal 1804. The adder 1812 may provide an added voltage 1834 based on the addition. In some aspects of the present disclosure, the adder 1812 may perform the addition based on current signals instead of voltage signals, as described previously in connection with FIG. 18.

The on time tuning loop 2105 may also include the comparator 1816 electrically or operably coupled to the output of the adder 1812 and the first terminal of the inductor 202. The comparator 1816 may receive the added voltage 1834 and the input voltage 1832. The comparator 1816 may compare the added voltage 1834 and the input voltage 1832 at the first terminal of the inductor 202. The comparator 1816 may generate the comparison voltage 1836 based on the comparison.

The switch controller 2107 may be configured to control the switches within the SIMO converter 104. The switch controller 2107 may control the switches within the SIMO converter 104 to selectively apply the switching output voltage 108 to the converter output.

The switch controller 2107 may generate one or more switching voltages 2111 based on the comparison voltage 1836 and the clock voltage 2103.

In some aspects of the present disclosure, the environment 2200 may also include the level shifter 2109 to generate the gate voltages 2113.

Figure 23:
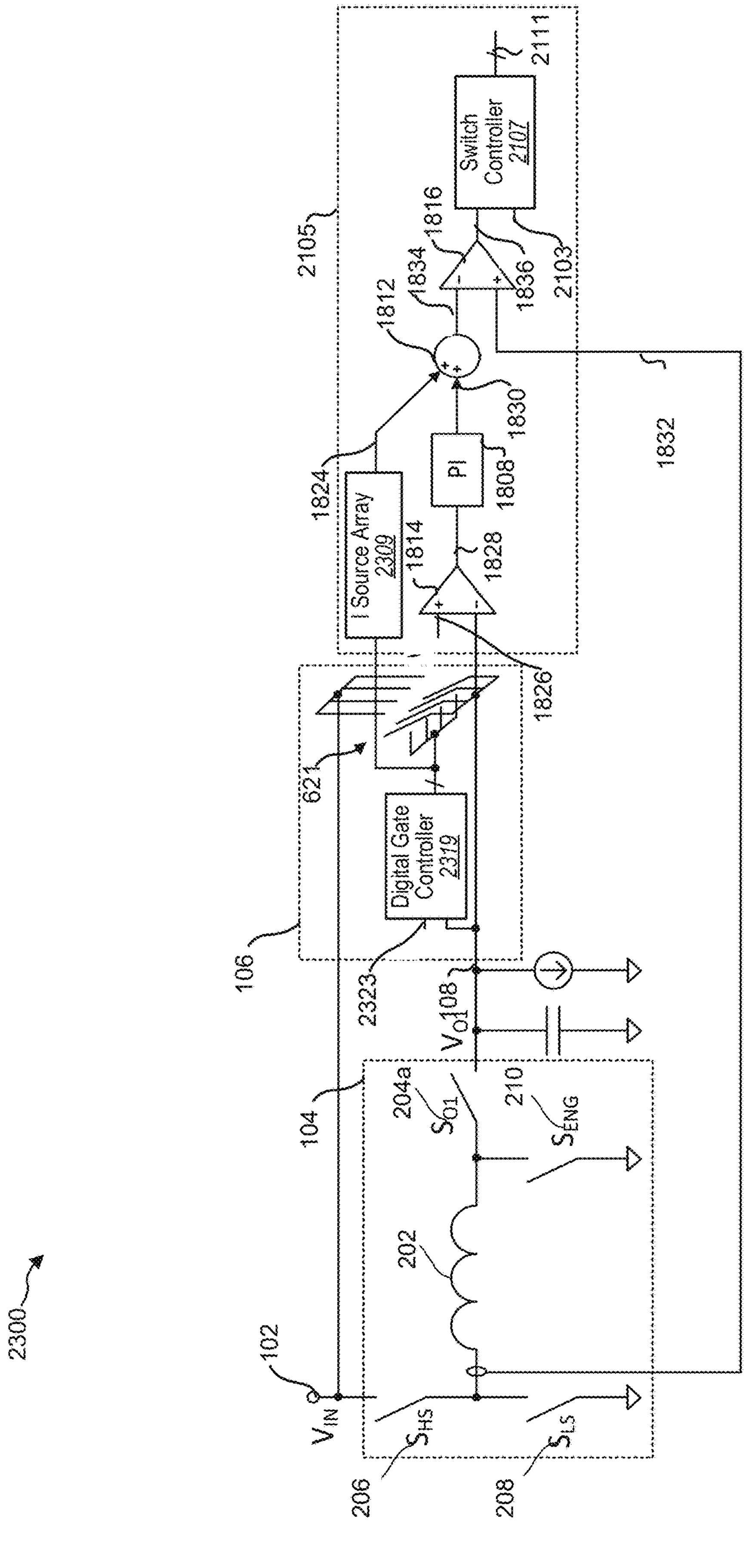
FIG. 23 exemplarily illustrates another block diagram of an operational environment for operating a SIMO converter.

FIG. 23 illustrates another block diagram of an example operational environment 2300 for operating the SIMO converter 104, in accordance with at least one aspect described in the present disclosure. The environment 2300 may include the SIMO converter 104, the LDO 106, the on time tuning loop 2105, and the switch controller 2107.

The SIMO converter 104 may correspond to the SIMO converter 104 described above in relation to FIG. 4. In addition, the LDO 106 may correspond to the LDO 106 discussed above in relation to FIG. 4.

In FIG. 23 a single LDO 106 is illustrated and discussed for simplicity of illustration and discussion. In some aspects of the present disclosure, the environment 2300 may include a single LDO 106 as illustrated in FIG. 23. In other aspects of the present disclosure, the environment 2300 may include multiple LDOs 106.

In some aspects of the present disclosure, the LDO 106 may include a digital linear regulator. The LDO 106 may include a digital gate controller 2319. The digital gate controller 2319 may be electrically coupled to the converter output. The digital gate controller 2319 may generate gate control signals. The digital gate controller 2319 may generate the gate control signals to control gates of switches 621 within the LDO 106 to regulate the switching output voltage 108. The digital gate controller 2319 may generate the gate control signals based on a difference between the switching output voltage 108 and the reference signal 2323. The digital gate controller 2319 may generate the gate control signals as digital signals. Each gate control signal may correspond to a different switch within the switches 621. For example, a first gate control signal may control a gate of a first switch within the switches 621 and a second gate control signal may control a gate of a second switch within the switches 621.

The digital gate controller 2319 may generate a particular number of the gate control signals at a logical high based on the difference between the switching output voltage 108 and the reference signal 2323. As the difference between the switching output voltage 108 and the reference signal 2323 changes, the digital gate controller 2319 may generate more or less of the gate control signals at the logical high. For example, as the difference decreases, the digital gate controller 2319 may reduce the number of gate control signals at the logical high.

The switches 621 may regulate the switching output voltage by increasing a current level of the switching output voltage. The switches 621 may receive an input signal (e.g., the input voltage) and provide the input signal at a controlled current level to the converter output. The switches 621 may receive the input signal from the input terminal 102. The controlled current level of the input signal provided to the converter output may be based on the number of switches within the switches 621 that are in the closed state (e.g., based on the number of the gate control signals that are a the logical high). Each switch within the switches 621 that is in the closed state may increase the current level of the input signal that is provided to the converter output. For example, if all of the switches 621 are in the closed state, the switches 621 may provide the input signal at a high current level. As another example, if a single switch of the switches 621 is in the closed state, the switches 621 may provide the input signal at a current level that is less than the high current level (e.g., one fourth of the high current level).

The on time tuning loop 2105 may include the amplifier 1814. The amplifier 1814 may receive the switching output voltage 108. The amplifier 1814 may receive the reference voltage via terminal 1826. The amplifier 1814 may compare the reference voltage with the switching output voltage. In some aspects of the present disclosure, the amplifier 1814 may generate the regulator-specific target output voltage 1828*b* based on the comparison.

In some aspects of the present disclosure, the on time tuning loop 2105 may include the PI regulator 1808. The PI regulator 1808 may regulate the regulator-specific target output voltage 1828*b* (or current) of the LDO 106 to provide the regulated target output voltage 1830 (or current). The PI regulator 1808 may perform various functions to the regulator-specific target output voltage 1828*b* to generate the regulated target output voltage 1830 (or current).

The on time tuning loop 2105 may include a current source (also referred to as "I source" hereinafter) array 2309. The I source array 2309 may be electrically coupled to an output of the digital gate controller 2319. In addition, the I source array 2309 may be electrically coupled to the adder 1812. The I source array 2309 may receive the gate control signals from the digital gate controller 2319. The I source array 2309 may generate the first voltage 1824 (or current) based on the gate control signals. In some aspects of the present disclosure, the I source array 2309 may generate the first voltage 1824 (or current) based on the number of the gate control signals that are the logical high. For example, if all of the gate control signals are the logical high (e.g., all of the switches within the switches 621 are in the closed state), the I source array 2309 may generate the first voltage 1824 (or current) at a high level. As another example, if two of the gate control signals are the logical high (e.g., two of the switches within the switches 621 are in the closed state), the I source array 2309 may generate the first voltage 1824 (or current) at a portion of the high level (e.g., on half of the high level). In some aspects of the present disclosure, the I source array 2309 may generate the first voltage 1824 as the first current as a copy of a current level within the SIMO Buck-Boost converter 104 (e.g., a current on the inductor 202).

The on time tuning loop 2105 may include the adder 1812. The adder 1812 may be electrically coupled to the I source array 2309 and the output of the PI regulator 1808. In some aspects of the present disclosure, the adder 1812 may add the target output voltage 1830 (or current) and the first voltage 1824 (or current) from the I source array 2309. The adder 1812 may provide the added voltage 1834 (or current) based on the addition.

The on time tuning loop 2105 may also include the comparator 1816 electrically coupled to the output of the adder 1812 and the sensor positioned by the first terminal of the inductor 202. The comparator 1816 may receive the added voltage 1834 (or current) and the voltage 1832 (or current) based on the current at the first terminal of the inductor 202. The comparator 1816 may compare the added voltage 1834 (or current) and the voltage 1832 (or current). The comparator 1816 may generate the comparison voltage 1836 (or current) based on the comparison.

The switch controller 2107 may be configured to control the switches within the SIMO converter 104. The switch controller 2107 may control the switches within the SIMO converter 104 to selectively apply the switching output voltage 108 to the converter output. The switch controller 2107 may generate one or more switching voltages 2111 based on the comparison voltage 1836 and the clock voltage 2103.

In some aspects of the present disclosure, the environment 2300 may also include the level shifter 2109 to generate the gate voltages 2113.

Figure 24:
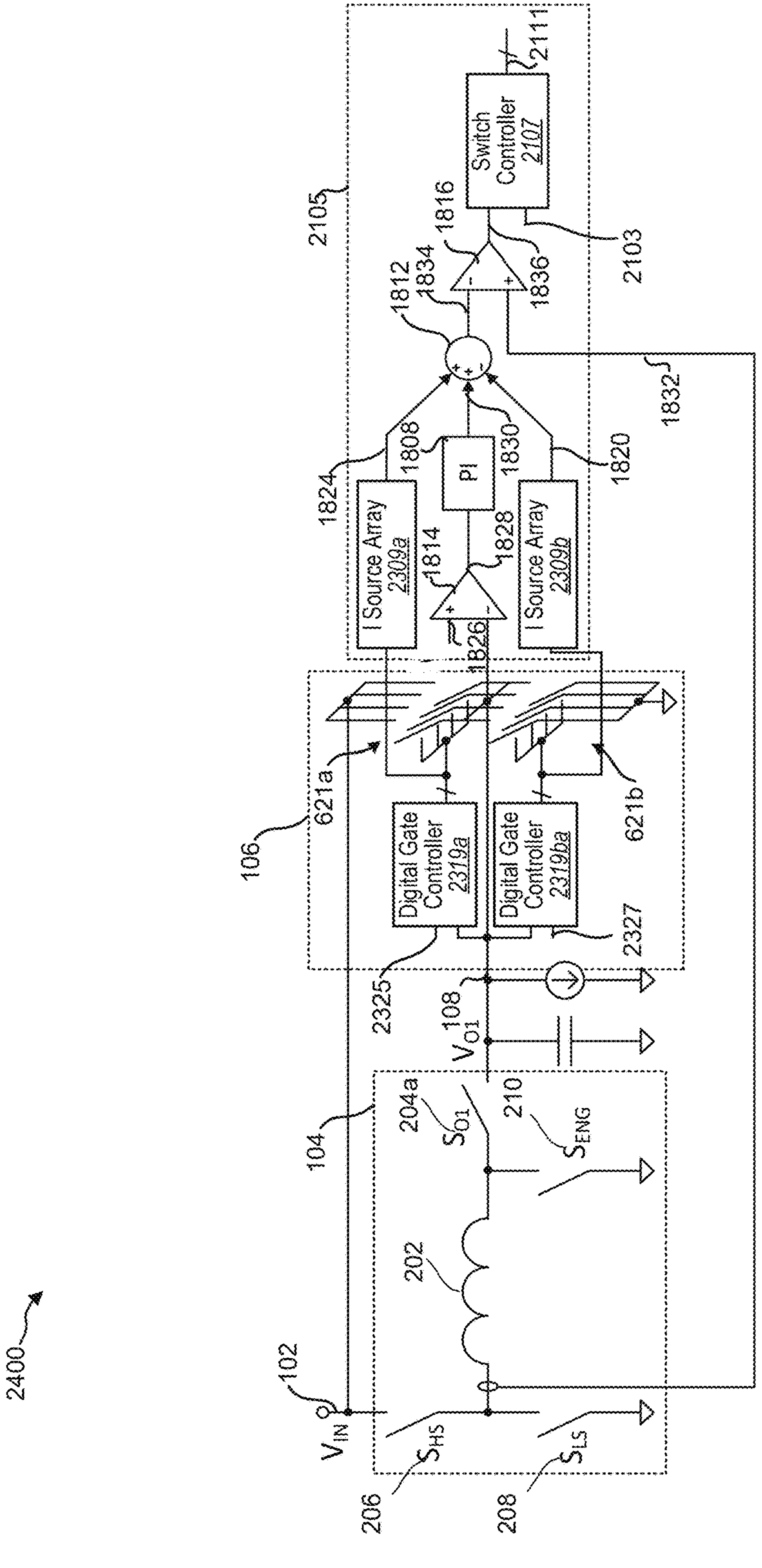
FIG. 24 exemplarily illustrates another block diagram of an operational environment for operating a SIMO converter.

FIG. 24 illustrates another block diagram of an example operational environment 2400 for operating the SIMO converter 104, in accordance with at least one aspect described in the present disclosure. The environment 2400 may include the SIMO converter 104, the LDO 106, the on time tuning loop 2105, and the switch controller 2107.

The SIMO converter 104 may correspond to the SIMO converter 104 described above in relation to FIG. 4. In addition, the LDO 106 may correspond to the LDO 106 discussed above in relation to FIG. 4.

In FIG. 24 a single LDO 106 is illustrated and discussed for simplicity of illustration and discussion. In some aspects of the present disclosure, the environment 2400 may include a single LDO 106 as illustrated in FIG. 24. In other aspects of the present disclosure, the environment 2400 may include multiple LDOs 106.

In some aspects of the present disclosure, the LDO 106 may include a digital push-pull regulator. The LDO 106 may include a first digital gate controller 2319*a* and a second digital gate controller 2319*b*. The digital gate controllers 2319*a-b* may be electrically coupled to the converter output. The digital gate controllers 2319*a-b* may generate gate control signals. The digital gate controllers 2319*a-b* may generate the gate control signals to control gates of switches 621*a-b* within the LDO 106 to regulate the switching output voltage 108.

The first digital gate controller 2319*a* may receive a low reference signal 2325 and the switching output voltage 108. The first digital gate controller 2319*a* may generate the corresponding gate control signals based on the switching output voltage 108 and the low reference signal 2325. In some aspects of the present disclosure, the first digital gate controller 2319*a* may regulate the switching output voltage to be above a low threshold as discussed above in relation to FIG. 23.

The second digital gate controller 2319*b* may receive a high reference signal 2327 and the switching output voltage 108. The second digital gate controller 2319*b* may generate the corresponding gate control signals based on the switching output voltage 108 and the high reference signal 2327. In some aspects of the present disclosure, the second digital gate controller 2319*b* may regulate the switching output voltage to be below a high threshold. The second digital gate controller 2319*b* may operate similar to the digital gate controller 2319 of FIG. 23, but instead of regulating the current level of the switching output voltage to be above a threshold value, the second digital gate controller 2319*b* may regulate the current level of the switching output voltage to be below the high threshold based on the gate control signals.

The on time tuning loop 2105 may include the amplifier 1814. The amplifier 1814 may receive the switching output voltage 108. The amplifier 1814 may receive the reference voltage via the terminal 1826. The amplifier 1814 may compare the reference voltage with the switching output voltage. In some aspects of the present disclosure, the amplifier 1814 may generate the regulator-specific target output voltage 1828*b* based on the comparison.

In some aspects of the present disclosure, the on time tuning loop 2105 may include the PI regulator 1808. The PI regulator 1808 may regulate the regulator-specific target output voltage of the LDO 106 to provide the regulated target output voltage 1830 (or current). The PI regulator 1808 may perform various functions to the regulator-specific target output voltage 1828*b* to generate the regulated target output voltage 1830 (or current). The LDO 106 of FIG. 24 may operate similarly to what has been described for the digital push-pull regulator 702*a* in connection with FIG. 7.

The on time tuning loop 2205 may include a first I source array 2309*a* and a second I source array 2309*b*. The first I source array 2309*a* may be electrically coupled to outputs of the first digital gate controller 2319*a*. The second I source array 2309*b* may be electrically coupled to outputs of the second digital gate controller 2319*b*. In addition, the I source arrays 2309*a-b* may be electrically coupled to the adder 1812. The I source arrays 2309*a-b* may receive the corresponding gate control signals from the digital gate controllers 2319*a-b*. The first I source array 2309*a* may generate the first voltage 1824 (or current) based on the gate control signals from the first digital controller 2319*a*. In some aspects of the present disclosure, the first I source array 2309*a* may generate the first voltage 1824 (or current) based on the number of the gate control signals received from the first digital gate controller 2319*a* that are the logical high as discussed above in relation to FIG. 23. The second I source array 2309*b* may generate the second voltage 1820 (or current) based on the gate control signals from the second digital controller 2319*b*. In some aspects of the present disclosure, the second I source array 2309*b* may generate the second voltage 1820 (or current) based on the number of the gate control signals received from the second digital gate controller 2319*b* that are the logical high as discussed above in relation to FIG. 23.

The on time tuning loop 2105 may include the adder 1812. The adder 1812 may be electrically coupled to the I source arrays 2309*a-b* and the output of the PI regulator 1808. In some aspects of the present disclosure, the adder 1812 may add the target output voltage 1830 (or current), the first voltage 1824 (or current), the second voltage 1820 (or current), or some combination thereof. The adder 1812 may provide the added voltage 1834 (or current) based on the addition.

The on time tuning loop 2105 may also include the comparator 1816 electrically coupled to the output of the adder 1812 and the sensor positioned by the first terminal of the inductor 202. The comparator 1816 may receive the added voltage 1834 (or current) and the voltage 1832 (or current) based on the current at the first terminal of the inductor 202. The comparator 1816 may compare the added voltage 1834 (or current) and the voltage 1832 (or current). The comparator 1816 may generate the comparison voltage 1836 (or current) based on the comparison.

The switch controller 2107 may be configured to control the switches within the SIMO converter 104. The switch controller 2107 may control the switches within the SIMO converter 104 to selectively apply the switching output voltage 108 to the converter output. The switch controller 2107 may generate one or more switching voltages 2111 based on the comparison voltage 1836 and the clock voltage 2103.

In some aspects of the present disclosure, the environment 2400 may also include the level shifter 2109 to generate the gate voltages 2113.

The system including the SIMO converter, the LDO, and the switch controller may operate as a feed forward system. The feed forward system may feed (e.g., provide) voltages, currents, or some combination thereof forward from the SIMO converter or the LDO to the switch controller. For example, the first voltage/current based on the current at the first regulator terminal and the second voltage/current based on the current at the second regulator terminal may be fed forward. The switch controller may use the voltages/current that are fed forward to control the duty cycles of the switches in the SIMO converter. In some aspects of the present disclosure, the switch controller or a combination of the switch controller and the LDO may be integrated with a tuning loop, e.g. an on time tuning loop.

In hybrid SIMO LDO structures, the SIMO converter may provide higher efficiency performance versus the LDO and the LDO may improve transient performance. To improve efficiency of the system, operation of the LDO may be minimized and operation of the SIMO converter may be maximized. In some aspects of the present disclosure, boosting (e.g., increasing) duty cycles of the switches in the SIMO converter to increase the operation of the SIMO converter may be implemented. The switch controller and the voltage that are fed forward from the SIMO converter may boost the duty cycles of the switches.

The LDO may be configured to dynamically set the respectively associated regulator-specific target output voltage. In some aspects of the present disclosure, the LDO may alter the respectively associated regulator-specific target output voltage based on operational factors within the SIMO converter or the LDO. The LDO may be configured to regulate the switching output voltage. The LDO may regulate the switching output voltage to stay within a pre-defined range using the input voltage. For example, the LDO may regulate the switching output voltage to stay within the pre-defined range of the target output voltage. In these and other aspects of the present disclosure, the input current may flow through the LDO from the first regulator terminal to the second regulator terminal.

In some aspects of the disclosure, the LDO may include the comparator (e.g., a third comparator) configured to compare the switching output voltage with a pre-defined third threshold voltage. In some aspects of the present disclosure, the pre-defined third threshold voltage may be programmed based on a steady state voltage level of the switching output voltage. The comparator may generate the regulator-specific target output voltage based on the comparison.

In some aspects of the disclosure, and as depicted, for example, in FIG. 18, the LDO may include the PI circuit that includes a proportion portion and an integration portion. The PI circuit, e.g. PI regulator, may receive the regulator-specific target output voltage from the amplifier. The PI regulator may perform proportional functions or integration functions to the regulator-specific target output voltage. The PI may provide the regulated target output voltage based on the functions performed on the regulator-specific target output voltage. In some aspects of the present disclosure, only the proportion portion of the PI circuit may perform functions on the regulator-specific target output voltage. In other aspects of the present disclosure, only the integration portion of the PI circuit may perform functions on the regulator-specific target output voltage. Alternatively, both the proportion portion and the integration portion of the PI circuit may perform functions on the regulator-specific target output voltage.

In some aspects of the present disclosure, the LDO or the switch controller may include the adder. The LDO or the switch controller may use the first voltage/current, the second voltage/current, or some combination thereof to control the switches in the SIMO converter. In some aspects of the present disclosure, the LDO may determine the first voltage/current based on the current at the first regulator terminal or the second voltage/current based on the current at the second regulator terminal. For example, the adder may receive the regulated target output voltage from the PI circuit, the first voltage/current from the sensor by the first regulator terminals, and/or the second voltage/current from the sensor by the first terminal of the inductor. The adder may sum the regulated target output voltage/current with the first voltage/current and/or the second voltage/current. The adder may generate the added voltage/current based on the sum of the regulated target output voltage/current and the first voltage/current and/or the second voltage/current.

According to some aspects of the disclosure, the switch controller may include the comparator (e.g., a fourth comparator) configured to receive the added voltage and a voltage/current based on a current at the first terminal of the inductor. According to other aspects of the disclosure, the comparator may be configured as a pre-stage to the switch controller. The comparator may compare the regulated target output voltage/current with the voltage/current based on the current at the first terminal of the inductor. The comparator may provide the comparison voltage based on the comparison.

The switch controller may include the SR latch circuit configured to receive the comparison voltage. The SR latch circuit may also receive a clock signal. In some aspects of the present disclosure, the comparison voltage may operate as a reset signal for the SR latch circuit. In these and other aspects of the present disclosure, the clock signal may operate as a set signal for the SR latch circuit. The SR latch circuit may generate a duty cycle voltage based on the clock signal and the comparison voltage (e.g., to control the switches within the SIMO converter). The duty cycle voltage may control a duty cycle of one or more of the switches in the SIMO converter.

In some aspects of the present disclosure, if the clock signal becomes a high value and the comparison voltage is below a threshold level, the SR latch circuit may be set and may provide the duty cycle voltage. The fed forward currents may be added to the duty control of the switches in the SIMO converter to boost (e.g., increase) the duty cycle of one or more of the switches in the SIMO converter. In some aspects of the present disclosure, boosting the duty cycles of one or more of the switches in the SIMO converter may increase an amount of time the one or more switches are in a closed position (e.g., a propagating position) or in an open position (e.g., a non-propagating position). In some aspects of the present disclosure, if the comparison voltage goes above the corresponding threshold level, the SR latch circuit may be reset and may not provide the duty cycle voltage and the one or more switches in the SIMO converter may transition to the open position (e.g., a non-propagating position). In these and other aspects of the present disclosure, if the comparison voltage goes above the corresponding threshold level, the SR latch circuit may be reset and may not provide the duty cycle voltage and the one or more switches in the SIMO converter may operate according to pre-defined duty cycles.

In some aspects of the present disclosure, the duty cycle voltage controlling the one or more switches may boost the duty cycles of the one or more switches in the SIMO converter and may increase a rate at which the inductor is charged compared to systems that do not include the switch controller. In some aspects of the present disclosure, the switch controller may increase (e.g., boost) the duty cycle of the one or more switches in the SIMO converter if the added voltage increases. In these and other aspects of the present disclosure, the switch controller may decrease (e.g., reduce) the duty cycle of the one or more switches in the SIMO converter if the added voltage provided by the associated regulator decreases. By controlling the duty cycles of the one or more switches in the SIMO converter, the switch controller may control the switching output voltage.

The LDO and the switch controller (e.g., the comparators, the PI circuit, the adder, or the SR latch circuit) may be used to sense if the output of the SIMO should increase, decrease, or be maintained. In some aspects of the present disclosure, the LDO and the switch controller may be implemented as on time tuning loops. In on time tuning loops, an amount of time the duty cycles of the one or more switches in the SIMO are on (e.g., $T_{on}$) may be increased or decreased to alter a rate that the inductor is either being charged or current on the inductor is being dissipated. One or more aspects described in the present disclosure may detect an increase in the current in the LDO, which may cause the amount of time (e.g., $T_{on}$) the duty cycle voltage is provided to increase. In turn, the current of the LDO may decrease due to the increased amount of time the duty cycle voltage is provided.

In some aspects, further optimization of the system may be obtained using power train triggering or other optimization methods.

One or more of the aspects described in the present disclosure may increase the duty cycles of the one or more switches in the SIMO quicker than SIMO systems that do not include the LDO or the feed-forward controller. In addition, one or more aspects described in the present disclosure may increase the rate at which the inductor is charged or dissipates stored current. Further, one or more aspects described in the present disclosure may reduce the circuit complexity of the SIMO system.

In some aspects of the present disclosure, the LDO, the on time tuning loop, the switch controller, or some combination thereof may include a Sense field effect transistor (SenseFET). The SenseFET may detect (e.g., sense) one or more voltages within the SIMO converter (e.g., the switching output voltage). In some aspects of the present disclosure, a gate-source voltage ($V_g s$) and a gate-drain voltage ($V_g a$) of the SenseFET may be the same as or similar to one or more voltages within the SIMO converter. The SenseFET may conduct a portion of the current within the SIMO converter to control one or more voltages within the LDO, the on time tuning loop, the switch controller, or some combination thereof.

In some aspects of the present disclosure, the SenseFET may include a size ratio of N:1 to the SIMO converter. In these and other aspects of the present disclosure, the SenseFET may conduct the current within the SIMO converter at a ratio of 1/N to control the one or more voltages within the LDO, the on time tuning loop, the switch controller, or some combination thereof.

In some aspects of the present disclosure, the LDO, the on time tuning loop, the switch controller, or some combination thereof may include an instrumentation amplifier. The LDO, the on time tuning loop, the switch controller, or some combination thereof may detect a voltage drop on the SIMO converter. The instrumentation amplifier may be configured to amplify the voltage drop on the SIMO converter. The instrumentation amplifier may amplify the voltage drop on the SIMO converter to control the one or more voltages within the LDO, the on time tuning loop, the switch controller, or some combination thereof.

In some aspects of the present disclosure, the LDO may include a digital LDO. The LDO may include a digital gate controller and an I source array. The LDO may detect current within the SIMO converter based on a number of activated switches (e.g., switches in the closed position). The LDO may include switches that are electrically coupled between the input of the SIMO converter and the converter output. The digital gate controller may control the switches with the LDO. The digital gate controller may cause the switches within the LDO to transition between the open position and the closed position based on the switching output voltage and a reference voltage. The I source array may detect a current on an output of the digital gate controller. The on time tuning loop may adjust the added voltage based on the detected current on the output of the digital gate controller.

Electronic devices electrically coupled to the converter outputs may include different settings for the voltage ripple of the switching output voltage. In some aspects of the present disclosure, the switch controller may control the switches within the SIMO converter 104 to provide the switching output voltage to electronic devices that include sensitive voltage ripple settings more often. The switch controller providing the switching output voltage to these electronic device more often may reduce the voltage ripple of the switching output voltage on the corresponding converter output.

According to an aspect of the disclosure, the switch controller may control the ripple of the switching output voltage by controlling the switches within the SIMO converter. Electrical components may have various tolerances for voltage ripple. Although some components may be very robust against ripple and can tolerate substantial voltage ripple, other components are comparatively ripple-sensitive and require significant voltage control to protect the component and ensure proper operation. For example, although a USB port is ideally operated at 5 V, some USB-connected devices may be sufficiently ripple tolerant to function well within a voltage range (e.g. a hypothetical range of 4.45V-5.25V). Other USB-connected devices, however, may require a voltage much closer to a consistent 5V. The magnitude of the ripple may be determined, in part, by controlling the switches 204*a-n*.

Figure 25:
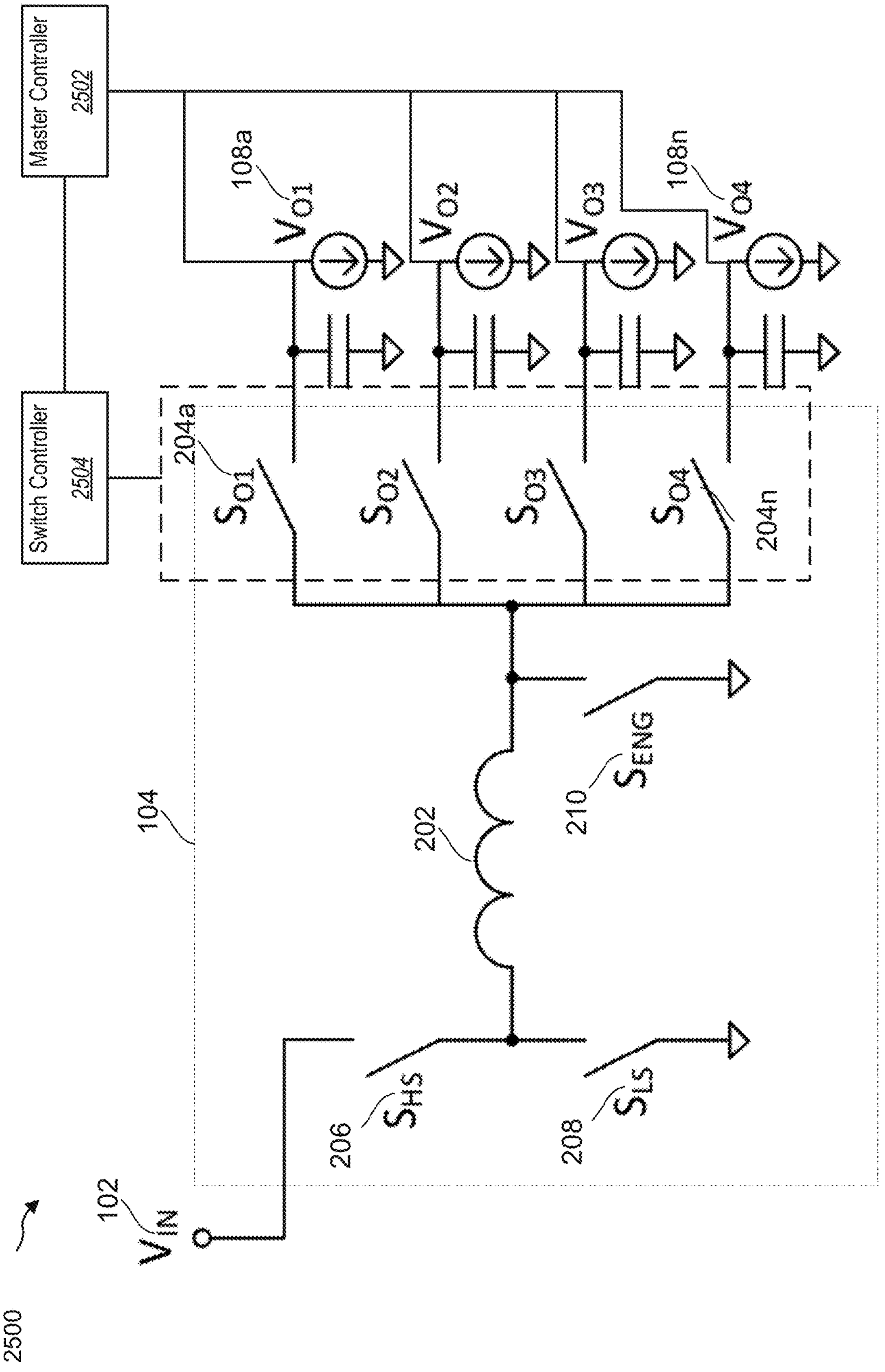
FIG. 25 exemplarily illustrates a block diagram of a system that includes the SIMO.

FIG. 25 illustrates a block diagram of an example system 2500 that includes the SIMO 104, in accordance with at least one aspect described in the present disclosure. The system 2500 may also include a master controller 2502 and a switch controller 2504. The SIMO 104 may correspond to the SIMO 104 described above in relation to FIG. 4.

In FIG. 25 a single master controller 2502 and a single switch controller 2504 are illustrated and discussed for simplicity of illustration and discussion. In some aspects of the present disclosure, the system 2500 may include a single master controller 2502 and a single switch controller 2504 as illustrated in FIG. 25. In other aspects of the present disclosure, the system 2500 may include two or more master controllers 2502 and two or more switch controllers 2504.

In some aspects of the present disclosure, the master controller 2502 may be electrically coupled to different outputs of the SIMO 104. In these and other aspects of the present disclosure, the switch controller 2504 may be communicatively coupled to the master controller 2502. In addition, in some aspects of the present disclosure, the switch controller 2504 may be electrically coupled to one or more of the switches 204*a-n* in the SIMO 104, represented in FIG. 25 as a dashed rectangle. The switch controller 2504 is illustrated in FIG. 25 as being coupled to the dashed rectangle instead of each of the switches 204*a-n* for simplicity of illustration.

In some aspects of the present disclosure, the system 2500 may operate to control a voltage ripple of the switching output voltages 108*a-n* as provided to the electrical devices that are electrically coupled to outputs of the SIMO 104. In these and other aspects of the present disclosure, the master controller 2502 may determine the switching output voltage 108*a-n* at one or more of the outputs. The switch controller 2504 may be configured to control duty cycles of the switches 204*a-n* based on signals provided by the master controller 2502 based on the switching output voltages 108*a-n*.

Figure 26:
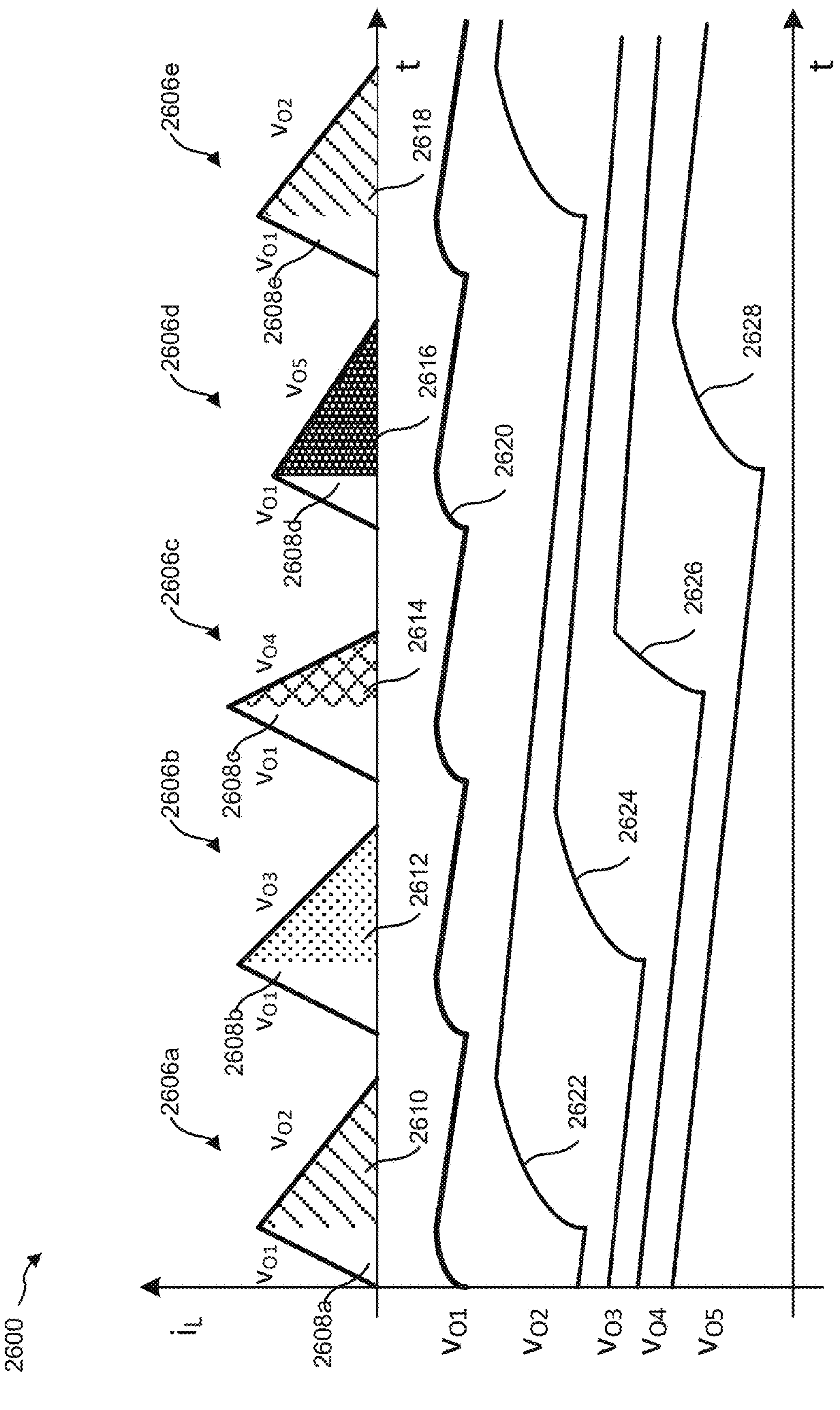
FIG. 26 exemplarily illustrates a graphical representation of a simulation in which the inductor is electrically coupled to two electrical devices during disjunct inductor cycles.

FIG. 26 illustrates a graphical representation 2600 of a simulation in which the inductor is electrically coupled to two electrical devices during disjunct inductor cycles, in accordance with at least one aspect described in the present disclosure. In FIG. 26, waveforms 2606*a-e* represent current on the inductor during the inductor cycles. The waveforms 2606*a-e* illustrate how the current on the inductor changes over time during the inductor cycles. The charge portions of the inductor cycles are illustrated in FIG. 26 as portions 2608*a-e* and the discharge portions of the inductor cycles are illustrated in FIG. 26 as portions 2610, 2612, 2614, 2616, and 2618. For example, the charge portion of the first inductor cycle 2606*a* includes portion 2608*a* and the discharge portion of the first inductor cycle 2606*a* includes portion 2610.

In some aspects of the present disclosure, the inductor may be electrically coupled to an electrical device during the charge portions 2608*a-e* and the discharge portions 2610, 2612, 2614, 2616, and 2618. In these and other aspects of the present disclosure, the charge portions 2608*a-e* illustrate an increase in the current on the inductor due to the inductor being charged using the input voltage as a positive voltage at a greater rate than the inductor is being discharged. For example, the charge portions 2608*a-e* may correspond to the inductor receiving the input voltage and being electrically coupled to a first electrical device via a first output. The discharge portions 2610, 2612, 2614, 2616, and 2618 illustrate a decrease in the current on the inductor due to disconnecting the inductor from the input voltage and electrically coupling the inductor to another electrical device. For example, the discharge portions 2610, 2612, 2614, 2616, and 2618 may correspond to electrically coupling the inductor to a second electrical device, a third electrical device, a fourth electrical device, a fifth electrical device, and the second electrical device, respectively. During each inductor cycle, the inductor is electrically coupled to the first electrical device during the charge portions 2608*a-e* and to a different electrical device during the discharge portions 2610, 2612, 2614, 2616, and 2618.

Curves 2620, 2622, 2624, 2626, and 2628 illustrate how the switching output voltage on each output of the SIMO system changes due to charging or discharging the inductor during the inductor cycles. Curve 2620 corresponds to a voltage level of the switching output voltage on the first output. Curve 2622 corresponds to the voltage level of the switching output voltage on the second output. Curve 2624 corresponds to the voltage level of the switching output voltage on the third output. Curve 2626 corresponds to the voltage level of the switching output voltage on the fourth output. Curve 2628 corresponds to the voltage level of the switching output voltage on the fifth output.

As illustrated in FIG. 26, the voltage level of the switching output voltage on the first output increases during the corresponding charge portions 2608*a-e*. In addition, as illustrated in FIG. 26, the voltage level of the switching output voltage on the second output, the third output, the fourth output, and the fifth output increase during the corresponding discharge portions 2610, 2612, 2614, 2616, and 2618. For example, the voltage level of the switching output voltage on the second output increases (e.g., curve 2622) during the discharge portions 2610 and 2618 and the voltage level on the switching output voltage of the fourth output (e.g., curve 2626) increases during the discharge portion 2614.

When the current on the inductor either reaches substantially zero amps or the corresponding inductor cycle ends (e.g., the switches move such that a subsequent charge portion occurs), the voltage level of the switching output voltage on the corresponding output starts to decrease. The voltage level of the switching output voltage on the different outputs may gradually decrease when the current reaches substantially zero amps or the corresponding inductor cycle ends due to the voltage stored of the capacitors. For example, as illustrated in FIG. 26, when the discharge portion 2612 ends, the voltage level of the switching output voltage on the third output begins to decrease (e.g., curve 2624 drops). As another example, as illustrated in FIG. 26, when the charge portion 2608*c* ends, the voltage level of the switching output voltage on the first output begins to decrease (e.g., curve 2620 drops). As illustrated in FIG. 26, electrically coupling the inductor to the first output each inductor cycle may reduce a voltage ripple on the first output.

Figure 27:
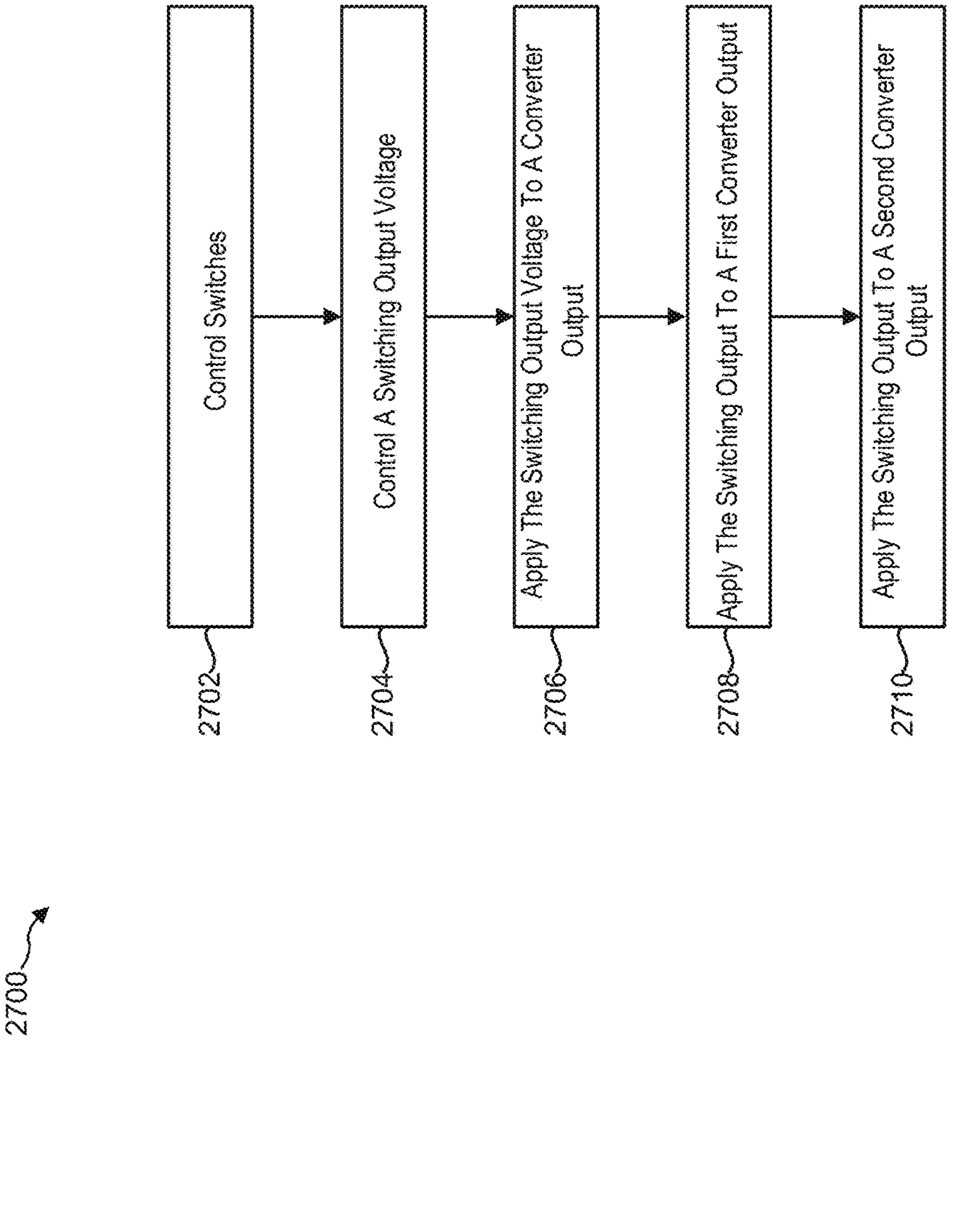
FIG. 27 illustrates a flowchart of an example method of operating a single inductor multiple output converter.

FIG. 27 illustrates a flowchart of an example method 2700 of operating a single inductor multiple output converter in accordance with at least one aspect described in the present disclosure. The method 2700 may include one or more blocks 2702, 2704, 2706, 2708, or 2710. Although illustrated with discrete blocks, the operations associated with one or more of the blocks of the method 2700 may be divided into additional blocks, combined into fewer blocks, or eliminated, depending on the particular implementation.

At block 2702 method may include controlling (e.g. switching) switches. In some aspects of the present disclosure, the switches may provide a switching output voltage in response to an input current supplied to an inductor.

At block 2704, method may include controlling the switching output voltage. In some aspects of the present disclosure, method may include controlling the switches to control the switching output voltage.

At block 2706, method may include applying the switching output voltage to a converter output. In some aspects of the present disclosure, method may include applying the switching output voltage to a single converter output during a charge portion or a discharge portion of an inductor cycle.

At block 2708, method may include applying the switching output voltage to a first converter output. In some aspects of the present disclosure, method may include applying the switching output voltage to the first converter output during a first time portion of a first duty cycle. In these and other aspects of the present disclosure, the first time portion of the first duty cycle may correspond to a charge portion of an inductor cycle.

At block 2710, method may include applying the switching output voltage to another converter output. In some aspects of the present disclosure, method may include applying the switching output voltage to a converter output other than the first converter output. In these and other aspects of the present disclosure, method may include applying the switching output voltage to the converter output other than the first converter output during a second time portion of a first duty cycle. In these and other aspects of the present disclosure, the second time portion of the first duty cycle may correspond to a discharge portion of an inductor cycle.

Modifications, additions, or omissions may be made to the method 2700 without departing from the scope of the present disclosure. For example, the operations of method 2700 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

Figure 28:
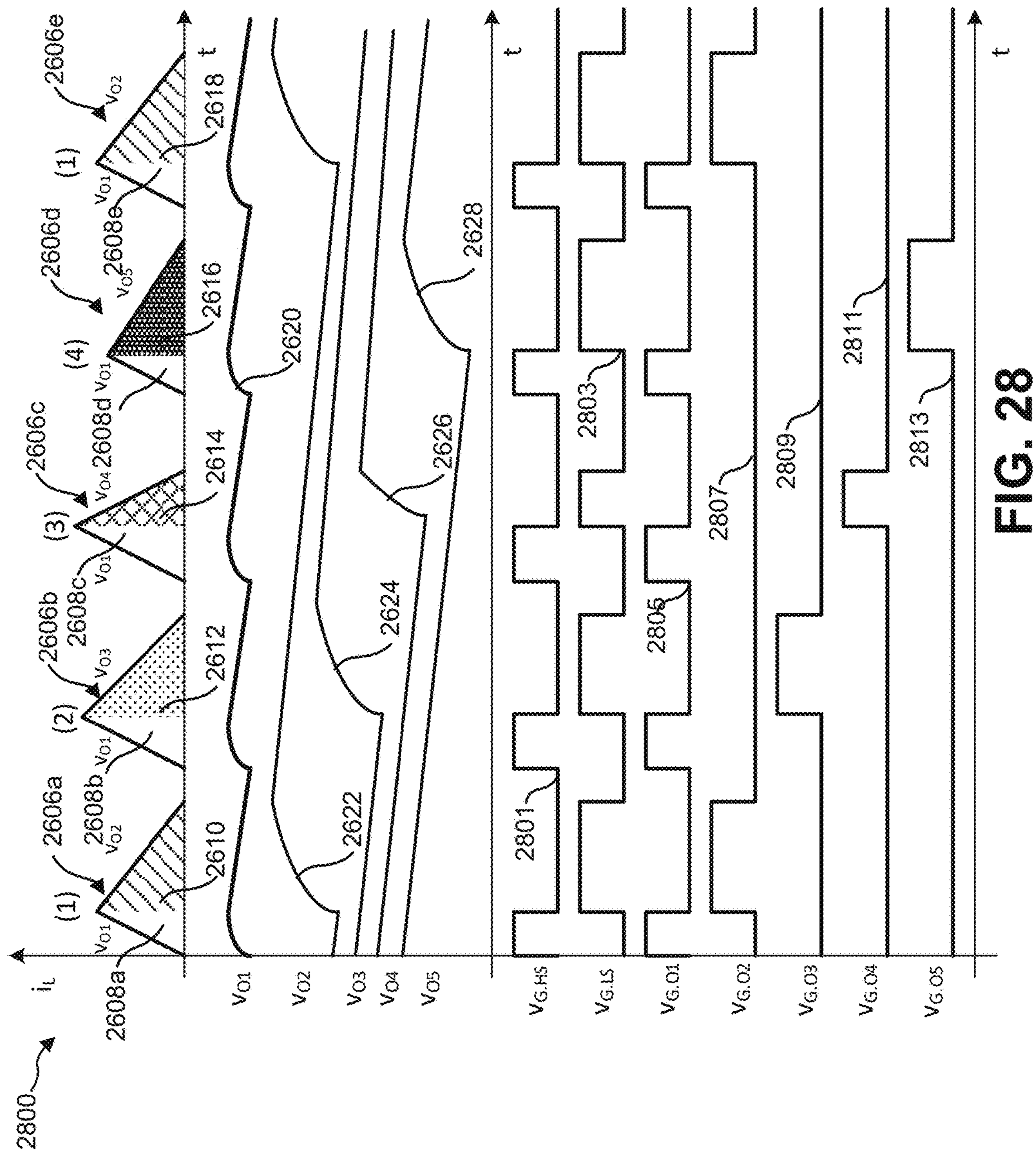
FIG. 28 illustrates a graphical representation of the simulation in which the inductor is electrically coupled to two electrical devices during disjunct inductor cycles including a timing diagram of switches within the SIMO converter.

FIG. 28 illustrates a graphical representation 2800 of the simulation in which the inductor is electrically coupled to two electrical devices during disjunct inductor cycles including a timing diagram of switches within the SIMO converter, in accordance with at least one aspect described in the present disclosure.

In FIG. 28, waveforms 2606*a-e* represent current on the inductor during the inductor cycles as discussed above in relation to FIG. 26. In addition, in FIG. 28 curves 2620, 2622, 2624, 2626, and 2628 illustrate how the switching output voltage on each converter output of the SIMO converter changes due to charging or discharging the inductor during the inductor cycles as discussed above in relation to FIG. 26.

Curves 2801, 2803, 2805, 2807, 2809, 2811, and 2813 illustrate a timing diagram of voltages on one or more gates of the switches (e.g., gate voltages) within the SIMO converter. Curve 2801 corresponds to a gate voltage on the gates of a high side portion of the switches within the SIMO converter. In some aspects of the present disclosure, the high side portion of the switches of the SIMO converter may correspond to the switches that control charging the inductor. Curve 2803 corresponds to a gate voltage on the gates of a low side portion of the switches within the SIMO converter. In some aspects of the present disclosure, the low side portion of the switching of the SIMO converter may correspond to the switches that control discharging the inductor.

Curves 2805, 2807, 2809, 2811, and 2813 correspond to gate voltages on the gates of the switches on the converter outputs of the SIMO converter.

As illustrated in FIG. 28, when the gate voltage of the high side portion (e.g., curve 2801) is high, the charge portions 2608*a-e* are occurring. In addition, when the gate voltage of the high side portion (e.g., curve 2801) is low, the charge portions 2608*a-e* are not occurring. Further, as illustrated in FIG. 28, when the gate voltage of the low side portion (e.g., 2803) is high, one of the discharge portions 2610, 2612, 2614, 2616, and 2618 is occurring. When the gate voltage of the low side portion (e.g. 2803) is low, the discharge portions 2610, 2612, 2614, 2616, and 2618 are not occurring.

As illustrated in FIG. 28, when the gate voltage on the gates of the switches on the converter outputs of the SIMO converter are high, the voltage level of the switching output voltage on the corresponding converter output increases. For example, when curve 2805 is high, curve 2620 increases. As another example, when curve 2807 is high, curve 2622 increases. As yet another example, when curve 2809 is high, curve 2624 increases. As another example, when curve 2811 is high, curve 2626 increases. As another example, when curve 2813 is high, curve 2628 increases.

As illustrated in FIG. 28, when the gate voltage on the gates of the switches for the converter outputs of the SIMO converter are low, the voltage level of the switching output voltage on the corresponding converter output decreases or becomes substantially zero volts. For example, when curve 2805 is low, curve 2620 decreases. As another example, when curve 2807 is low, curve 2622 decreases. As yet another example, when curve 2809 is low, curve 2624 decreases. As another example, when curve 2811 is low, curve 2626 decreases. As another example, when curve 2813 is low, curve 2628 decreases.

As illustrated in FIG. 28, each charge portion of the inductor cycles may occur when curves 2801 and 2805 are high and curve 2803 is low. Each discharge portion of the inductor cycles may occur when curves 2801 and 2805 are low and curve 2803 is high. In addition, each discharge portion of the inductor cycles occur when one or more of curves 2807, 2809, 2811, and 2813 are high (e.g., the corresponding gate voltages on the gates of the switches on the converter outputs of the SIMO converter are high).

The disjunct inductor cycles 2606*a-e* may reduce a ripple on the first converter output (e.g., curve 2620) by providing the switching output voltage on the first converter output each disjunct inductor cycle 2606*a-e*. The voltage ripple (also referred to herein as ripple value) of the switching output voltage on the first converter output (e.g., a difference between high and low points of curve 2620) may be lower than the ripple of the switching output voltage on the second converter output, the third converter output, the fourth converter output, the fifth converter output, or some combination thereof (e.g., a difference between high and low points of curves 2622, 2624, 2626, 2628, or some combination thereof).

Figure 29:
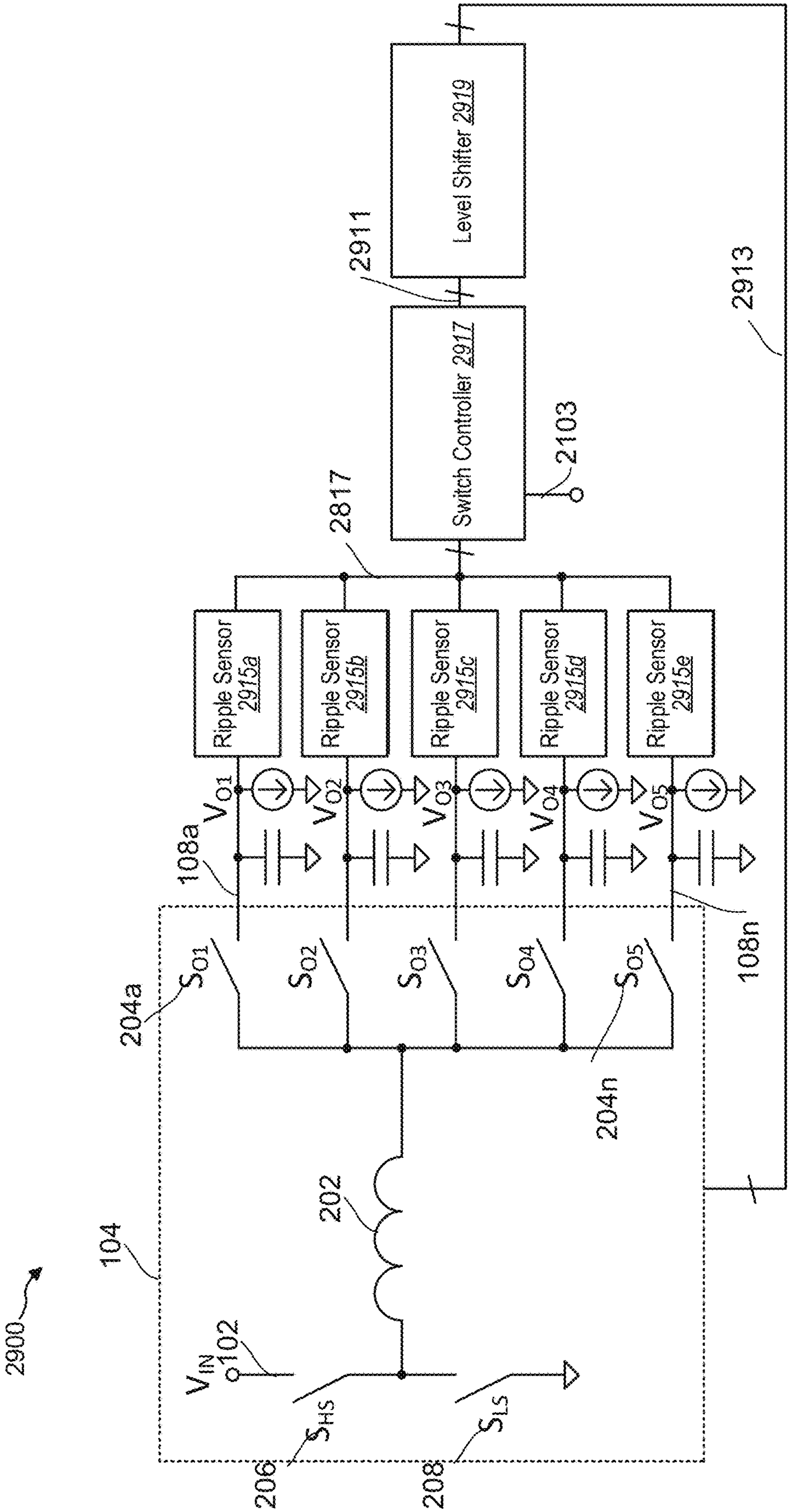
FIG. 29 exemplarily illustrates a block diagram of a system that includes the SIMO converter.

FIG. 29 illustrates a block diagram of an example system 2900 that includes the SIMO converter 104, in accordance with at least one aspect described in the present disclosure. The system 2900 may include the SIMO converter 104, one or more ripple sensors (or referred to as ripple detectors) 2915*a-e*, a switch controller 2917, and a level shifter 2919.

The system 2900 may include one or LDOs (not illustrated). In some aspects of the present disclosure, the LDOs may correspond to the LDOs 106 described elsewhere in the present disclosure.

In FIG. 29, a single switch controller 2917 is illustrated and discussed for simplicity of illustration and discussion. In some aspects of the present disclosure, the system 2900 may include multiple switch controllers 2917. In some aspects of the present disclosure, the system 2900 may include a single ripple detector 2915 electrically coupled to one or more converter outputs of the SIMO converter 104.

The SIMO converter 104 may correspond to the SIMO converter 104 described elsewhere in the present disclosure. The SIMO converter 104 may include multiple outputs to provide the switching output voltage 108 at different values at the converter output.

The ripple detectors 2915*a-e* may detect a ripple of the switching output voltage on corresponding converter outputs. The ripple detectors 2915*a-e* may determine a ripple value of the ripple of the switching output voltage on the corresponding converter output. For example, the ripple detector 2915*a* may determine the ripple value of the ripple of the switching output voltage 108*a* on the first converter output. The ripple detectors 2915*a-e* may generate a ripple voltage 2817 based on the corresponding ripple value of the ripple of the switching output voltage. For example, the ripple detector 2915*a* may generate the ripple voltage based on the ripple value of the ripple of the switching output voltage 108*a* on the first converter output.

The switch controller 2917 may be configured to control the switches within the SIMO converter 104. The switch controller 2917 may control the switches within the SIMO converter 104 to selectively apply the switching output voltage 108 to the converter outputs.

The switch controller 2917 may generate one or more switch voltages 2911 based on the ripple voltage 2817 and the clock voltage 2103. In some aspects of the present disclosure, when the ripple voltage 2817 is a logical high and the clock voltage 2103 is being received, the switch controller 2917 may generate switch voltages 2911 such that the high-side portion of the SIMO converter 104 turns off and the low-side portion and the corresponding output switch within the SIMO converter 104 turn on.

The level shifter 2919 may receive the switch voltages 2911. The level shifter 2919 may shift a voltage level of one or more of the switch voltages 2911 to levels sufficient to cause corresponding switches within the SIMO converter 104 to transition between the open position and the closed position. The level shifter 2919 may generate gate voltages based on the switch voltages 2911. In some aspects of the present disclosure, the level shifter 2919 may delay the gate voltages 2913 based on corresponding stages of the SIMO converter 104 that are to receive the gate voltages 2913.

The system including the master controller and/or the switch controller may operate such that the voltage ripple of the switching output voltage of one or more of the outputs of the SIMO converter is controlled. In some aspects of the present disclosure, the master controller and/or the switch controller may control the duty cycle of one or more switches in the SIMO converter such that the switches are in the closed position more often than other switches within the SIMO converter. The voltage ripple may be controlled based on voltage ripple requirements of the electrical devices electrically coupled to the corresponding outputs of the SIMO converter.

In some aspects of the present disclosure, the master controller may be electrically coupled to the switching output voltage (e.g., one or more outputs of the SIMO converter). In these and other aspects of the present disclosure, the master controller may determine a voltage level of the switching output voltage on each output of the SIMO converter. In addition, the master controller may provide signals to the switch controller such that the duty cycles of the switches are controlled to reduce or regulate the voltage ripple of the switching output voltage on one or more outputs of the SIMO converter.

In some aspects of the present disclosure, the master controller may not be electrically coupled to the switching output voltage. In these and other aspects of the present disclosure, the master controller may be preprogrammed to provide signals to the switch controller such that the duty cycles of the switches in the SIMO are controlled to automatically reduce or control the voltage ripple of the switching output voltage of one or more outputs of the SIMO.

The switch controller may be configured to control the switches in the SIMO converter to control the switching output voltage. For example, the switch controller may control the duty cycle of the switches in the SIMO converter. In some aspects of the present disclosure, the switch controller may control the switches in the SIMO converter such that the switching output voltage may be applied to a first converter output of the SIMO converter during a first time portion of duty cycles (e.g., inductor cycles). In these and other aspects of the present disclosure, the first time portion of the duty cycles may correspond to the charge portions of the inductor cycles. In addition, the switch controller may control the switches in the SIMO converter such that the inductor within the SIMO converter is charged during the first time portions of the duty cycles. For example, the switch controller may control the switches in the SIMO converter such that the inductor is charged (e.g., energized) and that the switching output voltage is applied to the first output of the SIMO converter during the first time portion of a first duty cycle and the first time portion of a second duty cycle. In some aspects of the present disclosure, the second duty cycle may occur directly subsequent after the first duty cycle.

In some aspects of the present disclosure, the switch controller may control the switches in the SIMO converter to apply the switching output voltage to a second converter output of the SIMO converter during a second time portion of duty cycles. In other aspects of the present disclosure, the second time portion may correspond to the discharge portions of the inductor cycles. In some aspects of the present disclosure, the switch controller may control the switches in the SIMO converter to apply the switching output voltage, during the second time portion, to a converter output of the SIMO converter other than the first converter output. For example, if the switching output voltage is applied to the first converter output during the first time portion of the duty cycles, the switch controller may control the switches in the SIMO converter to apply the switching output voltage to the second converter output, a third converter output, or a fourth converter output of the SIMO during the second time portion of the duty cycles. As another example, if the SIMO converter applies the switching output voltage to the first converter output during the first time portion of the duty cycles, the switch controller may control the switches in the SIMO converter to apply the switching output voltage to the second converter output during the second time portion of the second duty cycle and to apply the switching output voltage to the third converter output during the second time portion of a third duty cycle.

In some aspects of the present disclosure, the ripple of the switching output voltage may be controlled automatically. For automatic control, the ripple detectors may detect the ripple of the switching output voltage on the converter outputs. The ripple detectors may determine the ripple value of the ripple of the switching output on the converter output. In addition, the ripple detectors may generate a ripple voltage based on the ripple value.

The switch controller may receive the ripple voltage. The switch controller may generate switch voltages based on the ripple voltage. The switch controller may control the switches within the SIMO converter based on the voltage level of the switch voltages. The switch voltages may be adjusted to cause the energizing phase of the corresponding inductor cycles to also be adjusted to cause the ripple of the switching output voltage to be reduced. The level shifter may receive the switch voltages. In addition, the level shifter may shift the voltage level of one or more of the switch voltages to levels sufficient to cause corresponding switches within the SIMO converter to transition between the open position and the closed position.

The switch controller automatically controlling the ripple of the switching output voltage may permit the ripple to dynamically be regulated. In addition, the switch controller automatically controlling the ripple of the switching output voltage may cause the ripple of the switching output voltage to be maintained within a boundary by adjusting the energizing phase of the corresponding inductor cycles.

In other aspects of the present disclosure, the switch controller may supervise the ripple of the switching output voltage. The switch controller may reserve one or more time slots that correspond to energizing phases for converter outputs that are higher priority. The switch controller reserving the time slots may reduce the ripple of the switching output voltage on the corresponding converter output.

A sequence and mode selector may select operation modes for the SIMO converter 104. The sequence and mode selector may select the operation modes to prioritize different factors of the SIMO converter 104 or the switching output voltage. For example, the sequence and mode selector may select the operation mode to prioritize efficiency of the SIMO converter 104, transient response of the switching output voltage, or the ripple of the switching output voltage. The sequence and mode selector may prioritize the transient response of the switching output voltage to improve the transient response of the switching output voltage. In addition, the sequence and mode selector may prioritize the ripple of the switching output voltage to reduce the ripple of the switching output voltage.

Power management may include many different aspects, which may be dependent, for example, on the nature of the device to be powered or its various components. One or more of these power management aspects may be more important than others of these power management aspects, depending on the implementation. For example, in a small, portable device (e.g. a battery operated device with a small battery), efficiency may be critical, whereas in a device with a large battery or a reliable power source, ripple reduction may be of greater importance than efficiency. The SIMO buck-boost converter may employ a variety of operational modes, in which an operational mode prioritizes one or more power management factors (e.g. battery management, efficiency, ripple reductions, transient response, etc.). A sequence and mode selector may select operation modes of the SIMO converter to prioritize different factors of the SIMO converter or to provide the switching output voltage to the converter output within a voltage domain or within operating parameters of the coupled electronic device.

Figure 30:
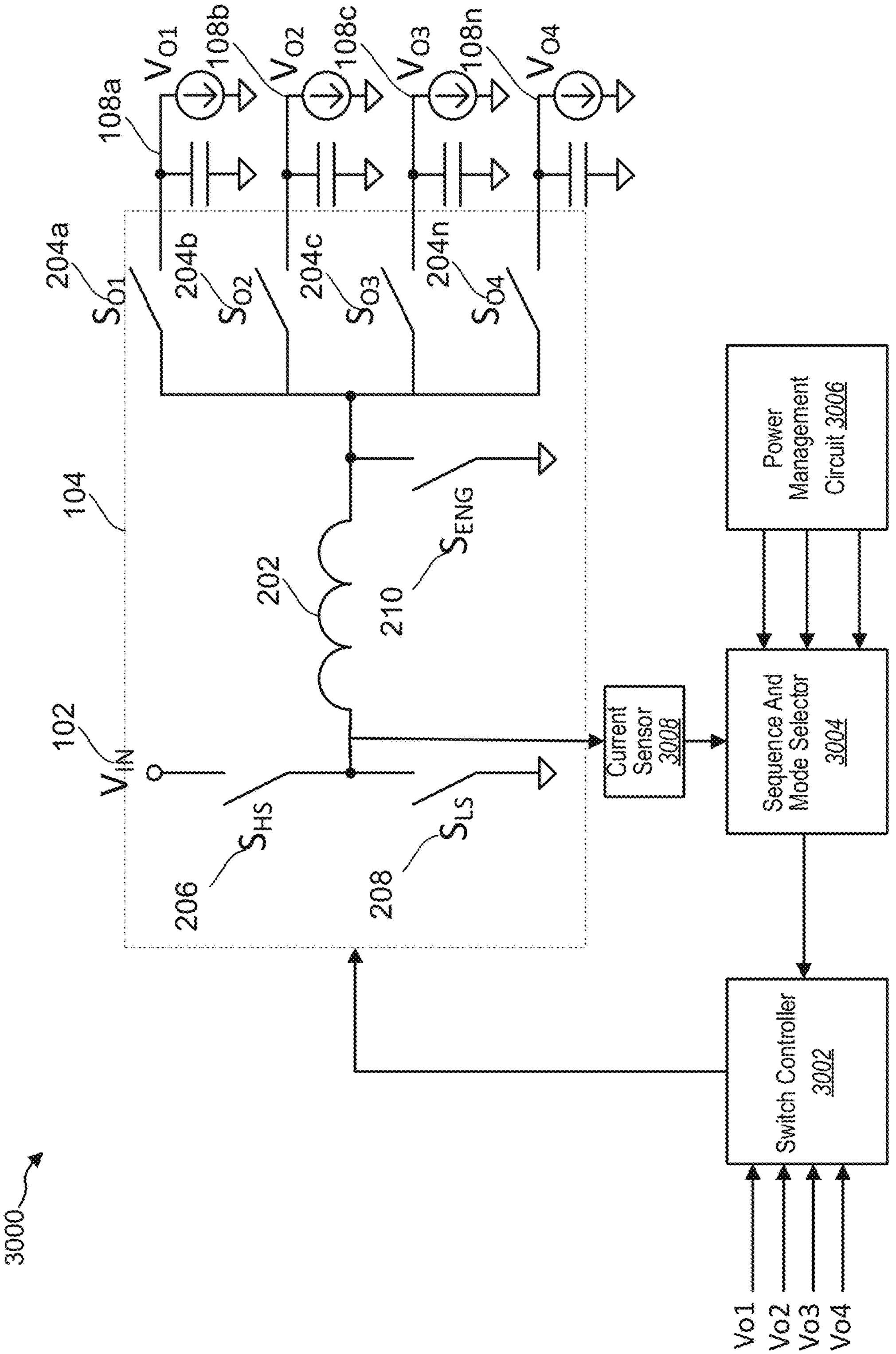
FIG. 30 exemplarily illustrates a block diagram of a system that includes the SIMO converter.

FIG. 30 illustrates a block diagram of an example system 3000 that includes the SIMO converter 104, in accordance with at least one aspect described in the present disclosure. The system 3000 may also include a switch controller 3002, a sequence and mode selector 3004, a current sensor 3008, and a power management (PM) circuit 3006. In FIG. 30 a single switch controller 3002 is illustrated and discussed for simplicity of illustration and discussion. In some aspects of the present disclosure, the system 3000 may include a single switch controller 3002 as illustrated in FIG. 30. In other aspects of the present disclosure, the system 3000 may include two or more switch controllers 3002.

In some aspects of the present disclosure, the SIMO converter 104 may correspond to the SIMO converter 104 described elsewhere in the present disclosure. In some aspects of the present disclosure, the SIMO converter 104 may include multiple outputs to provide a switching output voltage 108*a-n* at different values at two or more of the converter outputs. In some aspects of the present disclosure, the system 3000 may include one or more LDOs (not illustrated). In some aspects of the present disclosure, the LDOs may correspond to the LDOs 106 described elsewhere in the present disclosure.

In some aspects of the present disclosure, the current sensor 3008 may be electrically coupled between the first terminal of the inductor 202 and the sequence and mode selector 3004. In these and other aspects of the present disclosure, the sequence and mode selector 3004 may be communicatively coupled to the PM circuit 3006 and/or the switch controller 3002. In addition, in some aspects of the present disclosure, the switch controller 3002 may be electrically coupled to one or more of the switches 204*a-n*, 206, 208, 210 in the SIMO converter 104. The switch controller 3002 is illustrated in FIG. 30 as being coupled to the dashed rectangle instead of each of the switches 204*a-n*, 206, 208, 210 for simplicity of illustration.

In some aspects of the present disclosure, the PM circuit 3006 may generate a target request. In these and other aspects of the present disclosure, the target request may include power/current division instructions, efficiency requirement instructions, and/or ripple requirement instructions. In addition, in some aspects of the present disclosure, the target request may indicate whether a transient response or a ripple of the switching output voltage on a particular converter output or efficiency of the SIMO converter is to be prioritized. In some aspects of the present disclosure, the PM circuit 3006 may provide the target request to the sequence and mode selector 3004.

The sequence and mode selector 3004 may receive the target request from the PM circuit 3006. In some aspects of the present disclosure, the sequence and mode selector 3004 may select an operation mode of the SIMO converter 104 for one or more converter outputs based on the target request. In these and other aspects of the present disclosure, the sequence and mode selector 3004 may select the operation mode of the SIMO converter 104 for one or all of the converter outputs. For example, the sequence and mode selector 3004 may select the operation mode of the SIMO converter 104 for all of the converter outputs to prioritize the transient response of the switching output voltage. As another example, the sequence and mode selector 3004 may select the operation mode of the SIMO converter 104 for the first converter output to prioritize the ripple of the switching output voltage, and the operation mode of the SIMO converter 104 for the second converter output to prioritize the efficiency of the SIMO converter 104.

In some aspects of the present disclosure, the sequence and mode selector 3004 may instruct the switch controller 3002 to control the switches 204*a-n*, 206, 208, and 210 in accordance with the selected operation mode. In these and other aspects of the present disclosure, the switch controller 3002 may control the switches 204*a-n*, 206, 208, and 210 in accordance with the selected operation mode. In these and other aspects of the present disclosure, the switch controller 3002 may control duty cycles of the switches 204*a-n*, 206, 208, and 210 so as to control the switching output voltage on corresponding converter outputs (e.g., corresponding rails). In some aspects of the present disclosure, the switch controller 3002 may control the switches 204*a-n*, 206, 208, and 210 to cause the SIMO converter 104 to operate in accordance with the selected operation mode.

In some aspects of the present disclosure, the current sensor 3008 may detect the current on the inductor 202. In these and other aspects of the present disclosure, the current sensor 3008 may detect the current on the inductor 202 during an energizing phase, a de-energizing phase, or a discharge time period. In these and other aspects of the present disclosure, the sequence and mode selector 3004 may determine a current value of the current on the inductor 202 based on the detected current. In some aspects of the present disclosure, the current sensor 3008 may determine the current value of the current on the inductor 202 based on the detected current. In addition, in some aspects of the present disclosure, the sequence and mode selector 3004 may select the operation mode of the SIMO converter 104 based on the target request and/or the current value of the current on the inductor (e.g., the inductor current).

Figure 31:
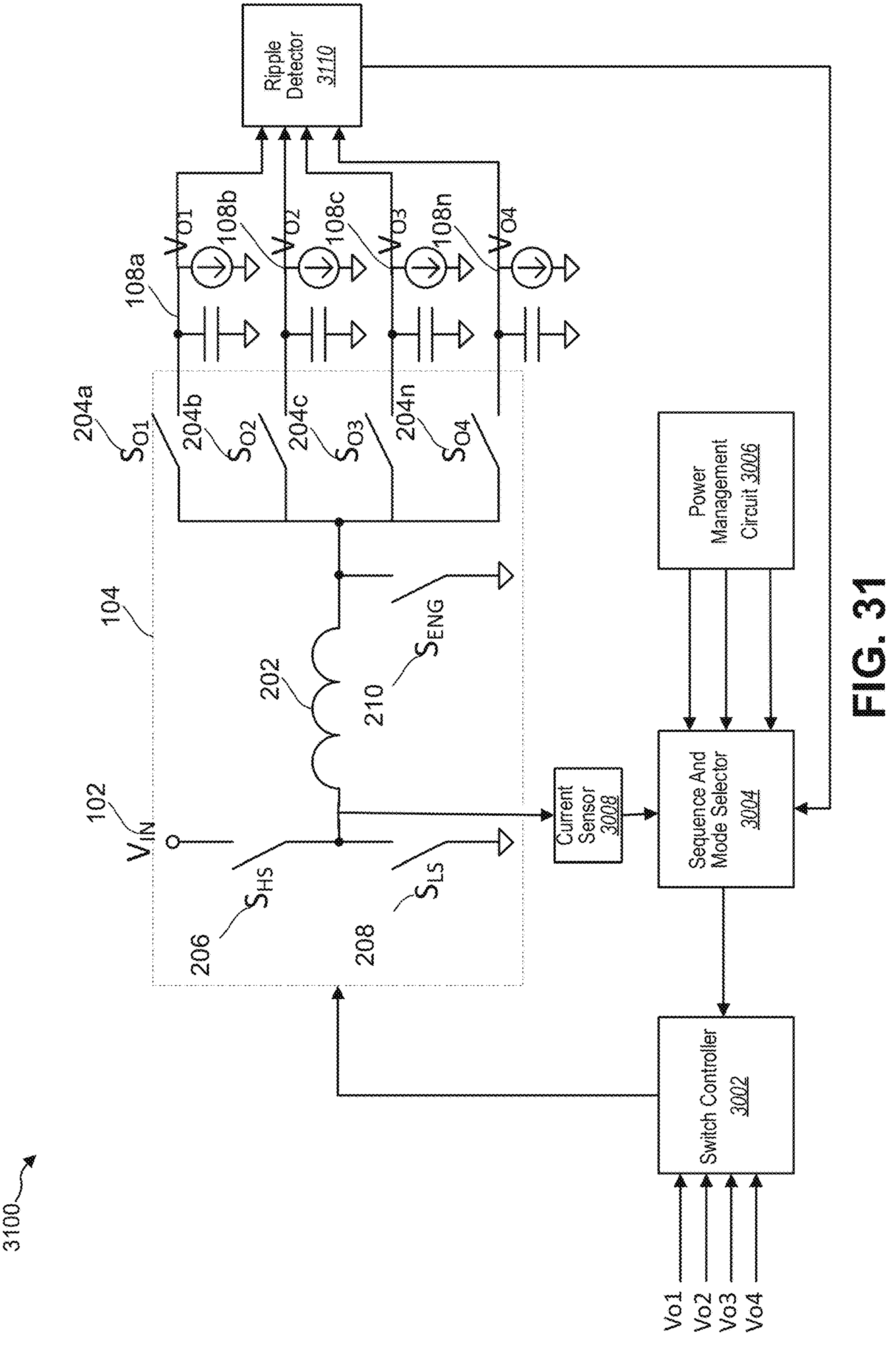
FIG. 31 exemplarily illustrates a block diagram of another system that includes the SIMO converter.

FIG. 31 illustrates a block diagram of another example system 3100 that includes the SIMO converter 104, in accordance with at least one aspect described in the present disclosure. In some aspects of the present disclosure, the system 3100 may also include the switch controller 3002, the sequence and mode selector 3004, the current sensor 3008, and the PM circuit 3006. In addition, the system 3100 may include a ripple detector 3110.

In FIG. 31 a single switch controller 3002 and a single ripple detector 3110 are illustrated and discussed for simplicity of illustration and discussion. In some aspects of the present disclosure, the system 3100 may include a single switch controller 3002 and a single ripple detector 3110 as illustrated in FIG. 31. In other aspects of the present disclosure, the system 3100 may include one or more switch controllers 3002 or one or more ripple detectors 3110.

In some aspects of the present disclosure, the system 3100 may operate similar to the system 3000 described in relation to FIG. 30 with the exception of the inclusion of the ripple detector 3110. In some aspects of the present disclosure, the ripple detector 3110 may be electrically coupled to different converter outputs of the SIMO converter 104.

In some aspects of the present disclosure, the ripple detector 3110 may detect a ripple of the switching output voltage on one or more of the converter outputs. In these and other aspects of the present disclosure, the sequence and mode selector 3004 may determine a ripple value of the ripple of the switching output voltage on the converter output based on the detected voltage ripple. In some aspects of the present disclosure, the ripple detector 3110 may determine the ripple value of the ripple of the switching output voltage based on the detected voltage ripple. In addition, in some aspects of the present disclosure, the sequence and mode selector 3004 may select the operation mode of the SIMO converter 104 based on the target request, the current value of the current on the inductor (e.g., the inductor current), and/or the ripple value of the ripple of the switching output voltage.

Figure 32:
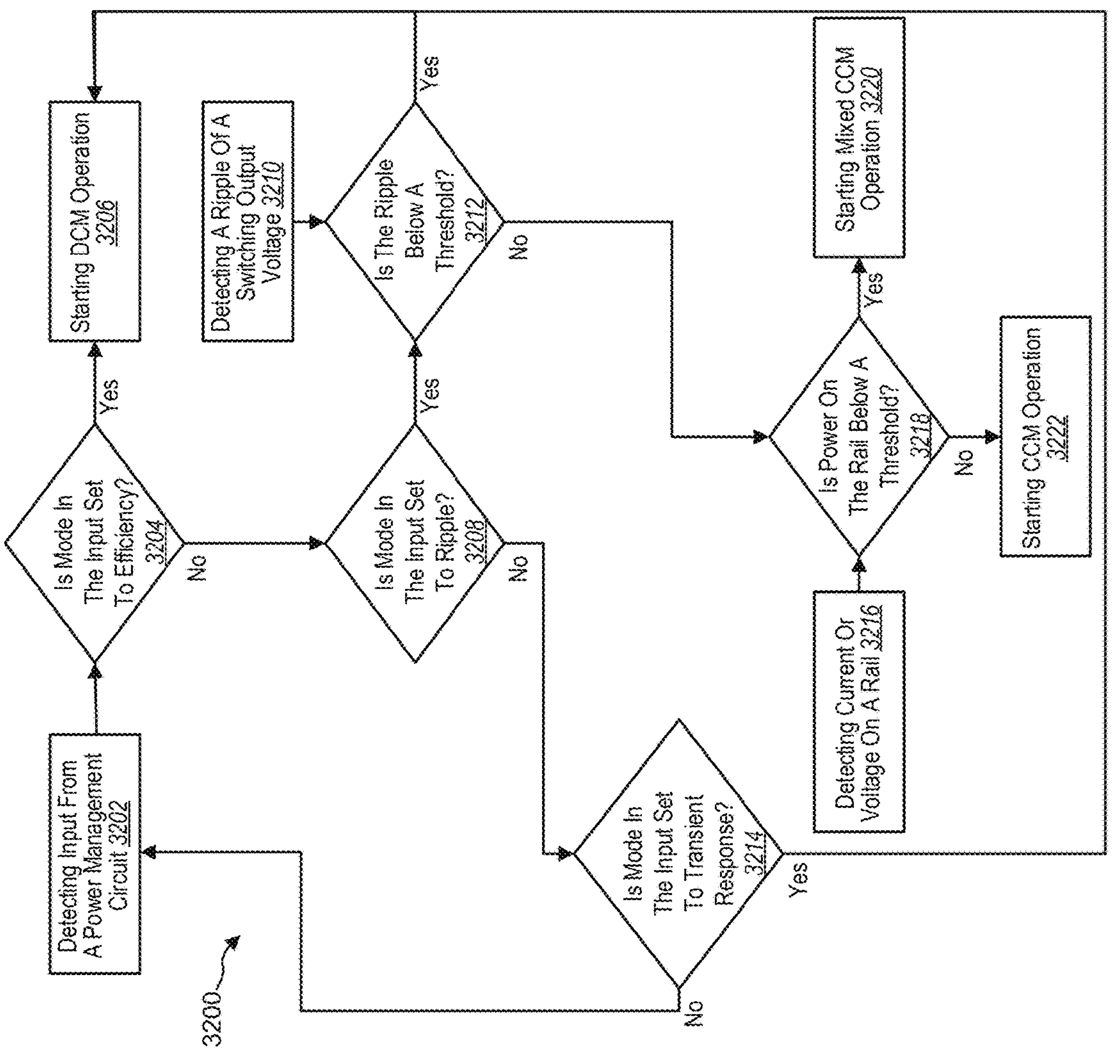
FIG. 32 exemplarily illustrates a flowchart of a method of operating a SIMO converter for sequence and mode selection.

FIG. 32 illustrates a flowchart of an example method 3200 of operating a SIMO converter for sequence and mode selection, in accordance with at least one aspect described in the present disclosure. The method 3200 may include one or more blocks 3202 through 3222. Although illustrated with discrete blocks, the operations associated with one or more of the blocks of the method 3200 may be divided into additional blocks, combined into fewer blocks, or eliminated, depending on the particular implementation.

The method 3200, at block 3202, may include detecting input from a PM circuit. In some aspects of the present disclosure, the sequence and mode selector 3004 may detect the input from the PM circuit 3006. In some aspects of the present disclosure, the input may include a target request. In some aspects of the present disclosure, block 3202 may be followed by block 3204.

The method 3200, at block 3204, may include determining whether the mode in the input is set to efficiency. In some aspects of the present disclosure, the sequence and mode selector 3004 may determine whether the mode in the input is set to efficiency. In some aspects of the present disclosure, the target request may indicate that efficiency of the SIMO converter is to be prioritized on corresponding converter outputs. For example, electronic devices electrically coupled to the corresponding converter output may include particular efficiency settings to properly operate. If the mode in the input is set to efficiency, block 3204 may be followed by block 3206. If the mode in the input is not set to efficiency, block 3204 may be followed by block 3208.

The method 3200, at block 3206, may include starting discontinuous conduction mode (DCM) operation. In some aspects of the present disclosure, the sequence and mode selector 3004 may instruct the switch controller to control the switches 204*a-n*, 206, 208, and/or 210 within the SIMO converter 104 in accordance with DCM operation. In some aspects of the present disclosure, DCM operation of the SIMO converter for one or more converter outputs may include charging the inductor and discharging the inductor via the corresponding converter output using disjunct inductor cycles as described elsewhere in the present disclosure.

The method 3200, at block 3208, may include determining whether the mode in the input is set to ripple. In some aspects of the present disclosure, the sequence and mode selector 3004 may determine whether the mode in the input is set to ripple. In some aspects of the present disclosure, the target request may indicate that management of the ripple of the switching output voltage on corresponding converter outputs (e.g., corresponding SIMO converter rails) is to be prioritized. If the mode in the input is set to ripple, block 3208 may be followed by block 3212. If the mode in the input is not set to ripple, block 3208 may be followed by block 3214.

The method 3200, at block 3210, may include detecting a ripple of the switching output voltage. In some aspects of the present disclosure, the ripple detector 3110 may detect the ripple of the switching output voltage. In some aspects of the present disclosure, the ripple of the switching output voltage may be detected at corresponding converter outputs.

The method 3200, at block 3212, may include determining whether the ripple is below a threshold. In some aspects of the present disclosure, the sequence and mode selector 3004 may determine whether the ripple is below the threshold. In some aspects of the present disclosure, the threshold of the ripple of the switching output voltage may include ~5-10 mV, ~5-15 mV, ~5-20 mV, or ~5-25 mV, depending upon the voltage domain and its noise requirements. In these and other aspects of the present disclosure, the method 3200 may include setting the threshold of the ripple of the switching output voltage to a pre-defined value. In other aspects of the present disclosure, the method 3200 may include statically or dynamically setting the threshold of the ripple of the switching output voltage. If the ripple of the switching output voltage is below the threshold, block 3212 may be followed by block 3206. If the ripple of the switching output voltage is equal to or above the threshold, block 3212 may be followed by block 3218.

The method 3200, at block 3214, may include determining whether the mode in the input is set to transient response. In some aspects of the present disclosure, the sequence and mode selector 3004 may determine whether the mode in the input is set to transient response. In some aspects of the present disclosure, the target request may indicate that management of the transient response of the switching output voltage on corresponding converter outputs (e.g., corresponding SIMO converter rails) is to be prioritized. If the mode in the input is set to transient response, block 3214 may be followed by block 3206. If the mode in the input is not set to transient response, block 3214 may be followed by block 3202.

The method 3200, at block 3216, may include detecting current or voltage on a rail. In some aspects of the present disclosure, the sequence and mode selector 3004 and/or the current sensor 3008 may detect the current or voltage on the inductor. In some aspects of the present disclosure, the current or the voltage may be detected on one or more converter outputs.

The method 3200, at block 3218, may include determining whether the power on the rail is below a threshold. In some aspects of the present disclosure, the sequence and mode selector 3004 may determine whether the power on the rail is below the threshold. In some aspects of the present disclosure, the power on the rails may be determined as a product of the detected currents and voltages on the rails. In these and other aspects of the present disclosure, the power levels could be <10% of the ICC MAX, assuming that the rail current is delivered in DCM. The power level may be understood as a percentage of the maximum current supported by the rail. Alternatively, the power level can be written as a percent of the inductor current rating.

In these and other aspects of the present disclosure, the method 3200 may include setting the threshold of the power on the rails to pre-defined values. In other aspects of the present disclosure, the method 3200 may include dynamically or statically setting the threshold of the power on the rails. If the power on the rails is below the threshold, block 3218 may be followed by block 3220. If the power on the rails is equal to or above the threshold, block 3218 may be followed by block 3222.

The method 3200, at block 3220, may include starting mixed continuous conduction mode (CCM). In some aspects of the present disclosure, the sequence and mode selector 3004 may instruct the switch controller to control the switches 204*a-n*, 206, 208, and/or 210 within the SIMO converter 104 in accordance with mixed CCM operation. In some aspects of the present disclosure, mixed CCM operation of the SIMO converter may include charging the inductor and discharging the inductor via the corresponding converter outputs using both disjunct and continuous inductor cycles as described elsewhere in the present disclosure.

The method 3200, at block 3222, may include starting CCM operation. In some aspects of the present disclosure, the sequence and mode selector 3004 may instruct the switch controller to control the switches 204*a-n*, 206, 208, and/or 210 within the SIMO converter 104 in accordance with CCM operation. In some aspects of the present disclosure, CCM operation of the SIMO converter may include charging the inductor and discharging the inductor via corresponding converter outputs using continuous inductor cycles as described elsewhere in the present disclosure.

In some aspects of the present disclosure, the method 3200 may be performed while maintaining a current operation mode of the SIMO converter for corresponding converter outputs. For example, the method 3200 may be performed when the SIMO converter for corresponding converter outputs is already operating in DCM, mixed CCM, or CCM. In these and other aspects of the present disclosure, the method 3200, block 3206; block 3220; or block 3222, when the SIMO converter is already operating according to a current operation mode for one or more converter outputs, may include maintaining the current operation mode for the corresponding converter outputs.

Modifications, additions, or omissions may be made to the method 3200 without departing from the scope of the present disclosure. For example, the operations of method 3200 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 33:
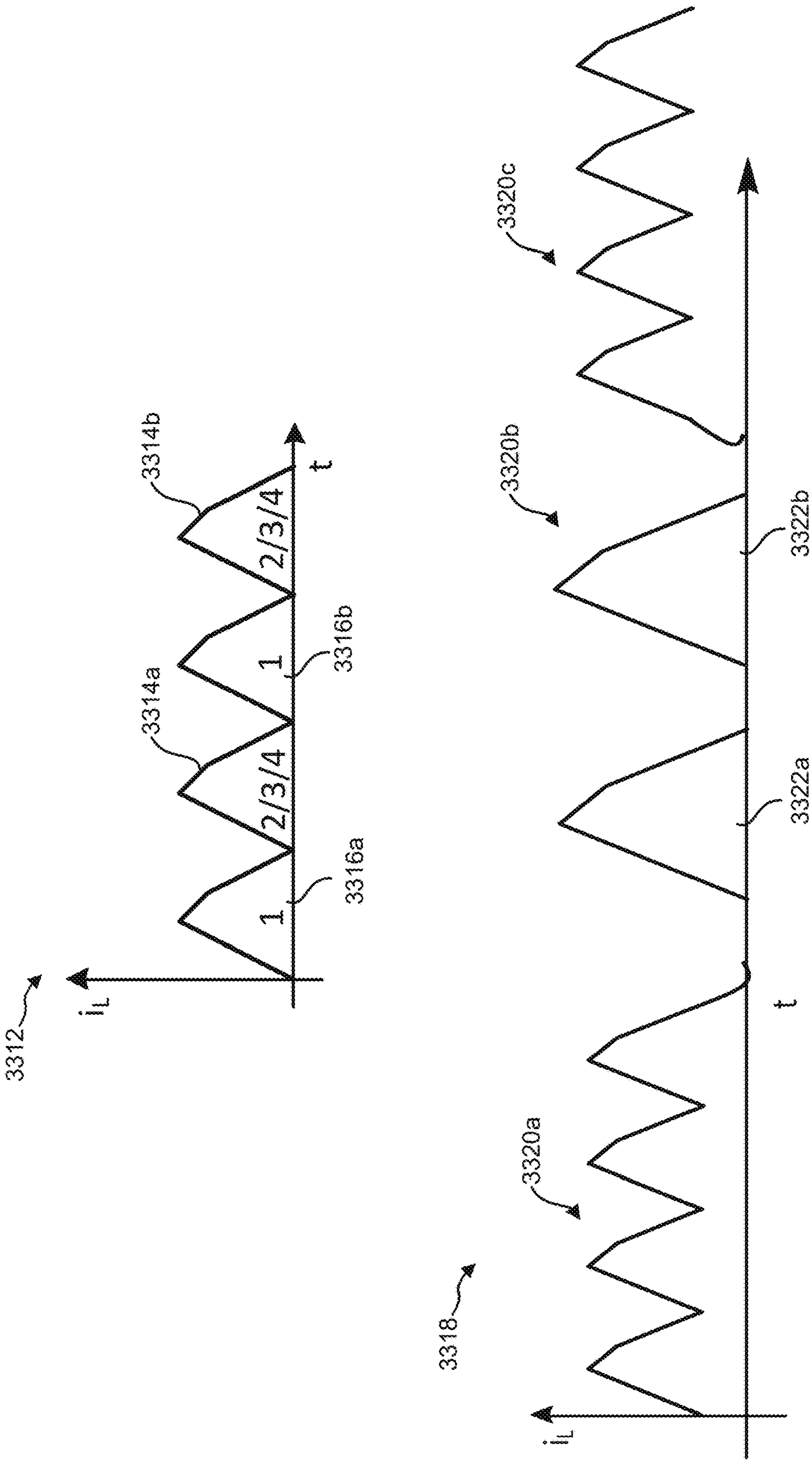
FIG. 33 illustrates graphical representations of simulations in which the SIMO converter operates in mixed CCM or mixed DCM and CCM during inductor cycles.

FIG. 33 illustrates graphical representations 3312 and 3318 of simulations in which the SIMO converter operates in mixed CCM or mixed DCM and CCM during inductor cycles, in accordance with at least one aspect described in the present disclosure. In FIG. 33, graphical representation 3312 may represent the simulation in which the SIMO converter operates in mixed CCM for multiple converter outputs of the SIMO converter. In addition, graphical representation 3318 may represent the simulation in which the SIMO converter operates in mixed DCM and CCM for multiple converter outputs of the SIMO converter.

With regards to graphical representation 3312, waveforms 3314*a,b* and 3316*a,b* represent current on the inductor during the inductor cycles. The waveforms 3314*a,b* and 3316*a,b* illustrate how the current on the inductor changes over time during the inductor cycles. As illustrated in FIG. 33, waveforms 3316*a,b* represent inductor cycles in which the inductor is electrically coupled to a single electrical device (e.g., device 1) during the corresponding inductor cycles. In addition, as illustrated in FIG. 33, waveforms 3314*a,b* represent inductor cycles in which the inductor is electrically coupled to multiple electrical devices (e.g., device 2, device 3, and device 4) during the corresponding inductor cycles. In some aspects of the present disclosure, the SIMO converter may operate in the mixed CCM for the converter output when the power on one or more rails (e.g., converter outputs) is below the threshold as described above in relation to FIG. 32.

With regards to graphical representation 3318, waveforms 3320*a-c* represent current on the inductor during the inductor cycles according to CCM and DCM. The waveforms 3320*a-c* illustrate how the current on the inductor changes over time during the inductor cycles. As illustrated in FIG. 33, waveforms 3320*a,c* represent inductor cycles in which the inductor is charged and discharged via the corresponding converter outputs according to CCM. In addition, as illustrated in FIG. 33, waveform 3320*b* includes inductor cycles 3322*a,b*, which represent inductor cycles in which the inductor is charged and discharged via the corresponding converter outputs according to DCM.

In some aspects of the present disclosure, the SIMO converter may transition between CCM and DCM operation for the corresponding converter outputs based on the transmit request. In these and other aspects of the present disclosure, the SIMO converter may transition between mixed CCM, DCM, and mixed DCM and CCM for the corresponding converter outputs. For example, the SIMO converter, for a period of time, may charge the inductor and discharge the inductor via the corresponding converter outputs as illustrated in graphical representation 3312. As another example, the SIMO converter, for a first period of time may charge the inductor and discharge the inductor via the corresponding converter outputs as illustrated in graphical representation 3312 and for a second period of time may charge the inductor and discharge the inductor via the corresponding converter outputs as illustrated in graphical representation 3318.

Figure 34:
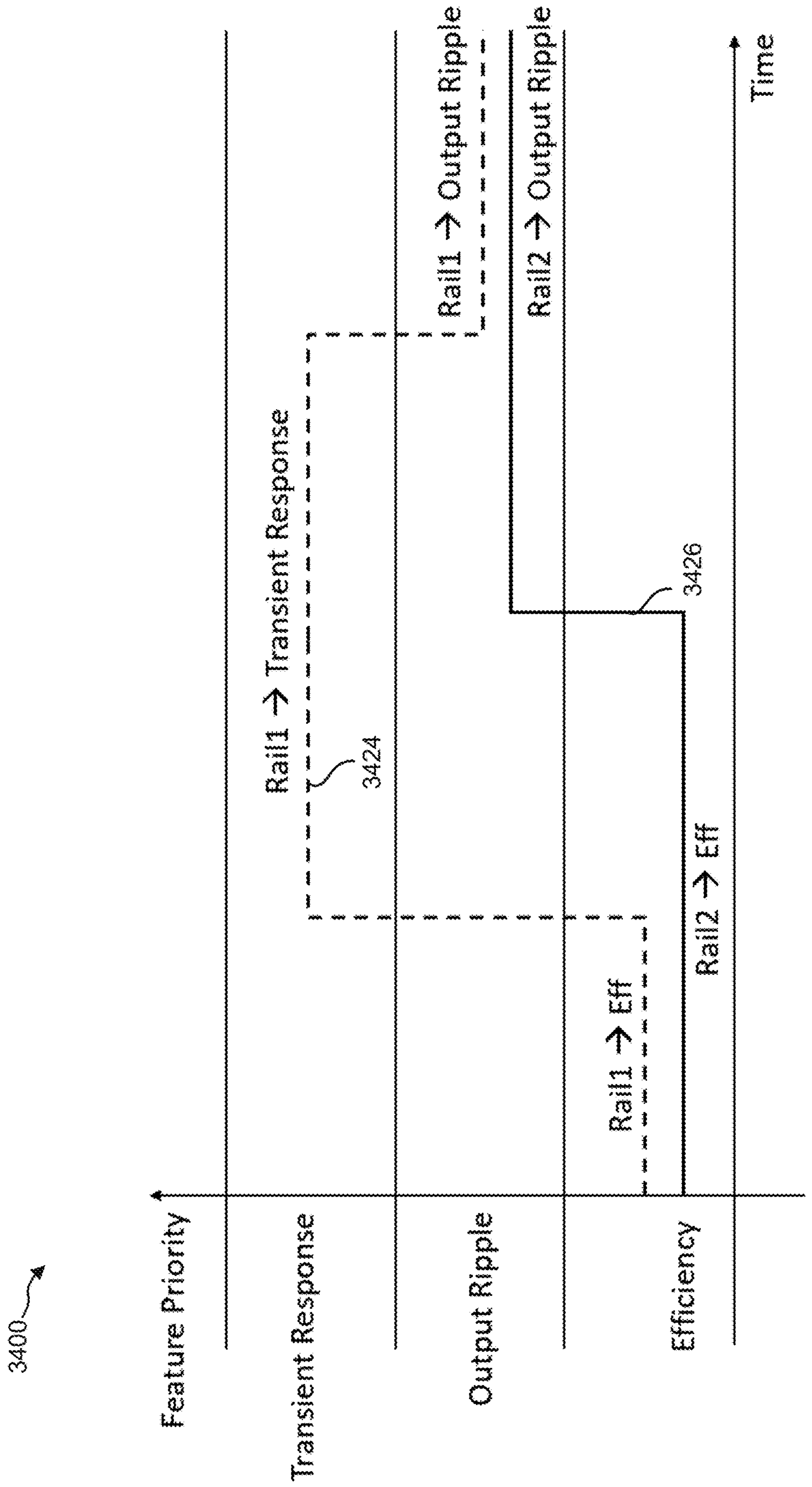
FIG. 34 illustrates a graphical representation of changes in prioritization of different power rails within the SIMO converter.

FIG. 34 illustrates a graphical representation 3400 of changes in prioritization of different power rails within the SIMO converter, in accordance with at least one aspect described in the present disclosure. In FIG. 34, waveform 3424 represents a sequence of prioritizations of a first rail (e.g., Rail1) of the SIMO converter and waveform 3426 represents a sequence of prioritizations of a second rail (e.g., Rail2) of the SIMO converter versus time.

Initially, the sequence and mode selector 3004 may set the operation mode of the SIMO converter for both the first rail and the second rail to prioritize the efficiency of the SIMO converter (illustrated in FIG. 34 as Rail1→Eff and Rail2→Eff). After a first period of time, the sequence and mode selector 3004 may set the operation mode of the SIMO converter for the first rail to prioritize the transient response of the switching output voltage on the corresponding rail (illustrated in FIG. 34 as Rail1→Transient Response). After a second period of time, the sequence and mode selector 3004 may set the operation mode of the SIMO converter for the second rail to prioritize management of the output ripple of the switching output voltage on the corresponding rail (illustrated in FIG. 34 as Rail2→Output Ripple). After a third period of time, the sequence and mode selector 3004 may set the operation mode of the SIMO converter for the first rail to prioritize management of the output ripple of the switching output voltage on the corresponding rail (illustrated in FIG. 34 as Rail1→Output Ripple).

Figure 35:
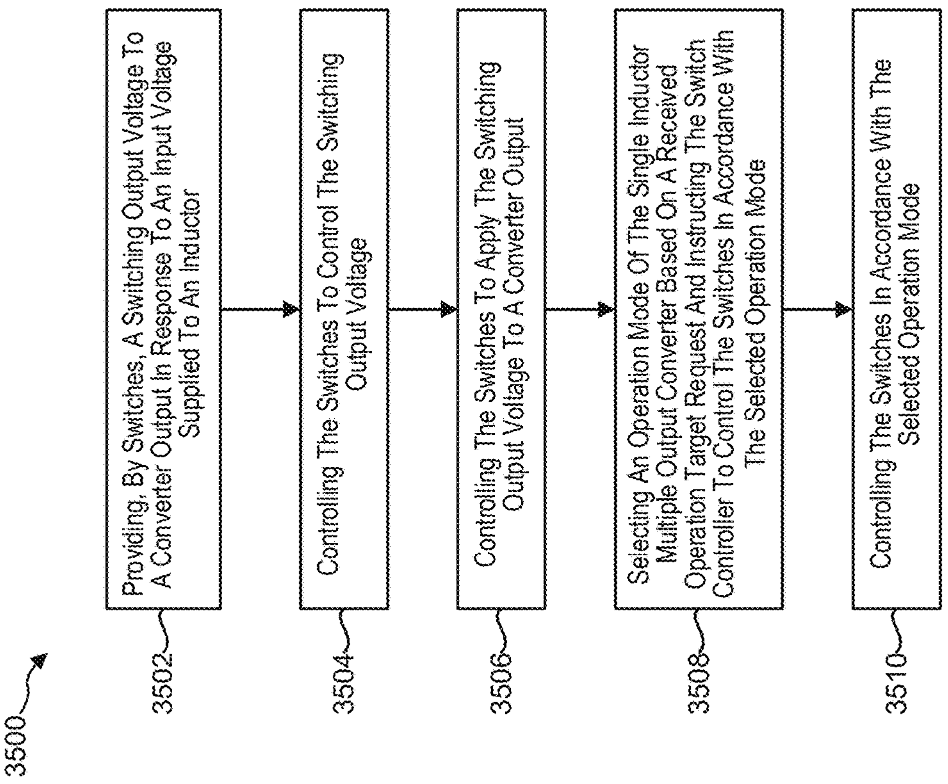
FIG. 35 exemplarily illustrates a flowchart of a method of operating a SIMO converter.

FIG. 35 exemplarily illustrates a flowchart of a method 3500 of operating a SIMO converter, in accordance with at least one aspect described in the present disclosure. The method 3500 may include providing, by switches, a switching output voltage to a converter output in response to an input voltage supplied to an inductor 3502; controlling the switches to control the switching output voltage 3504; controlling the switches to apply the switching output voltage to a converter output 3506; selecting an operation mode of the SIMO converter based on a received operation target request and instructing the switch controller to control the switches in accordance with the selected operation mode 3508; and controlling the switches in accordance with the selected operation mode 3510.

In some aspects of the present disclosure, the SIMO converter for the converter outputs may operate in accordance with one or more operation modes. In these and other aspects of the present disclosure, the SIMO converter may prioritize different aspects of operation of the SIMO converter in accordance with the selected operation modes. In some aspects of the present disclosure, the SIMO converter may prioritize transient response or ripple (e.g., output ripple) of the switching output voltage on corresponding converter outputs or the efficiency of the SIMO converter.

In some aspects of the present disclosure, the SIMO converter may include the PM circuit and an operation mode selector (also referred to in the present disclosure as a sequence and mode selector). The PM circuit may be communicatively coupled to the operation mode selector. In these and other aspects of the present disclosure, the PM circuit may generate an operation target request (also referred to in the present disclosure as a target request). In addition, in some aspects of the present disclosure, the PM circuit may provide the operation target request to the operation mode selector.

In some aspects of the present disclosure, the operation target request may include a request to select an operation mode of the SIMO converter for one or more converter outputs that provides a ripple of the switching output voltage of less than 5-10 mV, less than 5-15 mV, less than 5-20 mV, or less than 5-25 mV. The voltage range depends at least upon whether the domain is digital or analog. Depending on the workload, there could be varying thresholds that are dynamic in nature. In addition, in some aspects of the present disclosure, the operation target request may include a request to select an operation mode of the SIMO converter for one or more converter outputs that provides an energy efficiency of at least 80-90%. This may depend upon a plurality of factors; however, regardless of the threshold, the percentage could vary as a function of the workload and system needs decided by the power management unit. Further, in some aspects of the present disclosure, the operation target request may include a request to select an operation mode of the SIMO converter for one or more converter outputs that provides a power to current ratio corresponding to a range of 10-20% of the maximum current (beneath this range results in DCM and above this range results in CCM). The percentage can be dynamically changed to force a desired state (DCM or CCM) as needed. In some aspects of the present disclosure, the operation target request may include a request to select an operation mode of the SIMO converter for one or more converter outputs that provides a cross regulation of the switching output voltage of less than 1% of the Vccnom (e.g. nominal Vcc) of the rail. Each rail generally has a DC tolerance of +/−1%, and therefore the cross regulation may be significantly smaller than this; however, 1% of the Vccnom is generally the upper threshold. The lower the voltage, the tighter the DC tolerance will generally be.

In some aspects of the present disclosure, the operation mode selector may receive the operation target request. In these and other aspects of the present disclosure, the operation mode selector may select an operation mode of the SIMO converter for one or more converter outputs from multiple operation modes. In these and other aspects of the present disclosure, the operation mode selector may select the operation mode of the SIMO converter for the converter outputs based on the received operation target request.

In some aspects of the present disclosure, the operation modes may include a CCM, a DCM, or an operation mode that provides different scheduling schemes. In some aspects of the present disclosure, the different scheduling schemes may include a scheduling scheme in the order of selecting the converter outputs. In addition, in some aspects of the present disclosure, the operation modes may include mixed CCM or mixed CCM and DCM. For example, the operation mode of the SIMO for one or more converter outputs may include CCM and the operation mode of the SIMO for one or more other converter outputs may include DCM. Further, in some aspects of the present disclosure, the operation modes may include an operation mode configured to minimize cross regulation between different converter outputs.

In some aspects of the present disclosure, the SIMO converter may include a current sensor and/or a ripple detector. In these and other aspects of the present disclosure, the current sensor may detect current on the inductor (e.g., detect an inductor current). In addition, in some aspects of the present disclosure, the ripple detector may detect the ripple of the switching output voltage on one or more converter outputs.

In some aspects of the present disclosure, the operation mode selector may determine a current value of the current on the inductor. In these and other aspects of the present disclosure, the operation mode selector may determine the operation mode based on the operation target request, the current on the inductor, or the current value of the current on the inductor.

In some aspects of the present disclosure, the operation mode selector may determine a power-to-current ratio. In these and other aspects of the present disclosure, the operation mode selector may determine power consumption of the inductor by determining a product of the current on the inductor and the switching output voltage (e.g., power is equal to the current on the inductor times the switching output voltage). In addition, in some aspects of the present disclosure, the operation mode selector may compare the power to the current on the inductor to determine the ratio.

In some aspects of the present disclosure, the operation selector may generate a command signal indicative of the selected operation mode of the SIMO converter for the converter outputs. In these and other aspects of the present disclosure, the operation selector may provide the command signal to the switch controller.

In some aspects of the present disclosure, the switch controller may control the switches of the SIMO converter in accordance with the selected operation mode. In these and other aspects of the present disclosure, the switch controller may control the duty cycles of the switches to control one or more operational aspects of the SIMO converter. For example, the switch controller may control the switches to control the ripple of the switching output voltage on one or more converter outputs during one or more inductor cycles. As another example, the switch controller may control the switches to cause the SIMO converter to operate according to CCM for one or more converter outputs and according to DCM for one or more other converter outputs.

In some aspects of the present disclosure, the switch controller may control the switches to minimize cross regulation of the switching output voltage on two or more of the converter outputs. In these and other aspects of the present disclosure, the switch controller may control the switches to enable efficient operation of the SIMO converter for one or more converter outputs.

In some aspects of the present disclosure, the operation target request may include multiple digital signals provided by the PM circuit using multiple rails. One or more of the digital signals may include a logical high (e.g., equal to 1), which may indicate that a particular prioritization is to be selected by the operation mode selector.

A voltage converter system may include the SIMO converter 104 and digital circuitry. The digital circuitry may determine timing parameters for duty cycles of the switches within the SIMO converter 104. The digital circuitry may determine the timing parameters such that each duty cycle includes an energizing phase and a de-energizing phase related to the inductor 202 within the SIMO converter 104.

According to an aspect of the disclosure, the SIMO buck-boost converter may employ digital circuitry to control its switches. This digital circuitry may utilize any of a plurality of strategies (e.g. timings, feedback loops, etc.) to control the switches to maintain an output voltage within a voltage domain of the electronic device coupled to the converter output.

Figure 36:
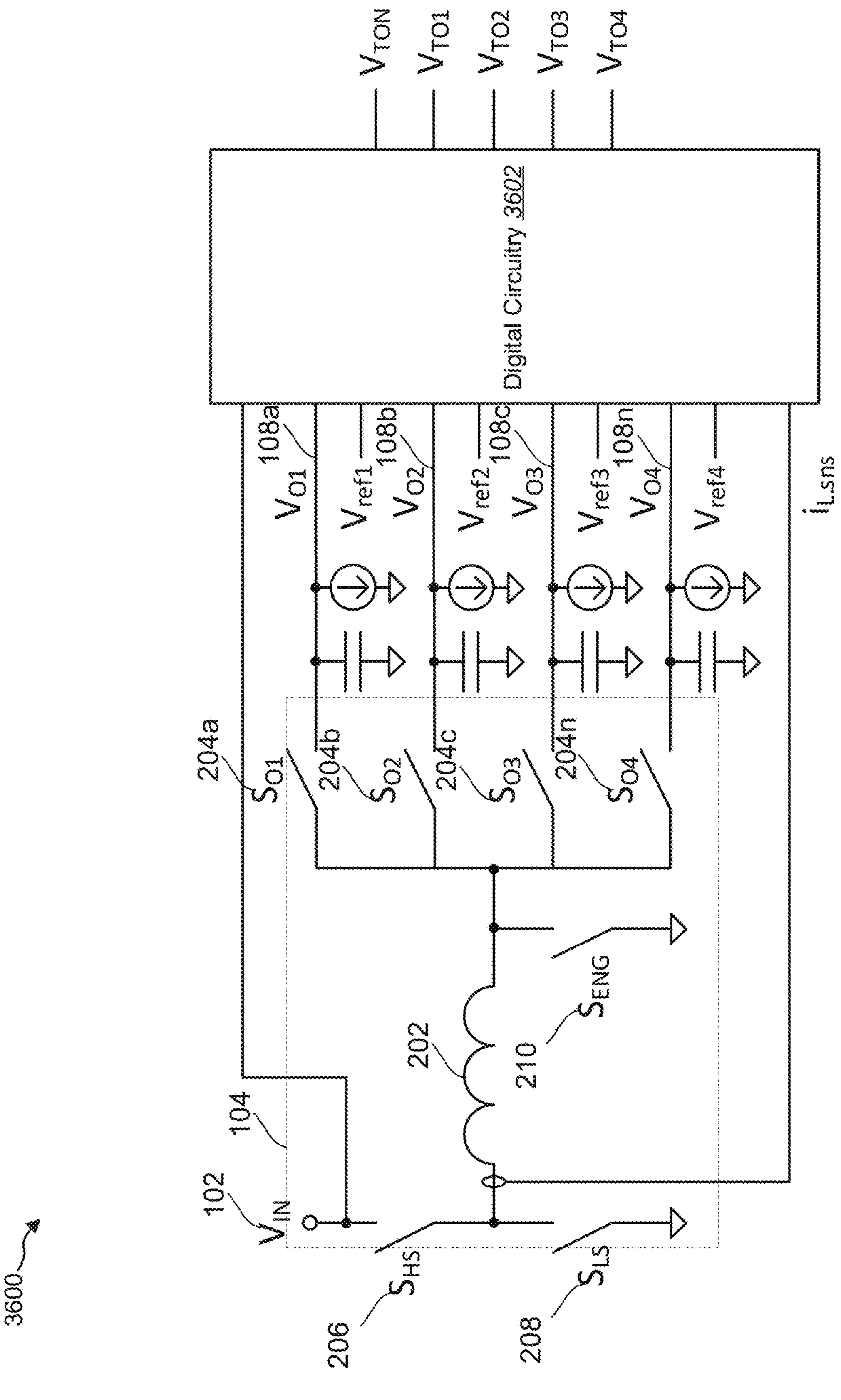
FIG. 36 exemplarily illustrates a block diagram of a system that includes the SIMO converter.

FIG. 36 illustrates a block diagram of an example system 3600 that includes the SIMO converter 104, in accordance with at least one aspect described in the present disclosure. The system 3600 may also include digital circuitry 3602. In FIG. 36 a single block representing the digital circuitry 3602 is illustrated and discussed for simplicity of illustration and discussion.

In some aspects of the present disclosure, the SIMO converter 104 may correspond to the SIMO converter 104 described elsewhere in the present disclosure. In some aspects of the present disclosure, the SIMO converter 104 may include multiple outputs to provide a switching output voltage 108*a-n* at different values at two or more of the converter outputs. In some aspects of the present disclosure, the system 3600 may include one or more LDOs (not illustrated). In some aspects of the present disclosure, the LDOs may correspond to the LDOs 106 described elsewhere in the present disclosure.

In some aspects of the present disclosure, the digital circuitry 3602 may include one or more analog to digital converters (ADCs), a digital processor, or any other appropriate circuitry. In these and other aspects of the present disclosure, the digital circuitry 3602 may be electrically coupled to one or more of the converter outputs. The digital circuitry 3602 may receive the switching output voltage via the converter outputs. For example, one or more ADCs within the digital circuitry 3602 may receive the switching output voltage via the converter outputs.

In some aspects of the present disclosure, the digital circuitry 3602 may convert the switching output voltage into one or more digital switching output voltage values. In these and other aspects of the present disclosure, the one or more digital switching output voltage values may be digital signals representative of the switching output voltage.

In some aspects of the present disclosure, the digital circuitry 3602 (e.g., the digital processor) may receive the switching output voltage via one or more of the converter outputs. In addition, in some aspects of the present disclosure, the digital circuitry 3602 may receive one or more reference voltages (illustrated in FIG. 36 as $V_{ref1}$, $V_{ref2}$, $V_{ref2}$, $V_{ref4}$). In these and other aspects of the present disclosure, the digital circuitry 3602 may receive a reference voltage (e.g., an associated target output voltage) for each converter output of the SIMO converter 104.

In some aspects of the present disclosure, the digital circuitry 3602 may determine one or more timing parameters for the SIMO converter 104. In these and other aspects of the present disclosure, the digital circuitry 3602 may determine the timing parameters related to duty cycles of the SIMO converter 104. In these and other aspects of the present disclosure, the digital circuitry 3602 may determine the timing parameters for the SIMO converter 104 based on the switching output voltage or the reference voltages. For example, the digital circuitry 3602 may determine the timing parameters for the SIMO converter 104 based on a difference between the switching output voltage and one or more of the reference voltages.

In some aspects of the present disclosure, the digital circuitry 3602 may determine the timing parameters related to the energizing phase of one or more inductor cycles of the SIMO converter 104. In these and other aspects of the present disclosure, the digital circuitry 3602 may determine the timing parameter related to the de-energizing phase of one or more inductor cycles of the SIMO converter 104.

In some aspects of the present disclosure, the digital circuitry 3602 may select a computer program to implement one or more software algorithms. In these and other aspects of the present disclosure, the digital circuitry 3602 may use the computer program implementing the software algorithms to determine the timing parameters. In these and other aspects of the present disclosure, the digital circuitry 3602 may select the computer program out of multiple computer programs.

In some aspects of the present disclosure, the digital circuitry 3602 may control the switches 204*a-n*, 206, 208, 210 in accordance with the determined timing parameters. In these and other aspects of the present disclosure, the digital circuitry 3602 may control the duty cycles of the switches 204*a-n*, 206, 208, 210 in accordance with the determined timing parameters. In some aspects of the present disclosure, the digital circuitry 3602 may generate one or more duty signals (illustrated in FIG. 36 as $V_{TON}$, $V_{TO1}$, $V_{TO2}$, $V_{TO3}$, and $V_{TO4}$). In some aspects of the present disclosure the duty signal $V_{TON}$ may control the duty cycles of the switches for charging the inductor 202. In these and other aspects of the present disclosure, the duty signals $V_{TO1}$, $V_{TO2}$, $V_{TO3}$, and $V_{TO4}$ may control the duty cycles of the switches 204*a-n*, respectively.

Figure 37:
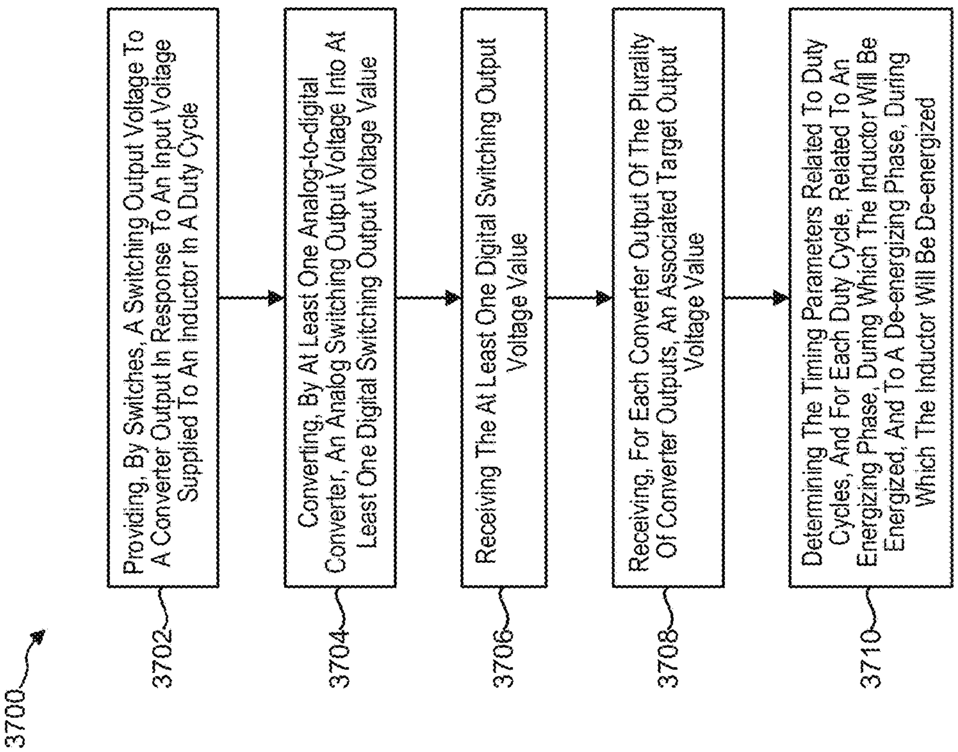
FIG. 37 exemplarily illustrates a flowchart of a method of operating a SIMO converter.

FIG. 37 exemplarily illustrates a flowchart of a method 3700 of operating a SIMO converter, in accordance with at least one aspect described in the present disclosure. The method 3700 may include providing, by switches, a switching output voltage to a converter output in response to an input voltage supplied to an inductor in a duty cycle 3702; converting, by at least one analog-to-digital converter, an analog switching output voltage into at least one digital switching output voltage value 3704; receiving the at least one digital switching output voltage value 3706; receiving, for each converter output of the plurality of converter outputs, an associated target output voltage value 3708; and determining the timing parameters related to duty cycles, and for each duty cycle, related to an energizing phase, during which the inductor will be energized, and related to a de-energizing phase, during which the inductor will be de-energized 3710.

Figure 38:
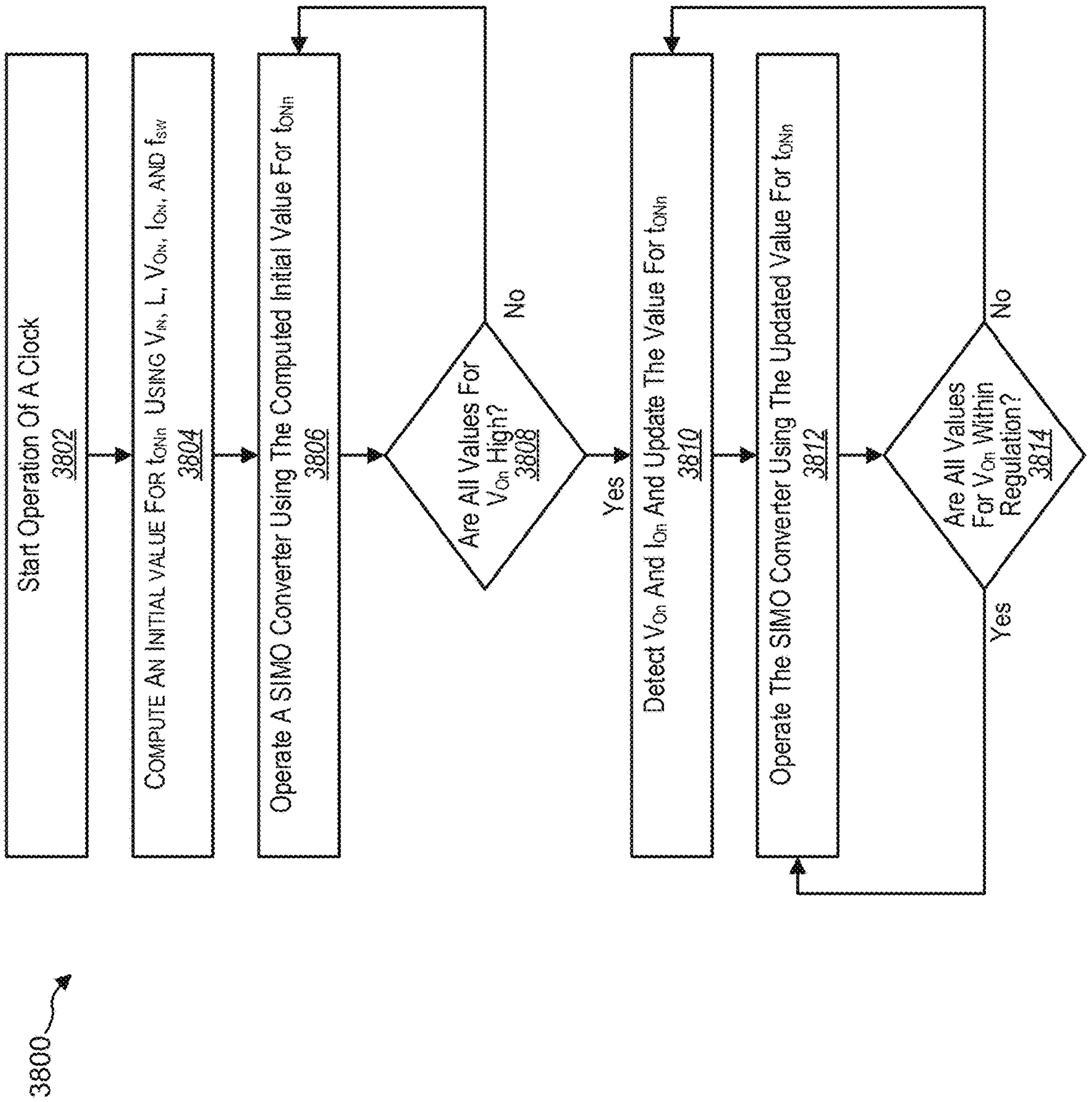
FIG. 38 exemplarily illustrates a flowchart of a method of operating a SIMO converter.

FIG. 38 exemplarily illustrates a flowchart 3800 of a method of operating a SIMO converter, in accordance with at least one aspect described in the present disclosure. The method 3800 may include one or more blocks 3802 through 3814. Although illustrated with discrete blocks, the operations associated with one or more of the blocks of the method 3800 may be divided into additional blocks, combined into fewer blocks, or eliminated, depending on the particular implementation.

The method 3800, at block 3802, may include starting operation of a clock. In some aspects of the present disclosure, the clock may include a clock signal for operating the SIMO converter, the digital circuitry, a switch controller, or some combination thereof. Block 3802 may be followed by block 3804.

The method 3800, at block 3804, may include computing an initial value for $t_{ONn}$ using $V_{in}$, L, $V_{On}$, $I_{On}$, and $f_{SW}$. The meaning of these parameters will be described below in connection with equation (1). In some aspects of the present disclosure, the digital circuitry may determine the initial value for $t_{ONn}$ using $V_{in}$, L, $V_{On}$, $I_{On}$, and $f_{SW}$. The initial value for $t_{ONn}$ may represent an amount of time a corresponding output switch is to be in the closed position during corresponding inductor cycles (e.g., an amount of time the discharge portion of the corresponding inductor cycles is to occur). The digital circuitry may determine the value for $t_{ONn}$ for one or more output switch. In some aspects of the present disclosure, the digital circuitry may compute the initial value for $t_{ONn}$ as defined in equation (1) or equation (2) below.

In some aspects of the present disclosure, the digital circuitry may include pre-defined values for $V_{IN}$, L, $f_{SW}$, $V_{On}$, or some combination thereof. In these and other aspects of the present disclosure, the digital circuitry may determine $V_{IN}$, L, $f_{SW}$, $V_{On}$, $I_{On}$, or some combination using voltage sensors, current sensors, or any other appropriate technique. Block 3804 may be followed by block 3806.

The method 3800, at block 3806, may include operating the SIMO converter using the computed initial value for $t_{Onn}$. In some aspects of the present disclosure, the digital circuitry may cause the switch controller to control the switches within the SIMO converter. The digital circuitry may cause the switch controller to control the switches such that the discharge portion of the corresponding inductor cycles are based on the computed initial value for $t_{Onn}$. Block 3806 may be followed by block 3808.

The method 3800, at block 3808, may include determining whether all values for $V_{On}$ are high. In some aspects of the present disclosure, the digital circuitry may determine whether all the values for $V_{On}$ (e.g., the value of the switching output voltage on the converter outputs) are high. The digital circuitry may determine that the values for Von are high if the values for $V_{On}$ are above a threshold value. In some aspects of the present disclosure, the threshold value of the values for $V_{On}$ may include 1.7 V to 7 V, e.g. 3 V to 5 V. If all of the values for $V_{On}$ are high, block 3808 may be followed by block 3810. If all of the values for $V_{On}$ are not high, block 3808 may be followed by block 3806. Block 3806 and block 3808 may repeat until all of the values for $V_{On}$ are high.

The method 3800, at block 3810, may include detecting $V_{On}$ and $I_{On}$ and updating the value for $t_{Onn}$. In some aspects of the present disclosure, the digital circuitry may detect $V_{On}$ and $I_{On}$ on the corresponding converter outputs. In these and other aspects of the present disclosure, the digital circuitry may detect $V_{On}$ by detecting the predefined value for $V_{On}$. The digital circuitry may update the value for $t_{Onn}$ using the detected $V_{On}$ and $I_{On}$. In some aspects of the present disclosure, the digital circuitry may update the value for $t_{Onn}$ as defined in equation (1) or equation (2).

$$t_{ONn} = \frac{1}{V_{IN}}\sqrt{\frac{2L \cdot V_{On} \cdot I_{On}}{f_{SW}}} \quad (1)$$

In equation (1) $V_{in}$ may represent the input voltage of the SIMO converter, L may represent the inductance rating of the inductor, $V_{On}$ may represent the switching output voltage on a corresponding converter output, $I_{On}$ may represent the current on the corresponding converter output, $f_{SW}$ may represent the frequency rate for controlling the output switches, and $t_{on}$ may designate the time duration of the de-energizing time period for the converter output N.

$$t_{ONn} = \frac{2V_{On} \cdot I_{On}}{I_{PK} \cdot f_{SW} \cdot V_{IN}} \quad (2)$$

In equation (2) $V_{On}$ may represent the switching output voltage on a corresponding converter output, $I_{On}$ may represent the current on the corresponding converter output, $I_{PK}$ may represent a peak current on the corresponding converter output, $f_{SW}$ may represent the frequency rate for controlling the output switches, and $V_{in}$ may represent the input voltage of the SIMO converter. Block 3810 may be followed by block 3812.

The method 3800, at block 3812, may include operating the SIMO converter using the updated value for $t_{ONn}$. In some aspects of the present disclosure, the digital circuitry may cause the switch controller to control the switches within the SIMO converter. The digital circuitry may cause the switch controller to control the switches such that the discharge portion of the corresponding inductor cycles are based on the updated value for $t_{ONn}$. Block 3812 may be followed by block 3814.

The method 3800, at block 3814, may include determining whether all values for $V_{On}$ are within regulation. In some aspects of the present disclosure, the digital circuitry may determine whether all the values for $V_{On}$ (e.g., the value of the switching output voltage on the converter outputs) are within the pre-defined range as discussed elsewhere in the present disclosure. If all of the values for $V_{On}$ are within regulation, block 3814 may be followed by block 3812. Block 3812 and block 3814 may repeat until all of the values for $V_{On}$ are not within regulation or operation of the SIMO converter ends. If all of the values for $V_{On}$ are not within regulation, block 3814 may be followed by block 3810. Block 3810, block 3812, and block 3814 may repeat until all of the values for $V_{On}$ are within regulation.

In some aspects of the present disclosure, blocks 3802, 3804, 3806, and 3808 may correspond to an initialization period or power up period for the SIMO converter. In these and other aspects of the present disclosure, blocks 3810, 3812, and 3814 may correspond to a steady state operation period for the SIMO converter.

In some SIMO converter control technologies, controllers that implement analog control methods for the SIMO converter may include linear controllers, comparators, or other types of devices. However, these SIMO converter control technologies may be limited by a bandwidth of the analog components within the controllers. In addition, these SIMO converter control technologies may use high precision comparators to properly operate. Using high precision comparators may increase a cost or a complexity of the circuitry associated with the controller.

According to one or more aspects described in the present disclosure, digital circuitry may control operation of the SIMO converter. In these and other aspects of the present disclosure, the digital circuitry may determine how much power is drawn to the inductor of the SIMO converter. In these and other aspects of the present disclosure, the digital circuitry may determine how to distribute the power stored on the inductor between different converter outputs. Further, in some aspects of the present disclosure, the digital circuitry may determine timing parameters for inductor control (e.g., timing parameters for charging phases or discharging phases of inductor cycles).

In some aspects of the present disclosure, the digital circuitry may include one or more ADCs and/or one or more digital processors. In these and other aspects of the present disclosure, the ADCs may convert the switching output voltage into one or more digital switching output voltage values. In some aspects of the present disclosure, the digital switching output voltage values may be representative of voltage levels of the switching output voltage.

In some aspects of the present disclosure, the digital processor may receive the digital switching output voltage values. In addition, the digital processor may receive, for each converter output of the SIMO converter, an associated target output voltage value (e.g., a reference voltage). In these and other aspects of the present disclosure, the digital processor may compare the digital switching output voltage value to one or more corresponding associated target output voltage value.

In some aspects of the present disclosure, the digital processor may determine the timing parameters for the SIMO converter. In these and other aspects of the present disclosure, the digital processor may determine the timing parameters for the SIMO converter related to one or more duty cycles of the SIMO converter (e.g., inductor cycles). In addition, in some aspects of the present disclosure, the digital processor may determine the timing parameters using at least one digital switching output voltage value within a duty cycle of the SIMO converter. In other aspects of the present disclosure, the digital processor may determine the timing parameters using the digital switching output voltage values or the respectively associated target output voltage value (e.g., associated reference voltage) within a duty cycle of the SIMO converter.

In some aspects of the present disclosure, the digital processor may compare the digital switching output voltage values to corresponding target output voltage values (e.g., corresponding reference voltages). In these and other aspects of the present disclosure, the digital processor may determine whether the switching output voltage values are equal or not to the target output voltage values. In these and other aspects of the present disclosure, the timing parameters for the SIMO converter may be determined based on a difference between the digital switching output voltage values and the corresponding target output voltage values.

In some aspects of the present disclosure, the timing parameters may include a duration of the energizing phase of the inductor cycles. In these and other aspects of the present disclosure, the digital processor may determine at least one energizing time. In addition, in some aspects of the present disclosure, the energizing time may represent a duration the inductor is energized. In these and other aspects of the present disclosure, the digital processor may determine the energizing time using at least one digital switching output voltage value within a duty cycle of the SIMO converter. In some aspects of the present disclosure, the digital processor may determine the energizing time for each subsequent duty cycle of the SIMO converter.

In some aspects of the present disclosure, the timing parameters may include a duration of the de-energizing phase of the inductor cycles. In these and other aspects of the present disclosure, the digital processor may determine at least one de-energizing time. In addition, in some aspects of the present disclosure, the de-energizing time may represent a duration the inductor is de-energized using at least one converter output of the SIMO converter. In these and other aspects of the present disclosure, the digital processor may determine the de-energizing time using at least one digital switching output voltage value or the respectively associated target output voltage value within a duty cycle of the SIMO converter. In some aspects of the present disclosure, the digital processor may determine the de-energizing time for each subsequent duty cycle of the SIMO converter.

In some aspects of the present disclosure, the timing parameters (e.g., the energizing time or the de-energizing time) may be determined to determine an amount to adjust the duty cycle of the switches within the SIMO converter. In these and other aspects of the present disclosure, the duty cycles of the switches within the SIMO converter may be adjusted to increase or decrease the voltage level of the switching output voltage. In these and other aspects of the present disclosure, the duty cycles of the switches within the SIMO converter may be adjusted to increase or decrease an amount of energy stored on the inductor within the SIMO converter.

In some aspects of the present disclosure, the digital processor may determine the timing parameters using one or more software algorithms. In these and other aspects of the present disclosure, the digital processor may implement the software algorithms. In these and other aspects of the present disclosure, the digital processor may determine the energizing time or the de-energizing time using the software algorithms.

In some aspects of the present disclosure, the digital processor may select a computer program that implements the software algorithms. In these and other aspects of the present disclosure, the digital processor may select the computer program out of multiple computer programs. In addition, in some aspects of the present disclosure, each of the computer programs may implements one or more software algorithm configured to determine the timing parameters. In these and other aspects of the present disclosure, the digital processor may use the computer programs to determine the timing parameters with respect to different optimization criteria of the SIMO converter. In these and other aspects of the present disclosure, the digital processor may use the computer programs to determine the energizing time or the de-energizing time with respect to different optimization criteria of the SIMO converter.

In some aspects of the present disclosure, the digital processor may be electrically coupled to the switches within the SIMO converter. In these and other aspects of the present disclosure, the digital processor may control the switches within the SIMO converter in accordance with the determined timing parameters (e.g., the energizing time or the de-energizing time).

In other aspects of the present disclosure, the digital processor may be communicatively coupled to a switch controller that is electrically coupled to the switches within the SIMO converter. In these and other aspects of the present disclosure, the digital processor may instruct the switch controller to control the switches within the SIMO converter in accordance with the determined timing parameters (e.g., the energizing time or the de-energizing time).

In some aspects of the present disclosure, one or more of the ADCs within the digital circuitry may include voltage controlled oscillator based ADCs.

At least one aspect of the present disclosure may provide a controller for the SIMO converter that implements a computation method to determine the timing parameters using digital circuitry. In these and other aspects of the present disclosure, the digital circuitry may determine the timing parameters in one or more clock cycle. In addition, in some aspects of the present disclosure, the digital circuitry may provide faster settling time, simpler circuitry, or more process portability versus SIMO converter control technologies that include analog circuitry. In addition, in some aspects of the present disclosure, the digital circuitry may not include (e.g., may be free from) an analog regulator.

In some aspects of the present disclosure, the digital processor may determine the value for $t_{ONn}$ for the output switch associated with each converter output. The digital processor may determine the value for $t_{ONn}$ by digital computation in one clock cycle.

In some aspects of the present disclosure, if the value for $I_{PK}$ is already known (e.g., available from a delay line), equation (2) may reduce computation costs for the digital processor compared to equation (1).

A converter is provided with control of different switching output voltages according to requirements associated with different electronic devices electrically coupled to the converter outputs. In some aspects of the present disclosure, each switching output voltage is associated with a peak current reference. The switch controller may control the switches within the SIMO converter 104 to provide the switching output voltage according to the peak current reference. The SIMO converter 104 provides the switching output voltage to the electronic devices when the peak current reference is reached during an inductor energizing phase.

Figure 39:
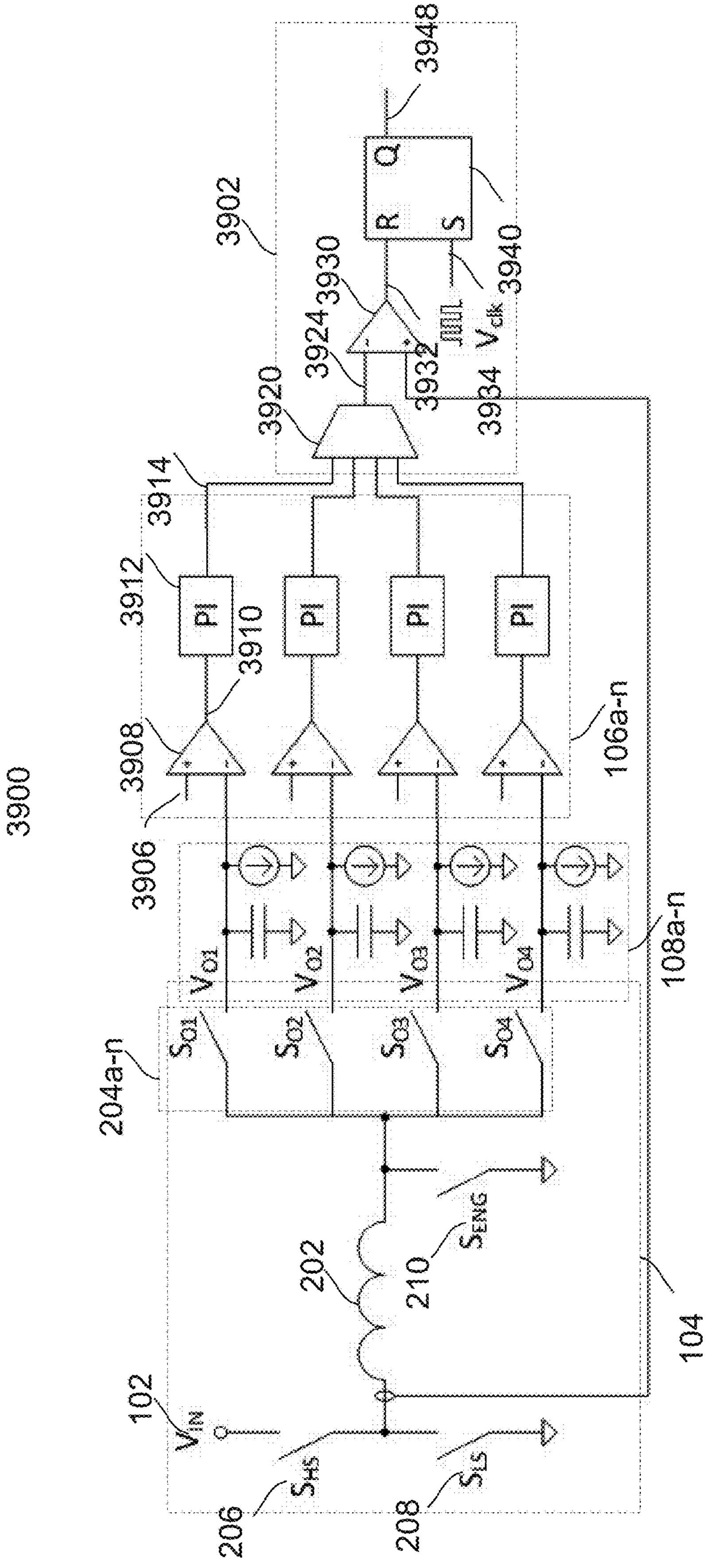
FIG. 39 exemplarily shows a Single Inductor Multiple Output (SIMO) environment in accordance with various aspects of the present disclosure.

FIG. 39 exemplarily illustrates a block diagram of a SIMO system according to some aspects, which may include input terminal 102, SIMO 104, regulators 106*a-n*, and output voltages 108*a-n*, as previously described. SIMO system 3900 may also include a switch controller 3902.

In FIG. 39 a plurality of regulators 106*a-n* and a single switch controller 3902 are illustrated. In some aspects of the present disclosure, the regulators 106*a-n* may be electrically coupled to different outputs of the SIMO 104 as previously described. For example, the system 3900 may include two regulators 106*a-n* electrically coupled to different outputs of the SIMO 104. In some aspects of the present disclosure, the system 3900 may include a single regulator 106 and a single switch controller 3902. In other aspects of the present disclosure, the system 3900 may include multiple regulators 106*a-n* and multiple switch controllers 3902 or a single switch controller 3902. It should be understood that various elements illustrated within regulators 106*a-n* may be positioned within switch controller 3902.

Regulator 106 may include an amplifier circuit 3908 electrically coupled to an output of SIMO 104. Amplifier circuit 3908 may receive switching output voltage 108 and reference voltage 3906. Amplifier circuit 3908 may compare the switching output voltage 108 with the reference voltage 3906 and generate a differential analog output signal, which may also be referred to as an error signal 3910. Error signal 2910 is provided to PI regulator 3912. It is to be noted that, if desired, the error signal 3910 may additionally be amplified. Regulator 106 may further include a proportional integration (PI) regulator 3912. PI regulator 3912 may include a proportional portion (not illustrated) and an integration portion (not illustrated). PI regulator 3912 may regulate the regulator-specific target output voltage of the regulator 106 to provide a compensated target output voltage reference 3914. PI regulator 3912 may perform various functions to the error signal 3910 to generate the compensated target output voltage 3914 for each output voltage. Compensated target output voltage reference 3914 may be proportional to error signal 3910 and the integral of the error signal 3910.

Switch controller 3902 may use one of the compensated target output voltages 3914 to generate a switch control signal controlling the switching from the inductor energizing phase to the inductor de-energizing phase. Switch controller 3902 may include multiplexer 3920, ramp comparator 3930, and set reset (SR) flip flop circuit 3940. Inputs of multiplexer 3920 may be electronically coupled with outputs of regulators 106*a-n*. The output of multiplexer 3920 may be electronically coupled with an input of ramp comparator 3930. Comparator 3930 may receive at the other input a sensed inductor current. Alternatively, the comparator 3930 may receive the voltage calculated from the sensed inductor current. The set reset (SR) flip flop circuit 3940 may be electronically coupled with the output of ramp comparator 3930.

The compensated target output voltage 3914 may be generated for each regulator 106*a-n* respectively. Multiple compensated target output voltages 3914 may be fed into inputs of multiplexer 3920. Multiplexer 3920 may be a 4-to-1 multiplexer as shown in FIG. 39, or other multiplexer sizes may be used such as 8-to-1 and 16-to-1. For example, the inputs of multiplexer 3920 may match the number of outputs of SIMO 104 to select an output voltage from output voltages 108*a-n*. A compensated target output voltage 3914 may be generated for each of the output voltages 108*a-n*. Multiplexer 3920 may make the selection of one of the compensated target output voltages 3914 in accordance with one or more selection signals. The selected compensated target output voltage 3924 of the plurality of compensated target output voltages 3914 may be fed to ramp comparator circuit 3930.

Switch controller 3902 may sequentially feed the compensated target output voltages 3914 to ramp comparator circuit 3930. The ramp comparator circuit 3930 may compare the selected target output voltage 3924 and the sensed inductor current ramp. In addition, the comparator circuit 3930 may generate a comparison voltage 3932 based on the comparison.

The SR flip flop circuit 3940 may receive the comparison voltage 3932 and a clock signal 3934. The SR flip flop circuit 3940 may generate a duty cycle voltage 3948 based on the comparison voltage 3932 and the clock signal 3934. Duty cycle voltage 3948 may be used in discontinuous-conduction mode (DCM) and provide stability.

As a result, SIMO system 3900 may be used to create discontinuous inductor cycles as illustrated in FIG. 14. As previously discussed, FIG. 14 illustrates a graphical representation 1400 of a simulation of discontinuous inductor cycles, in accordance with at least one embodiment described in the present disclosure.

FIG. 40 exemplarily shows a flowchart of a method of operating a SIMO according to some aspects. Method 4000 may include providing a switching output voltage in response to an input voltage supplied to the inductor in a duty cycle 4002; providing a respectively associated target output voltage to a respective converter output of the plurality of converter outputs by regulating the switching output voltage 4004; controlling the plurality of switches to control the switching output voltage 4006; selecting a converter output of the plurality of converter outputs to which the switching output voltage is supplied during a duty cycle of a plurality of duty cycles, each duty cycle comprising an inductor energizing phase and an inductor de-energizing phase 4008; and within at least one duty cycle of the plurality of duty cycles, for a selected converter output of the plurality of converter outputs, switching from the inductor energizing phase to the inductor de-energizing phase using the course of the inductor current 4010.

FIG. 41 exemplarily shows a flowchart of a method of operating a SIMO according to some aspects. Method 4100 may include providing a switching output voltage to a converter output of a plurality of converter outputs in response to an input voltage supplied to the inductor in a duty cycle of a plurality of duty cycles 4102; providing a respectively associated target output voltage to a respective converter output of the plurality of converter outputs by regulating the switching output voltage 4104; controlling the plurality of switches to control the switching output voltage. 4106; applying the switching output voltage to a converter output of the plurality of converter outputs 4108; selecting a converter output of the plurality of converter outputs to which the switching output voltage is supplied for a respective duty cycle of a plurality of duty cycles 4110; and within at least one duty cycle of the plurality of duty cycles, for a selected converter output of the plurality of converter outputs, switching from an inductor energizing phase to an inductor de-energizing phase based on a comparison of a target current representing a respectively associated regulator-specific target output voltage with a course of an inductor current flowing through the inductor 4112.

Figure 42:
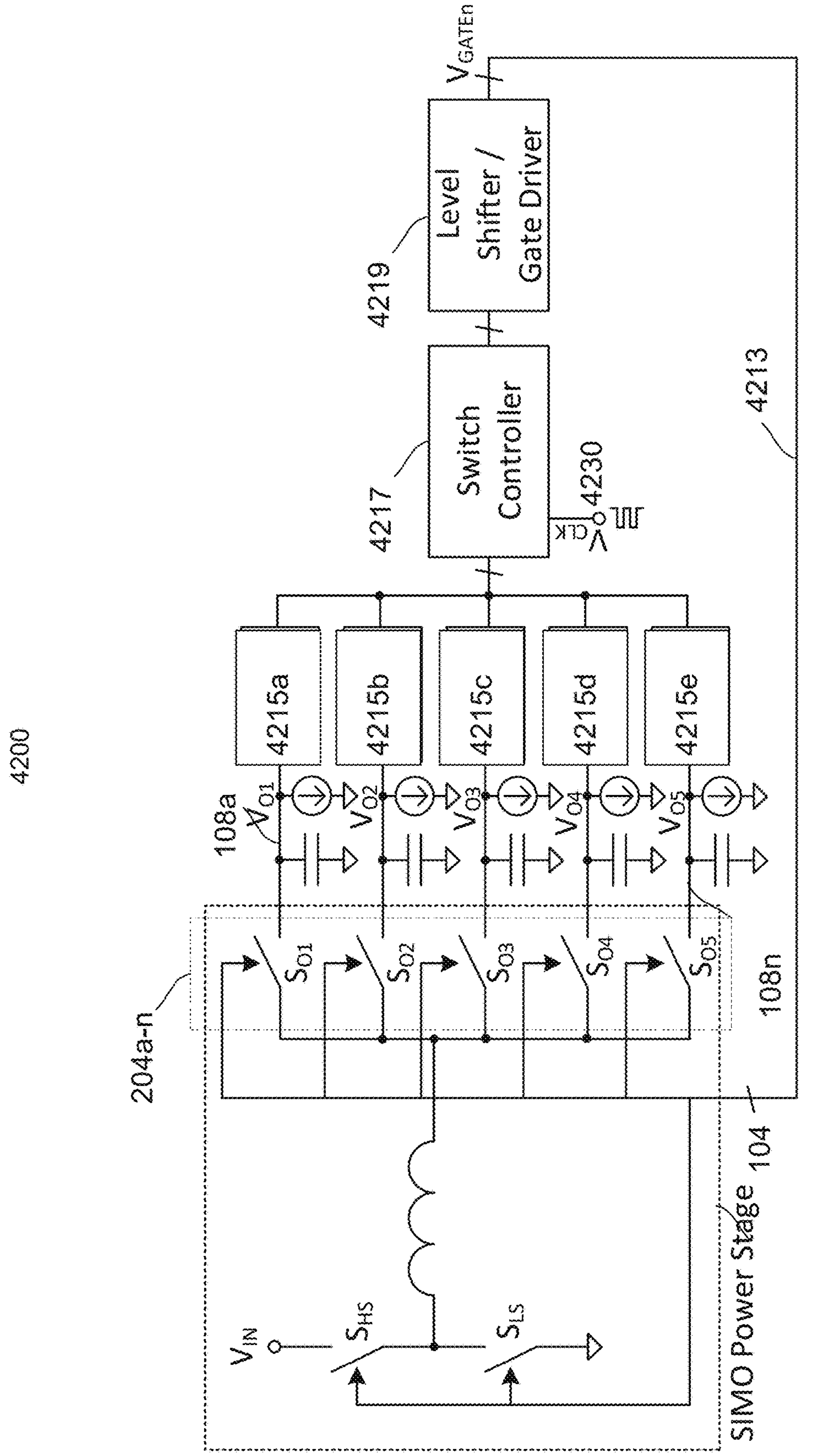
FIG. 42 exemplarily illustrates a block diagram of a system that includes the SIMO converter.

FIG. 42 illustrates a block diagram of an example system 4200 that includes the SIMO converter 104, in accordance with at least one aspect described in the present disclosure. The system 4200 may include the SIMO converter 104, one or more time ON generators 4215*a-e*, a switch controller 4217, and a level shifter 4219.

The system 4200 may include one or more switches 204. In FIG. 42, a single switch controller 4217 is illustrated and discussed for simplicity of illustration and discussion. In some aspects of the present disclosure, the system 4200 may include multiple switch controllers 4217. In some aspects of the present disclosure, the system 4200 may include a single time ON generator 4215 electrically coupled to one or more SIMO converter outputs.

The SIMO converter 104 may correspond to the SIMO converter 104 described elsewhere in the present disclosure. The SIMO converter 104 may include multiple outputs to provide the switching output voltages 108 at different values.

The time ON generators 4215*a-e* may determine a $T_{ON}$ for its respective converter output switch 204. The time ON generators 4215*a-e* may determine a time the switch 204*a-n* for a converter output is on to provide the switching output voltage on the corresponding converter output. For example, the time ON generator 4215*a* may determine the time the switch 204*a* needs to be on to de-energize the inductor and provide the switching output voltage 108*a* on the first converter output. The time ON generators 4215*a-e* may generate a $T_{ON}$ based on the corresponding peak current reference of each switching output voltage.

The switch controller 4217 may be configured to control the switches within the SIMO converter 104 to selectively apply the switching output voltage 108 to the converter outputs.

The switch controller 4217 may control the SIMO switches to generate one or more switch output voltages based on the $T_{ON}$ signal from generators 4215 and clock voltage 4230. In some aspects of the present disclosure, when the inductor has reached a peak current and the clock voltage 4230 is received, the switch controller 4217 may generate switch voltages such that SIMO converter 104 provides switching output voltage according to a peak current reference.

The level shifter 4219 may receive the switch voltages. The level shifter 4219 may shift a voltage level of one or more of the switch voltages to levels sufficient to cause corresponding switches within the SIMO converter 104 to transition between the open position and the closed position. The level shifter 4219 may generate gate voltages 4213 based on the switch voltages. In some aspects of the present disclosure, the level shifter 4219 may delay the gate voltages 4213 based on corresponding stages of the SIMO converter 104.

For example, linear regulators or a switch capacitor network may receive gate voltages 4213 in order to provide switching output voltages 108*a-n.*

Figure 43:
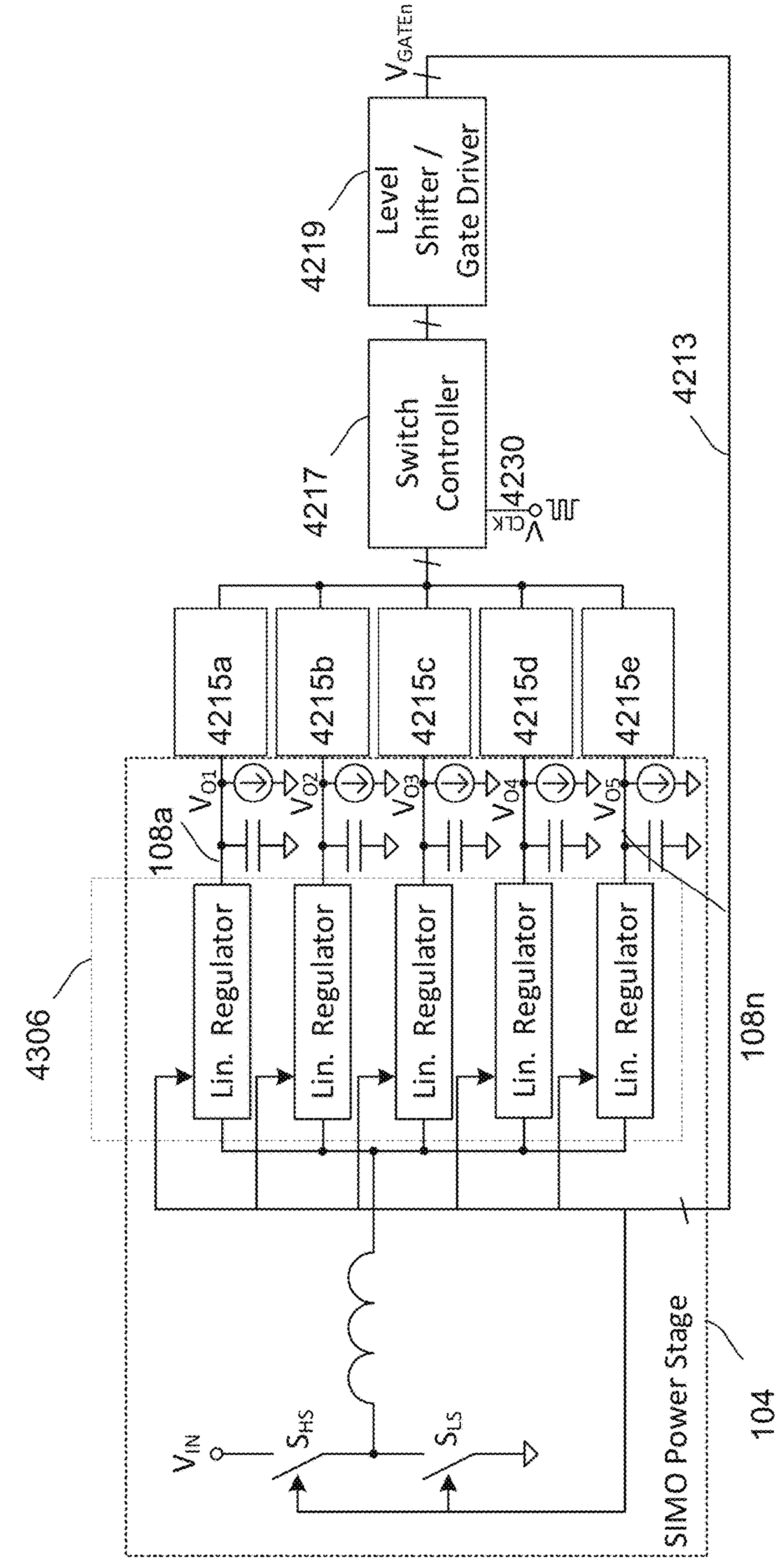
FIG. 43 exemplarily illustrates a block diagram of a system that includes the SIMO converter.

FIG. 43 illustrates a block diagram of an example system 4300 that includes the SIMO converter 104, in accordance with at least one aspect described in the present disclosure. The system 4300 may include the SIMO converter 104, one or more time ON generators 4215*a-e*, a switch controller 4217, and a level shifter 4219.

The system 4300 may include one or more linear regulators 4306. In FIG. 43, a single switch controller 4217 is illustrated and discussed for simplicity of illustration and discussion. In some aspects of the present disclosure, the system 4300 may include multiple switch controllers 4217. In some aspects of the present disclosure, the system 4300 may include a single linear regulator 4306 electrically coupled to one or more SIMO converter outputs. The linear regulators 4306 may correspond to the LDOs 106 described elsewhere in the present disclosure.

The linear regulators 4306 may receive gate voltages 4213 to regulate the switching output voltages 108*a-n* according to a peak current reference.

Figure 44:
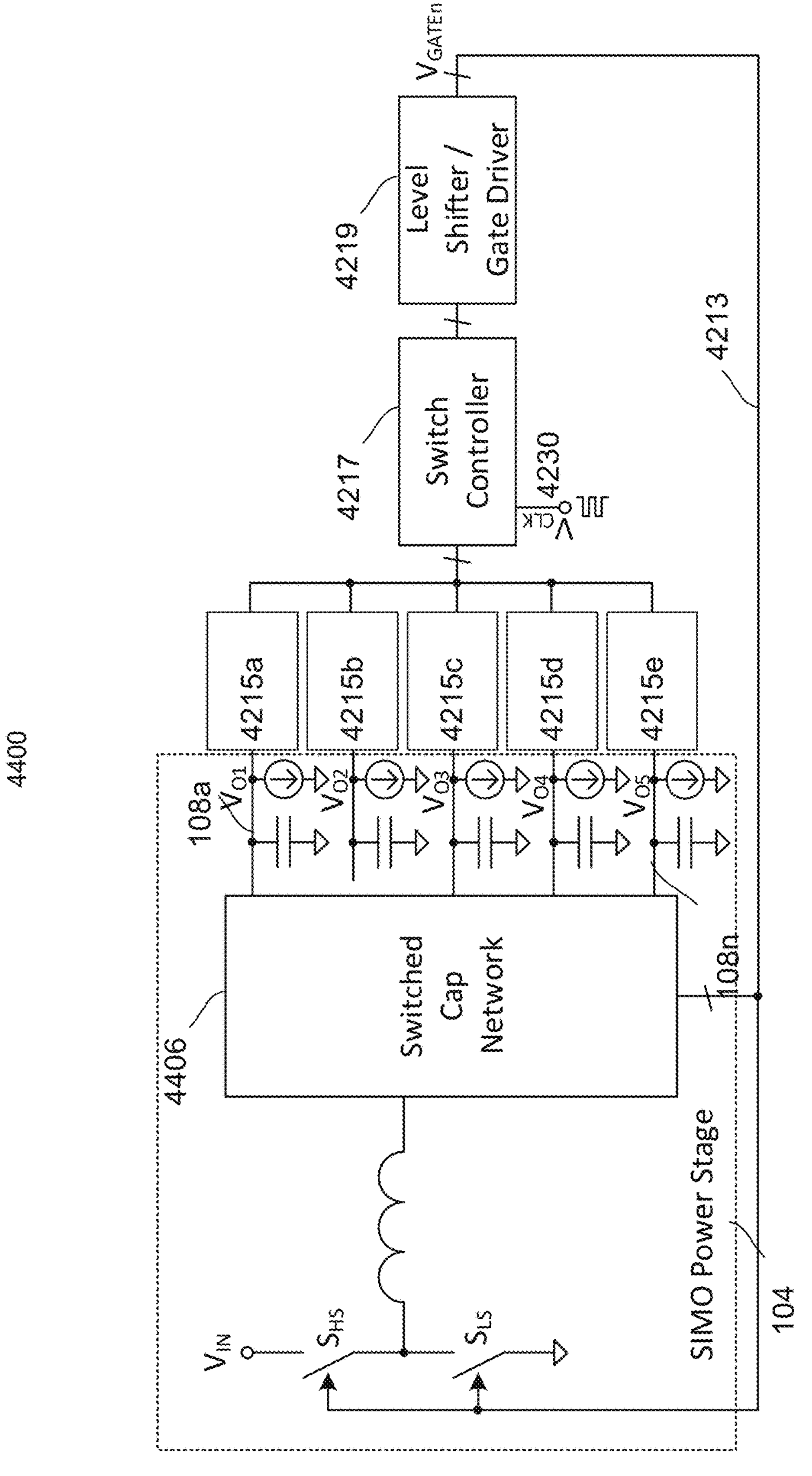
FIG. 44 exemplarily illustrates a block diagram of a system that includes the SIMO converter.

FIG. 44 illustrates a block diagram of an example system 4400 that includes the SIMO converter 104, in accordance with at least one aspect described in the present disclosure. The system 4400 may include the SIMO converter 104, one or more time ON generators 4215*a-e*, a switch controller 4217, and a level shifter 4219.

The system 4400 may include a network of switched capacitors 4406. In FIG. 44, a single switch controller 4217 is illustrated and discussed for simplicity of illustration and discussion. In some aspects of the present disclosure, the network of switched capacitors 4406 may be electrically coupled to one or more SIMO converter outputs.

The network of switched capacitors 4406 may receive gate voltages 4213 to regulate the switching output voltages 108*a-n* according to a peak current reference. The network of switched capacitors 4406 may include a separate switch controller (not illustrated) to control the switched capacitors. The network of switched capacitors 4406 may use filters to open and close switches based on gate voltages 4213. The gate network of switched capacitors 4406 may provide regulated switching output voltages according to a peak current reference.

The switch controller may be used to control the duty cycle for each output current of the SIMO using the peak or target current of output voltages. Using the selected target voltage reference for each output of the SIMO, the SR circuit may generate a duty cycle voltage. The duty cycle voltage may be used to control one or more of the switches of the SIMO system to determine when to switch from an inductor energizing phase to an inductor de-energizing phase based on a comparison of the peak output voltage and the input voltage.

Each regulator may contain a PI block to generate the peak current reference for each output voltage. Each of the reference signal may be fed to a ramp comparator sequentially to generate each duty cycle voltage. The duty cycle voltages or duty commands may be generated discontinuously to add stability to the SIMO system.

The SIMO system may include a multiplexer to select from each of the target output voltages for each of the SIMO output voltages. The multiplexer may select the target output voltages sequentially and feed them to a ramp comparator. The ramp comparator may take in two inputs such as the input voltage and the selected target output voltage to generate a comparison used to determine when the inductor switches between energizing and de-energizing phases.

For example, the switch control may switch between an inductor energizing phase and an inductor de-energizing phase as the target output voltage approaches the input voltage.

The ramp comparator may generate a comparison signal used as input into an SR flip flop circuit. The SR flip flop circuit may receive a clock signal at its S input and the comparison signal from the ramp comparator at its R input. Based on these inputs the SR flip flop may generate a duty cycle voltage. The duty cycle voltage may be used as a switch control signal to control the switch controller to switch from the inductor energizing phase to the inductor de-energizing phase.

The elements of the SIMO system may be implemented on a common chip or as separate elements.

The SIMO converter 104 may include one or more voltage detector, one or more current detector, or some combination thereof. The voltage detectors, current detectors, or some combination thereof may measure currents or voltages within the SIMO converter 104 at different stages of operation of the SIMO converter 104. The SIMO converter 104 may reconstruct a real inductance curve of the inductor 202 based on the measured currents, voltages, or some combination thereof.

According to an aspect of the disclosure, the SIMO buck-boost converter may utilize one or more measurements (e.g. one or more voltage measurements and/or one or more current measurements) to reconstruct a real inductance curve of the inductor. The SIMO converter may use the real inductance curve to adjust the duty cycles of the switches within the SIMO converter to provide the switching output voltage within a voltage domain of the electronic device coupled to the converter output.

Figure 45:
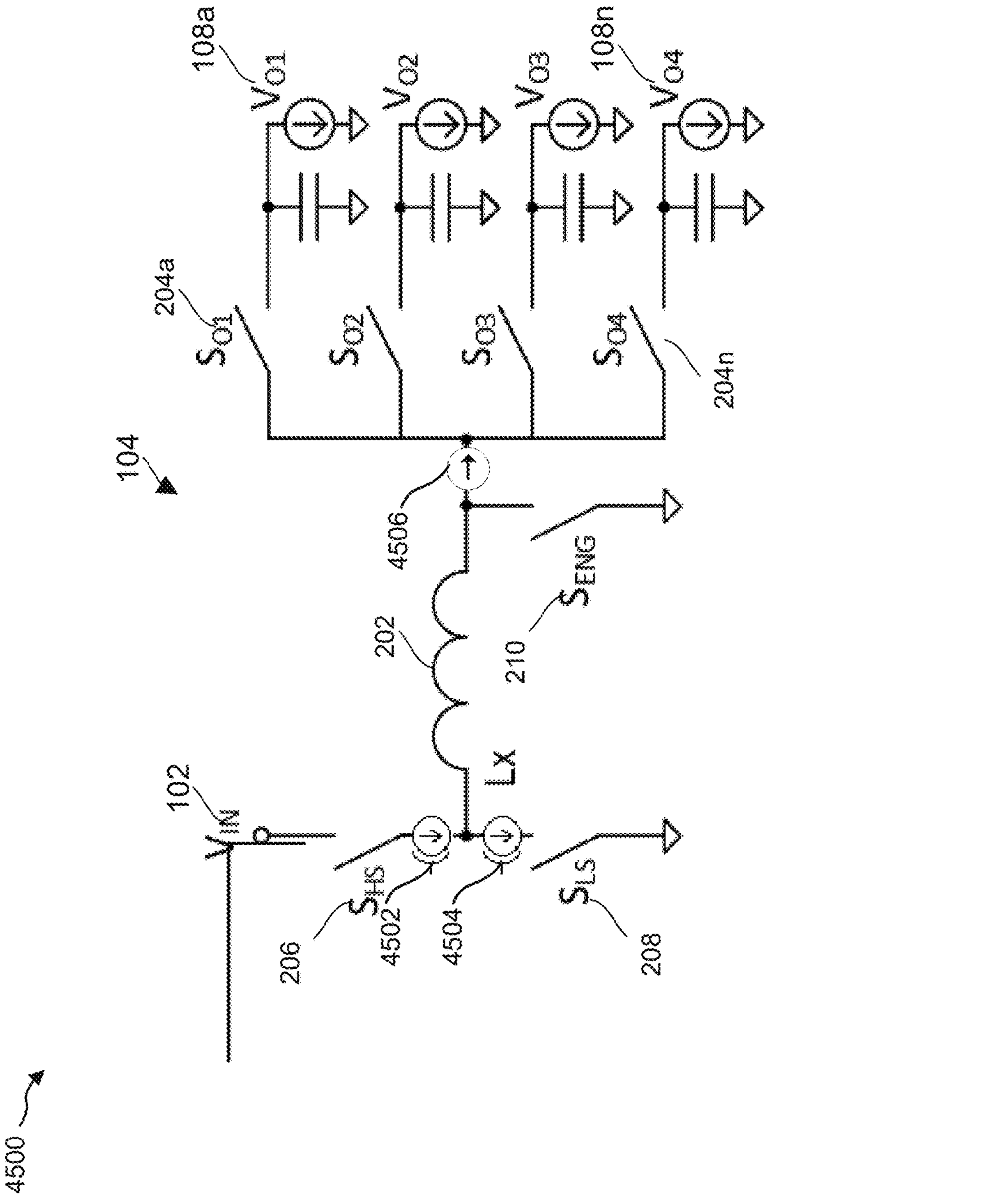
FIG. 45 exemplarily illustrates a block diagram of a system that includes the SIMO.

FIG. 45 illustrates a block diagram of an example system 4500 that includes the SIMO converter 104, in accordance with at least one aspect described in the present disclosure. The system 4500 may also include a first sensor 4502, a second sensor 4504, and a third sensor 4506. The SIMO converter 104 may otherwise correspond to the SIMO converter 104 described above in relation to FIG. 4.

In some aspects of the present disclosure, the first sensor 4502 may be electrically coupled between the first terminal of the inductor 202 and the switch 206. In other aspects of the present disclosure, the first sensor 4502 may be electrically coupled to the first terminal of the inductor 202. In some aspects of the present disclosure, the second sensor 4504 may be electrically coupled between the first terminal of the inductor 202 and the switch 208. In other aspects of the present disclosure, the second sensor 4504 may be electrically coupled to the first terminal of the inductor 202. In some aspects of the present disclosure, the third sensor 4506 may be electrically coupled between the second terminal of the inductor 202 and one or more of the switches 204*a-n*. In other aspects of the present disclosure, the third sensor 4506 may be electrically coupled to the second terminal of the inductor 202.

In some aspects, the first sensor 4502, the second sensor 4504, or the third sensor 4506 may be communicatively or electrically coupled to a controller (not illustrated). In some aspects of the present disclosure, the controller the controller may be the switch controller described in the above paragraphs.

In some aspects of the present disclosure, the first sensor 4502 and the second sensor 4504 may detect voltage or current on the inductor 202. For example, the first sensor 4502 may detect the input voltage or the input current of the first terminal of the inductor 202. As another example, the second sensor 4504 may detect the voltage or current of the first terminal of the inductor 202. In these and other aspects of the present disclosure, the first sensor 4502 may be configured to detect the input voltage or the input current of the inductor 202 during an energizing phase. The energizing phases may occur such that the inductor 202 is energized (e.g., charged). For example, the controller may cause the switches to transition to states where the inductor 202 receives the input voltage (e.g., switch 206 and switch 210 are in the closed state and switch 208 is in the open state).

In some aspects of the present disclosure, the second sensor 4504 may be configured to detect the voltage or the current of the first terminal of the inductor 202 during a de-energizing phase. The de-energizing phase may occur such that the inductor 202 is de-energized (e.g., conducts via one or more of the switches 204*a-n*). For example, the controller may cause the switches to transition to states where the inductor 202 is electrically isolated from the input voltage and is electrically coupled to an output of the SIMO converter 104 (e.g., switch 206 and switch 210 are in the open state and switch 208 and one or more of the switches 204*a-n* are in the closed state).

In some aspects of the present disclosure, the third sensor 4506 may detect the switching output voltage or output current of the second terminal of the inductor 202. In these and other aspects of the present disclosure, the third sensor 4506 may detect the switching output voltage or the output current during the energizing or the de-energizing phase.

In some aspects of the present disclosure, the system 4500 may operate to control the switching output voltage during duty cycles (e.g., inductor cycles that include the energizing phase and the de-energizing phase) of the inductor 202. In these and other aspects of the present disclosure, the controller may determine an input voltage value, a voltage value, a switching output voltage value, an input current value, a current value, or an output current value. In some aspects of the present disclosure, the controller may determine the input voltage value, voltage value, switching output voltage value, input current value, current value, or output current value based on the detected input voltage, voltage, switching output voltage, input current, current, or output current, respectively.

Figure 46:
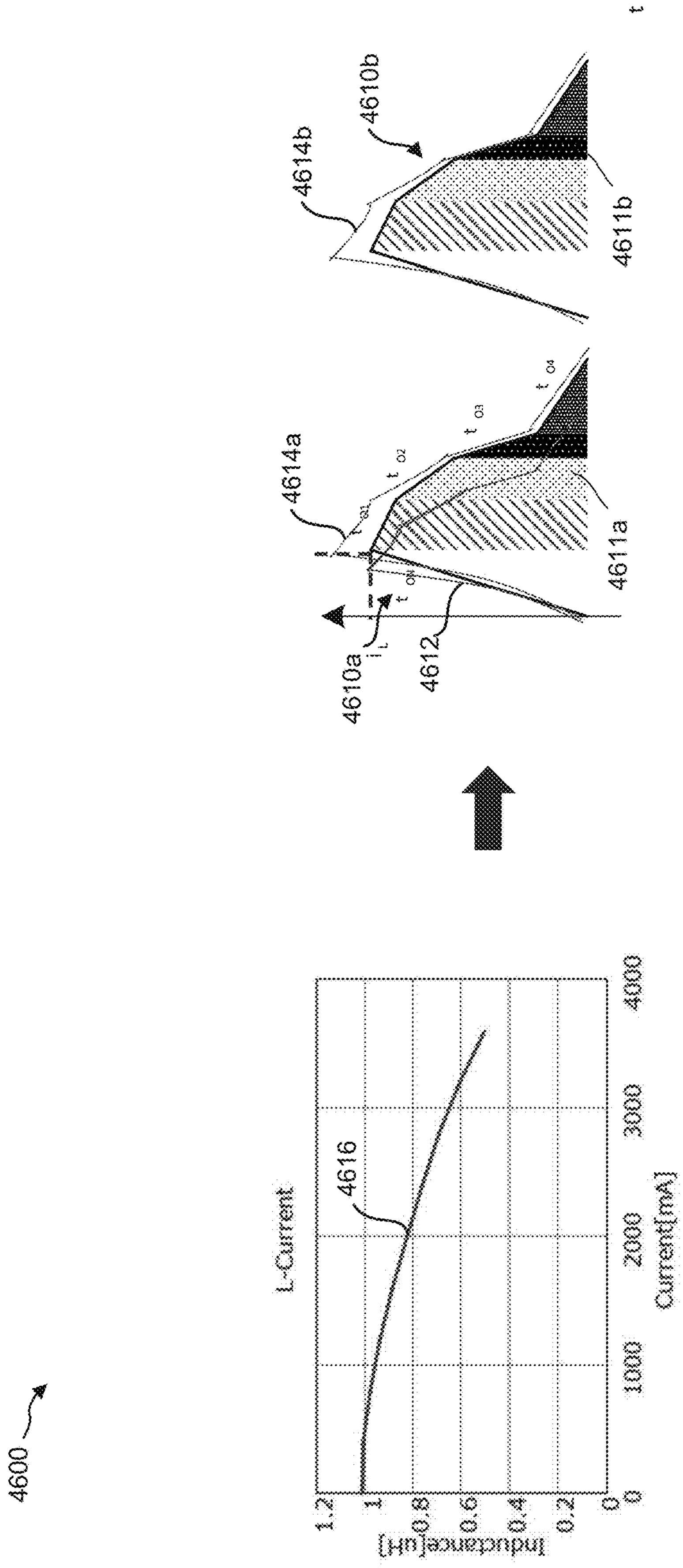
FIG. 46 exemplarily illustrates a graphical representation of currents on the inductor during inductor cycles.

FIG. 46 illustrates a graphical representation 4600 of currents on the inductor during inductor cycles 4610*a-b*, in accordance with at least one aspect described in the present disclosure. In FIG. 46, curve 4616 represents a known inductance of the inductor versus current on the inductor (e.g., an inductor curve 4616). As illustrated by the inductor curve 4616, as the current on the inductor increases, the inductance of the inductor decreases.

Curves 4611*a-b* may represent the current on the inductor during the first inductor cycle 4610*a* and the second inductor cycle 4610*b* without any inductor derating, respectively. Curves 4614*a-b* may represent the current on the inductor during the first inductor cycle 4610*a* and the second inductor cycle 4610*b* with inductor derating, respectively. Further, curve 4612 may represent the current on the inductor during the first inductor cycle 4610*a* with inductor derating. Differences occur in the current on the inductor during the inductor cycles 4610*a-b* as illustrated by the differences in the curves 4611*a-b*, 4612, and 4614*a-b*. In some aspects of the present disclosure, the differences between the curves 4611*a-b*, 4612, and 4614*a-b* may be due to inductance derating as the current increases.

Figure 47:
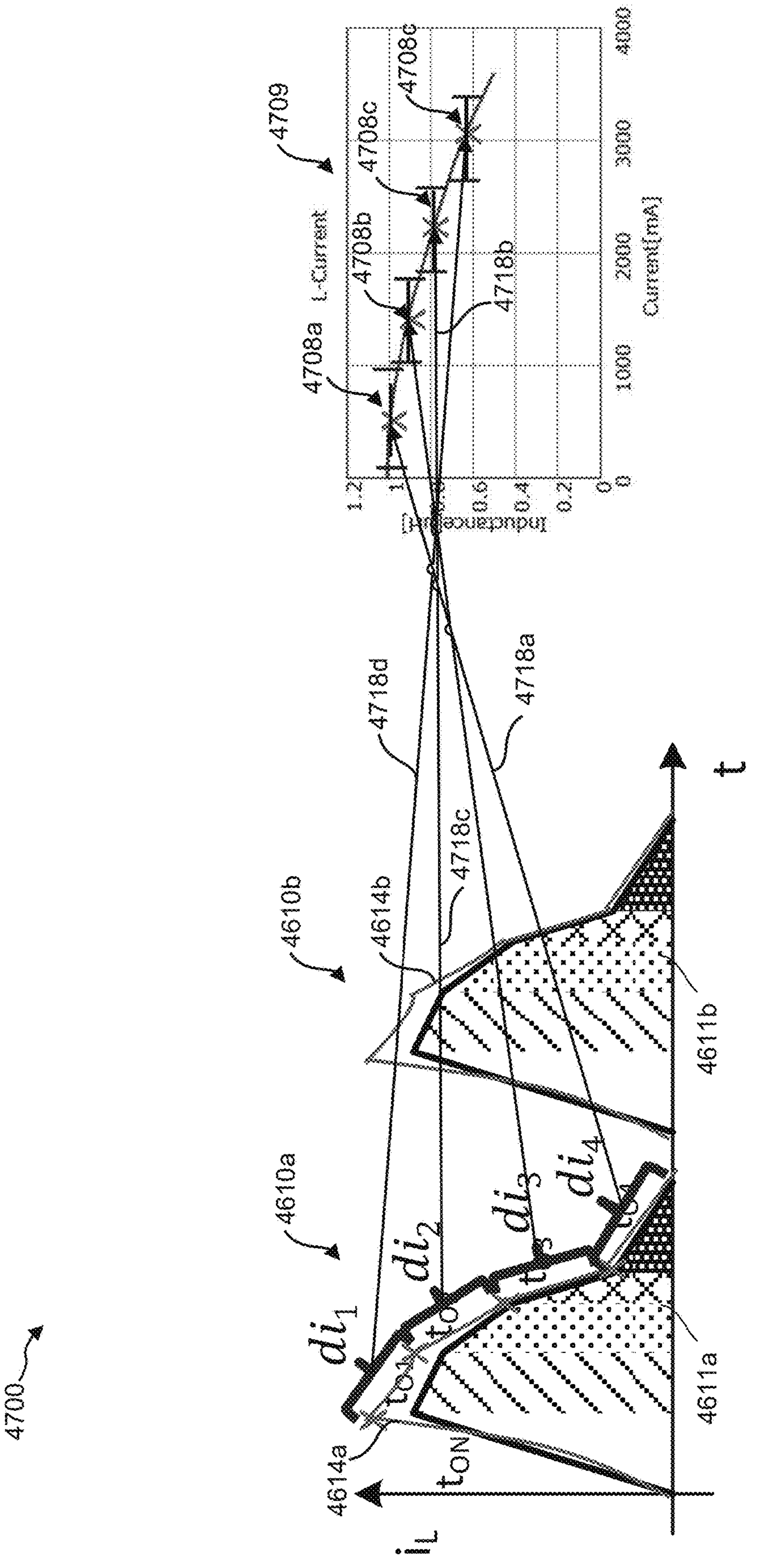
FIG. 47 illustrates a graphical representation of currents on the inductor during inductor cycles and the known inductance rating versus an interpolated real inductance rating.

FIG. 47 illustrates a graphical representation 4700 of currents on the inductor during inductor cycles 4610*a-b* and the known inductance rating versus an interpolated real inductance rating 4709, in accordance with at least one aspect described in the present disclosure.

In some aspects of the present disclosure, the interpolated real inductance rating 4709 may be interpolated using the input voltage value, the input current value, or the switching output voltage value of the inductor, as discussed elsewhere in the present disclosure. The current 4614*a* may be divided into multiple portions, illustrated in FIG. 47 as $di_1$, $di_2$, $di_3$, and $di_4$. Each portion $di_1$, $di_2$, $di_3$, and $di_4$ of the measured current 4614*a* may correspond to a different portion of the interpolated inductor curve 4709. For example, portion $di_4$ may correspond to a first portion 4708*a*, portion $di_3$ may correspond to a second portion 4708*b*, portion $di_2$ may correspond to a third portion 4708*c*, and portion $di_1$ may correspond to a fourth portion 4708*d*. In some aspects of the present disclosure, each portion 4708*a-d* of the interpolated inductor curve 4709 may be interpolated based on the corresponding portion $di_1$, $di_2$, $di_3$, and $di_4$ of the measured current 4614*a*. In other aspects of the present disclosure, each portion 4708*a-d* of the interpolated inductor curve 4709 may correspond to a different portion $di_1$, $di_2$, $di_3$, and $di_4$ of the measured current 4614*a*.

Figure 48:
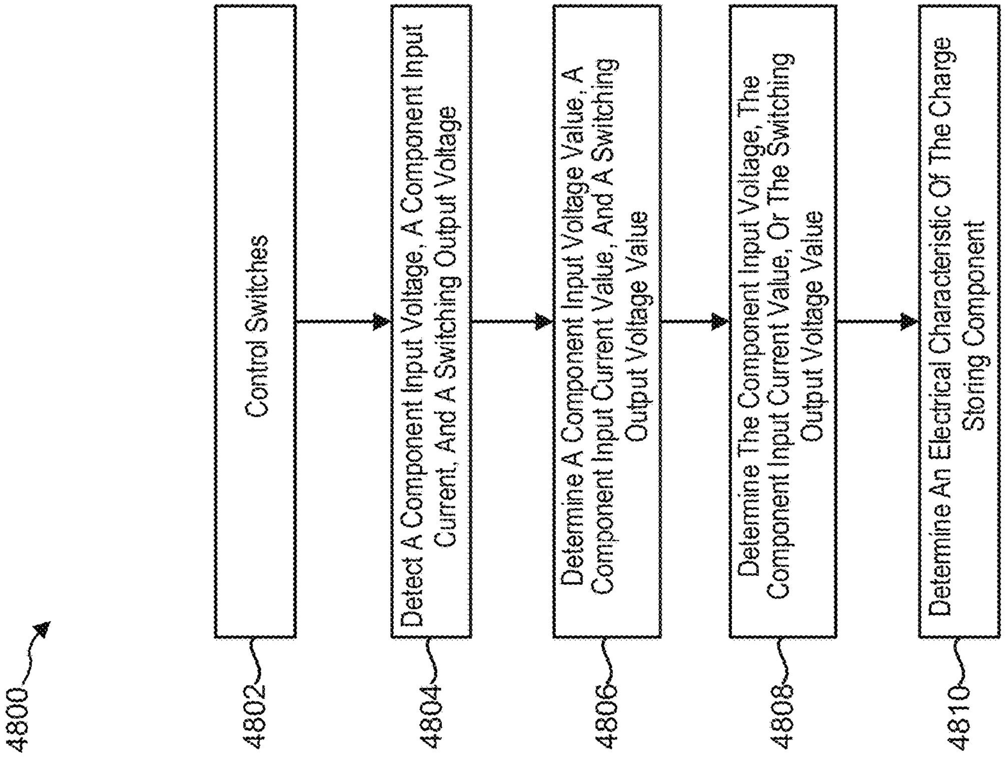
FIG. 48 exemplarily illustrates a flowchart of a method of operating a switched converter.

FIG. 48 illustrates a flowchart of an example method 4800 of operating a switched converter, in accordance with at least one aspect described in the present disclosure. The method 4800 may include one or more blocks 4802, 4804, 4806, 4808, or 4810. Although illustrated with discrete blocks, the operations associated with one or more of the blocks of the method 4800 may be divided into additional blocks, combined into fewer blocks, or eliminated, depending on the particular implementation.

At block 4802, switches may be controlled. In some aspects of the present disclosure, the switches may be controlled to control the switching output voltage in duty cycles. In these and other aspects of the present disclosure, each duty cycle may include an energizing phase and a de-energizing phase. During the energizing phase, a charge storing component may be energized. In addition, during the de-energizing phase, the charge storing component may be de-energized to one or more converter outputs of the plurality of converter outputs.

At block 4804, method may include detecting a component input voltage, a component input current, and a switching output voltage. In some aspects of the present disclosure, method may include detecting the component input voltage and the component input current at a first node of the charge storing component. In addition, in some aspects of the present disclosure, method may include detecting the switching output voltage at a second node of the charge storing component.

At block 4806, method may include determining a component input voltage value, a component input current value, and/or a switching output voltage value by a first sensor. In some aspects of the present disclosure, method may include determining the component input voltage value (e.g., input voltage value) and the component input current value (e.g., input current value) during the beginning and the end of the energizing phase at a first node of the charge storing component. In addition, in some aspects of the present disclosure, method may include determining the switching output voltage value at the second node of the charge storing component during the beginning and during the end of the energizing phase.

At block 4808, method may include determining the component input voltage value, the component input current value, and/or the switching output voltage value by a second sensor. In some aspects of the present disclosure, method may include determining at least one of the component input voltage, the component input current value, or the switching output voltage value during the beginning or during the end of at least one de-energizing phase. Method may include determining the component input voltage or the component input current value at the first node of the charge storing component. In addition, method may include determining the switching output voltage value at the second node of the charge storing component.

At block 4810, method may include determining an electrical characteristic of the charge storing component. In some aspects of the present disclosure, method may include determining the electrical characteristic using the determined values.

Modifications, additions, or omissions may be made to the method 4800 without departing from the scope of the present disclosure. For example, the operations of the method 4800 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

In some aspects of the present disclosure, the first sensor may be configured as a voltage sensor. In other aspects of the present disclosure, the first sensor may be configured as a current sensor. Alternatively, in some aspects of the present disclosure, the first sensor may be configured as including both a voltage sensor and a current sensor.

In some aspects of the present disclosure, the second sensor may be configured as a voltage sensor. In other aspects of the present disclosure, the second sensor may be configured as a current sensor. Alternatively, in some aspects of the present disclosure, the second sensor may be configured as including both a voltage sensor and a current sensor.

In some aspects of the present disclosure, the third sensor may be configured as a voltage sensor. In other aspects of the present disclosure, the third sensor may be configured as a current sensor. Alternatively, in some aspects of the present disclosure, the third sensor may be configured as including both a voltage sensor and a current sensor.

In some aspects of the present disclosure, the controller may include one or more processors configured to perform various functions using determined voltage values (e.g., a component input voltage value, a component voltage value, or a voltage value) or determined current values (e.g., a component input current value, a component current value, or a current value) of the first terminal or the second terminal of the inductor.

In some aspects of the present disclosure, the first sensor may detect the input voltage or the input current of the first terminal during the energizing phase. The controller may determine an input voltage value of the first terminal of the inductor during the energizing phase. In some aspects of the present disclosure, the controller may determine the input voltage value during the energizing phase based on the input voltage detected by the first sensor. The controller may determine an input current value of the first terminal during the energizing phase. In some aspects of the present disclosure, the controller may determine the input current value during the energizing phase based on the input current detected by the first sensor.

In some aspects of the present disclosure, the second sensor may detect the voltage or the current of the first terminal during the de-energizing phase. The controller may determine a voltage value of the first terminal of the inductor during the de-energizing phase. In some aspects of the present disclosure, the controller may determine the voltage value during the de-energizing phase based on the voltage detected by the second sensor. The controller may determine an input current value of the first terminal during the de-energizing phase. In some aspects of the present disclosure, the controller may determine the input current value during the de-energizing phase based on the input current detected by the first sensor.

In some aspects of the present disclosure, the third sensor may detect the switching output voltage or the output current of the second terminal during the energizing phase or the de-energizing phase. The controller may determine the switching output voltage value of the second terminal of the inductor during the energizing or the de-energizing phase. In some aspects of the present disclosure, the controller may determine the switching output voltage value during the energizing or the de-energizing phase based on the switching output voltage detected by the third sensor. The controller may determine the output current value of the second terminal during the energizing or the de-energizing phase. In some aspects of the present disclosure, the controller may determine the output current value during the energizing or the de-energizing phase based on the output current detected by the first sensor.

In some aspects of the present disclosure, the first sensor may detect the input voltage of the first terminal of the inductor during (e.g., at) a beginning of the energizing phase. In these and other aspects of the present disclosure, the beginning of the energizing phase may correspond to a period of time subsequent to the switches transitioning to a state configured to energize (e.g., charge) the inductor. In these and other aspects of the present disclosure, the controller may determine the input voltage value of the first terminal of the inductor at the beginning of the energizing phase based on the detected input voltage.

In some aspects of the present disclosure, the first sensor may detect the input current of the first terminal of the inductor during the beginning of the energizing phase. In these and other aspects of the present disclosure, the controller may determine the input current value of the first terminal of the inductor at the beginning of the energizing phase based on the detected input current.

In some aspects of the present disclosure, the third sensor may detect the switching output voltage of the second terminal of the inductor during the beginning of the energizing phase. In these and other aspects of the present disclosure, the controller may determine the switching output voltage value of the second terminal of the inductor at the beginning of the energizing phase based on the detected switching output voltage.

In some aspects of the present disclosure, the third sensor may detect the output current of the second terminal of the inductor during the beginning of the energizing phase. In these and other aspects of the present disclosure, the controller may determine the output current value of the second terminal of the inductor at the beginning of the energizing phase based on the detected output current.

In some aspects of the present disclosure, the first sensor may detect the input voltage of the first terminal of the inductor during (e.g., at) an end of the energizing phase. In these and other aspects of the present disclosure, the end of the energizing phase may correspond to a period of time prior to the switches transitioning to a state configured to de-energize the inductor (e.g., cause the inductor to conduct). In these and other aspects of the present disclosure, the controller may determine the input voltage value of the first terminal of the inductor during the end of the energizing phase based on the detected input voltage.

In some aspects of the present disclosure, the first sensor may detect the input current of the first terminal of the inductor during the end of the energizing phase. In these and other aspects of the present disclosure, the controller may determine the input current value of the first terminal of the inductor during the end of the energizing phase based on the detected input current.

In some aspects of the present disclosure, the third sensor may detect the switching output voltage of the second terminal of the inductor during the end of the energizing phase. In these and other aspects of the present disclosure, the controller may determine the switching output voltage value of the second terminal of the inductor during the end of the energizing phase based on the detected switching output voltage.

In some aspects of the present disclosure, the third sensor may detect the output current of the second terminal of the inductor during the end of the energizing phase. In these and other aspects of the present disclosure, the controller may determine the output current value of the second terminal of the inductor during the end of the energizing phase based on the detected output current.

In some aspects of the present disclosure, the second sensor may detect the voltage of the first terminal of the inductor during (e.g., at) a beginning of the de-energizing phase. In these and other aspects of the present disclosure, the beginning of the de-energizing phase may correspond to a period of time subsequent to the switches transitioning to a state configured to de-energize the inductor (e.g., cause the inductor to conduct). In these and other aspects of the present disclosure, the controller may determine the voltage value of the first terminal of the inductor during the beginning of the de-energizing phase based on the detected voltage.

In some aspects of the present disclosure, the second sensor may detect the current of the first terminal of the inductor during the beginning of the de-energizing phase. In these and other aspects of the present disclosure, the controller may determine the current value during the beginning of the de-energizing phase of the first terminal of the inductor based on the detected current.

In some aspects of the present disclosure, the third sensor may detect the switching output voltage of the second terminal of the inductor during the beginning of the de-energizing phase. In these and other aspects of the present disclosure, the controller may determine the switching output voltage value at the beginning of the de-energizing phase of the second terminal of the inductor based on the detected switching output voltage.

In some aspects of the present disclosure, the third sensor may detect the output current of the second terminal of the inductor during the beginning of the de-energizing phase. In these and other aspects of the present disclosure, the controller may determine the output current value of the second terminal of the inductor at the beginning of the de-energizing phase based on the detected output current.

In some aspects of the present disclosure, the second sensor may detect the voltage of the first terminal of the inductor during (e.g., at) an end of the de-energizing phase. In these and other aspects of the present disclosure, the end of the de-energizing phase may correspond to a period of time prior to the switches transitioning to a state configured to energize (e.g., charge) the inductor or to cause substantially no current to occur on the inductor. In these and other aspects of the present disclosure, the controller may determine the voltage value of the first terminal of the inductor during the end of the de-energizing phase based on the detected voltage.

In some aspects of the present disclosure, the second sensor may detect the current of the first terminal of the inductor during the end of the de-energizing phase. In these and other aspects of the present disclosure, the controller may determine the current value of the first terminal of the inductor during the end of the de-energizing phase based on the detected current.

In some aspects of the present disclosure, the third sensor may detect the switching output voltage of the second terminal of the inductor during the end of the de-energizing phase. In these and other aspects of the present disclosure, the controller may determine the switching output voltage value of the second terminal of the inductor during the end of the de-energizing phase based on the detected switching output voltage.

In some aspects of the present disclosure, the third sensor may detect the output current of the second terminal of the inductor during the end of the de-energizing phase. In these and other aspects of the present disclosure, the controller may determine the output current value of the second terminal of the inductor during the end of the de-energizing phase based on the detected output current.

In some aspects of the present disclosure, the controller may determine at least one of the voltage value (e.g., the input voltage value or the voltage value) or the current value (e.g., the input current value or the current value) of the first terminal (e.g., at the first node) of the inductor (e.g., the charge storing component) and the switching output voltage value during the beginning and the end of the energizing phase. In these and other aspects of the present disclosure, the controller may determine at least one of the voltage value (e.g., the input voltage value or the voltage value) of the first terminal, the current value (e.g., the input current value or the current value) of the first terminal, or the switching output voltage value of the second terminal (e.g., at the second node) of the inductor during the beginning or the end of the energizing phase.

In some aspects of the present disclosure, the controller may determine an electrical characteristic of the inductor (e.g., the charge store component) using the determined values. In these and other aspects of the present disclosure, the controller may determine a real inductance value of the inductor using the input voltage value, the input current value, the voltage value, the current value, the switching output voltage value, the output current value, or some combination thereof. In addition, the controller may determine the electrical characteristic of the inductor by interpolating the input voltage value, input current value, voltage value, current value, switching output voltage value, output current value, or some combination thereof.

In some aspects of the present disclosure, the controller may determine a real inductance rating (e.g., an inductance curve) of the inductor based on the interpolation of the input voltage value, input current value, voltage value, current value, switching output voltage value, output current value, or some combination thereof. In these and other examples, the controller may interpolate the real inductance rating of the inductor based on the input voltage value, input current value, voltage value, current value, switching output voltage value, output current value, or some combination thereof.

The controller may determine the electrical characteristic (e.g. the voltage across the inductor u(t)) of the inductor according to the following equation:

$$u(t) = V(Lx) - VoN = L\cdot(di_N(t))/dt = L\cdot(i_N - i_{N-1})/t_{oN} \quad (3)$$

In equation (3),

- V(Lx) designates the voltage value of the first terminal of the inductor (which is usually substantially 0 V at the beginning and at the end of every phase of the SIMO switching, e.g. in case the SIMO converter is operated in DCM mode—in this case, substantially no electrical current is flowing on the inductor);
- VoN designates the respective output voltage on an converter output (or converter output rail);
- L designates the inductivity of the inductor;
- $i_N$ designates the electrical current on the inductor during the respective de-energizing time period for the converter output N;
- $i_{N-1}$ designates the electrical current on the inductor during the respective de-energizing time period for the converter output N-1 (e.g. during the de-energizing time period immediately before the de-energizing time period for converter output N, in other words, there is no other de-energizing time period between the de-energizing time period for $i_{N-1}$ and the de-energizing time period for $i_{N-1}$, only e.g. exactly one energizing time period); and
- $t_{oN}$ designates the time duration of the de-energizing time period for the converter output N.

In some aspects of the present disclosure, the controller may control the switches in accordance with the electrical characteristic of the inductor. In these and other aspects of the present disclosure, the controller may control the switches to compensate for inductor derating due to increased current on the inductor. For example, the controller may control the switches to either increase or decrease a duty cycle of the switches.

In some aspects of the present disclosure, the controller may control the switches in accordance with the DCM. In these and other aspects of the present disclosure, if the electrical characteristic is determined such that causing the inductor cycles to be discontinuous would improve performance of the SIMO converter, the controller may cause the switches to operate in accordance with the DCM.

In some aspects of the present disclosure, the inductor may be replaced by a capacitor and the various operations discussed in the present disclosure may be performed using the capacitor instead of the inductor. In these and other aspects of the present disclosure, the electrical characteristic of the capacitor may include a capacity of the capacitor.

In some aspects, a fourth switch may be electrically coupled between the second terminal of the inductor and the switching output voltage. In these and other aspects of the present disclosure, a fifth switch may be electrically coupled between the second terminal of the inductor and the input voltage.

One or more aspects described in the present disclosure may minimize timing errors that may cause efficiency in the SIMO converter to be reduced. In addition, one or more aspects described in the present disclosure may, under defined loads, adapt timing (e.g., adapt duty cycles of the switches) to compensate for over inducting derating. These aspects of the present disclosure may replace external inductors with the inductor including known inductor curve characteristics.

In some aspects of the present disclosure, functions described in regards to the SIMO converter may be implemented by a SISO converter using oversampling.

In accordance with one or more aspects of the present disclosure, the controller may control the switches such that a voltage ripple of the switching output voltage value is reduced. In addition, in accordance with one or more aspects of the present disclosure, the controller may control the switches based on the determined electrical characteristic to reduce or eliminate inaccuracies associated with the control feedback computations or timing errors.

The SIMO converter 104 may recycle power stored on one or more of the output capacitors. The SIMO converter 104 may recycle the power to a storage capacitor. The power stored on the storage capacitor may be used to charge the inductor 202 during a subsequent inductor cycle. Alternatively, the SIMO converter 104 may recycle the power to charge the inductor 202 for a subsequent inductor cycle.

According to an aspect of the disclosure, the SIMO converter may be configured to recycle unused power using one or more power storage devices (e.g. one or more capacitors). That is, unused residual charges in the SIMO converter may be collected and stored, and then used as additional energy sources, which may result in improved efficiency of the circuit. Otherwise stated, since many electrical components have similar voltage requirements (e.g. voltage domains), unused power for one component can be temporarily stored and then redirected to another component. For example, BLE and Wi-Fi devices have similar voltage domains, which permits unused voltage for a converter output connected to a BLE device to be stored on a capacitor for a converter output connected to a Wi-Fi module. Furthermore, even if the components have dissimilar voltage requirements, it may be possible to power a second component with stored voltage from the first component.

Figure 49:
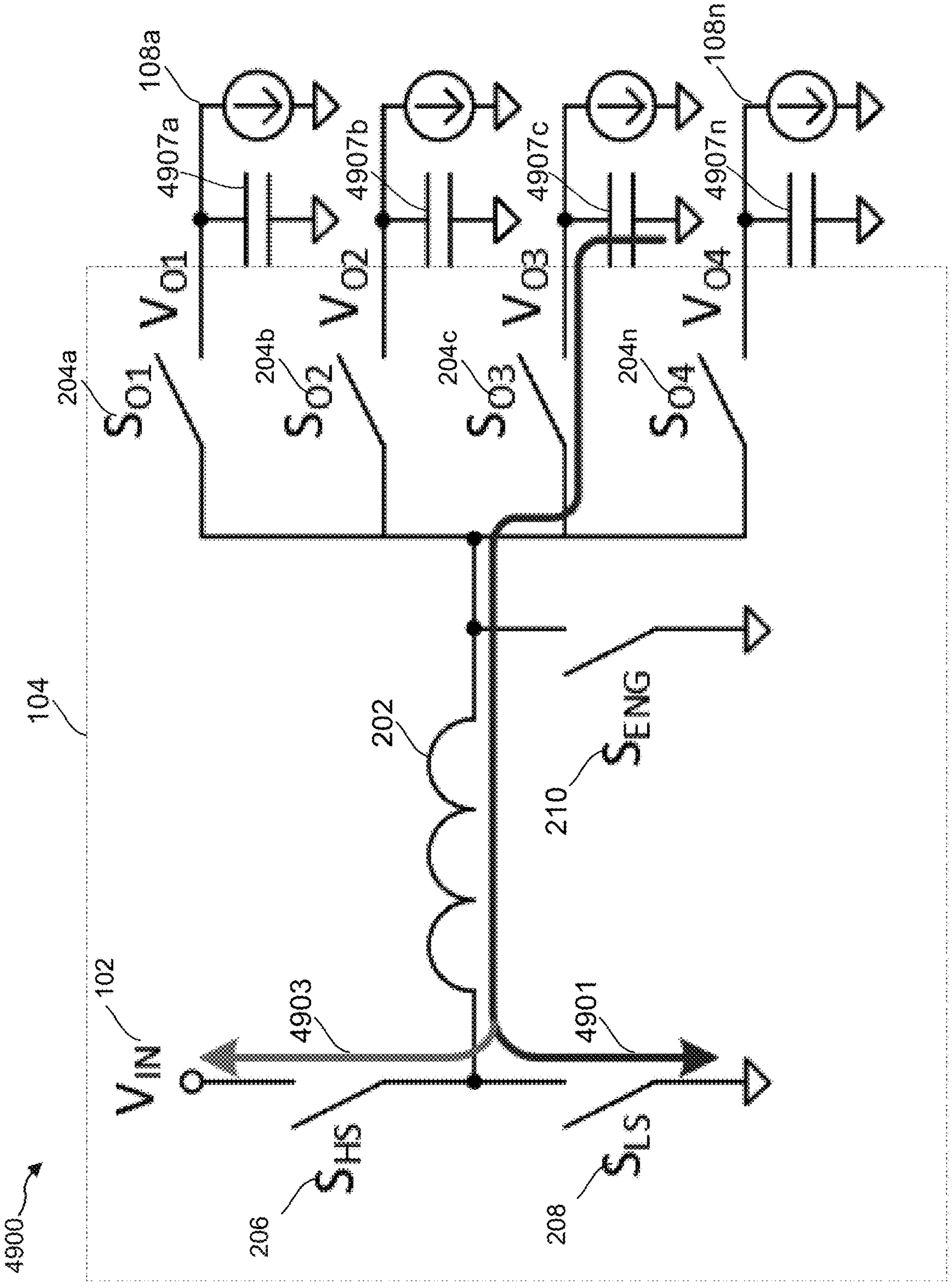
FIG. 49 exemplarily illustrates a block diagram of a system that includes the SIMO.

FIG. 49 illustrates a block diagram of an example system 4900 that includes the SIMO converter 104, in accordance with at least one aspect described in the present disclosure. In some aspects of the present disclosure, the SIMO 104 may correspond to the SIMO converter 104 described elsewhere in the present disclosure. In some aspects of the present disclosure, the system 4900 may include multiple converter outputs to provide a switching output voltage

108_a-n_ at different values at two or more of the converter outputs. In some aspects of the present disclosure, the system 4900 may include one or more LDOs (not illustrated). In some aspects of the present disclosure, the LDOs may correspond to the LDOs 106 described elsewhere in the present disclosure.

The system 4900 may be configured to recycle voltage stored on one or more of output capacitors 4907_a-n_ during a discharge time period. In some aspects of the present disclosure, the voltage stored on one or more of the output capacitors 4907_a-n_ may be recycled so as to be used during a subsequent inductor cycle. In these and other aspects of the present disclosure, the switch controller (not illustrated) may control the switches 204_a-n_, 210, 206, 208 such that during the discharge time period, the voltage stored on one or more of the output capacitors 4907_a-n_ is transferred to another component within the system 4900.

In some aspects of the present disclosure, the switch controller may control the switches 204_a-n_, 210, 206, 208 such that during the discharge time period, the voltage stored on one or more of the output capacitors 4907_a-n_ is used to charge the inductor 202. During the discharge time period, in these and other aspects of the present disclosure, the switch controller may controller the switches 204_a-n_, 210, 206, 208 such that current (represented by arrow 4901 in FIG. 49) may propagate from an output capacitor (illustrated in FIG. 49 as capacitor 4907_c_) to the reference potential. In these and other aspects of the present disclosure, the current being propagated from the output capacitor 4907_c_ to the reference potential may cause current to be stored on the inductor 202.

In some aspects of the present disclosure, the switch controller may control the switches 204_a-n_, 210, 206, 208 such that during the discharge time period, the voltage stored on the output capacitor 4907_c_ is transferred to a storage capacitor (not illustrated). In some aspects of the present disclosure, the storage capacitor may be electrically coupled to the input terminal 102 of the SIMO 104. In these and other aspects of the present disclosure, the storage capacitor may be electrically coupled to the input terminal 102 via a switch (not illustrated).

During the discharge time period, in some aspects of the present disclosure, the switch controller may controller the switches 204_a-n_, 210, 206, 208 such that current (represented by arrow 4903 in FIG. 49) may propagate from the output capacitor (illustrated in FIG. 49 as capacitor 4907_c_) to the input terminal 102. In these and other aspects of the present disclosure, the current being propagated from the output capacitor 4907_c_ to the input terminal 102 may cause current to be stored on the inductor 202 or the voltage to be stored on the storage capacitor electrically coupled to the input terminal 102. In subsequent inductor cycles, the voltage stored on the storage capacitor may provide at least a portion of the input voltage.

Figure 50:
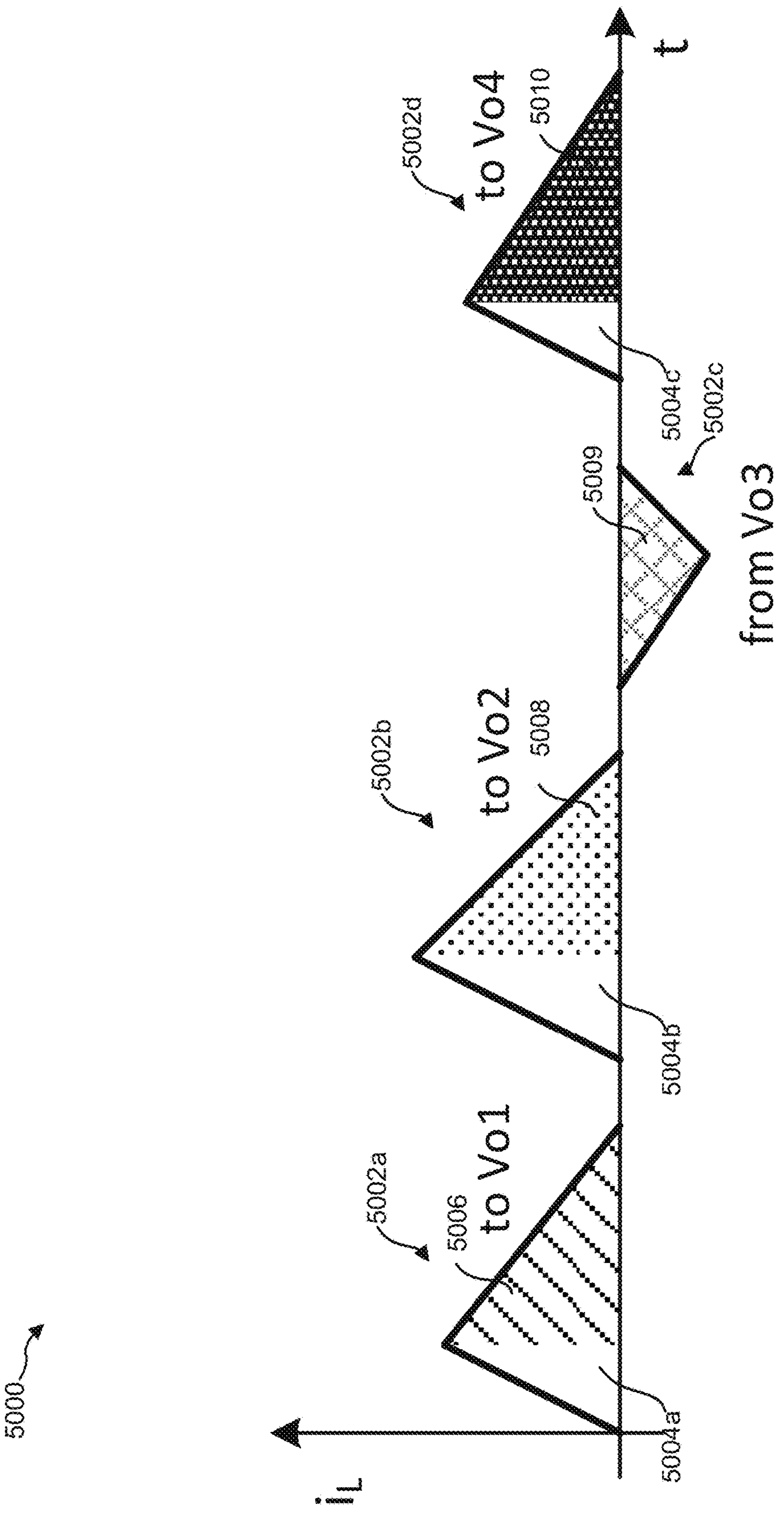
FIG. 50 illustrates a graphical representation of a simulation in which either the inductor is electrically coupled to a single electrical device or an output capacitor is discharged during disjunct inductor cycles.

FIG. 50 illustrates a graphical representation 5000 of a simulation in which either the inductor is electrically coupled to a single electrical device or an output capacitor is discharged during disjunct inductor cycles, in accordance with at least one aspect described in the present disclosure. In FIG. 50, waveforms 5002_a-d_ represent current on the inductor during the inductor cycles. The waveforms 5002_a-d_ illustrate how the current on the inductor changes over time during the inductor cycles. One or more of the inductor cycles may include a charge portion, a conduction portion, or a discharge portion. The charge portions are illustrated in FIG. 50 as portions 5004_a-c_. The conduction portions are illustrated in FIG. 50 as portions 5006, 5008, 5010. The discharge portion is illustrated in FIG. 50 as portion 5009.

The charge portions 5004_a-c_ illustrate a change in the current on the inductor due to the inductor being charged using the input voltage. In some aspects of the present disclosure, the inductor may be charged using the input voltage as a positive voltage. For example, the charge portions 5004_a-c_ as illustrated in FIG. 50 represent an increase in the current on the inductor due to the inductor being charged using the input voltage or voltage recycled and stored on a storage capacitor.

In some aspects of the present disclosure, the inductor may be charged using voltage stored on an output capacitor of the system. For example, the discharge portion 5009 represents a change (in the negative direction) in the current on the inductor due to an output capacitor being discharged during the corresponding inductor cycle 5002_c_. The current on the inductor, during the corresponding discharge portion 5009 may increase in the negative direction because the current due to the voltage stored on the output capacitor flows in the opposite direction than the current due to the input voltage.

In some aspects of the present disclosure, the discharge portion 5009 may also represent a decrease in current on the inductor as the voltage stored in the output capacitor reaches a threshold as the stored voltage decreases. In these and other aspects of the present disclosure, as the current propagates the inductor during the discharge portion 5009, the voltage stored on the output capacitor may be reduced. When a threshold amount of the stored voltage (e.g., substantially half) is dissipated, the current on the inductor may start to decrease due to the decreased stored voltage.

The conduction portions 5006, 5008, 5010 illustrate a decrease in the current on the inductor due to the inductor being disconnected from the input voltage and being electrically coupled to an electrical device via a converter output of the SIMO converter during the conduction portions 5006, 5008, 5010. For example, in some aspects of the present disclosure, each of the conduction portions 5006, 5008, 5010 may correspond to the inductor being electrically coupled to different electronic devices via a different converter output of the SIMO converter. As another example, in some aspects of the present disclosure, each of the conduction portions 5006, 5008, 5010 may correspond to the inductor being electrically coupled to the same electronic device via a converter output of the SIMO converter.

Figure 51:
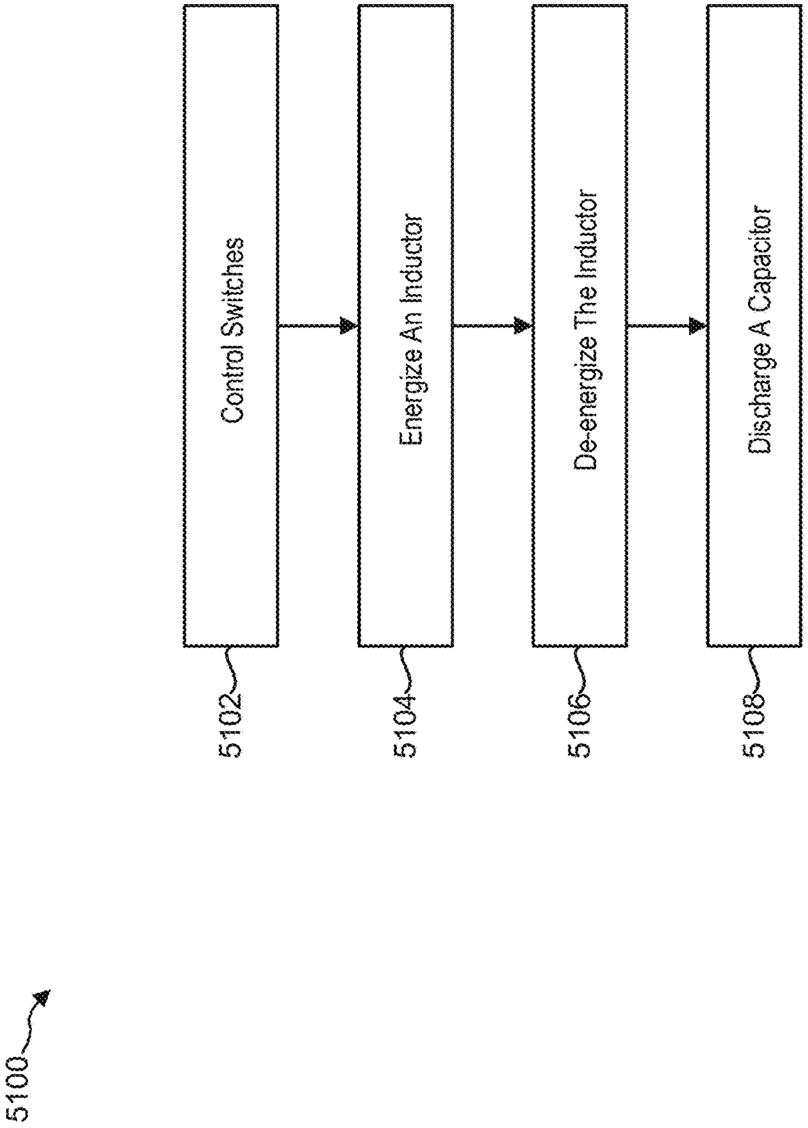
FIG. 51 exemplarily illustrates a flowchart of a method of operating a switched power converter.

FIG. 51 illustrates a flowchart of an example method 5100 of operating a switched power converter, in accordance with at least one aspect described in the present disclosure. The method 5100 may include one or more blocks 5102, 5104, 5106, or 5108. Although illustrated with discrete blocks, the operations associated with one or more of the blocks of the method 5100 may be divided into additional blocks, combined into fewer blocks, or eliminated, depending on the particular implementation.

At block 5102, switches may be controlled. In some aspects of the present disclosure, the switches may be controlled to provide a switching output voltage to a converter output. In these and other aspects of the present disclosure, the switching output voltage may be provided to the converter output in response to an input voltage supplied to an inductor.

At block 5104, method may include energizing the inductor. In some aspects of the present disclosure, method may include energizing the inductor in an inductor energizing time period.

At block 5106, method may include de-energizing the inductor. In some aspects of the present disclosure, method may include de-energizing inductor in a de-energizing time period.

At block 5108, method may include discharging a capacitor. In some aspects of the present disclosure, the capacitor may be coupled to a converter output. In these and other aspects of the present disclosure, the capacitor may include an output capacitor. In addition, in some aspects of the present disclosure, the capacitor may be discharged in a discharge time period. In these and other aspects of the present disclosure, the discharge time period may occur outside the inductor energizing time period or the inductor de-energizing time period. Further, in some aspects of the present disclosure, the capacitor may be discharged to store the discharged energy in an energy storage device. The energy storage device may be located within or outside the SIMO converter. In various aspects, the energy storage device may be a capacitor of a converter output rail currently not used. In various aspects, the energy storage device may be an additional capacitor arranged upstream the inductor 202. In various aspects, the energy storage device may be an additional capacitor arranged downstream the inductor 202. In various aspects, the energy storage device may be an additional capacitor connected to a tap terminal of the inductor which may be selectively coupled to the inductor 202 between the two inductor terminals at the respective end regions of the inductor 202.

Modifications, additions, or omissions may be made to the method 5100 without departing from the scope of the present disclosure. For example, the operations of the method 5100 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

Figure 52:
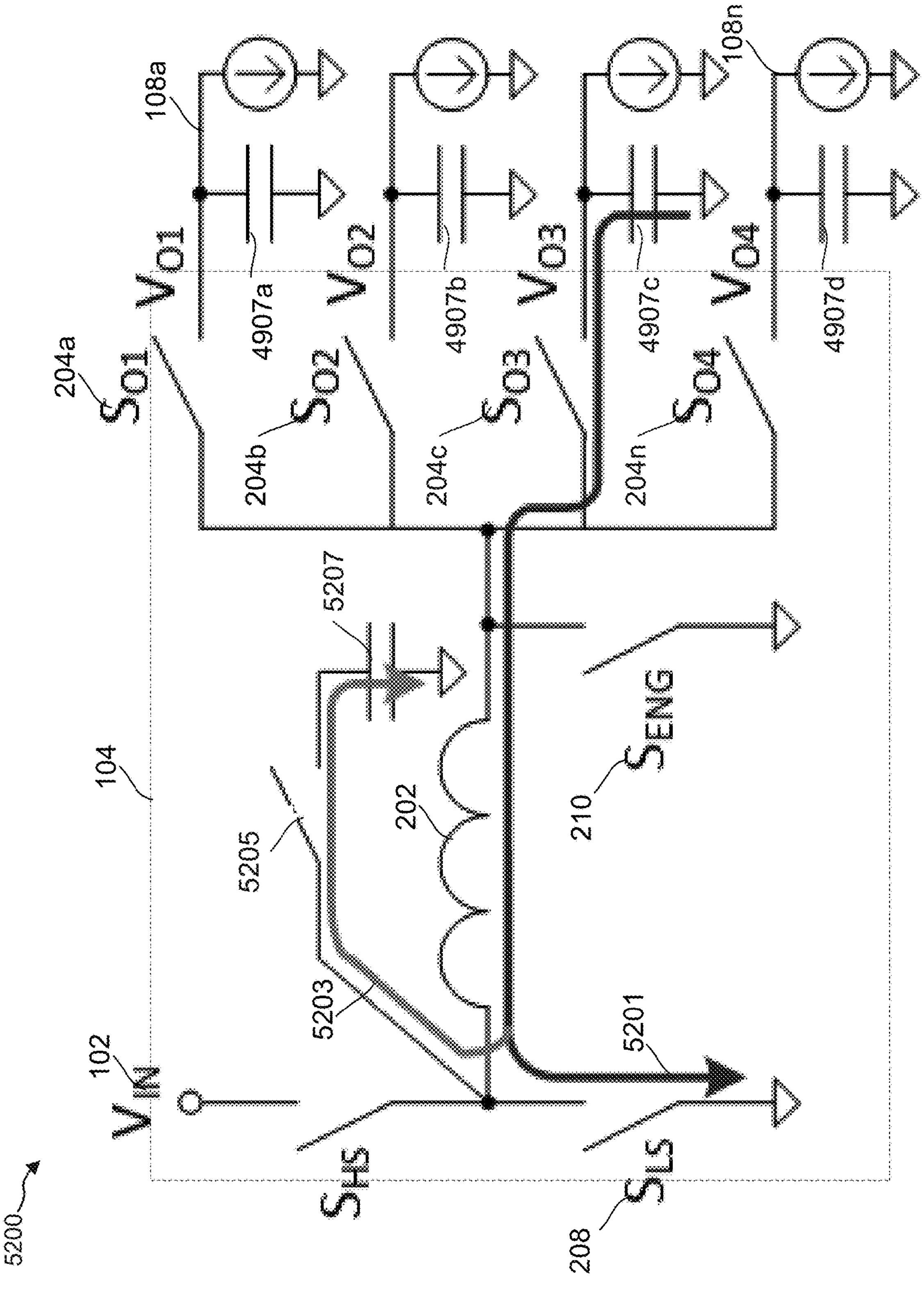
FIG. 52 exemplarily illustrates a block diagram of another system that includes the SIMO.

FIG. 52 illustrates a block diagram of another example system 5200 that includes the SIMO converter 104, in accordance with at least one aspect described in the present disclosure. In some aspects of the present disclosure, the SIMO converter 104 may correspond to the SIMO converter 104 described elsewhere in the present disclosure. In some aspects of the present disclosure, the system 5200 may include one or more LDOs (not illustrated). In some aspects of the present disclosure, the LDOs may correspond to the LDOs 106 described elsewhere in the present disclosure.

The system 5200 may be configured to recycle voltage stored on one or more of output capacitors 4907*a-n* during a discharge time period. In some aspects of the present disclosure, the voltage stored on one or more output capacitors 4907*a-n* may be recycled so as to be used during a subsequent inductor cycle. The voltage stored on one or more of the output capacitors 4907*a-n* may be recycled from one or more output capacitor 4907*a-n* to an auxiliary capacitor 5207.

The switch controller (not illustrated) may control an auxiliary switch 5205 to electrically couple the auxiliary capacitor 5207 to the first terminal of the inductor 202 during the discharge portions. The switch controller may control the switches 204*a-n*, 210, 206, 208, the auxiliary switch 5205, or some combination thereof such that during the discharge time period, the voltage stored on one or more of the output capacitors 4907*a-n* is transferred to the auxiliary capacitor 5207.

In addition, the switch controller may control the switches 204*a-n*, 210, 206, 208 such that, during the discharge time period, at least a portion of the voltage stored on one or more of the output capacitors 4907*a-n* is used to charge the inductor 202. During the discharge time period, the switch controller may controller the switches 204*a-n*, 210, 206, 208 such that current (represented by arrow 5201 in FIG. 52) may propagate from an output capacitor (illustrated in FIG. 52 as capacitor 4907*c*) to the reference potential. In these and other aspects of the present disclosure, the current being propagated from the output capacitor 4907*c* to the reference potential may cause current to be stored on the inductor 202.

In some aspects of the present disclosure, the switch controller may control the switches 204*a-n*, 210, 206, 208, the auxiliary switch 5205, or some combination thereof such that during the discharge time period, the voltage stored on the output capacitor 4907*c* is transferred to the auxiliary capacitor 5207 (e.g., a storage capacitor). During the discharge time period, the switch controller may controller the switches 204*a-n*, 210, 206, 208, the auxiliary switch 5205, or some combination such that current (represented by arrow 5203 in FIG. 52) may propagate from an output capacitor (illustrated in FIG. 52 as capacitor 4907*c*) to the auxiliary capacitor 5207.

The system 5200 may use the inductor 202 for recycling the power stored on the output capacitors 4907 to the auxiliary capacitor 5207. In addition, the auxiliary capacitor 5207 may be implemented as an isolated capacitor that is isolated from the inductor 202 or the switches 204 by the auxiliary switch 5205.

Figure 53:
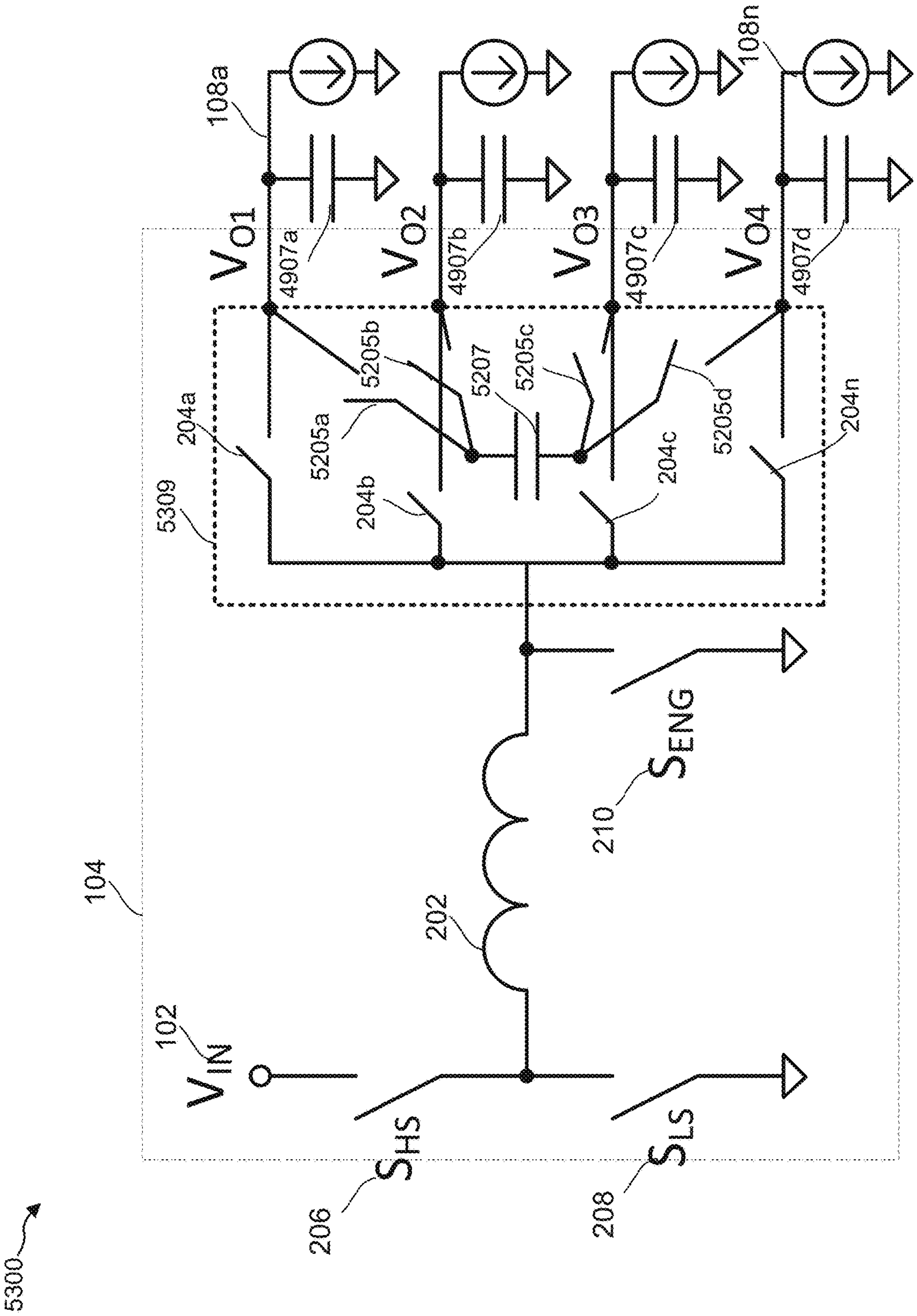
FIG. 53 exemplarily illustrates a block diagram of another system that includes the SIMO.

FIG. 53 illustrates a block diagram of another example system 5300 that includes the SIMO converter 104, in accordance with at least one aspect described in the present disclosure. In some aspects of the present disclosure, the SIMO converter 104 may correspond to the SIMO converter 104 described elsewhere in the present disclosure. The system 5200 may include one or more LDOs (not illustrated). The LDOs may correspond to the LDOs 106 described elsewhere in the present disclosure.

The system 5300 may include a switch capacitor network 5309 (also referred to as a switch network 5309). The switch capacitor network 5309 may include auxiliary switches 5205*a-d* and the auxiliary capacitor 5207. The switch capacitor network 5309 may be configured to recycle voltage stored on one or more of output capacitors 4907*a-n* to the auxiliary capacitor 5207 during the discharge time period.

The switch controller (not illustrated) may control the switches 204*a-n*, 210, 206, 208, the auxiliary switches 5205*a-d*, or some combination thereof such that during the discharge time period, the voltage stored on one or more of the output capacitors 4907*a-n* is transferred to the auxiliary capacitor 5207.

The system 5300 may not use the inductor 202 for recycling the power stored on the output capacitors 4907.

Figure 54:
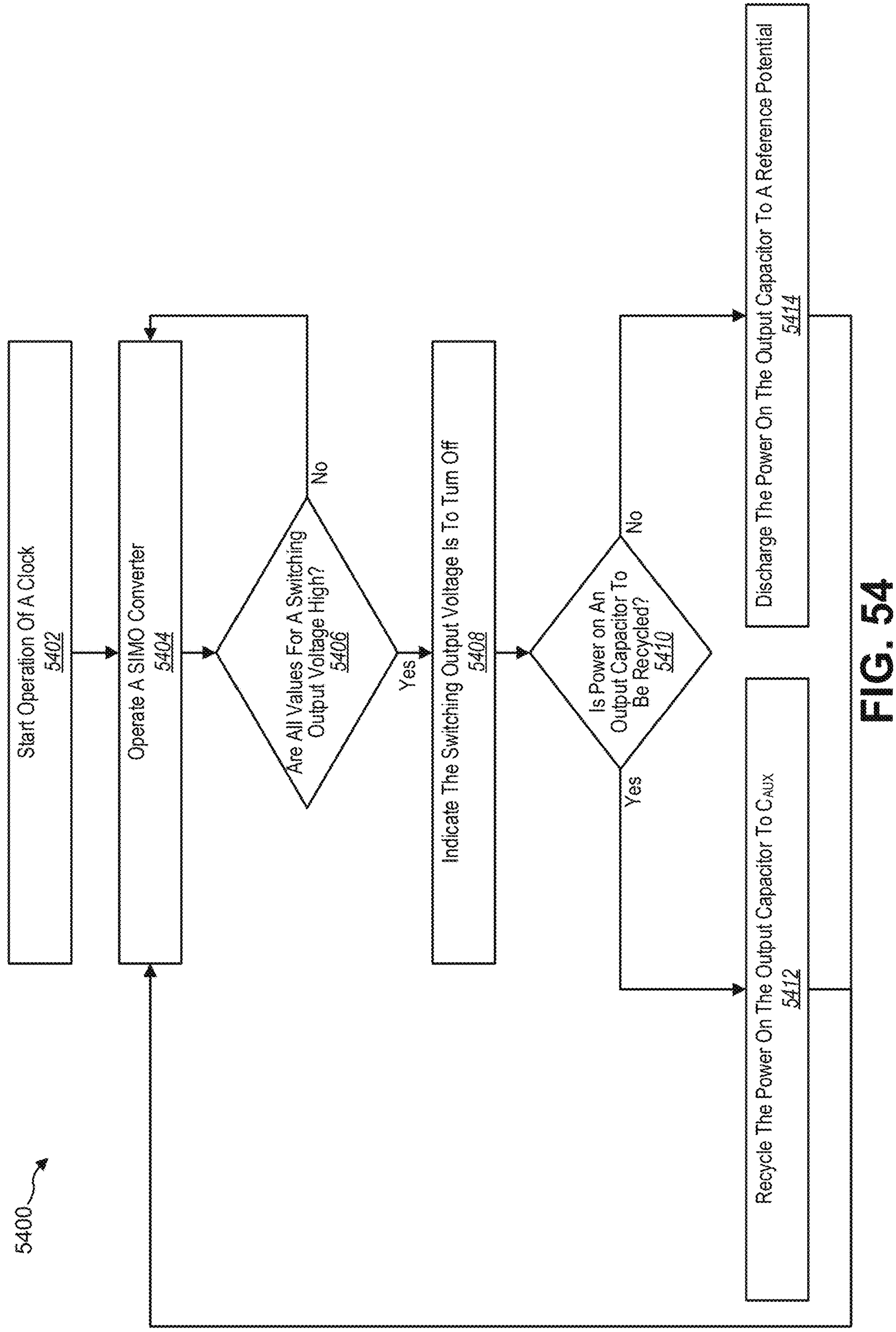
FIG. 54 exemplarily illustrates a flowchart of a method of operating a SIMO converter.

FIG. 54 illustrates a flowchart of an example method 5400 of operating a SIMO converter, in accordance with at least one aspect described in the present disclosure. The method 5400 may include one or more blocks 5402 through 5414. Although illustrated with discrete blocks, the operations associated with one or more of the blocks of the method 5400 may be divided into additional blocks, combined into fewer blocks, or eliminated, depending on the particular implementation.

The method 5400, at block 5402, may include starting operation of a clock. In some aspects of the present disclosure, the clock may include a clock signal for operating the SIMO converter, a switch controller, or some combination thereof. Block 5402 may be followed by block 5404.

The method 5400, at block 5404, may include operating the SIMO converter. In some aspects of the present disclosure, the switch controller may control the switches within the SIMO converter, the auxiliary switches, or some combination thereof. Block 5404 may be followed by block 5406.

The method 5400, at block 5406, may include determining whether all values for the switching output voltage are high. In some aspects of the present disclosure, the switch controller may determine whether all the values for the switching output voltage (e.g., the value of the switching output voltage on the corresponding converter outputs) are high. The switch controller may determine that the values for the switching output voltage are high if the values for the switching output voltage are above a threshold value. In some aspects of the present disclosure, the threshold value of the values for the switching output voltage may include 1.7 V to 7 V, e.g. 3 V to 5 V. If all of the values for the switching output voltage are high, block 5406 may be followed by block 5408. If all of the values for the switching output voltage are not high, block 5406 may be followed by block 5404. Block 5404 and block 5406 may repeat until all of the values for the switching output voltage are high.

The method 5400, at block 5408, may include indicating the switching output voltage is to turn off. In some aspects of the present disclosure, the switch controller may determine that the switching output voltage is to stop being provided to a corresponding converter output. Block 5408 may be followed by block 5410.

The method 5400, at block 5410, may include determining whether power on an output capacitor is to be recycled. In some aspects of the present disclosure, the switch controller may determine whether the power on one or more output capacitor is to be recycled to an auxiliary capacitor. If the power on one or more output capacitor is to be recycled, block 5410 may be followed by block 5412. If the power on one or more output capacitor is not to be recycled, block 5410 may be followed by block 5414.

The method 5400, at block 5412, may include recycling the power on the output capacitor to the auxiliary capacitor. In some aspects of the present disclosure, the switch controller may control the switches within the SIMO converter, the auxiliary switches, or some combination thereof to transfer the power stored on the output capacitors to the auxiliary capacitor.

The method 5400, at block 5414, may include discharging the power on the output capacitor to a reference potential. In some aspects of the present disclosure, the switch controller may control the switches within the SIMO converter, the auxiliary switches, or some combination thereof to discharge the power stored on the output capacitors to the reference potential (e.g., ground potential).

In some aspects of the present disclosure, the output capacitors of the SIMO converter may be used to smooth the switching output voltage (e.g., to reduce ripples in the switching output voltage). The output capacitors may store voltage when the switching output voltage is being provided to a corresponding converter output. The output capacitors may store voltage outside of charging periods or conducting periods of the SIMO converter. In some aspects of the present disclosure, the voltage stored on the output capacitors may be discharged (e.g., discarded) to the reference potential (e.g., ground) outside the corresponding inductor cycles. In other aspects of the present disclosure, the voltage stored on the output capacitors may be recycled to be used for charging the inductor in subsequent inductor cycles. In other aspects of the present disclosure, the voltage stored on the output capacitors may be used to charge the inductor for use in the subsequent inductor cycle.

In some aspects of the present disclosure, the voltage stored on the output capacitors (e.g., the energy or potential stored on the output capacitors), may be recycled and stored on a storage capacitor. In these and other aspects of the present disclosure, the storage capacitor may be selectively electrically coupled to the input of the SIMO converter. In addition, in these and other aspects of the present disclosure, the switch controller may control a switch to selectively electrically couple the storage capacitor to the input of the SIMO converter.

In some aspects of the present disclosure, during a discharge time period, the switches in the SIMO converter may be controlled such that current flows from one or more of the output capacitors to the storage capacitor to store voltage in the storage capacitor. In other aspects of the present disclosure, during a discharge time period, the switches may be controlled such that current flows from one or more of the output capacitors to the reference potential to charge the inductor.

In some aspects of the present disclosure, the discharge time period may occur outside the inductor energizing time period (e.g., the charge portions) or the inductor de-energizing time period (e.g., the conduction portions). In some aspects of the present disclosure, the discharge time period may occur partially within the inductor energizing time period (e.g., the charge portions) or the inductor de-energizing time period (e.g., the conduction portions), e.g. in case the rails of the SIMO converter between which the charges are transferred from the storage capacitor to be discharged to the energy storage device (in other words the recovery discharge path(s)) is/are substantially electrically isolated from the rails that are involved in the energizing or de-energizing of the inductor during the inductor energizing time period or the inductor de-energizing time period, respectively.

In some aspects of the present disclosure, a single output capacitor may be discharged during the discharge time periods. In other aspects of the present disclosure, multiple output capacitors may be discharged during the discharge time periods. In these and other aspects of the present disclosure, a single output capacitor may be discharged each discharge time period. In other aspects of the present disclosure, multiple output capacitors may be discharged each discharge time period.

In some aspects of the present disclosure, the switches may be controlled such that the voltage stored on one or more of the output capacitors is recycled to a different output capacitor. In these and other aspects of the present disclosure, recycling the stored voltage to a different output capacitor may reduce an amount of time for the switching output voltage to become stable during a subsequent discharge period.

In some aspects of the present disclosure, the switch controller may determine if a charging state of one or more of the output capacitors fulfills a pre-defined criterion. In these and other aspects of the present disclosure, the switch controller may control the switches to cause a discharge portion to occur if one or more of the output capacitors fulfills the pre-defined criterion. In some aspects of the present disclosure, the pre-defined criterion may include an amount of voltage (e.g., energy) stored in one or more capacitors is equal to or above a pre-defined energy threshold value.

In some aspects of the present disclosure, one or more of the switches may include a power switch.

In some aspects of the present disclosure, the system may include a converter other than the SIMO converter, the system with the different converter may recycle the power stored on one or more output capacitor in the same or similar manner as discussed above.

In some aspects of the present disclosure, the power stored on the output capacitors may be recycled to multiple locations. In these and other aspects of the present disclosure, a portion of the power stored on the output capacitors may be recycled to the storage capacitor and another portion may be recycled to the inductor.

In some aspects of the present disclosure, the power stored on the output capacitors may be recycled to another output capacitor.

The SIMO converter may provide the switching output voltage on different converter outputs at different voltage levels to a high band WiFi chain and a combined chain that includes a Bluetooth transmitter chain and a low band WiFi chain. The SIMO converter providing the switching output voltage on different converter outputs may permit the Bluetooth transmitter chain within the combined chain and the high band WiFi chain to simultaneously operate. In addition, the SIMO converter may tailor the voltage level of the switching output voltage to the Bluetooth transmitter chain and the high band chain to reduce the power consumption of the Bluetooth chain while maintaining proper operation of the high band chain.

According to an aspect of the disclosure, the SIMO converter may provide the switching output voltage within voltage domains for high band WiFi chains, a combined chain that includes a Bluetooth transmitter chain and a low band WiFi chain, or a combination thereof.

Figure 55:
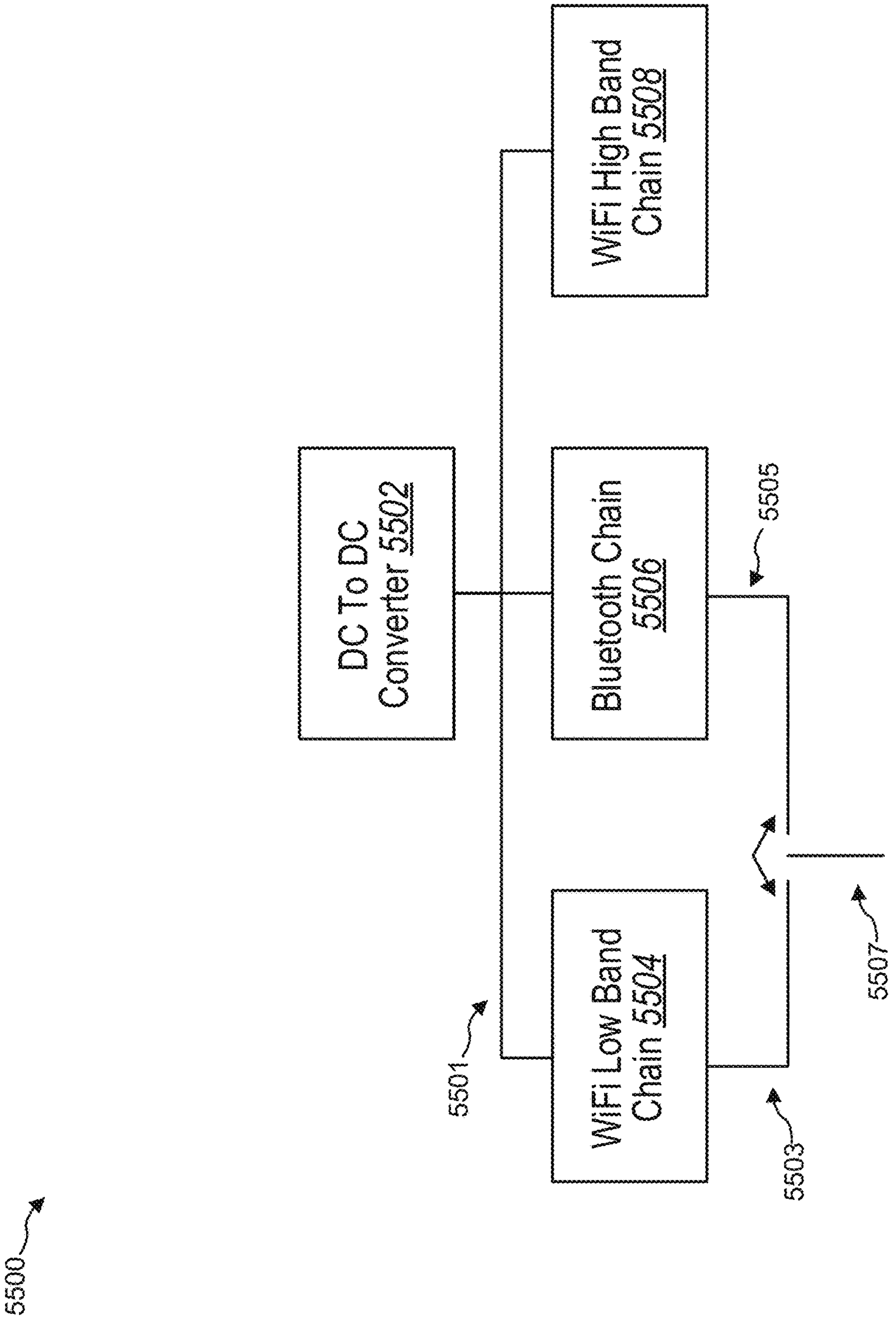
FIG. 55 exemplarily illustrates a block diagram of a radio transmitter that includes a DC to DC converter.

FIG. 55 illustrates a block diagram of an example radio transmitter 5500 that includes a DC to DC converter 5502, in accordance with at least one aspect described in the present disclosure. The radio transmitter 5500 may also include a WiFi Low Band (WLB) chain 5504, a Bluetooth (BT) chain 5506, and a WiFi High Band (WHB) chain 5508.

In some aspects of the present disclosure, the DC to DC converter 5502 may receive a DC voltage. In these and other aspects of the present disclosure, the DC to DC converter 5502 may generate an output voltage at a different DC voltage. In these and other aspects of the present disclosure, the voltage level of the output voltage may be based on one or more settings of the WLB chain 5504, the BT chain 5506, or the WHB chain 5508.

In some aspects of the present disclosure, the WLB chain 5504, the BT chain 5506, or the WHB chain 5508 may be electrically coupled to the DC to DC converter 5502 via a single rail 5501. In these and other aspects of the present disclosure, the WLB chain 5504, the BT chain 5506, or the WHB chain 5508 may receive the output voltage from the DC to DC converter 5502 via the rail 5501.

In some aspects of the present disclosure, the WLB chain 5504 may transmit radio signals according to wireless local area network (WLAN) standards. In these and other aspects of the present disclosure, the WLB chain 5504 may transmit the radio signals in a low band according to WiFi protocols.

In some aspects of the present disclosure, the WLB chain 5504 may be electrically coupled to a second rail 5503. In these and other aspects of the present disclosure, the WLB chain 5504 may receive an input voltage via the second rail 5503.

In some aspects of the present disclosure, the BT chain 5506 may transmit BT radio signals. In these and other aspects of the present disclosure, the BT chain 5506 may transmit the BT radio signals according to BT standards.

In some aspects of the present disclosure, the BT chain 5506 may be electrically coupled to the second rail 5505. In these and other aspects of the present disclosure, the BT chain 5506 may receive an input voltage via the second rail 5503.

In some aspects of the present disclosure, the WHB chain 5508 may transmit radio signals according to WLAN standards. In these and other aspects of the present disclosure, the WHB chain 5508 may transmit the radio signals in a high band according to WiFi protocols.

In some aspects of the present disclosure, the WLB chain 5504, the BT chain 5506, or the WHB chain 5508 may receive the output voltage as a transmit signal to be transmitted by the WLB chain 5504, the BT chain 5506, or the WHB chain 5508. In addition, in some aspects of the present disclosure, the WLB chain 5504, the BT chain 5506, or the WHB chain 5508 may simultaneously operate and transmit the corresponding radio signals using the output voltage.

In some aspects of the present disclosure, the DC to DC converter 5502 providing the output voltage via the single rail 5501 to the BT chain 5506, or the WHB chain 5508 may cause degradation of the radio signals. For example, the DC to DC converter 5502 providing the output voltage via the single rail 5501 to the BT chain 5506 and the WLB chain 5504 may cause substantially one decibel degradation in performance due to mutual loading compared to just the WLB chain 5504 operating using the output voltage.

In some aspects of the present disclosure, when the BT chain 5506 and the WHB chain 5508 are both transmitting using the output voltage, the DC to DC converter 5502 may provide the output voltage at a level to permit the BT chain 5506 and the WHB chain 5508 to both properly operate. The DC to DC converter 5502 increasing the level of the output voltage based on the settings of the WHB chain 5508 while the BT chain 5506 is also transmitting may increase power consumption by the BT chain 5506.

Figure 56:
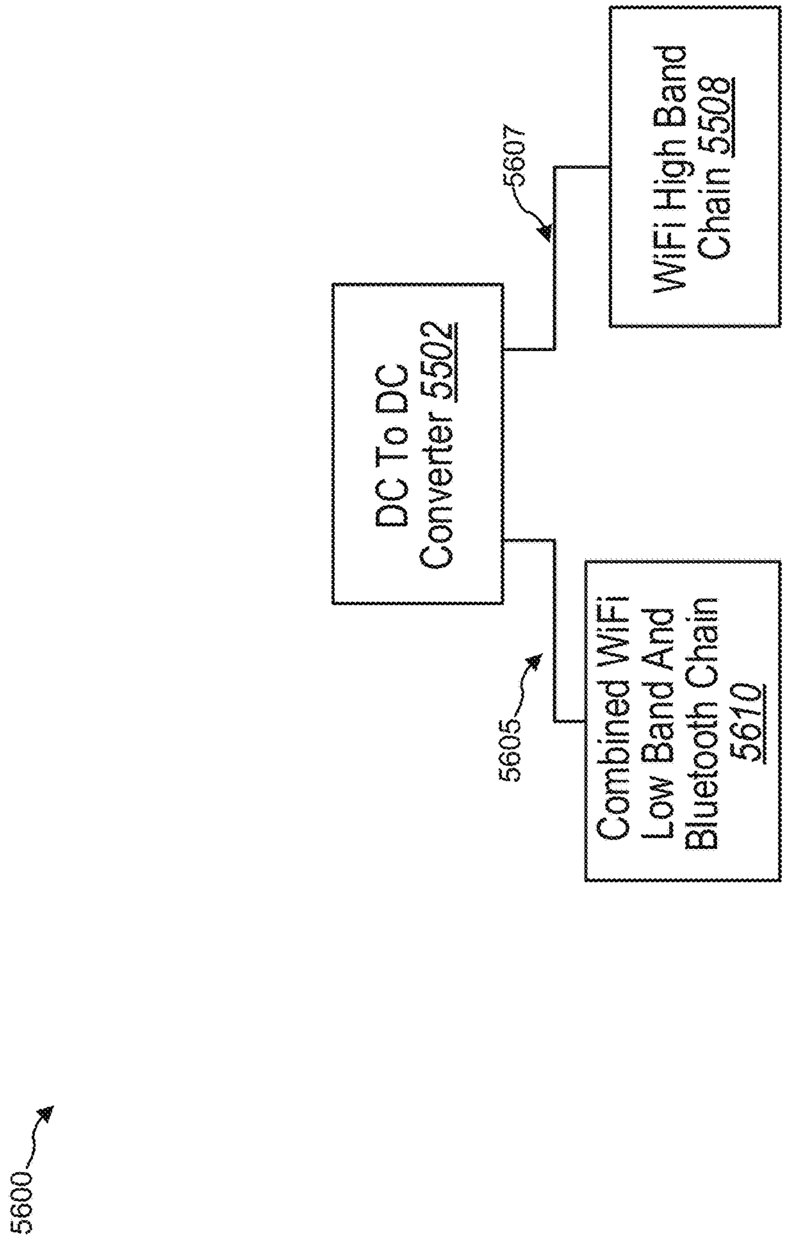
FIG. 56 exemplarily illustrates a block diagram of another radio transmitter that includes two DC to DC converters.

FIG. 56 illustrates a block diagram of another example radio transmitter 5600 that includes the DC to DC converter 5502, in accordance with at least one aspect described in the present disclosure. The radio transmitter 5600 may also include a combined WLB and BT chain 5610 and/or the WHB chain 5508.

In some aspects of the present disclosure, the DC to DC converter 5502 may receive a DC voltage. In these and other aspects of the present disclosure, the DC to DC converter 5502 may generate an output voltage at a different voltage. In these and other aspects of the present disclosure, the voltage level of the output voltage may be based on one or more settings of the combined WLB and BT chain 5610 or the WHB chain 5508.

In some aspects of the present disclosure, the combined WLB and BT chain 5610 may be electrically coupled to the DC to DC converter 5502 via a rail 5605. In these and other aspects of the present disclosure, the WHB chain 5508 may be electrically coupled to the DC to DC converter 5502 via a rail 5607.

In some aspects of the present disclosure, the combined WLB and BT chain 5610 may transmit radio signals according to WLAN standards. In these and other aspects of the present disclosure, the combined WLB and BT chain 5610 may transmit the radio signals in a low band according to WiFi protocols. In some aspects of the present disclosure, the combined WLB and BT chain 5610 may also transmit BT radio signals. In these and other aspects of the present disclosure, the combined WLB and BT chain 5610 may transmit the BT radio signals according to BT standards.

In some aspects of the present disclosure, the combined WLB and BT chain 5610 may receive the output voltage from the DC to DC converter 5502 via the rail 5605. In these and other aspects of the present disclosure, the WHB chain 5508 may receive the output voltage from the DC to DC converter via the rail 5607.

In some aspects of the present disclosure, the combined WLB and BT chain 5610 may operate and simultaneously transmit the corresponding radio signals using the output voltage received via the rail 5605. In these and other aspects of the present disclosure, the combined WLB and BT chain 5610 simultaneously transmitting the BT radio signals and WLB radio signals using the output voltage as the transmit signal received via the rail 5605 (e.g., a single rail), may reduce efficiency of the BT radio signals. In addition, in some aspects of the present disclosure, the efficiency of the BT radio signals may be reduced due to a WiFi power amplifier in a WiFi portion of the combined WLB and BT chain 5610 including a higher maximum power (Pmax) than devices within a BT portion of the combined WLB and BT chain 5610.

Figure 57:
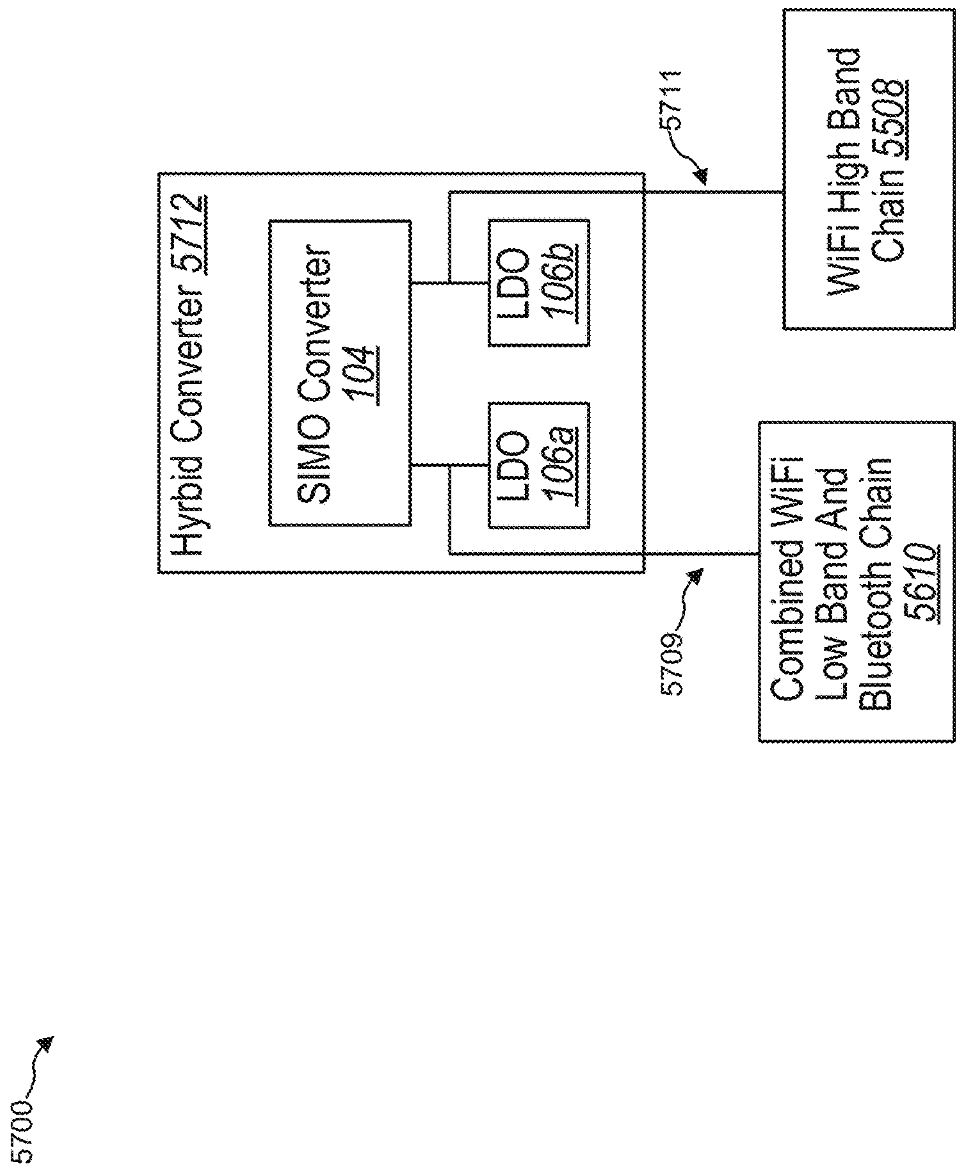
FIG. 57 exemplarily illustrates a block diagram of a radio transmitter that includes a hybrid converter.

FIG. 57 illustrates a block diagram of an example radio transmitter 5700 that includes a hybrid converter 5712, in accordance with at least one aspect described in the present disclosure. In some aspects of the present disclosure, the hybrid converter 5712 may correspond to the hybrid converters described elsewhere in the present disclosure. The hybrid converter 5712 may include the SIMO converter 104 and one or more LDOs 106*a,b*.

In some aspects of the present disclosure, the SIMO converter 104 may correspond to the SIMO converter 104 described elsewhere in the present disclosure. In these and other aspects of the present disclosure, the LDOs 106*a,b* may correspond to the LDOs 106 described elsewhere in the present disclosure.

In some aspects of the present disclosure, the radio transmitter 5700 may include a switch controller (not illustrated) configured to control the switches within the SIMO converter 104. In these and other aspects of the present disclosure, the switch controller may control the switches to selectively apply the switching output voltage to different converter outputs of the SIMO converter 104.

In some aspects of the present disclosure, the switches of the SIMO converter 104 may provide the switching output voltage as transmit signals to one or more converter outputs during duty cycles of the SIMO converter 104. In these and other aspects of the present disclosure, the switches of the SIMO converter 104 may provide the switching output voltage 108*a-n* at different values at two or more of the converter outputs. Further, in some aspects of the present disclosure, the switch controller may control the switches of the SIMO converter 104 to provide the switching output voltage in response to the input voltage supplied to the inductor.

In some aspects of the present disclosure, the switch controller may control the switches of the SIMO converter 104 to provide the switching output voltage during the duty cycles of the SIMO converter 104.

In some aspects of the present disclosure, the WHB chain 5508 may be electrically coupled to a converter output of the SIMO converter 104 via a rail 5711. In these and other aspects of the present disclosure, the WHB chain 5508 may receive the switching output voltage as a transmit signal via the rail 5711.

In some aspects of the present disclosure, the combined WLB and BT chain 5610 may be electrically coupled to a converter output of the SIMO converter 104 via a rail 5709. In these and other aspects of the present disclosure, the combined WLB and BT chain 5610 may receive the switching output voltage as a transmit signal via the rail 5709.

In some aspects of the present disclosure, instead of the combined WLB and BT chain 5610, the radio transmitter 5700 may include the WLB chain 5504 or the BT chain 5506. In these and other aspects of the present disclosure, the WLB chain 5504 and the BT chain 5506 may be electrically coupled to different converter outputs of the SIMO converter 104 via different rails.

Figure 58:
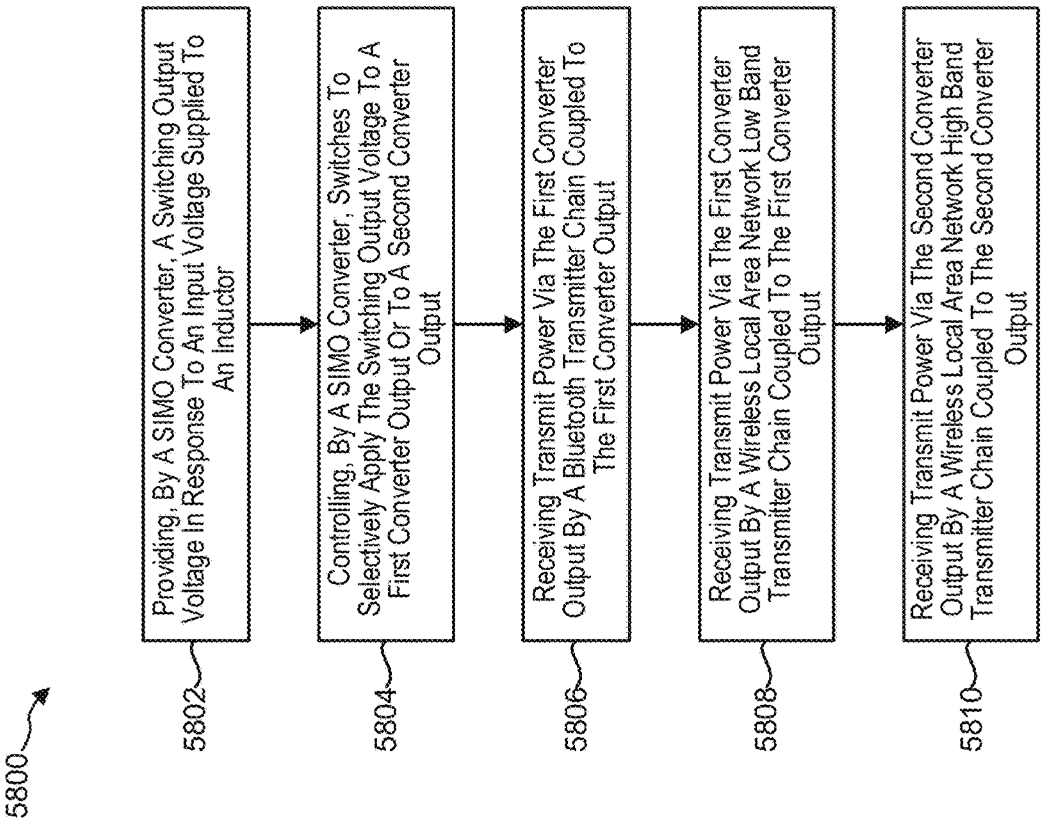
FIG. 58 exemplarily illustrates a flowchart of a method of operating a radio transmitter.

FIG. 58 exemplarily illustrates a flowchart of a method 5800 of operating a radio transmitter, in accordance with at least one aspect described in the present disclosure. The method 5800 may include providing, by a SIMO converter, a switching output voltage in response to an input voltage supplied to an inductor 5802; controlling, by a SIMO converter, switches to selectively apply the switching output voltage to a first converter output or to a second converter output 5804; receiving transmit power via the first converter output by a Bluetooth transmitter chain coupled to the first converter output 5806; receiving transmit power via the first converter output by a wireless local area network low band transmitter chain coupled to the first converter output 5808; and receiving transmit power via the second converter output by a wireless local area network high band transmitter chain coupled to the second converter output 5810.

Figure 59:
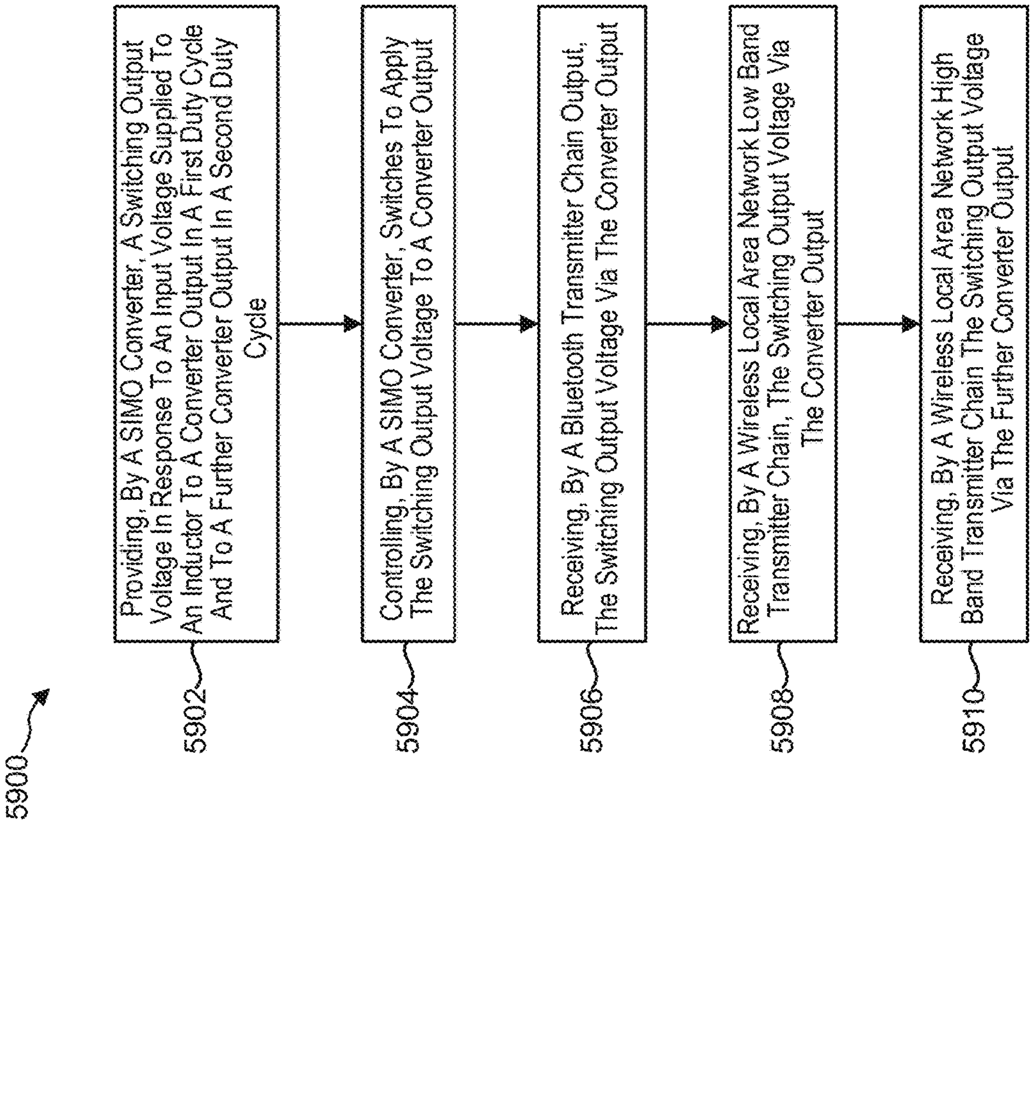
FIG. 59 exemplarily illustrates a flowchart of a method of operating a radio transmitter.

FIG. 59 exemplarily illustrates a flowchart of a method 5900 of operating a radio transmitter, in accordance with at least one aspect described in the present disclosure. The method 5900 may include providing, by a SIMO converter, a switching output voltage in response to an input voltage supplied to an inductor to a converter output in a first duty cycle and to a further converter output in a second duty cycle 5902; controlling, by a SIMO converter, switches to apply the switching output voltage to a converter output 5904; receiving, by a Bluetooth transmitter chain output, the switching output voltage via the converter output 5906; receiving, by a wireless local area network low band transmitter chain, the switching output voltage via the converter output 5908; and receiving, by a wireless local area network high band transmitter chain, the switching output voltage via the further converter output 5910.

In some aspects of the present disclosure, a radio transmitter may include a WLB chain, a BT chain, or a WHB chain as separate devices electrically coupled to a DC to DC converter via a single rail. In these and other aspects of the present disclosure, the DC to DC converter may provide a single DC output voltage to the BT chain or the WHB chain, which may cause degradation of the radio signals. In these and other aspects of the present disclosure, when the BT chain and the WHB chain are both transmitting, the DC to DC converter may increase the output voltage to a level to permit the BT chain and the WHB chain to both properly operate. The DC to DC converter increasing the output voltage based on the settings of the WHB chain while the BT chain is also transmitting may increase power consumption by the BT chain.

In some aspects of the present disclosure, the radio transmitter may include a combined WLB and BT chain or a WHB chain electrically coupled to the DC to DC converter via different rails. In these and other aspects of the present disclosure, the combined WLB and BT chain simultaneously transmitting the BT radio signals and the WLB radio signals using the same output voltage as a transmit signal, may reduce efficiency of the BT radio signals. In addition, in some aspects of the present disclosure, the efficiency of the BT radio signals may be reduced due to a WiFi power amplifier in a WiFi portion of the combined WLB and BT chain including a higher Pmax than devices within a BT portion of the combined WLB and BT chain.

In some aspects of the present disclosure, the radio transmitter may include a SIMO converter (e.g., a hybrid converter). In these and other aspects of the present disclosure, the SIMO converter may provide the switching output voltage on separate converter outputs at different values to the combined WLB and BT chain and the WHB chain. These and other aspects of the present disclosure may permit the combined WLB and BT chain and the WHB chain to simultaneously operate (e.g., co-run) using optimal voltage levels. In addition, these and other aspects of the present disclosure may permit, the switching output voltage to be adjusted for the combined WLB and BT chain based on whether WLAN or BT radio signals are being transmitted while permitting the switching output voltage to be at a level sufficient for the WHB chain.

In some aspects of the present disclosure, the SIMO converter may provide the switching output voltage in response to the input voltage supplied to the inductor. In these and other aspects of the present disclosure, the switching output voltage may be provided to one or converter outputs of the SIMO converter. In these and other aspects of the present disclosure, the SIMO converter may provide the switching output voltage to a first converter output in a first duty cycle of the SIMO converter. In addition, in some aspects of the present disclosure, the SIMO converter may provide the switching output voltage to a second converter output (e.g., a further converter output) in a second duty cycle of the SIMO converter.

In some aspects of the present disclosure, the SIMO converter may control the switches within the SIMO converter to selectively apply the switching output to the converter outputs of the SIMO converter. In these and other aspects of the present disclosure, the SIMO converter may control the switches within the SIMO converter to selectively apply the switching output voltage to the first converter output. In these and other aspects of the present disclosure, the SIMO converter may control the switches within the SIMO converter to selectively apply the switching output voltage to the second converter output.

In some aspects of the present disclosure, the radio transmitter may include a BT transmitter chain (e.g., a BT chain). In these and other aspects of the present disclosure, the BT transmitter chain may be electrically coupled to one or more of the converter outputs of the SIMO converter. In these and other aspects of the present disclosure, the BT transmitter chain may be electrically coupled to the first converter output of the SIMO converter. In some aspects of the present disclosure, the BT transmitter chain may receive the switching output voltage via one or more of the converter outputs of the SIMO converter. In addition, in some aspects of the present disclosure, the BT transmitter chain may receive transmit power (e.g., the switching output voltage) via one or more of the converter outputs (e.g., the first converter output) of the SIMO converter.

In some aspects of the present disclosure, the BT transmitter chain may transmit BT radio signals in a 2.4 GHz frequency band.

In some aspects of the present disclosure, the radio transmitter may include a WLAN low band (WLB) transmitter chain (e.g., a WLB chain). In these and other aspects of the present disclosure, the WLB transmitter chain may be electrically coupled to one or more of the converter outputs of the SIMO converter. In these and other aspects of the present disclosure, the WLB transmitter chain may be electrically coupled to the first converter output of the SIMO converter. In some aspects of the present disclosure, the WLB transmitter chain may receive the switching output voltage via one or more of the converter outputs of the SIMO converter. In addition, in some aspects of the present disclosure, the WLB transmitter chain may receive transmit power (e.g., the switching output voltage) via one or more of the converter outputs (e.g., the first converter output) of the SIMO converter.

In some aspects of the present disclosure, the WLB transmitter chain may transmit WLAN radio signals in a 2.4 Ghz frequency band. In these and other aspects of the present disclosure, the WLB transmitter chain may transmit the WLAN radio signals according to at least one of IEEE 802.11a, IEEE 802.11b, IEEE 802.11g, IEEE 802.11n, or IEEE 802.11ac standards.

In some aspects of the present disclosure, the radio transmitter may include a WLAN high band (WHB) transmitter chain (e.g., a WHB chain). In these and other aspects of the present disclosure, the WHB transmitter chain may be electrically coupled to one or more of the converter outputs of the SIMO converter. In these and other aspects of the present disclosure, the WHB transmitter chain may be electrically coupled to the second converter output of the SIMO converter. In some aspects of the present disclosure, the WHB transmitter chain may receive the switching output voltage via one or more of the converter outputs of the SIMO converter. In addition, in some aspects of the present disclosure, the WHB transmitter chain may receive transmit power via one or more of the converter outputs (e.g., the first converter output) of the SIMO converter.

In some aspects of the present disclosure, the WHB transmitter chain may transmit WLAN radio signals in a five Ghz frequency band. In these and other aspects of the present disclosure, the WHB transmitter chain may transmit the WLAN radio signals according to at least one of IEEE 802.11a, IEEE 802.11b, IEEE 802.11g, IEEE 802.11n, or IEEE 802.11ac standards.

In some aspects, the radio transmitter may also include a transmitter chain selector. In these and other aspects of the present disclosure, the transmitter chain selector may be coupled to the WHB transmitter chain, WLB transmitter chain, BT transmitter chain, or combined WLB and BT transmitter. In these and other aspects of the present disclosure, the transmitter chain selector may select the WHB transmitter chain, WLB transmitter chain, BT transmitter chain, or combined WLB and BT transmitter chain to transmit the corresponding radio signal.

In some aspects of the present disclosure, the radio transmitter may include a switch controller. In these and other aspects of the present disclosure, the switch controller may be electrically coupled to the switches in the SIMO converter. In these and other aspects of the present disclosure, the switch controller may control the switches in the SIMO converter to selectively apply the switching output voltage to the converter outputs of the SIMO converter.

One or more aspects of the present disclosure may reduce degradation of the signal transmitted by the combined WLB and BT transmitter chain. In addition, one or more aspects of the present disclosure may maintain optimal performance and efficiency of BT and WLAN transmissions. Further, one or more aspects of the present disclosure may permit simultaneous operation (e.g., co-running) of the WHB transmitter chain and the BT transmitter chain while maintaining power consumption of both transmitter chains. One or more aspects of the present disclosure may permit multiple WLB transmitter chains in a multiple input multiple output (MIMO) die to include both WLAN transmitters chain and BT transmitter chain areas without increased area overhead while maintaining BT beamforming. In addition, one or more aspects of the present disclosure may enable high power BT for BT broadcasting when the BT transmitter chain includes a digital power amplifier. In these and other aspects of the present disclosure, the BT transmitter chain may receive the switching output voltage at a level for WLAN transmission while the BT transmitter chain may perform low power BT operation.

A radio chip of a radiohead system may include components that operate using different voltage values. In addition, the radiohead system may only include a single input rail for receiving input power. The SIMO buck-boost converter 104 (generally referred to herein as a "SIMO converter") may receive the input power from the single input rail and may generate the switching output voltage at different voltage values. The SIMO converter 104 may provide the switching output voltage to the different components within the radio ship to permit the components to properly operate.

According to an aspect of the disclosure, the SIMO converter may provide the switching output voltage domains for components within a radiohead system. For example, each radiohead system component may have a unique voltage domain. Therefore, each component may be connected to a different converter output of the SIMO buck-boost converter.

Figure 60:
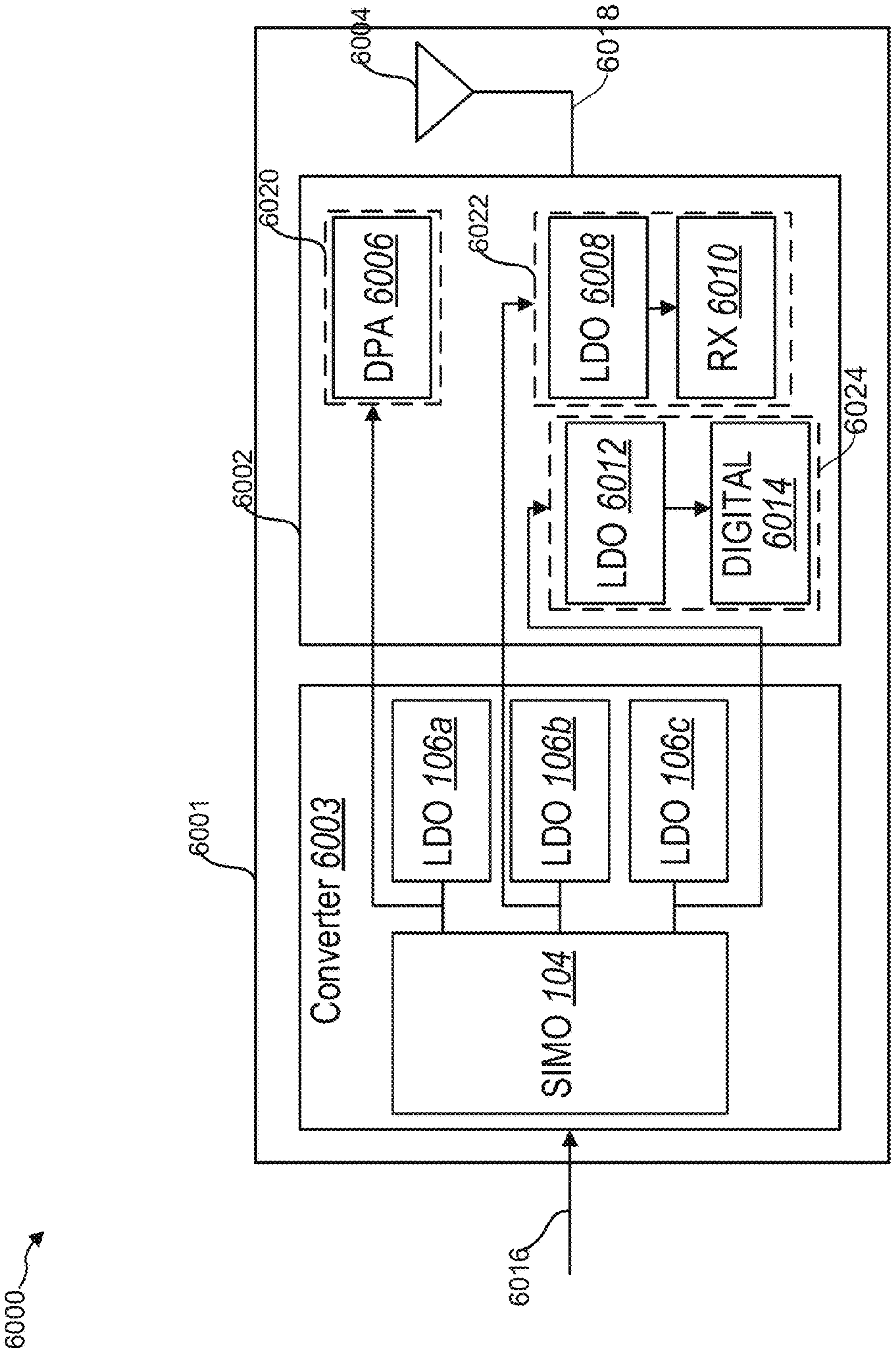
FIG. 60 exemplarily illustrates a block diagram of a system that includes a converter.
Figure 61:
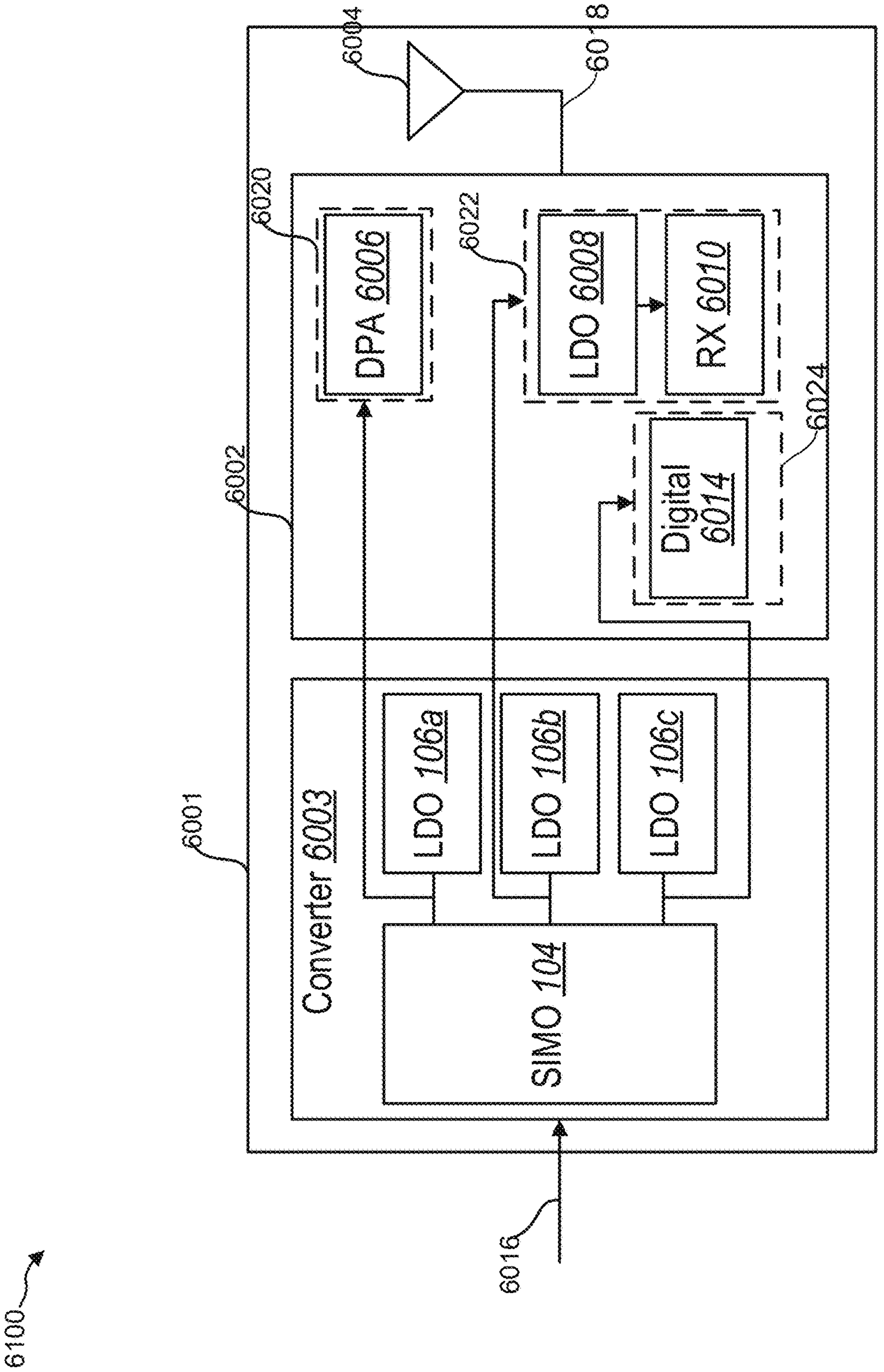
FIG. 61 exemplarily illustrates a block diagram of another system that includes the converter.

FIG. 60 illustrates a block diagram of an example system 6000 that includes a converter 6003, in accordance with at least one aspect described in the present disclosure. FIG. 61 illustrates a block diagram of another example system 6100 that includes the converter 6003, in accordance with at least one aspect described in the present disclosure.

With combined reference to FIGS. 60 and 61, the systems 6000, 6100 may include a radiohead (RH) circuitry 6001, which may receive power signals, control signals, or any other appropriate signal via a single interface cable 6016 (e.g., a digital/power interface cable). In some aspects of the present disclosure, the single interface cable 6016 may include a flex cable.

The RH circuitry 6001 may include the converter 6003, a RH radio chip 6002, and/or an antenna 6004. The converter 6003 may include the SIMO converter 104 and one or more LDOs 106*a-c* (it is to be noted that the converter 6003 may be any of the SIMO converters described herein). In some aspects of the present disclosure, the SIMO converter 104 and the one or more LDOs 106*a-c* may correspond to the SIMO converter 104 and the LDO 106 described elsewhere in the present disclosure, respectively. In some aspects of the present disclosure, the converter 6003 may include multiple outputs to provide a switching output voltage at different values at two or more of the outputs.

In some aspects of the present disclosure, the converter 6003 may receive an input voltage and provide the switching output voltage as supply voltages. In these and other aspects of the present disclosure, the converter 6003 may provide one or more of the supply voltages at different values. In addition, in some aspects of the present disclosure, the converter 6003 may provide the supply voltages via the outputs of the converter 6003.

In some aspects of the present disclosure, the RH radio chip 6002 may include multiple supply voltage domains 6020, 6022, and 6024. In some aspects of the present disclosure, each of the supply voltage domains 6020, 6022, and 6024 may correspond to a different chain or portion of the RH radio chip 6002. In these and other aspects of the present disclosure, a first supply voltage domain 6020 may correspond to a transmitter chain of the RH radio chip 6002 and will be referred to as transmitter chain 6020 hereinafter.

The transmitter chain 6020 may include a power supply terminal (not illustrated) and one or more electronic components. The power supply terminal may be electrically coupled to an output of the converter 6003. The electronic components within the transmitter chain 6020 may be configured to operate at substantially the same domain-specific supply voltage. In addition, each of the electronic components in the transmitter chain 6020 may be electrically coupled to the power supply terminal. In some aspects of the present disclosure, the transmitter chain 6020 may include one or more transmitter components. For example, the transmitter components may include a transmit power amplifier 6006 (illustrated in FIGS. 60 and 61 as a digital power amplifier (DPA) 6006).

The second supply voltage domain 6022 may correspond to a receiver chain, and will hereinafter be referred to as receiver chain 6022. The receiver chain 6022 may include a power supply terminal (not illustrated) and one or more electronic components. The power supply terminal may be electrically coupled to an output of the converter 6003. The electronic components within the receiver chain 6022 may be configured to operate at substantially the same domain-specific supply voltage. In addition, each of the electronic components in the receiver chain 6022 may be electrically coupled to the power supply terminal. In some aspects of the present disclosure, the receiver chain 6022 may include one or more receiver components. For example, the receiver components may include a low noise amplifier 6010 (illustrated in FIGS. 60 and 61 as RX 6010) or an LDO 6008. The LDO 6008 may operate the same as or similar to the LDOs 106 discussed elsewhere in the present disclosure.

The third supply voltage domain 6024 may correspond to a digital chain, and will hereinafter be referred to as digital chain 6024. The digital chain 6024 may include a power supply terminal (not illustrated) and one or more electronic components. The power supply terminal may be electrically coupled to an output of the converter 6003. The electronic components within the digital chain 6024 may be configured to operate at substantially the same domain-specific supply voltage. In addition, each of the electronic components in the digital chain 6024 may be electrically coupled to the power supply terminal. In some aspects of the present disclosure, the digital chain 6024 may include one or more digital components. For example, the digital components may include the modem (MAC and PHY layer) implementation, any associated communication processor, and/or any of the digital circuits that implement the signal conditioning and calibration for the analog and RF sections of the radio (e.g., digital front-end). With reference to FIG. 60, the digital components may also include an LDO 6012. The LDO 6012 may operate the same as or similar to the LDOs 106 discussed elsewhere in the present disclosure. With reference to FIG. 61, the digital components may not include the LDO 6012.

The antenna 6004 may be electrically coupled or communicatively coupled to the RH radio chip 6002 via an interface cable 6018. In some aspects of the present disclosure, the interface cable 6018 may be configured to transmit digital (e.g., control) signals or power to the antenna 6004.

An RH system may include the radio chip (e.g., the RH radio chip) and RF components that are coupled directly at the antenna. For example, the antenna and the radio chip may be located and housed within a single unit. To properly operate the RH system, a number of power rails, communication rails, or other external connections coupled to the unit may be limited. For example, the external connections may be limited to a single external rail for providing control, communication, and power signals. In addition, area limitations (e.g., limitations on circuit footprints) may be implemented to reduce a physical size of the unit. For example, the area limitations may permit a single inductor for DC to DC conversion to be included within the RH system.

In accordance with some aspects of the present disclosure, a converter (e.g., a DC to DC converter) that includes a single inductor and multiple outputs may be implemented within the RH system. In some aspects of the present disclosure, the RH system may include the RH radio chip that includes multiple supply voltage domains. Each of the supply voltage domains may be electrically coupled to a different output of the converter. This may permit each voltage domain to receive the same as or a different supply voltage value than each other.

In some aspects of the present disclosure, the supply voltage domains may include the first voltage domain, the second voltage domain, or the third voltage domain. In these and other aspects of the present disclosure, the first voltage domain may include a transmitter chain. In addition, in some aspects of the present disclosure, the transmitter chain may include transmitter components that operate at a first supply voltage. In these and other aspects of the present disclosure, the second voltage domain may include a receiver chain. In addition, in some aspects of the present disclosure, the receiver chain may include receiver components that operate at a second supply voltage. In these and other aspects of the present disclosure, the first supply voltage may be different than the second supply voltage. In some aspects of the present disclosure, the third voltage domain may include one or more digital components that operate at a third supply voltage. In these and other aspects of the present disclosure, the third supply voltage may be different than at least one of the first supply voltage and the second supply voltage.

In some aspects of the present disclosure, the supply voltage domains may include a first voltage domain that includes a transmitter chain. In these and other aspects of the present disclosure, the transmitter chain may include one or more transmitter components. In these and other aspects of the present disclosure, the transmitter components may operate at a first supply voltage. In addition, in some aspects of the present disclosure, the transmitter components may include a transmit power amplifier.

In some aspects of the present disclosure, the supply voltage domains may include a second voltage domain that includes a receiver chain. In these and other aspects of the present disclosure, the receiver chain may include one or more receiver components. In these and other aspects of the present disclosure, the receiver components may operate at a second supply voltage. In addition, in some aspects of the present disclosure, the receiver components may include a low noise amplifier. In some aspects of the present disclosure, the second supply voltage may be different than the first supply voltage.

In some aspects of the present disclosure, a physical layer, a turbo decoder (TD), or radio frequency (RF) components of the RH system may be connected at the antenna. In these and other aspects of the present disclosure, implementing a conventional single DC to DC converter within the RH system would increase power consumption versus systems that implement multiple DC to DC converters.

In accordance with one or more aspects of the present disclosure, an RH system may be implemented that meets both the area requirements and the power requirements of RH systems that are housed within a single unit.

According to an aspect of the disclosure, the SIMO converter may provide the switching output voltage on the converter outputs within voltage domains for each of a transmitter and a receiver. The transmitter and receiver may have distinct voltage domains.

Figure 62A:
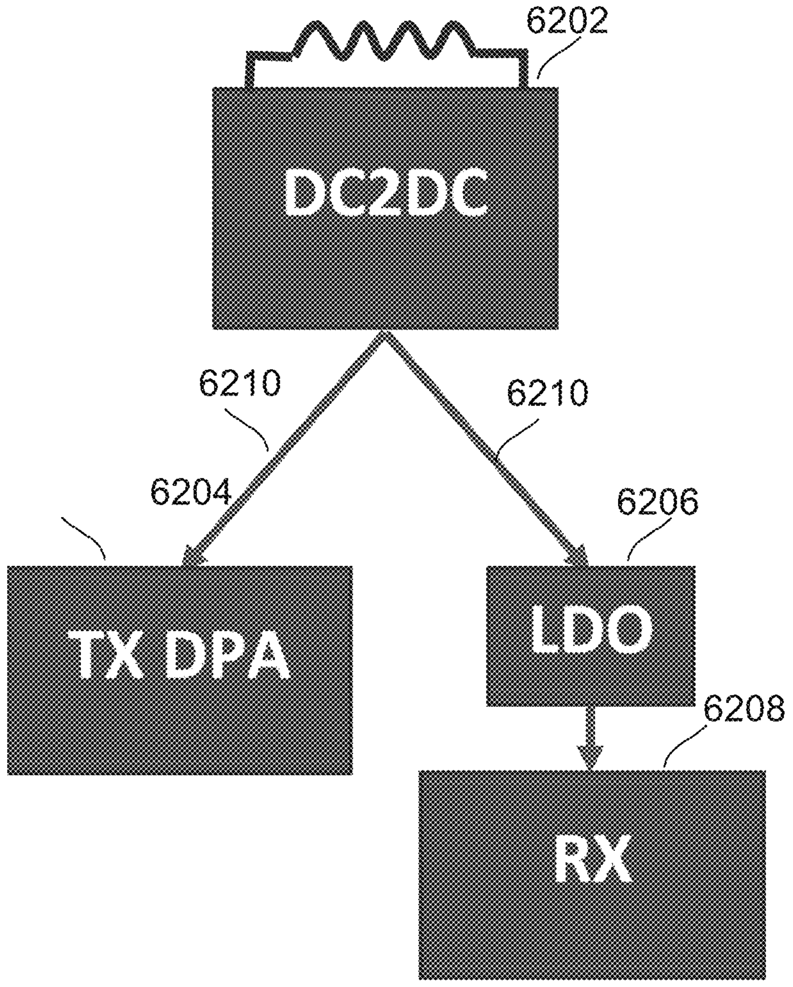
FIG. 62A-B exemplarily illustrate block diagrams of a converter for supplying voltages for transmission and reception.

FIG. 62A illustrates a block diagram of an example DC2DC converter 6202 according to an aspect of the disclosure. Converter 6202 supplies voltage to transmitter amplifier 6204 via connection 6210. Converter 6202 supplies voltage to LDO regulator 6206 via connection 6210. Connection 6210 is one live voltage rail supplying transmission and reception operations. LDO regulator 6206 further supplies regulated voltage to reception chain 6208. A single converter 6202 supplies voltage to both amplifier 6204 and receiver of reception chain 6208, via regulator 6206.

The use of one active voltage rail 6210 may create stress on the transmission amplifier 6204 transistor. When reception is in the on state and transmission is in the off state, the transmitter still sees the live voltage because the transmitter and the receiver use the same rail. The stress on the transmitter degrades reliability.

Figure 62B:
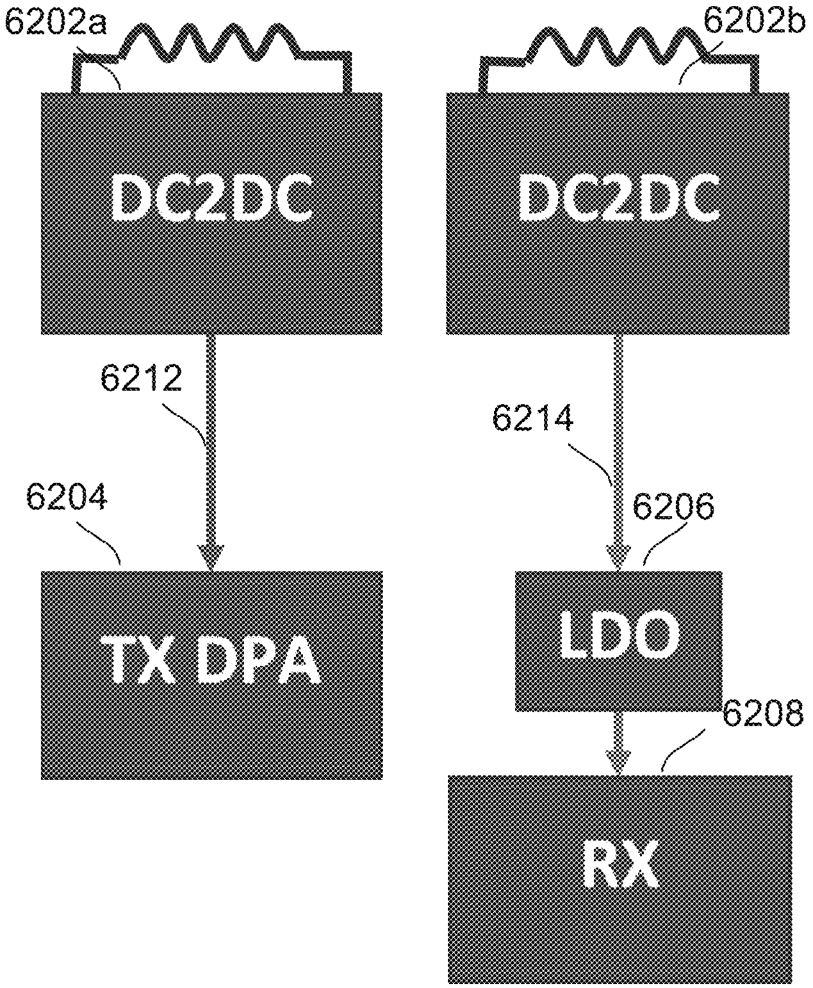

FIG. 62B illustrates a block diagram of example DC2DC converters 6202*a&b* according to an aspect of the disclosure. Converter 6202*a* supplies voltage to transmitter amplifier 6204 via connection 6212. Converter 6202*b* supplies voltage to LDO regulator 6206 via connection 6214. LDO regulator 6206 further supplies regulated voltage to reception chain 6208. Independent converters 6202*a&b* supply voltage to amplifier 6204 and receiver of reception chain 6208 respectively.

Separate connections 6212 and 6214 eliminate the stress on the transistor 6204 and the risk of degrading transmission. Voltage to transmitter 6204 may be turned off while reception is active. However, there is a tradeoff in formfactor and production cost associated with having two DC2DC converters 6202*a&b*.

Figure 63:
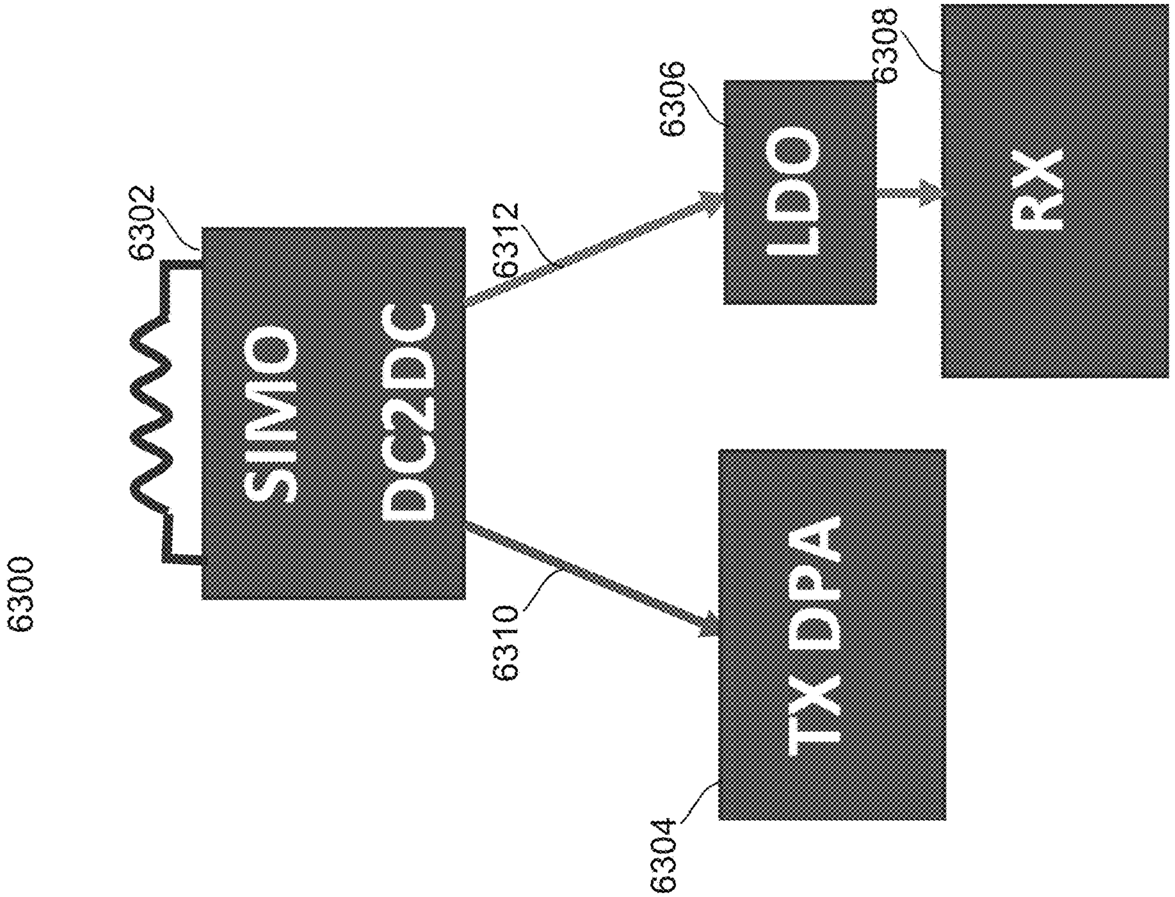
FIG. 63 exemplarily illustrates a block diagrams of a single inductor multiple output converter for supplying voltages for transmission and reception.

FIG. 63 illustrates a block diagram of an example single inductor multiple output (SIMO) circuitry 6300 including SIMO DC2DC converter 6302 according to an aspect of the present disclosure. Converter 6302 includes multiple output rails 6310 and 6312. Output rail 6310 supplies voltage from converter 6302 to transmitter 6304. Output rail 6312 supplies voltage from converter 6302 to LDO regulator 6306. LDO regulator 6306 regulates the supplied voltage from converter 6302 to a target voltage and supplies the regulated voltage to receiver 6308. The target voltage may be predefined or configurable.

Separate supply rails (or nodes) 6310 and 6312 allow for different output voltages required by transmitter amplifier 6304 and receiver 6308. For example, a lower voltage may be supplied to transmitter amplifier 6304 than is suppled to receiver 6308 via LDO regulator 6306. Additionally, separate nodes 6310 and 6312 allow converter 6302 to supply the transmitter amplifier 6304 while the rail 6312 for receiver 6308 is active.

SIMO 6302 eliminates the stress on the digital power amplifier (DPA) of transmitter 6304 using designated output rails for transmission and reception. While reception is active, rail 6312 may be turned on and rail 6310 may be turned off to eliminate transmitter 6304 seeing active voltage. Therefore, a single DC2DC converter 6302 may independently supply reception and transmission without risk to transmission reliability.

Figure 64:
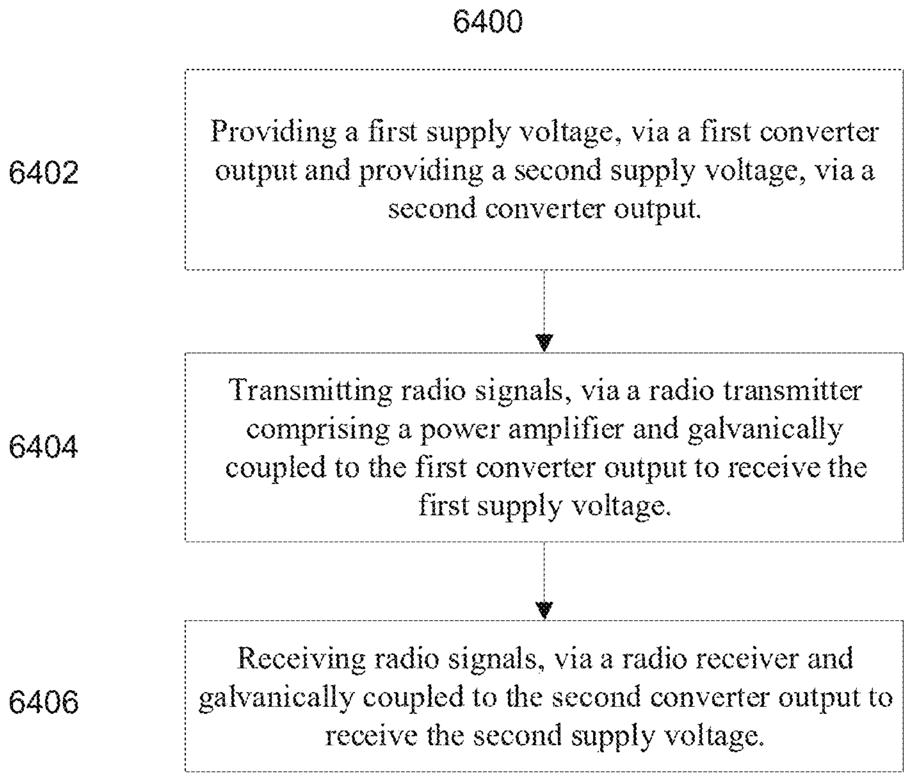
FIG. 64 exemplarily illustrates a flowchart of a method of operating a single inductor multiple output circuitry according to some aspects of the disclosure.
Figure 65:
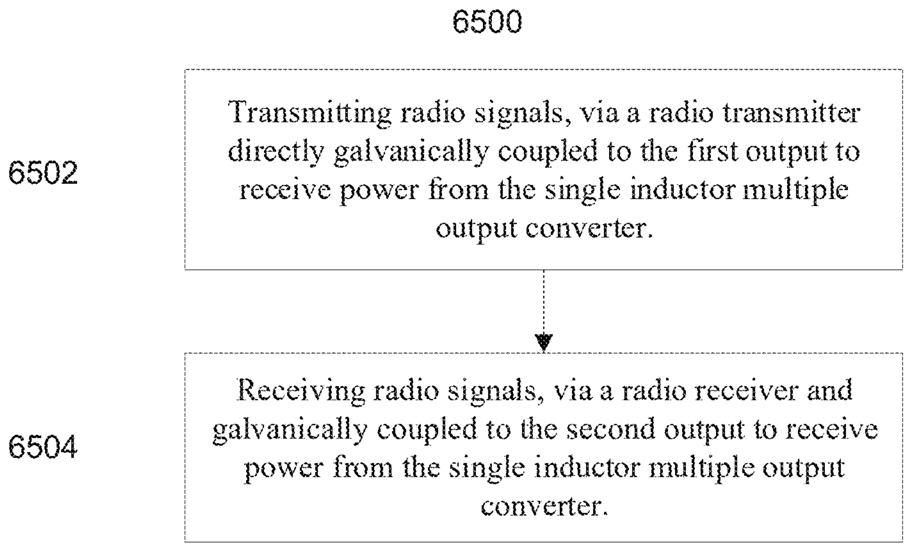
FIG. 65 exemplarily illustrates a flowchart of a method of operating a single inductor multiple output circuitry according to some aspects of the disclosure.

FIG. 64 depicts an example method of operating a SIMO circuitry according to an aspect of the present disclosure including: providing a first supply voltage, via a first converter output and providing a second supply voltage, via a second converter output 6402; transmitting radio signals, via a radio transmitter comprising a power amplifier and galvanically coupled to the first converter output to receive the first supply voltage 6404; and receiving radio signals, via a radio receiver and galvanically coupled to the second converter output to receive the second supply voltage FIG. 65 illustrates a flowchart of an example method 6500 of operating a SIMO circuitry (e.g. SIMO circuitry 6300) according to at least one aspect of the present disclosure. Method 6500 may include transmitting radio signals, via a radio transmitter directly galvanically coupled to the first output to receive power from the single inductor multiple output converter 6502. The method may further include receiving radio signals, via a radio receiver galvanically coupled to the second output to receive power from the single inductor multiple output converter 6504.

A radio transmitter including an amplifier and radio frequency receiver may be electronically coupled with a SIMO converter via separate converter outputs. The radio transmitter and radio frequency receiver may have different voltage requirements. The different SIMO converter outputs may be configured to supply different voltages. For example, while the receiver supply is on, the SIMO converter may be configured to lower the voltage supplied to the transmitter. Lowering the supply to the transmitter while the receiver supply is on may eliminate the reliability risk of the transmitter amplifier while it is in an off state.

The receiver may receive a regulated voltage from a regulator configured serially between the converter and the receiver. The converter supplies the regulator the supply voltage directly from its designated converter output. The regulator regulates the voltage to a configurable voltage target for the receiver.

According to some aspects of the present disclosure, a SIMO converter includes two converter outputs corresponding to two supply voltages. A radio transmitter including an amplifier electronically coupled to the first converter output receives the first supply voltage. A radio receiver electronically coupled to the second converter output receives the second supply voltage. The transmitter and the receiver may switch between on and off states. When in the on state, the transmitter may transmit radio signals. When in the on state, the receiver may receive radio signals.

According to some aspects of the disclosure, the radio transmitter includes a digitally controlled power amplifier.

According to some aspects of the disclosure, the SIMO circuitry includes a regulator configured between one of the converter outputs and the receiver to regulate the supply voltage supplied to the receiver. According to some aspects, the regulator may be a linear regulator or a low drop out regulator.

According to some aspects of the disclosure, the SIMO circuitry includes a switch controller to control one or more switches of the SIMO converter to provide supply voltages to the first converter output or the second converter output.

The SIMO converter 104 may provide the switching output voltage at different voltage values to a class G power amplifier. The class G power amplifier may operate by switching between the switching output voltage at the different voltage values to improve efficiency of the class G power amplifier. The class G power amplifier may operate at an improved efficiency due to the SIMO converter 104 providing the switching output voltage at two or more voltage values.

According to an aspect of the disclosure, the SIMO converter may provide the switching output voltage on the converter outputs within voltage domains for reference voltages for a class Go power amplifier.

Figure 66:
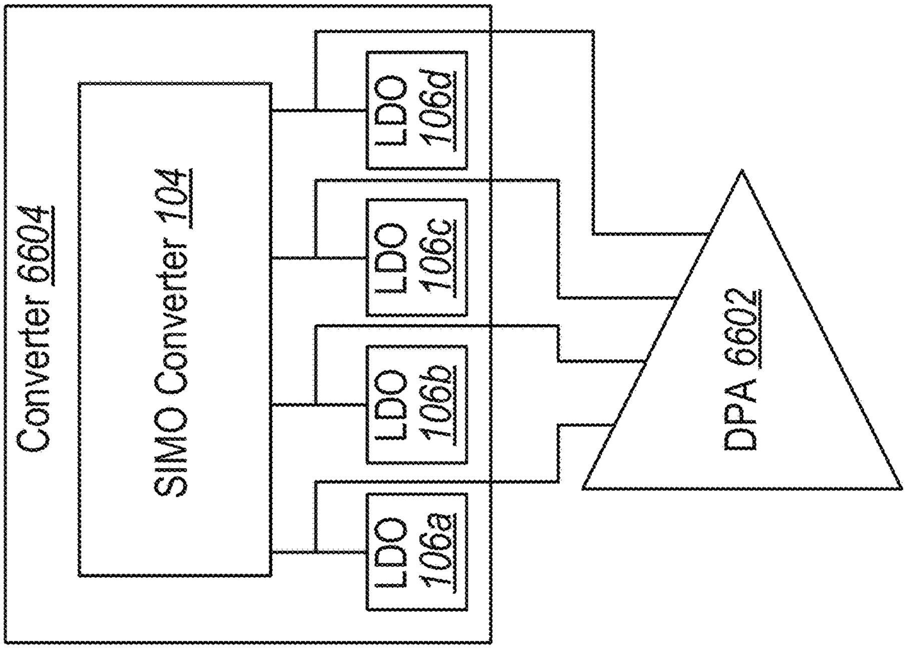
FIG. 66 exemplarily illustrates a block diagram of a system that includes the SIMO.

FIG. 66 illustrates a block diagram of an example system 6600 that includes a converter 6604, in accordance with at least one aspect described in the present disclosure. The system 6600 may also include a DPA 6602.

The converter 6604 may include the SIMO converter 104 and one or more LDOs 106*a-d*. In some aspects of the present disclosure, the SIMO converter 104 and the one or more LDOs 106*a-c* may correspond to the SIMO converter 104 and the LDO 106 described elsewhere in the present disclosure, respectively. In some aspects of the present disclosure, the converter 6604 may include multiple outputs to provide a switching output voltage at different values at two or more of the outputs.

In some aspects of the present disclosure, the converter 6604 may receive an input voltage and provide the switching output voltage as supply voltages. In these and other aspects of the present disclosure, the converter 6604 may provide one or more of the supply voltages at different values. In addition, in some aspects of the present disclosure, the converter 6604 may provide the supply voltages via the outputs of the converter 6604.

In some aspects of the present disclosure, the DPA 6602 may be electrically coupled to the outputs of the converter 6604. In these and other aspects, the DPA 6602 may be galvanically coupled to the outputs of the converter 6604. For example, a first input of the DPA 6602 may be coupled to a first output of the converter 6604, a second input of the DPA 6602 may be coupled to a second output of the converter 6604, a third input of the DPA 6602 may be coupled to a third output of the converter 6604, and a fourth input of the DPA 6602 may be coupled to a fourth output of the converter 6604.

In some aspects of the present disclosure, the converter 6604 may provide a first supply voltage via the first output. In these and other aspects of the present disclosure, the converter 6604 may provide a second supply voltage via the second output. In addition, in some aspects of the present disclosure, the converter 6604 may provide a third supply voltage via the third output. Further, in some aspects of the present disclosure, the converter 6604 may provide a fourth supply voltage via the fourth output.

In some aspects of the present disclosure, the DPA 6602 may receive the first supply voltage via the first input. In these and other aspects of the present disclosure, the DPA 6602 may receive the second supply voltage via the second input. Further, in some aspects of the present disclosure, the DPA 6602 may receive the third supply voltage via the third input. In some aspects of the present disclosure, the DPA 6602 may receive the fourth supply voltage via the fourth input.

A multi-level (ML) power amplifier (e.g., a class G power amplifier or DPA) may switch between supply voltages to increase efficiency. For example, the ML power amplifier may switch from a supply voltage to a lower supply voltage to increase efficiency. In some aspects of the present disclosure, the efficiency of the ML power amplifier may be increased due to the ML power amplifier operating at a higher power back-off using the lower supply voltage (e.g., operation may be increased prior to saturation of the ML power amplifier). In some aspects of the present disclosure, a system may include a converter that includes the SIMO converter and the LDOs. The converter may provide multiple supply voltages at one or more different values to the ML power amplifier.

In some aspects of the present disclosure, the SIMO converter and the LDOs Regulator 106 may include an amplifier circuit 3908 electrically coupled to an output of SIMO 10 may provide the supply voltages. In these and other aspects of the present disclosure, the SIMO and the LDOs may replace multiple DC to DC converters in systems that include the ML power amplifier. For example, in some converter technologies, multiple DC to DC converters may receive the input voltage and each DC to DC converter may generate a different DC supply voltage for the ML power amplifier. However, in some aspects of the present disclosure, the SIMO and the LDOs, implemented as a single converter, may receive the input voltage and provide the different supply voltages at the different values to the ML power amplifier.

In some aspects of the present disclosure, the converter (e.g., the SIMO and the LDOs) may generate the supply voltages at different values. In these and other aspects of the present disclosure, the converter may generate two or more supply voltages at two or more values. For example, the converter may generate three supply voltages at three different values. As another example, the converter may generate three supply voltages at two different values (e.g., the first supply voltage and the second supply voltage may be the same value and the third supply voltage may be a different value). As yet another example, the converter may generate four supply voltages at four different values.

Accordingly, at least one aspect of the present disclosure may provide multiple supply voltages at different values with a reduced footprint for using the ML power amplifier (e.g., a class G power amplifier) compared to systems that implement multiple DC to DC converters. In addition, at least one aspect of the present disclosure may reduce production costs for the systems compared to systems that implement multiple DC to DC converters.

In addition, at least one aspect of the present disclosure may permit the ML power amplifier (e.g., a class G power amplifier) to operate more efficiently versus systems that implement multiple DC to DC converters. In some aspects of the present disclosure, the ML power amplifier may operate more efficiently due to an increased number of voltage values (e.g., values of the switching output voltage) in a single converter compared to systems that implement two DC to DC converters.

Thus, at least one aspect of the present disclosure may enable a lower cost system for implementing the ML power amplifier compared to systems that implement multiple DC to DC converters. In addition, at least one aspect of the present disclosure may improve ML power amplifier efficiency versus back-off operations of the ML power amplifier. For example, at least one aspect of the present disclosure may permit the power back-off of the ML power amplifier to reach beyond an upper six decibel level of a single level power amplifier. For example, the upper 6 decibel limit may be extended when a change in the supply voltage value occurs. Further, at least one aspect of the present disclosure may permit rolling (e.g., variable) power consumption due to one supply voltage being used and the other supply voltages being turned off.

The inductor 202 of the SIMO converter 104 may include one or more tap terminals between a first end terminal and a second end terminal of the inductor 202. The tap terminals may be configured to provide tapped voltages at different voltage levels based on an inductance rating of the inductor 202 at the corresponding tap terminal. In addition, the switch controller may control the switches within the SIMO converter 104 to provide either one of the tapped voltages or the switching output voltage at the converter outputs. The switch controller may control the switches within the SIMO converter 104 to permit the SIMO converter 104 to be reconfigurable.

According to an aspect of the disclosure, the SIMO converter may include an inductor with one or more tap terminals to provide the switching output voltage within a voltage domain of the electronic device coupled to the converter output.

Figure 67:
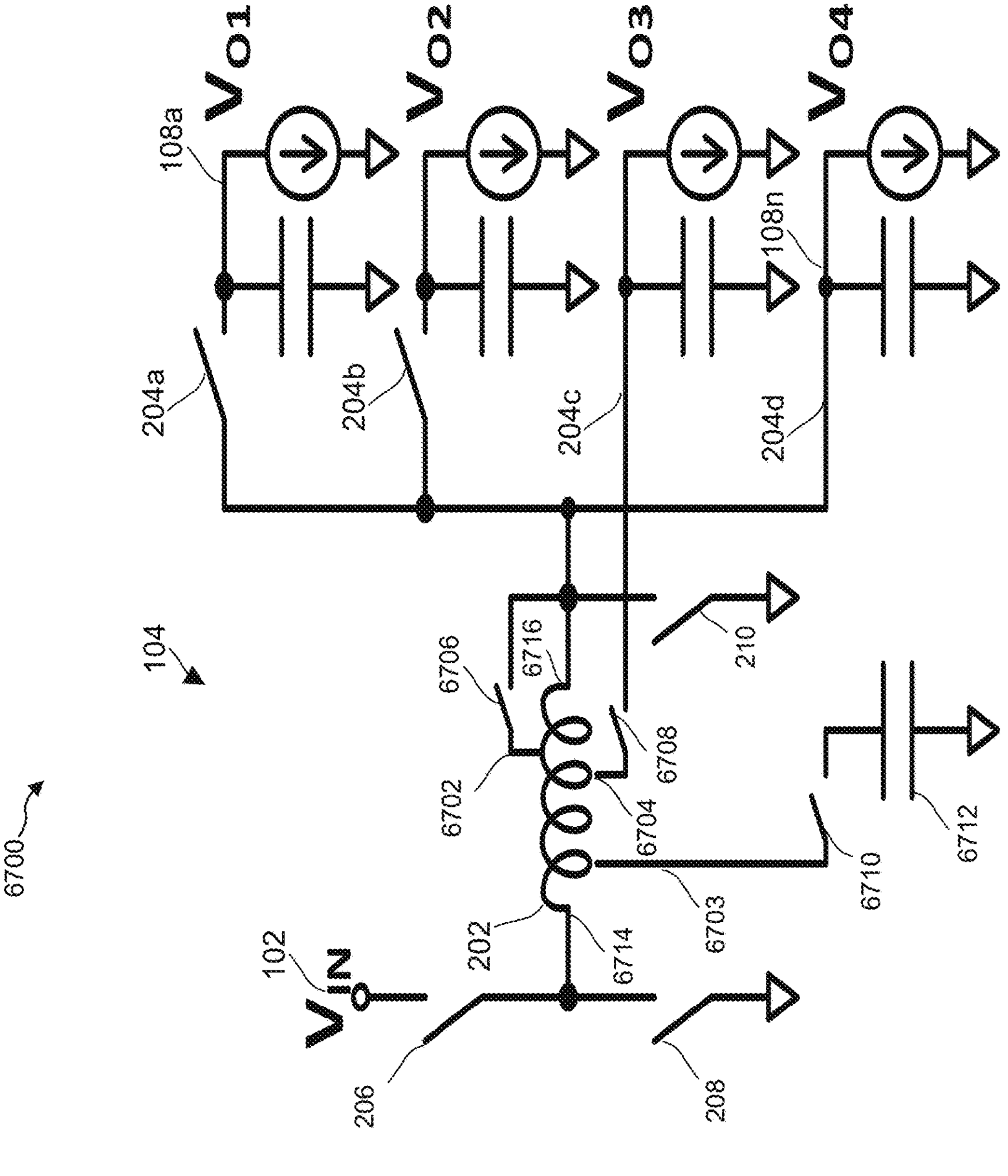
FIG. 67 exemplarily illustrates a block diagram of a system that includes the SIMO converter.

FIG. 67 illustrates a block diagram of an example system 6700 that includes the SIMO converter 104, in accordance with at least one aspect described in the present disclosure. The system 6700 may also include one or more tap switches 6706, 6708, and 6710 or a storage capacitor 6712.

In some aspects of the present disclosure, the SIMO converter 104 may correspond to the SIMO converter 104 described elsewhere in the present disclosure. In some aspects of the present disclosure, the SIMO converter 104 may include multiple outputs to provide a switching output voltage 108*a-n* at different values at two or more of the converter outputs. In some aspects of the present disclosure, the system 6700 may include one or more LDOs (not illustrated). In some aspects of the present disclosure, the LDOs may correspond to the LDOs 106 described elsewhere in the present disclosure.

In some aspects of the present disclosure, the inductor 202 may include a first end terminal 6714 or a second end terminal 6716. In these and other aspects of the present discourse, the inductor 202 may also include one or more tap terminals 6702 and 6704. In addition, in some aspects of the present disclosure, the one or more tap terminals 6702 and 6704 may be positioned between the first end terminal 6714 and the second end terminal 6716.

In some aspects of the present disclosure, the inductor 202 may be replaced by a transformer or any other appropriate inductive component. In these and other aspects of the present disclosure, the transformer may operate the same as or similar to the inductor 202 as described in the present disclosure. That is, the inductor 202 as shown in FIG. 2, or the inductor of any other figure, may be replaced with a transformer, which may then carry out the energizing and deenergizing phases as disclosed herein for the inductor for the SIMO converter 104.

In some aspects of the present disclosure, the tap switch 6706 may be coupled between the tap terminal 6702 and an associated converter output. In these and other aspects of the present disclosure, the tap switch 6708 may be coupled between the tap terminal 6704 and an associated converter output. In addition, in some aspects of the present disclosure, the tap switch 6710 may be coupled between the inductor 202 and the storage capacitor 6712. Further, in some aspects of the present disclosure, the storage capacitor 6712 may be coupled between the tap switch 6710 and the reference potential.

In some aspects of the present disclosure, the one or more tap switches 6706 and 6708 may selectively couple one or more of the tap terminals 6702 and 6704 to one or more of the converter outputs. In these and other aspects of the present disclosure, the tap switches 6706 or 6708 may provide a tapped switching output voltage to the associated converter outputs. In addition, in some aspects of the present disclosure, the tap switches 6706 or 6708 may provide the tapped switching output voltage as the switching output voltage on the associated converter outputs.

In some aspects of the present disclosure, the system 6700 may include a switch controller (not illustrated) configured to control the switches within the SIMO converter 104 or the tap switches 6706, 6708, or 6710. In these and other aspects of the present disclosure, the switch controller may control the switches to selectively apply the switching output voltage or the tapped switching output voltage to different converter outputs of the SIMO converter 104.

Figure 68:
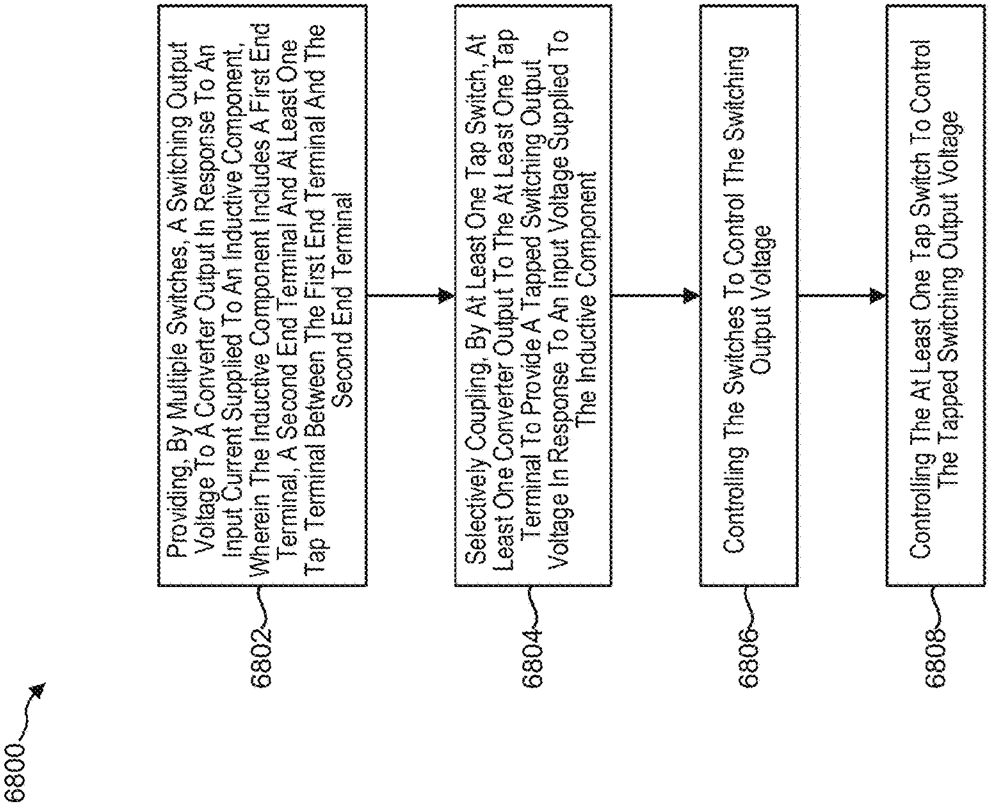
FIG. 68 exemplarily illustrates a flowchart of a method of operating a SIMO converter.

FIG. 68 exemplarily illustrates a flowchart of a method 6800 of operating a SIMO converter, in accordance with at least one aspect described in the present disclosure. The method 6800 may include providing, by multiple switches, a switching output voltage to a converter output in response to an input current supplied to an inductive component, wherein the inductive component includes a first end terminal, a second end terminal and at least one tap terminal between the first end terminal and the second end terminal 6802; selectively coupling, by at least one tap switch, at least one converter output to the at least one tap terminal to provide a tapped switching output voltage in response to an input voltage supplied to the inductive component 6804; controlling the switches to control the switching output voltage 6806; and controlling the at least one tap switch to control the tapped switching output voltage 6808.

Some electronic devices that are electrically coupled to converter outputs of the SIMO converter may include different current loads over time. In addition, some electronic devices may include different settings for the switching output voltage. Further, some electronic device may include different inductor (e.g., optimum inductor performance) and energy pre-charging settings. Further, the SIMO converter may perform cross-regulation between the converter outputs to minimize a difference between the switching output voltage on the converter outputs.

Some aspects of the present disclosure may include the SIMO converter configured as a reconfigurable SIMO converter. In these and other aspects of the present disclosure, the SIMO converter may include multiple switches and a tapped energy storage device (e.g., an inductive component including an inductor or transformer). In addition, in some aspects of the present disclosure, the SIMO converter may store energy in the tapped energy storage device based on a workload of the associated electronic devices. Further, in some aspects of the present disclosure, the SIMO converter may perform cross regulation of the voltage on the converter outputs by decoupling the converter outputs. In some aspects of the present disclosure, the SIMO converter may recycle power stored on capacitors within the SIMO converter or the tapped energy storage device by routing the power to other capacitors coupled to inactive converter outputs.

In some aspects of the present disclosure, the SIMO converter may include the inductive component. In these and other aspects of the present disclosure, the inductive component may include an inductor or a transformer. In addition, in some aspects of the present disclosure, the inductive component may include a first end terminal, a second end terminal, and one or more tap terminals. In these and other aspects of the present disclosure, the one or more tap terminals may be positioned on the inductive component between the first end terminal and the second end terminal.

In some aspects of the present disclosure, the SIMO converter may include one or more tap switches. In these and other aspects of the present disclosure, one or more of the tap switches may be coupled between the inductive component and the converter outputs. In addition, in some aspects of the present disclosure, one or more of the tap switches may be coupled between the inductive component and a storage capacitor (e.g., a flyback capacitor). In these and other aspects of the present disclosure, the tap switches may provide a tapped switching output voltage in response to the input voltage supplied to the inductive component.

In some aspects of the present disclosure, the one or more tap switches may include a first tap switch, a second tap switch, and/or a third tap switch. In these and other aspects of the present disclosure, the first tap switch may be coupled between one of the tap terminals and an associated converter output of the SIMO converter. In addition, in some aspects of the present disclosure, the second tap switch may be coupled between one of the tap terminals and a reference potential. In other aspects of the present disclosure, the second tap switch may be coupled between one of the tap terminals and the storage capacitor. In some aspects of the present disclosure, the third tap switch may be coupled between one of the tap terminals and another associated converter output of the SIMO converter.

In some aspects of the present disclosure, the tap switches may provide the tapped switching output voltage to the storage capacitor. In these and other aspects of the present disclosure, the storage capacitor may store energy using the switching output voltage. In addition, in some aspects of the present disclosure, the storage capacitor may provide the stored energy during subsequent energizing phases to charge the inductive component.

In some aspects of the present disclosure, the SIMO converter may include a switch controller. In these and other aspects of the present disclosure, the switch controller may be coupled to the switches or the tap switches of the SIMO converter. In addition, in some aspects of the present disclosure, the switch controller may control the switches or the tap switches to control the tapped switching output voltage. In some aspects of the present disclosure, the switch controller may control the switches or the tap switches to control the switching output voltage.

In some aspects of the present disclosure, the storage capacitor may be coupled between one of the tap terminals and the reference potential.

Accordingly, one or more aspects of the present disclosure may improve efficiency of systems that do not include tap terminals on the inductive component. In addition, one or more aspects of the present disclosure may permit the SIMO converter to be reconfigurable with a single SIMO converter to support electronic devices that include different workloads. Further, one or more aspects of the present disclosure may cause the SIMO converter to operate more optimally and with better regulation versus SIMO converters that do not include tap terminals on the inductive component.

A voltage converter system may include the SIMO converter 104 and one or more switched capacitor regulators. The SIMO converter 104 combined with the one or more switched capacitor regulators may provide a greater range of voltage values for the switching output voltage compared to the SIMO converter 104 or the switched capacitor regulators by themselves.

According to an aspect of the disclosure, the SIMO bust-boost converter may utilize one or more switched capacitor regulators to regulate the switching output voltage and thus provide the switching output voltage within a voltage domain of the electronic device coupled to the converter output.

Figure 69:
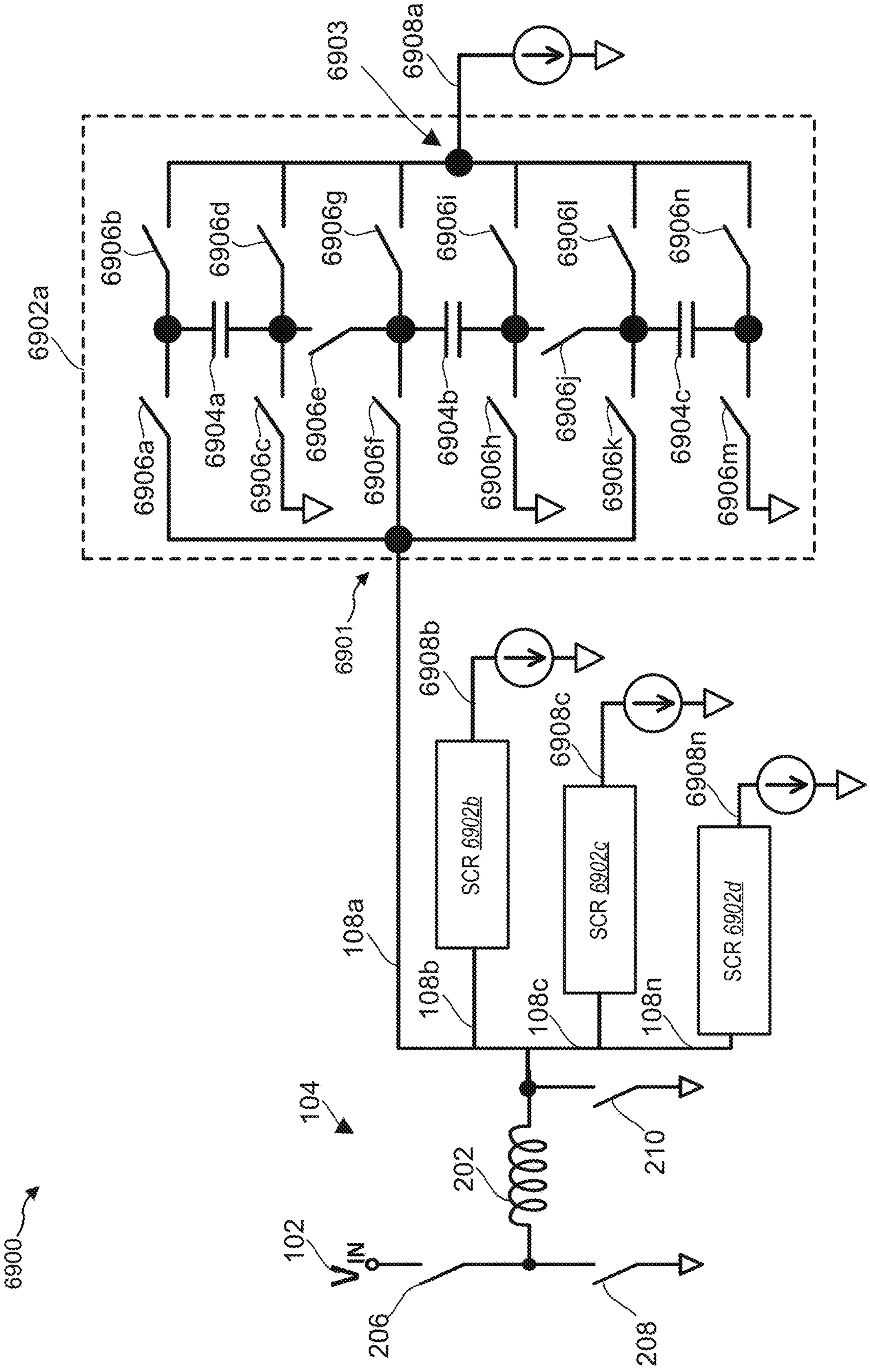
FIG. 69 exemplarily illustrates a block diagram of a system.

FIG. 69 illustrates a block diagram of an example system 6900 that includes the SIMO converter 104, in accordance with at least one aspect described in the present disclosure. The system 6900 may also include one or more switched capacitor regulators (SCRs) 6902*a-d*.

In some aspects of the present disclosure, the system 6900 may include the SIMO converter 104 and one or more LDOs (not illustrated). In these and other aspects of the present disclosure, the SIMO converter 104 may correspond to the SIMO converter 104 described elsewhere in the present disclosure. The LDOs may correspond to the LDOs 106 described elsewhere in the present disclosure. The SIMO converter 104 may include multiple outputs to provide a switching output voltage 108*a-n* at different values at two or more of the converter output lines.

In some aspects of the present disclosure, the SCRs 6902*a-d* may dynamically set a regulator-specific target output voltage 6908*a-d* for corresponding converter output lines. The SCRs 6902*a-d* may dynamically set the regulator-specific target output voltage 6908*a-d* to permit electronic devices that include different workload over time settings to properly operate. The SCRs 6902*a-d* may dynamically set a voltage value of the regulator-specific target output voltage 6908*a-d* within various voltage domains.

In some aspects of the present disclosure, the SCRs 6902*a-d* may receive the switching output voltage 108*a-n* from the SIMO converter 104. The SCRS 6902*a-d* may generate the regulator-specific target output voltage 6908*a-d* based on the switching output voltage 108*a-n*.

In some aspects of the present disclosure, the SCRs 6902*a-d* may set the regulator-specific target output voltage 6908*a-d* to be within a pre-defined range (e.g., a pre-defined voltage range). Each of the SCRs 6902*a-d* may be configured to set the regulator-specific target output voltage 6908*a-d* to be within a different pre-defined range. The SCRs 6702*a-d* may dynamically set the regulator-specific target output voltage 6908*a-d* for the corresponding converter output lines.

In some aspects of the present disclosure, the system 6900 may include a switch controller (not illustrated) configured to control the switches within the SIMO converter 104. The switch controller may control the switches within the SIMO converter 104 to selectively apply the switching output voltage 108*a-n* to different SCRs 102*a-d*.

Components of only silicon controlled regulator (SCR) 6902*a* are illustrated in FIG. 69 for ease of illustration. In addition, operation of only SCR 6902*a* is discussed in the present disclosure for ease of discussion. SCRs 6902*b-d* may include components similar to or same as those of SCR 6902*a*, and may perform operations similar to or same as those of SCR 6902*a*.

In some aspects of the present disclosure, the SCR 6902*a* may include regulator capacitors 6904*a-c* and one or more regulator switches 6906*a-n*. The SCR 6902*a* may include a regulator input node 6901 and a regulator output node 6903. In these and other aspects of the present disclosure, the regulator input node 6901 may be electrically coupled to the inductor 202. The regulator input node 6901 and the regulator output node 6903 may form part of the corresponding converter output line.

In some aspects of the present disclosure, the regulator switches 6906*a-n* may selectively connect one or more regulator capacitors 6904*a-c* to the corresponding converter output line, the reference potential, or some combination thereof.

In these and other aspects of the present disclosure, the regulator switches 6906*a-n* may selectively connect the regulator capacitors 6904*a-c* in parallel or series between the regulator input node 6901 and the regulator output node 6903. The regulator switches 6906*a-n* may selectively connect the regulator capacitors 6904*a-c* between the regulator input node 6901, the regulator output node 6903, or some combination thereof and the reference potential.

In some aspects of the present disclosure, the switch controller may be configured to control the regulator switches 6906*a-n*. The switch controller may control the regulator switches 6906*a-n* to operate the SCR 6902*a* in different stages. The different stages of the SCR 6902*a* may include a stage to store energy on the regulator capacitors 6904*a-c*, a stage to provide the power stored on the regulator capacitors 6904*a-c* to the converter output line, a stage to discharge the regulator capacitors to the reference potential, or some combination thereof.

In some aspects of the present disclosure, the switch controller may control the regulator switches 6906*a-n* to set and selectively provide the regulator-specific target output voltage 6908*a* within the pre-defined range. In other aspects of the present disclosure, the switch controller may control the regulator switches 6906*a-n* to provide the regulator-specific target output voltage 6908*a* within a configurable range (e.g., at configurable voltage values).

In some aspects of the present disclosure, the switch controller may control the regulator switches 6906*a-n* to connect two or more regulator capacitors 6904*a-c* in parallel between the regulator input node 6901 and the regulator output node 6903. The switch controller may control the regulator switches 6906*a-n* to connect two or more regulator capacitors 6904*a-c* in series between the regulator input node 6901 and the regulator output node 6903.

In some aspects of the present disclosure, the switch controller may control the regulator switches 6906*a-n* to provide the regulator-specific target output voltage 6908*a* within the different voltage domains to permit a corresponding electronic device that includes different workload over time settings to properly operate using a single common rail. For example, the corresponding electronic device may include a Bluetooth radio and a WLAN radio that are configured to operate within different voltage domains. The switch controller may control the regulator switches 6906*a-n* to provide the regulator-specific target output voltage 6908*a* within the different voltage domains based on whether the Bluetooth radio or the WLAN radio is to operate.

Figure 70:
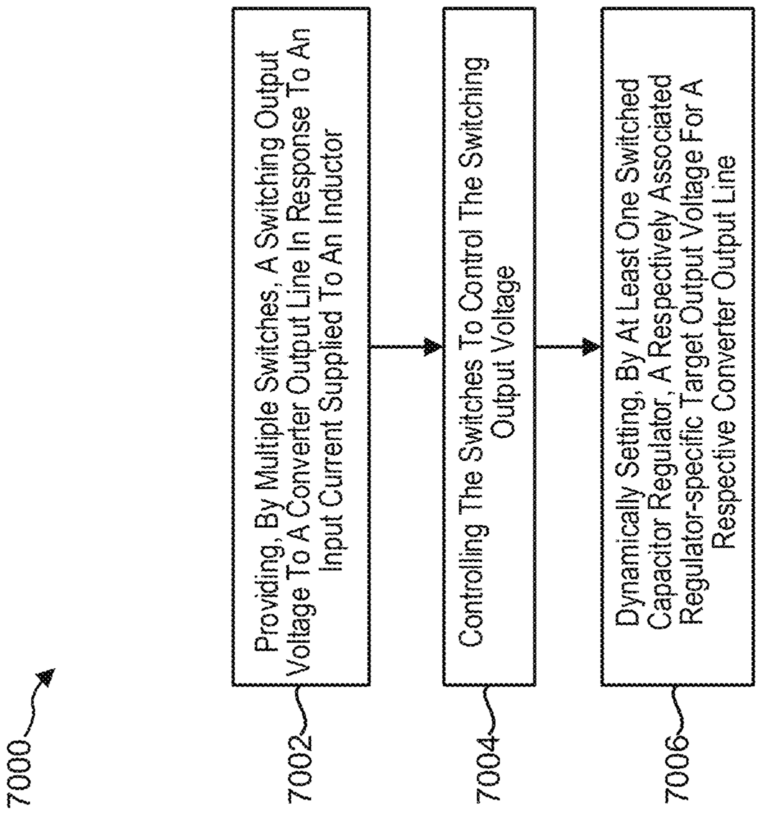
FIG. 70 exemplarily illustrates a flowchart of a method of operating a SIMO converter.

FIG. 70 exemplarily illustrates a flowchart of a method 7000 of operating a SIMO converter, in accordance with at least one aspect described in the present disclosure. The method 7000 may include providing, by multiple switches, a switching output voltage to a converter output line in response to an input current supplied to an inductor 7002; controlling the switches to control the switching output voltage 7004; and dynamically setting, by at least one SCR, a respectively associated regulator-specific target output voltage for a respective converter output line 4606.

Some electronic devices may include different voltage settings, current settings, workload over time settings, or some combination thereof. For example, some electronic devices may be configured to operate as multi-link devices that include multiple radios (e.g., may co-run or include unification of different radios within a single common circuit). Further, some electronic devices may operate at different operating points or different modes (e.g., using different voltage domains). For example, a single common electronic device may include components that operate within two different voltage domains (e.g., using different values of VDD). In addition, different electronic devices may operate within a wide range of voltage domains.

Some switched inductor regulators may operate less efficiently as a difference between the voltage domains increases. Some SCRs may be configured to operate only within specific ratios of voltage domains. These SCRs may be configured to convert a voltage to a different voltage only by a specific ratio. These SCRs may not be able to provide a voltage in a wide range of voltage domains.

One or more aspects of the present disclosure may include a configurable SIMO converter combined with one or more SCRs (referred to in the present disclosure as a combined converter). The combined converter may increase a range of voltage domains (e.g., voltage values) of a respectively associated regulator-specific target output voltage versus a SIMO converter alone or a SCR alone. In addition, the combined converter may increase the range of voltage domains of the respectively associated regulator-specific target output voltage while not reducing the efficiency of the SIMO converter. The combined converter may include a configurable network of regulator switches and regulator capacitors electrically coupled to the converter output of the SIMO converter. The configurable network of regulator switches and regulator capacitors may be configured to increase the range of voltage domains supplied by the combined converter.

In some aspects of the present disclosure, the SIMO converter may receive an input voltage at a first voltage value. The SIMO converter may provide the switching output voltage at a second voltage value based on the input voltage. In addition, in some aspects of the present disclosure, the second voltage value of the switching output voltage may be different than the first voltage value of the input voltage. In some aspects of the present disclosure, the second voltage value may be greater than or less than the first voltage value.

In some aspects of the present disclosure, the SIMO converter may include multiple converter output lines. The SIMO converter may provide the switching output voltage to one or more converter output lines. The SIMO converter may set the second voltage value of the switching output voltage to be different on two or more converter output lines based on the settings of the corresponding electronic device.

In some aspects of the present disclosure, the SIMO converter may include a switch controller. The switch controller may control the switches within the SIMO converter to control the switching output voltage. For example, the switch controller may control the switches to set the second voltage value of the switching output voltage.

The SCRs may dynamically set a respectively associated regulator-specific target output voltage for the corresponding converter output line. In some aspects of the present disclosure, the SCRs may provide the respectively associated regulator-specific target output voltage at a third voltage value based on the switching output voltage. In addition, the third voltage value of the regulator-specific target output voltage may be different than the second voltage value of the switching output voltage. The third voltage value may be greater than or less than the second voltage value.

In some aspects of the present disclosure, each of SCRs may be electrically coupled to a different converter output line of the SIMO converter. The SCRs may provide the regulator-specific target output voltage to the corresponding converter output lines. In these and other aspects of the present disclosure, the SCRs may set the third voltage values of the regulator-specific target output voltage to be different than the second voltage value of the switching output voltage.

In some aspects of the present disclosure, each of the SCRs may include a regulator input node and a regulator output node as part of the corresponding converter output line. One or more of the SCRs may include multiple regulator capacitors. In these and other aspects of the present disclosure, one or more of the SCRs may include multiple regulator switches. In addition, the regulator switches may selectively connect the regulator capacitors to the corresponding regulator input node, the corresponding regulator output node, or the reference potential.

In some aspects of the present disclosure, the regulator switches may selectively connect two or more of the regulator capacitors in parallel between the corresponding regulator input node and the corresponding regulator output node. The regulator switches may selectively connect two or more of the regulator capacitors in series between the corresponding regulator input node and the corresponding regulator output node.

In some aspects of the present disclosure, the combined converter may include one or more linear regulators, such that the voltages of all, or fewer than all, output rails of the SIMO converter 104 are regulated by a linear regulator. Multiple types of linear regulators are disclosed herein, and the one or more linear regulators may include any of the disclosed linear regulators, or any combination of linear regulators. Where the voltages of fewer than all output rails are regulated by the one or more linear regulators, these output rails without a linear regulator may be regulated by a non-linear regulator or otherwise have no regulator. The combined converter may include one or more SCRs electrically coupled to one or more converter output line. In some aspects of the present disclosure, the linear regulator may be electrically coupled to different converter output lines than the SCRs. In other aspects of the present disclosure, the linear regulator may be electrically coupled to common converter output lines as one or more SCRs.

In some aspects of the present disclosure, the linear regulator may be configured to dynamically set the respectively associated regulator-specific target output voltage. The linear regulator may operate in place of, or in combination with, the SCRs. In other aspects of the present disclosure, the linear regulator may dynamically set the respectively associated regulator-specific target output voltage by regulating the switching output voltage.

In some aspects of the present disclosure, the combined converter may include one or more push-pull regulator. The combined converter may include one or more SCR electrically coupled to one or more converter output line. The push-pull regulator may be electrically coupled to different converter output lines than the SCRs.

In some aspects of the present disclosure, the push-pull regulator may be configured to dynamically set the respectively associated regulator-specific target output voltage. The push-pull regulator may operate in place of, or in combination with, the SCRs. In other aspects of the present disclosure, the push-pull regulator may dynamically set the respectively associated regulator-specific target output voltage by regulating the switching output voltage.

In some aspects of the present disclosure, one or more switches of the SIMO converter may include a transistor. One or more of the regulator switches may include a transistor.

One or more aspects of the present disclosure may increase a voltage range (e.g., system flexibility in voltage generation) for the voltage domains electronic devices that may be powered by the combined converter versus a SIMO converter alone or an SCR alone. These and other aspects of the present disclosure may permit a greater type of electronic devices to efficiently operate using the combined converter instead of a SIMO converter alone or an SCR alone. In addition, one or more aspects of the present disclosure may improve efficiency versus workload over time settings of the electronic devices versus a SIMO converter alone.

One or more aspects of the present disclosure may dynamically vary the regulator-specific target output voltage based on the workload over time settings of the electronic devices. These and other aspects of the present disclosure may dynamically vary the regulator-specific target output voltage to permit electronic devices that include components that operate within different voltage domains to properly and/or efficiently operate. Further, one or more aspects of the present disclosure may optimize voltage ripple and/or load regulation versus a SIMO converter alone or a SCR alone.

According to an aspect of the disclosure, the SIMO buck-boost converter may utilize a switch matrix to open or close galvanic connections between the output rails. In this manner, the switch matrix may connect, for example, an input portion of a first output rail to an output portion of a second output rail. For example, if a first converter output is connected to a BLE device and a second converter output is connected to a Wi-Fi module, the switch controller may use the converter outputs interchangeably since both devices have similar domain voltages. Further stated, if the SIMO converter switches (e.g. using switches 204*a-n*) between an output rail for a BLE device and an output rail for a Wi-Fi module, the switch controller may maintain the first converter output (for the BLE device) active and cause the switch matrix to connect the first converter output to the Wi-Fi module instead of deactivating the first output and activating the second output.

Figure 71:
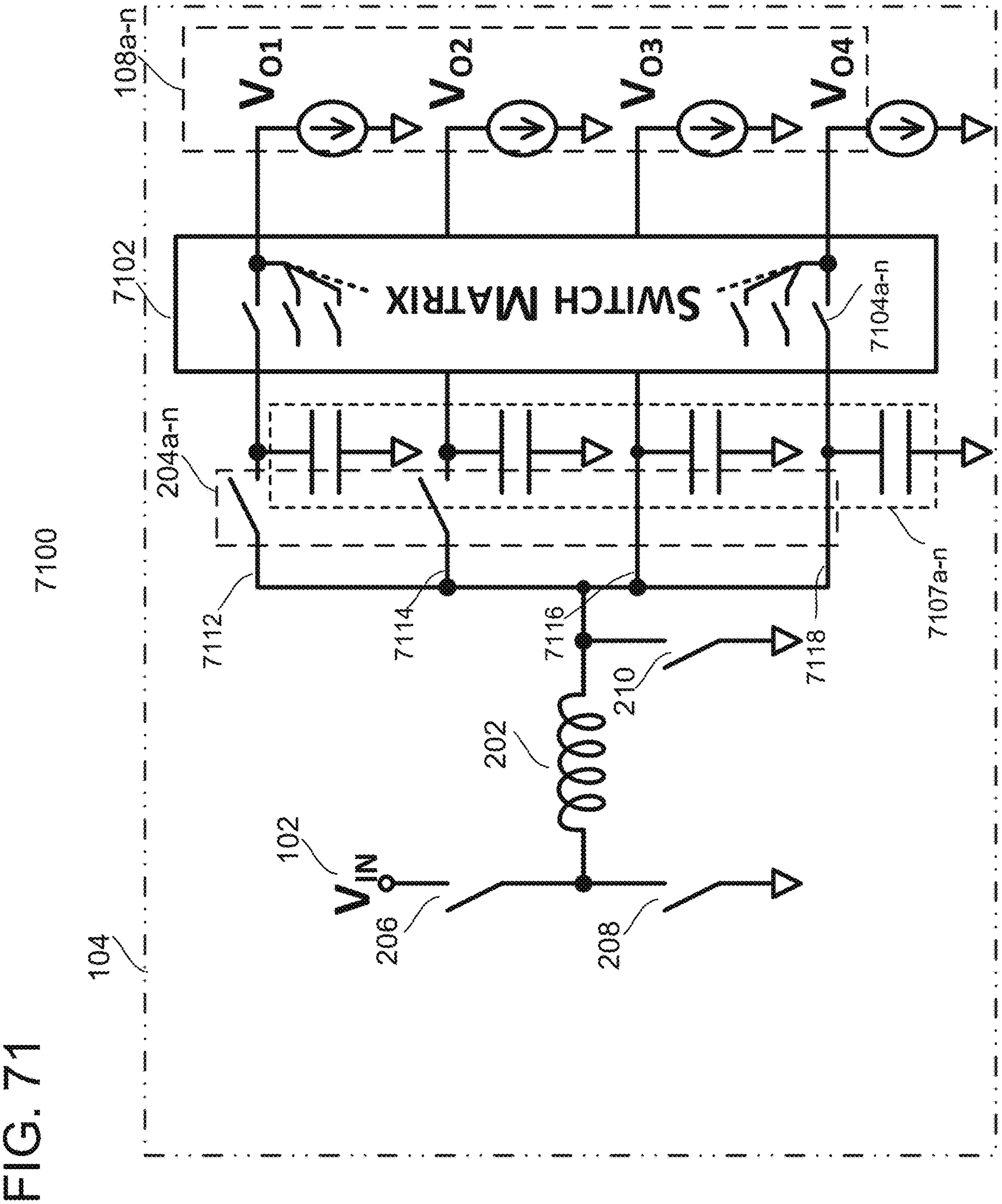
FIG. 71 exemplarily illustrates a block diagram of a SIMO system according to an aspect of the disclosure.

FIG. 71 illustrates a block diagram of an example SIMO circuitry 7100 according to an aspect of the disclosure. SIMO circuitry may include SIMO converter 104 as previously described in the present disclosure. In some aspects of the present disclosure, the SIMO converter may include one or more capacitors 7107*a-n* electronically coupled with one or more output rails. In some aspects of the present disclosure, SIMO circuitry 7100 may include switch matrix 7102. Switch matrix 7102 may include one or more configurable switches 7104*a-n*. SIMO circuitry 7100 may further include one or more switch controllers (not shown) to control switches 7104*a-n* and 204*a-n*.

The one or more switches 7104*a* may transition between an open (non-conducting) and closed (conducting) state. Configurable switches 7104*a-n* may connect each converter output rail 7112-7118 to one or more of the other converter output rails 7112-7118. As load demand changes for at least one of output voltages 108*a-n*, switch matrix 7102 may control one or more switches 7104*a-n* to open or close to accommodate a new load demand. If the load demand for an output voltage increases, one or more switches 7104*a-n* may close to draw current from one or more other rails. If the load demand for an output voltage decreases, one or more switches 7104*a-n* may open to draw less current from one or more other rails.

For example, the converter output rail 7118 may be associated with an output voltage 108. In response to an increased load demand for an output voltage associated with rail 7118, switch matrix 7102 may control one or more switches 7104*a-n* to connect rail 7118 to rail 7116 to draw more current for the voltage output associated with rail 7118. As illustrated in FIG. 71, switch 204 associated with rail 7116 is closed. However, switches 7104*a-n* may be configured to prevent rail 7116 from providing an output voltage. Therefore, the increase in load demand for output voltage associated with rail 7118 is drawn from the output terminal of inductor 102 through rail 7116.

Alternatively, in response to an increased load demand for an output voltage associated with rail 7118, switch matrix 7102 may control one or more switches 7104*a-n* to connect rail 7118 to rails 7112 and/or 7114 to draw more current for the voltage output associated with rail 7118. As illustrated in FIG. 71, switches 204 associated with rails 7112 and 7114 are open. Therefore, the increase in load demand for output voltage associated with rail 7118 is drawn from capacitors 7107*a-n* associated with rails 7112 and 7114. Capacitors 7107*a-n* may have been charged when the associated switches 204*a-n* were closed.

FIG. 72 illustrates a flowchart of an example method 7200 of operating a SIMO circuitry according to at least one aspect of the present disclosure. Method 7200 may include providing, via a plurality of switches, a switching output voltage to a converter output line of a plurality of converter output lines in response to an input current supplied to an inductor 7202. The method may further include controlling the plurality of switches to control the switching output voltage 7204. The method may further include setting, via dynamically regulating at least one switched capacitor, a respectively associated regulator-specific target output voltage for a respective converter output line of the plurality of converter output lines 7206. The method may further include controlling a plurality of output line switches of a switch matrix to selectively couple converter output lines with each other 7208.

Electronic devices coupled to SIMO converter outputs may have time-varying load demand requirements. According to some aspects of the present disclosure, a switch matrix including one or more switches may be embedded between SIMO converter output rails. The one or more switches may be reconfigured to allow delivery of higher currents from inactive rails when the active rail's load demand changes dynamically. Some aspects of the present disclosure may increase a SIMO circuitry's performance and efficiency when load demand is time-varying. The regulated output of a converter output may introduce noise to different regulated converter outputs. Analog and radio frequency (RF) signals are especially sensitive to cross-regulation noise. Operating the SIMO circuitry with a switch matrix as previously described may reduce or eliminate cross-regulation noise/ripple from transients between one regulated output voltage and other output rails. Additionally, a SIMO circuitry implementation including a switch matrix may regulate the output voltage to ensure that the output voltage is below loadline. If one or more SIMO circuitry rails are inactive while an active rail experiences a current surge, the switch matrix may reallocate an active rail's current surge to different loads.

A switch controller may include a machine learning circuit that may increase the SIMO converter's efficiency by utilizing machine learning computational models to predict load demand changes. For example, a deep learning architecture such as a deep neural network (DNN) may anticipate dynamic changes in load demands. Many machine learning models, including but not limited to, a neural network, convolutional neural network, autoencoder network, variational autoencoder network, sparse autoencoder network, recurrent neural network, deconvolutional network, generative adversarial network, forward thinking neural network, sum-product neural network, or any combination thereof, may anticipate load demand changes for the switch matrix.

The machine learning algorithm may be trained to determine load demand changes associated with electrical devices coupled to the SIMO converter. In this way, the switches can be seamlessly reconfigured to accommodate the load changes without any loss of performance. Additionally, the machine learning algorithm can employ a machine learning model to continuously learn based on input of load demand changes and more accurately predict future load demand changes.

According to some aspects of the present disclosure, an input voltage is supplied to the inductor of the SIMO converter. As a result, the one or more switches provide a switching output voltage from the inductor of the SIMO converter at a converter output line. A switch controller may adjust the switching output voltage to control the one or more switches of a switch matrix. In other aspects of the disclosure, the switch matrix may be configured to open and close switches to connect two or more converter output lines.

According to some aspects of the present disclosure, the switch matrix controller is configured to control the one or more switches to dynamically regulate the output voltages of the converter output lines in response to a change in load demand.

According to some aspects of the present disclosure, the switch matrix controller dynamically opens and closes the one or more output line switches to accommodate a change in load demand based on a predicted change of a load for the output line.

According to some aspects of the present disclosure, the single inductor multiple output converter includes one or more switched capacitor regulators to dynamically set a respectively associated regulator-specific target output voltage for a respective converter output line of the plurality of converter output lines.

According to some aspects of the present disclosure, one or more of the switched capacitor regulators include one or more regulator capacitors and regulator switches to connect the capacitors in parallel between a regulator input on the respective converter output line and a regulator output node on the respective converter output line.

According to some aspects of the present disclosure, the switch matrix includes the plurality of regulator switches. In other aspects the switch matrix controller is configured to control the plurality of regulator switches.

According to some aspects of the present disclosure, the linear regulator dynamically sets a respectively associated regulator-specific target output voltage to a respective further converter output line of the plurality of converter output lines.

According to some aspects of the present disclosure, the SIMO circuitry includes one or more push-pull regulators to dynamically set a regulator-specific target output voltage. The regulator-specific target output voltage is supplied to a respective converter output line of SIMO.

According to some aspects of the present disclosure, the regulators are configured to dynamically set a respectively associated regulator-specific target output voltage to a respective converter output of the plurality of converter outputs.

According to some aspects of the present disclosure, the plurality of switches and the switch controller are monolithically integrated on a common chip, and the inductor is implemented separately from the common chip. In these and other aspects, the one or more switches include a first switch coupled between a first terminal of the inductor and the input voltage and a second switch coupled between the first terminal of the inductor and a reference potential. In these and other aspects, the one or more switches include a third switch coupled between a second terminal of the inductor and a reference potential.

According to some aspects of the present disclosure, the plurality of switches includes a fourth switch coupled between a second terminal of the inductor and the switching output voltage.

According to some aspects of the present disclosure, the one or more switches includes a fifth switch coupled between a second terminal of the inductor and the input voltage.

Switched mode DC-to-DC power converters are electronic circuits that convert a DC input current from a first voltage to a DC output current of a second voltage. Switched-mode DC-to-DC converters operate by temporarily storing the input energy and then releasing that energy to an output at a different voltage. Energy may be stored in magnetic fields of one or more inductors and then released at a different voltage to an output. Switched mode DC-to-DC converters may be configured at least as a boost converter (step-up), a buck converter (step-down), or a buck-boost converter (step-up or step-down).

Whatever the configuration, switched mode converters disclosed herein include at least one inductor, and one or more semiconductor switches connected to a voltage source. The one or more semiconductor switches may be operated by a control circuit, which may be programmed to output a switching signal to the one or more switches at a desired frequency (e.g., output a switching signal to a base/gate of a transistor to cause the transistor to enter and exit an active mode/saturation mode).

Switched mode DC-to-DC power converters may be configured as a buck converter. A buck converter may be configured to reduce an input voltage (Vin) to one or more desired output voltages (Vout1, Vout2, etc.), the one or more output voltages being less than the input voltage ($V_{in}$).

Figure 73:
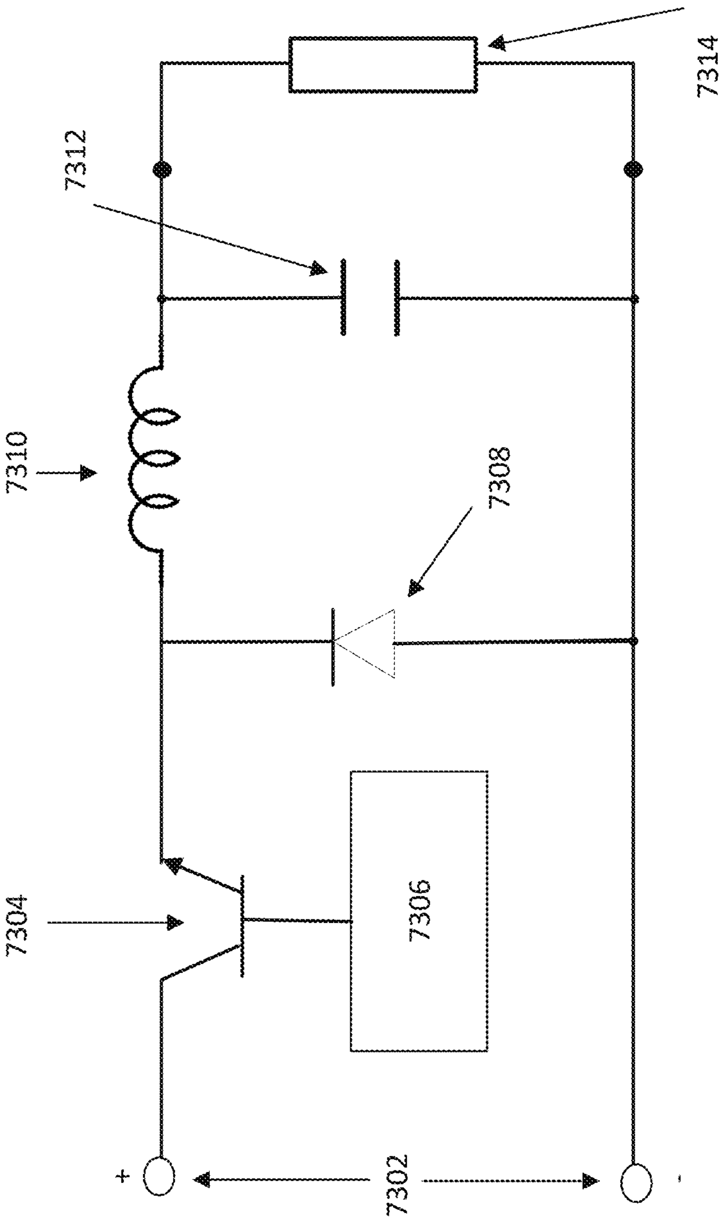
FIG. 73 depicts a buck converter according to an aspect of the disclosure.

Buck converters may include a transistor (e.g., FET, MOSFET) as a main switching device to reduce an input voltage to an output voltage. FIG. 73 depicts a buck converter according to an aspect of the disclosure. The buck converter includes a transistor, which is operated as a switch 7304 based on an output of a control circuit 7306 at its base/gate. This buck converter includes an inductor 7310, which is connected to a voltage input through the switch 7304. The buck converter may further include a diode 7308, a capacitor 7312, and a load 7314. An input voltage Vin is applied to an input stage 7302 of the converter. The buck converter may operate according to two operating modes, depending on whether the switching transistor 7304 is turned "on" or "off".

In the first operating more, the switching transistor 7304 is biased "on" (e.g., the switch is closed), the diode 7308 becomes reverse biased, and the input voltage Vin causes a current to flow through the inductor 7310 and to the load 7314. This current also charges the capacitor 7312. The inductor 7310 opposes the change in current and stores a portion of its received energy in a magnetic field.

When the transistor 7304 is turned "off" (e.g., the switch is open), the input voltage is disconnected from the inductor 7310. This decrease in voltage causes the inductor's magnetic field to break down, which induces a reverse voltage across the inductor 7310. This reverse voltage results in the diode 7308 becoming forward biased and causes a current to flow to the load 7314. The capacitor 7312 also discharges its stored electrical field, thereby supplying current to the load.

Otherwise stated, when the switch 7304 is closed, current flows as a result of the input voltage 7302, and when the switch 7304 is open, current flows due to the discharge of the inductor's magnetic field. The average output voltage (Vout) of the buck converter is a function of the duty cycle, which may be understood as the duration that the transistor switch is set to "on" during one full switching cycle. The average output voltage may be understood as:

$$V_{out} = \frac{t_{on}}{t_{on} + t_{off}} = V_{in} \tag{4}$$

As the duty cycle of a buck converter can be considered as:

$$D = \frac{t_{on}}{t_{on} + t_{off}} = \frac{t_{on}}{\text{Total Time}} = \frac{t_{on}}{T} \tag{5}$$

Then, the output voltage can be calculated as:

$$V_{out} = DV_{in} \tag{6}$$

Assuming that the switching transistor is turned off for any duration, the output voltage will always be less than the input voltage.

Figure 74:
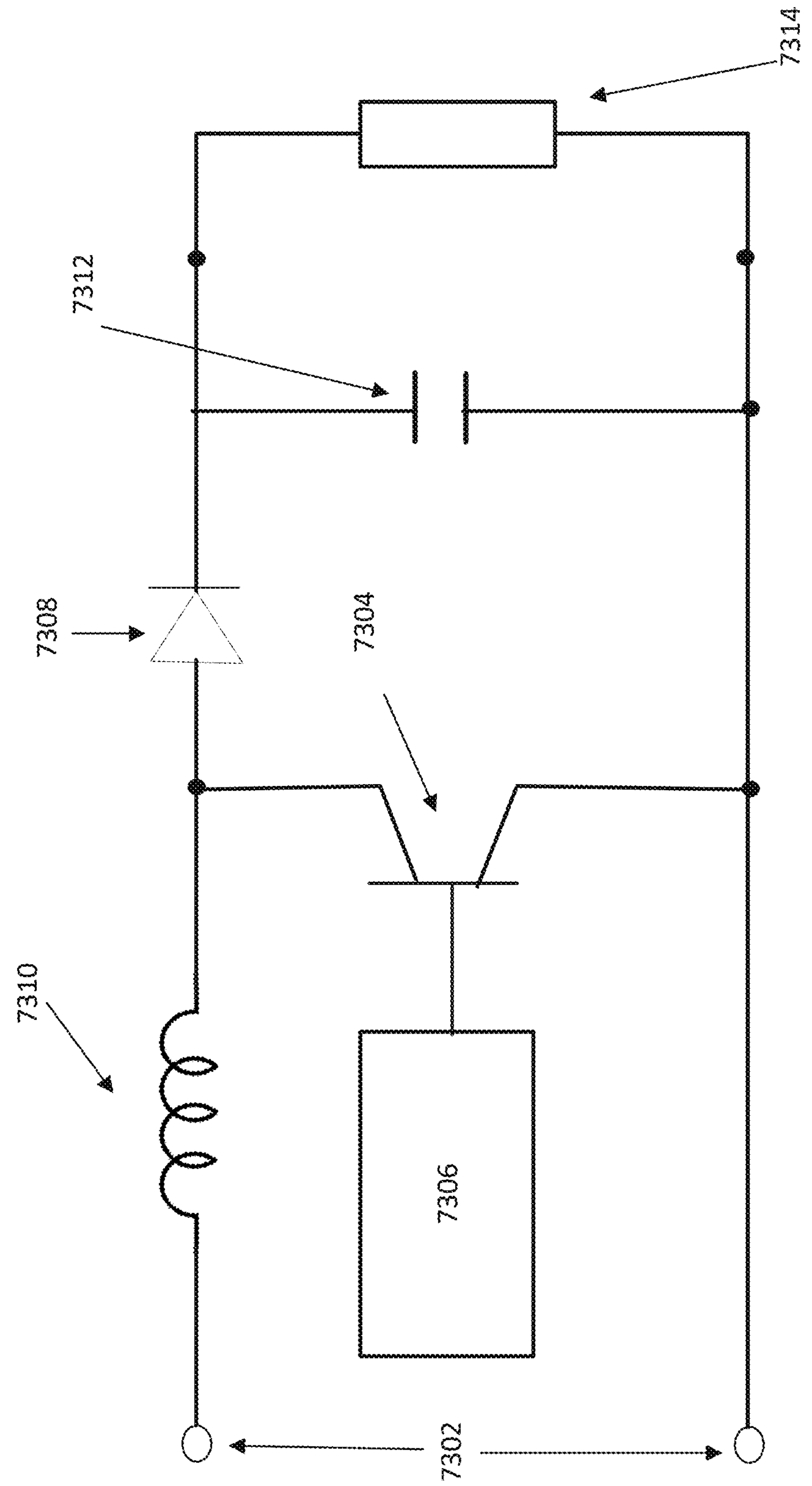
FIG. 74 depicts a boost converter configuration according to another aspect of the disclosure.

A DC-to-DC switched mode power converter may also be configured as a boost converter and thereby be configured to output a higher voltage than the input voltage. FIG. 74 depicts a boost converter configuration according to another aspect of the disclosure. In the boost converter, when the transistor switch 7304 is "on", the input voltage $V_{in}$ causes a current to pass through the inductor 7310 and transistor switch 7304 and then return to the supply. The current flowing through the inductor causes the inductor to build a magnetic field, in which energy is stored.

When the transistor switch 7304 is "off", the current cannot flow through the transistor 7304 and thus flows through the diode 7308, which is connected in series to the inductor 7310. Due at least to the longer path and increased resistance, less current flows through the inductor 7310, thereby resulting in a decrease of the inductor's magnetic field. As the magnetic field decreases, the inductor generates a reverse voltage, which is added to the input voltage. This summed voltage may be applied to the capacitor 7312, which may store energy in an electrical field at the combined voltage of the input voltage and the discharged inductor voltage.

A boot converter's output can be calculated as:

$$V_{out} = V_{in}\left(\frac{1}{1-D}\right) \tag{7}$$

Figure 75:
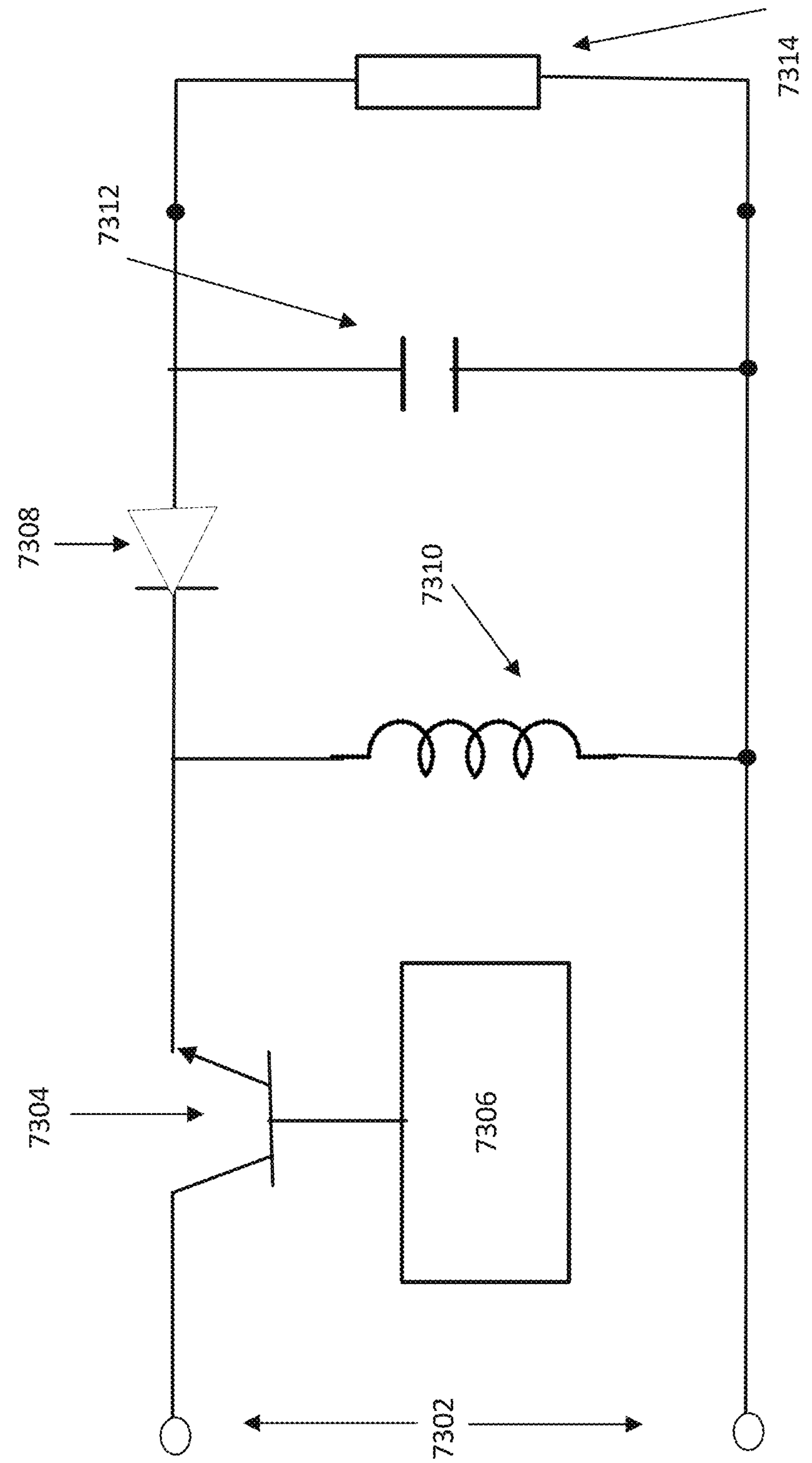
FIG. 75 depicts a buck-boost converter, according to an aspect of the disclosure.

A DC-to-DC converter may be configured as a buck-boost converter, which may be configured to output a voltage that is either greater than or less than the input voltage. FIG. 75 depicts a buck-boost converter, according to an aspect of the disclosure. In a buck-boost configuration, and when the transistor switch 7304 is "on" (e.g., closed), the input voltage Vin 7302 causes a current to flow through the transistor switch and through the inductor 7310. In this configuration, the diode 7308 is reversed biased, thereby preventing current from flowing past the diode. As the input voltage is applied to the inductor, the inductor builds a magnetic field, within which some of the electrical energy is stored.

When the transistor switch 7304 is "off" (e.g., open), the inductor's magnetic field begins to dissipate, and electrical energy stored in the inductor is transferred to the load. When this occurs, the voltage across the inductor reverses, which causes the output voltage of the inductor to be added to the input voltage, thereby resulting in a voltage of greater magnitude than the input voltage. Moreover, this combined voltage is applied to the capacitor 7312. Because the reversed voltage of the discharging inductor applies a positive voltage to the anode of the capacitor 7312, the discharge voltage may be added to any voltage of the stored energy within the capacitor. Depending on the length of the duty cycle, it may be possible to sequentially increase the voltage at the capacitor to levels much greater than the input voltage.

Depending on the duty cycle, the magnitude of the inductor's inverted output voltage can be greater, smaller, or equal to the magnitude of the input voltage.

The voltage output of a buck-boost converter may be calculated as:

$$V_{out} = V_{in}\left(\frac{1}{1-D}\right) \tag{8}$$

In some implementations, it may be desirable to utilize a low-dropout regulator (LDO), which may be used to regulate an output voltage. Rather than relying on transistor switching to regulate an output voltage, such as in a buck converter, boost converter, or a buck-boost converter, LDOs do not rely on switching and thus have no switching noise. LDOs are, however, generally less efficient than switching regulators, as they regulate voltage by dissipating power as heat.

Figure 76:
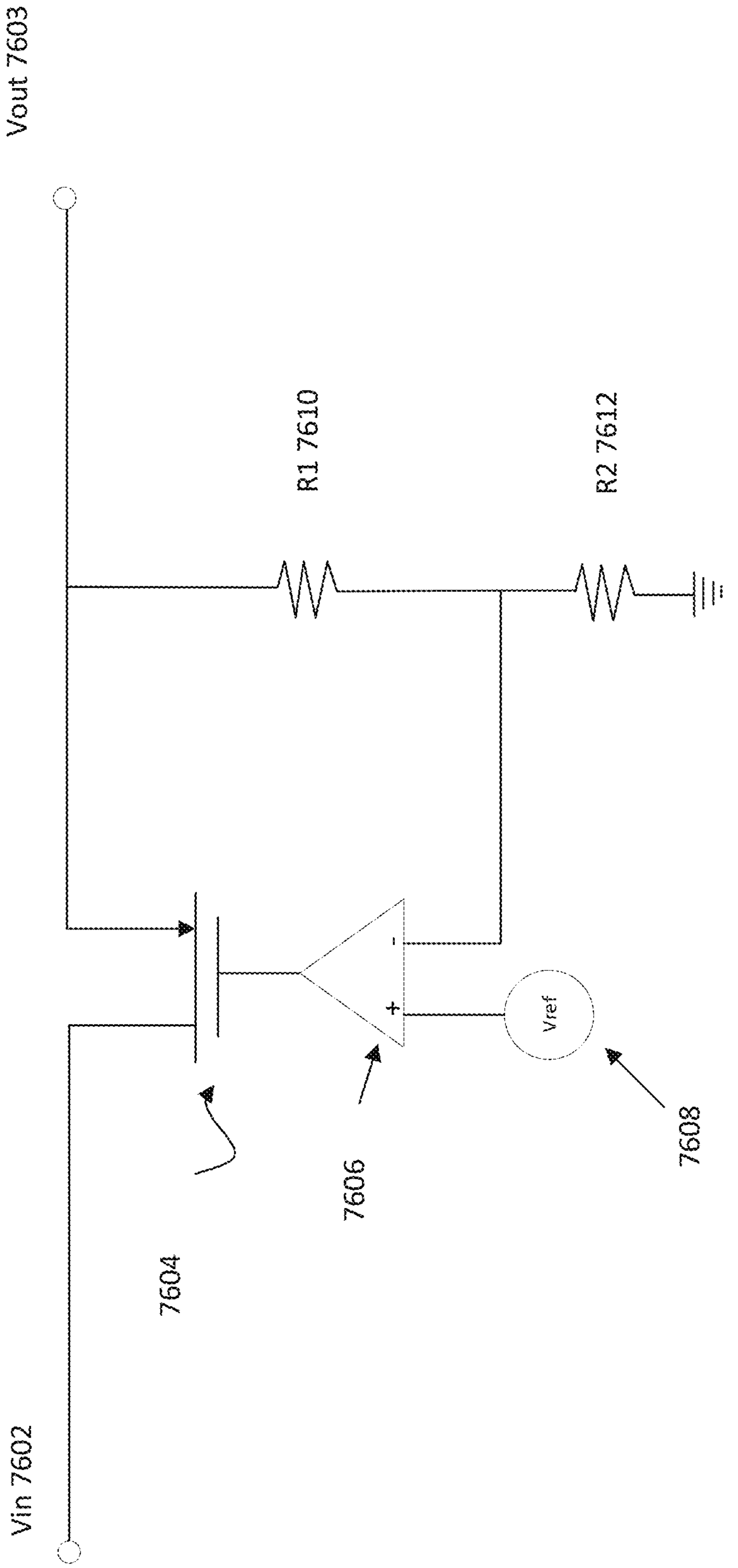
FIG. 76 depicts an LDO according to an aspect of the disclosure.

FIG. 76 depicts an LDO according to an aspect of the disclosure. In this figure, an input voltage Vin 7602 is coupled to a transistor 7604. The transistor may be configured in an open collector/open drain typology, wherein the current exits the transistor at the output voltage. The transistor may be controlled (e.g., driven into and out of saturation) by an amplifier 7606, which is connected to a reference voltage 7608 at a predetermined reference voltage value. The other input of the amplifier 7606 is a voltage that is dependent on an output of the transistor 7604. In a typical configuration, the transistor output passes in part through a branch having a stacked first resistor 7610 and a second resistor 7612, which may be selected correspondingly with the reference voltage, for example, according to:

$$R_2 = \frac{(V_{out} - V_{ref}) * R_1}{V_r} \tag{9}$$

If the voltage between R1 and R2 is less than the reference voltage 7608, the amplifier controls the transistor to increase the output voltage. If the voltage between R1 and R2 is greater than the reference voltage 7608, the amplifier controls the transistor to reduce the output voltage. In this manner, the output voltage Vout can be tightly controlled. An LDO is a type of linear regulator and functions as a step-down converter. This means that an output voltage will be equal to or less than the input voltage.

The converters and regulators described herein may be implemented, whether alone or in combination, in a variety of applications. In many applications, including but not limited to applications in computers, integrated circuits, and wireless communication technology, a variety of components requiring a variety of different voltages may be present. At least for size and cost considerations, it may be impractical and/or undesirable to provide a separate and component-specific supply voltage (e.g., a separate transformer or a separate AC-to-DC converted voltage) to each component. Some conventional approaches have utilized multiple DC-to-DC converters to achieve and supply the necessary variety of voltages; however, this often proves to be sub-optimal in terms of cost and efficiency.

Having multiple switched mode DC-to-DC converters generally requires a separate inductor for each converter. Since an inductor is a physical component consisting of a coiled conductor, inductors may be large and require significant silicon space compared to other electronic components. Furthermore, the implementation of multiple separate switched mode DC-to-DC converters, and thus including multiple inductors, increases cost.

Linear regulators do not require an inductor and thus may not be associated with certain disadvantages related to expense and silicon space that are common with switched mode converters; however, linear regulators dissipate excess power as heat and thus have decreased efficiency compared to switched mode regulators.

Single Inductor Multiple Output (SIMO) regulators solve many of these problems by efficiently converting a single input voltage to one or more different output voltages, using only a single inductor. Some illustrative SIMO architectures, as well as their operations, will be described below with reference to FIGS. 77-80. These SIMO architectures may be used to implement the SIMO converter 104 described supra, depending on the requirements of specific applications.

Figure 77:
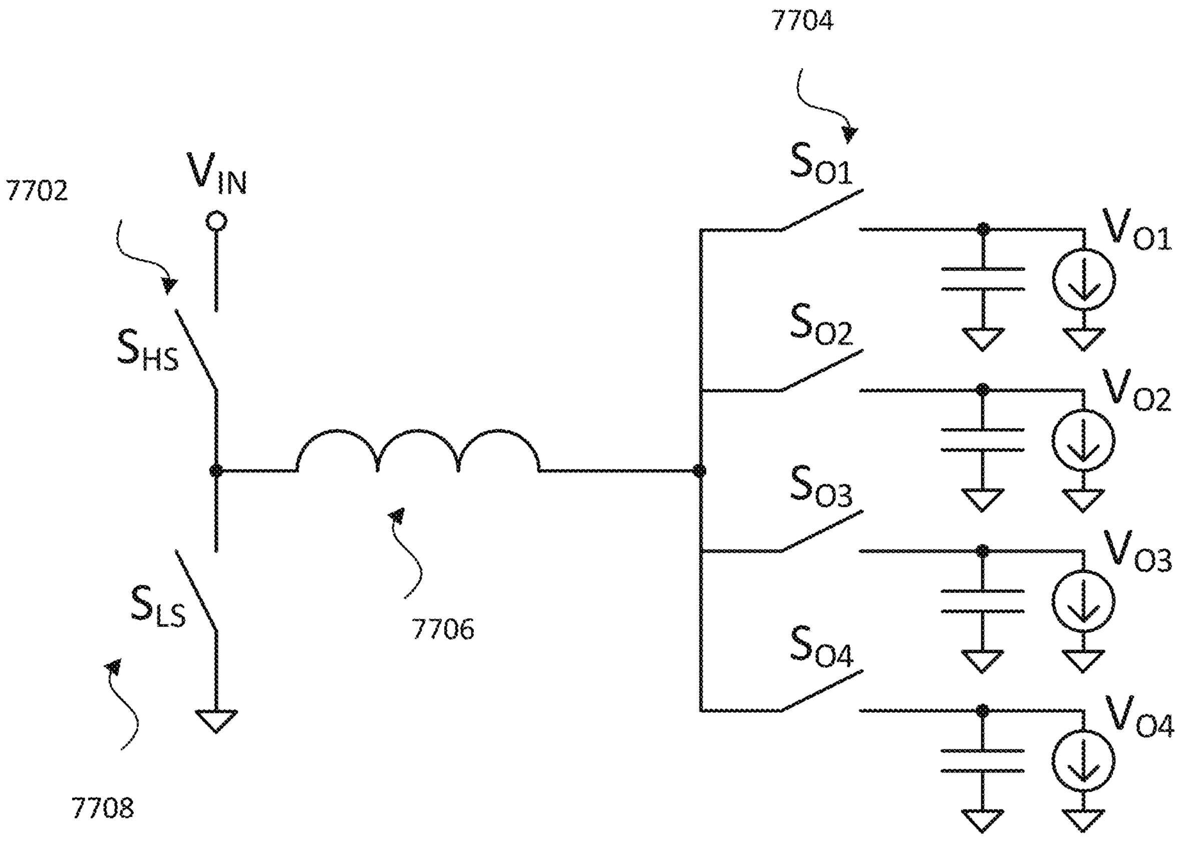
FIG. 77 depicts a SIMO architecture configured as a buck converter, according to one aspect of the disclosure.

FIG. 77 depicts a SIMO architecture configured as a buck converter, according to one aspect of the disclosure. In this configuration, the SIMO converter includes a voltage input (Vin) switch $S_{HS}$ 7702, a plurality of output switches S01-S04 7704, an inductor 7706, and a discharge switch $S_{LS}$ 7708. Analogously to the DC-to-SC buck converter described above, the inductor may undergo a rapid succession of energizing and deenergizing phases. During the energizing phase, voltage input switch $S_{HS}$ 7702 and one or more of the output switches S01-S04 7704 close. The input voltage thus causes a current to flow through the inductor 7706 and across the one or more closed switches 7704, into the corresponding voltage outputs V01-V04. The inductor stores a portion of this energy in a magnetic field. In a deenergizing phase voltage input switch $S_{HS}$ is opened, thereby breaking the connection to Vin and reducing the voltage applied to the inductor 7706. This causes the inductor's magnetic field to break down, which results in a voltage that causes current to flow to one or more open switches S01-S04 7704. As the magnetic field decays, the voltage diminishes. The one or more switches S01-S04 7704 may be selectively closed during the decay cycle to receive current at a desired voltage corresponding to the instantaneous voltage of the decay cycle. If it is not desired for any of the output switches S01-S04 to close for the corresponding outputs to receive current from one or more portions of the decay cycle, switch SLS may be closed while some or all of the switches S01-S04 remain open, which will result in stored charge being drained to ground. In this manner, the SIMO architecture functions as a buck converter, reducing voltage from the supply voltage to one or more lower output voltages.

Figure 78:
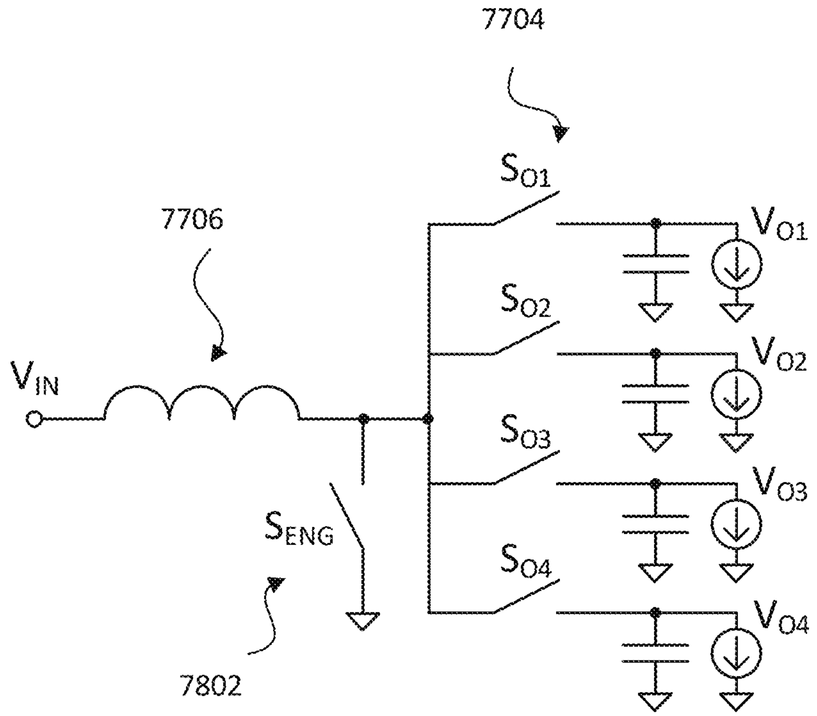
FIG. 78 depicts a SIMO architecture configured as a boost converter, according to one aspect of the disclosure.

FIG. 78 depicts a SIMO architecture configured as a boost converter, according to one aspect of the disclosure. The SIMO boost converter includes an inductor 7706 connected between a voltage input Vin and one or more switches S01-S04 7704. The inductor terminal opposite the voltage input is connected to an energizing switch (SENG) 57802. Analogous to the DC-to-DC boost converter described above, in an energizing phase, the energizing switch $S_{ENG}$ is closed, which, due to the short conductive path and/or low resistance, causes a high amount of current to be transferred across the inductor. The inductor stores a portion of this energy in its magnetic field. In a deenergizing phase, the energizing switch $S_{ENG}$ 7802 is opened and one or more of the output switches S01-S04 7704 are closed. The longer conduction path/increased resistance results in a partial breakdown of the inductor's magnetic field, and the magnetic field's decay generates a voltage, which is added to the input voltage $V_{in}$, thereby resulting in a greater output voltage than the input voltage. During the deenergizing phase, the output switches S01-S04 may be closed to apply the resulting voltage to one or more corresponding, desired outputs.

Figure 79:
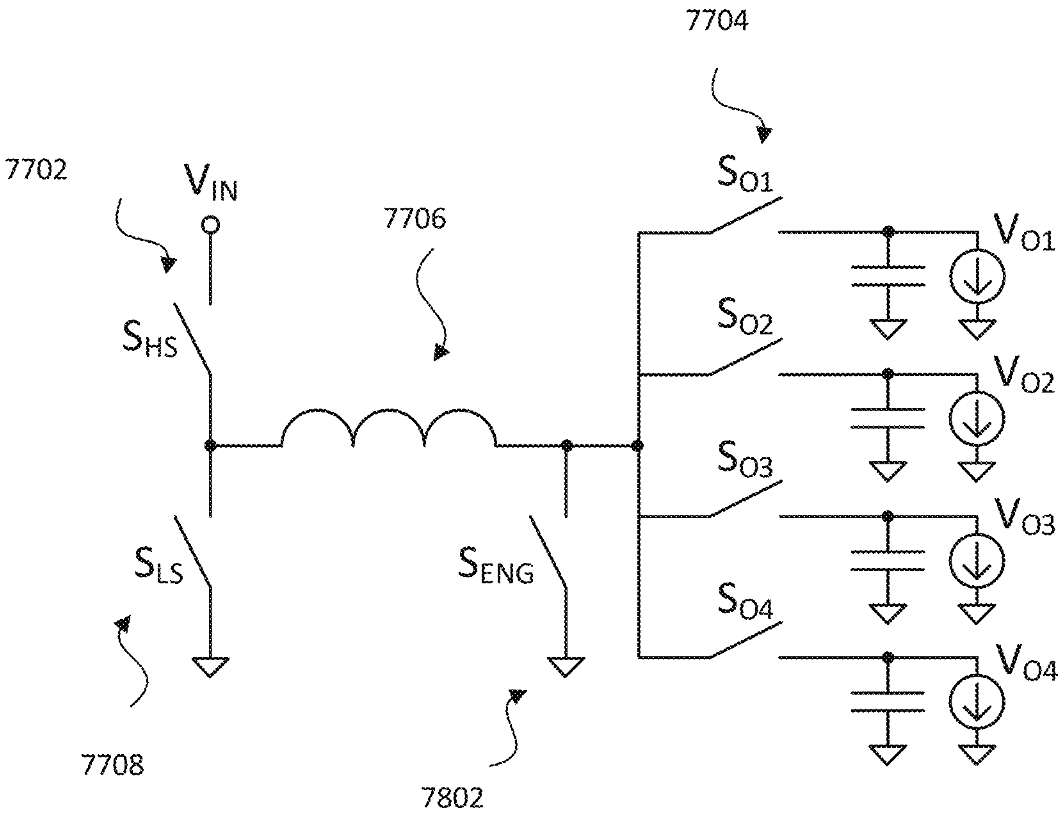
FIG. 79 depicts a SIMO architecture configured as a buck-boost converter.

FIG. 79 depicts a SIMO architecture configured as a buck-boost converter, according to one aspect of the disclosure. The SIMO buck-boost converter includes an inductor 7706 connected between or to a voltage input $V_{in}$ and one or more switches S01-S04 7704. An input voltage (high side) switch $S_{HS}$ 7702 is placed in serial between the voltage input Vin and the inductor 7706. A low side switch 7708 permits a connection to group for deenergizing the inductor 7706, and an energizing switch 7802 in combination with the voltage input switch $S_{HS}$ permits for an energizing phase of the inductor when the switched S01-S04 7704 are closed. By utilizing the switches $S_{HS}$ 7702, $S_{LS}$ 7708, SENG 7802 and S01-S04 7704 as described above according to the buck converter configuration and the boost converter configuration, the SIMO converter can output to one or more output rails simultaneously a voltage that is greater than, less than, or equal to the input voltage, as desired.

Figure 80:
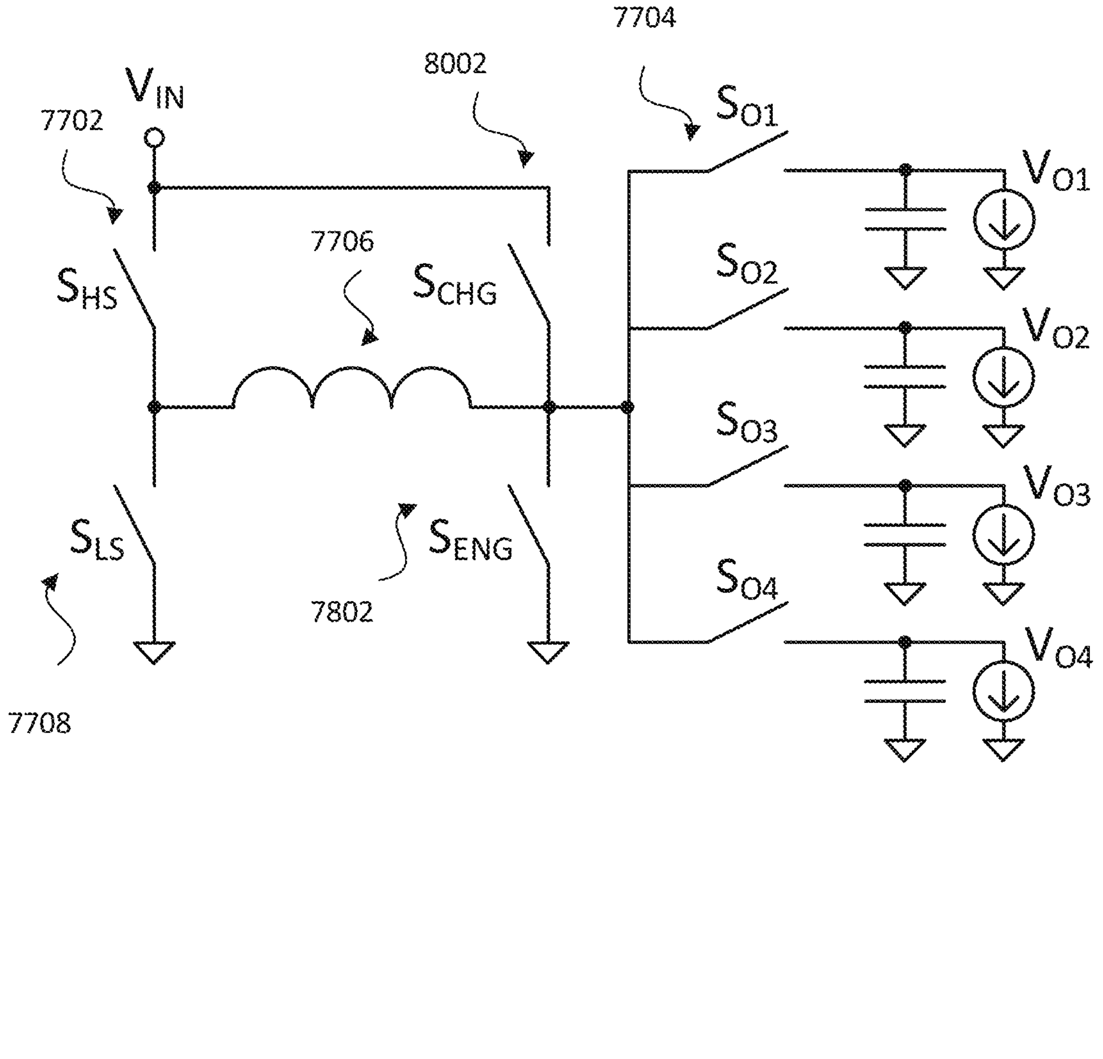
FIG. 80 depicts a SIMO architecture configured as a buck-boost converter with an H-bridge.

FIG. 80 depicts a SIMO architecture configured as a buck-boost converter with an H-bridge, according to one aspect of the disclosure. This SIMO converter includes the elements of the buck-boost converter as described in FIG. 79, above, with an additional switch $S_{CHG}$ 8002, which permits an alternate energizing phase in which $S_{CHG}$ 8002 connects $V_{in}$ to the inductor, and $S_{LS}$ connects the opposite end of the inductor to ground. In this manner, the polarity of the inductor is reverse during the energizing phase, compared to the polarity of the inductor in the buck-boost converter as described in FIG. 79.

Although the SIMO architecture described herein is shown with four output switches (S01-S04), this number is selected merely for demonstrative purposes and can be selected to meet the needs of a given implementation.

In the following, various aspects of this disclosure will be illustrated by way of non-limiting examples.

Example 1a is a single inductor multiple output (SIMO) converter. The SIMO converter may include an inductor; and a plurality of switches to provide a switching output voltage in response to an input voltage applied to the inductor, wherein the plurality of switches includes a first switch coupled between a first terminal of the inductor and the input voltage, a second switch coupled between the first terminal of the inductor and a reference potential, and a third switch coupled between a second terminal of the inductor and a reference potential. A switch controller may be configured to control the plurality of switches to control the switching output voltage, and a plurality of regulators. Each regulator is configured to dynamically set a respectively associated regulator-specific predefined target output voltage, and to regulate the switching output voltage to stay within a predefined range from the target output voltage using the input voltage.

Example 2a is a SIMO converter. The SIMO converter may include a switching stage including an inductor and a plurality of switches to provide a switching output voltage in response to an applied input voltage dependent on the switching states of the plurality of switches. The plurality of switches includes a first switch coupled between a first terminal of the inductor and the input voltage, a second switch coupled between the first terminal of the inductor and a reference potential, and a third switch coupled between a second terminal of the inductor and a reference potential. The SIMO converter may further include a plurality of regulators, each regulator configured to receive the switching output voltage and to dynamically set an output voltage. Each regulator includes a circuit configured to determine at least one of whether the switching output voltage is above a predefined upper threshold voltage which is greater than a target regulator output voltage or whether the switching output voltage is below a predefined lower threshold voltage which is smaller than the target regulator output voltage, and to use the input voltage to regulate the switching output voltage.

Example 20a is a method of operating a single inductor multiple output SIMO converter. The method may include a plurality of switches providing a switching output voltage in response to an input voltage applied to an inductor. The plurality of switches may include a first switch coupled between a first terminal of the inductor and the input voltage, a second switch coupled between the first terminal of the inductor and a reference potential, and a third switch coupled between a second terminal of the inductor and a reference potential. The method may further include controlling the plurality of switches to control the switching output voltage; and operating each regulator of a plurality of regulators for dynamically setting a respectively associated regulator-specific predefined target output voltage, and regulating the switching output voltage to stay within a predefined range from the target output voltage using the input voltage.

Example 21a is a method of operating a SIMO converter. The method may include controlling a switching stage including an inductor and a plurality of switches to provide a switching output voltage in response to an applied input voltage dependent on the switching states of the plurality of switches. The plurality of switches includes a first switch coupled between a first terminal of the inductor and the input voltage, a second switch coupled between the first terminal of the inductor and a reference potential, and a third switch coupled between a second terminal of the inductor and a reference potential. Each regulator of a plurality of regulators dynamically sets an output voltage in response to receiving the switching output voltage, and determines at least one of whether the switching output voltage is above a predefined upper threshold voltage which is greater than a target regulator output voltage or whether the switching output voltage is below a predefined lower threshold voltage which is smaller than the target regulator output voltage, and regulates the switching output voltage using the input voltage.

Example 1b is a converter. The converter may include an inductor; a plurality of converter outputs; a plurality of switches to provide a switching output voltage in response to an input voltage supplied to the inductor; and a switch controller configured to control the plurality of switches to control the switching output voltage, and to apply the switching output voltage to a converter output of the plurality of converter outputs. The converter may further include one or more regulators. Each regulator is configured to dynamically set a respectively associated regulator-specific target output voltage to a respective converter output of the plurality of converter outputs. The converter may further include at least one processor to select an operation mode of the converter from a first operation mode or a second operation mode; to operate the converter as a single inductor multiple output converter in the first operation mode; and to operate the converter in a way that for at least one converter output the switching output voltage is not regulated and for at least one other converter output the associated regulator dynamically sets a respectively associated regulator-specific target output voltage in the second operation mode.

Example 2b is a converter. The converter may include an inductor; a plurality of converter outputs; a plurality of switches to provide a switching output voltage in response to an input voltage supplied to the inductor, wherein each converter output of the plurality of converter outputs has an associated selection switch, wherein each selection switch includes at least one transistor; a switch controller configured to control the plurality of switches to control the switching output voltage, and to apply the switching output voltage to a converter output of the plurality of converter outputs. The converter may further includes at least one processor to select an operation mode of the converter from a first operation mode or a second operation mode, to operate, in the first operation mode, the at least one transistor of each selection switch in its saturation region; and operate, in the second operation mode, the at least one transistor of at least one selection switch in its saturation region and the at least one transistor of at least one other selection switch in its linear region.

In Example 3b, the subject matter of Example 2b can optionally include that at least one converter output of the plurality of converter outputs has an associated regulator including the selection switch.

In Example 4b, the subject matter of any one of Examples 2b or 3b can optionally include that the at least one processor is further configured to operate, in the second operation mode, the at least one transistor of exactly one selection switch in its saturation region and the at least one transistor of at least one other selection switch in its linear region.

In Example 5b, the subject matter of any one of Examples 1b to 4b can optionally include that at least one regulator of the one or more regulators includes or is a linear regulator.

In Example 6b, the subject matter of any one of Examples 1b to 5b can optionally include that at least one regulator of the one or more regulators includes or is a digital regulator.

In Example 7b, the subject matter of any one of Examples 1b to 6b can optionally include that the at least one processor is further configured to operate the converter in a way that for exactly one converter output the switching output voltage is not regulated and for a plurality of other converter outputs the associated regulator dynamically sets a respectively associated regulator-specific target output voltage in the second operation mode.

In Example 8b, the subject matter of any one of Examples 1b to 7b can optionally include that the plurality of switches includes a first switch coupled between a first terminal of the inductor and the input voltage and a second switch coupled between the first terminal of the inductor and a reference potential.

In Example 9b, the subject matter of any one of Examples 1b to 8b can optionally include that the plurality of switches includes a third switch coupled between a second terminal of the inductor and a reference potential.

Example 10b is a method of operating a converter. The method may include a plurality of switches providing a switching output voltage to a converter output of a plurality of converter outputs in response to an input current supplied to an inductor; controlling the plurality of switches to control the switching output voltage; to apply the switching output voltage to a converter output of the plurality of converter outputs. The method may further include dynamically setting a respectively associated regulator-specific target output voltage to a respective converter output of the plurality of converter outputs; selecting an operation mode of the converter from a first operation mode or a second operation mode; operating the converter as a single inductor multiple output converter in the first operation mode; and operating the converter in a way that for at least one converter output the switching output voltage is not regulated and for at least one other converter output the associated regulator dynamically sets a respectively associated regulator-specific target output voltage in the second operation mode.

Example 11b is a method of operating a converter. The method may include a plurality of switches providing a switching output voltage to a converter output of a plurality of converter outputs in response to an input voltage supplied to the inductor, wherein each converter output of the plurality of converter outputs has an associated selection switch, wherein each selection switch includes at least one transistor; controlling the plurality of switches to control the switching output voltage, and to apply the switching output voltage to a converter output of the plurality of converter outputs. The method may further include selecting an operation mode of the converter from a first operation mode or a second operation mode; operating, in the first operation mode, the at least one transistor of each selection switch in its saturation region; and operating, in the second operation mode, the at least one transistor of at least one selection switch in its saturation region and the at least one transistor of at least one other selection switch in its linear region.

Example 1c is a SIMO converter. The SIMO converter may include an inductor; a plurality of converter output lines; a plurality of switches to provide a switching output voltage in response to an input voltage applied to the inductor; a switch controller configured to control the plurality of switches to control the switching output voltage; and at least one regulator configured to dynamically set a respectively associated regulator-specific predefined target output voltage at an associated converter output line of the plurality of converter output lines; and to regulate the switching output voltage to stay within a predefined range from the target output voltage using a current from another converter output line of the plurality of converter output lines.

Example 2c is a SIMO converter. The SIMO converter may include a switching stage including an inductor and a plurality of switches to provide a switching output voltage at a converter output line of a plurality of converter output lines in response to an applied input voltage dependent on the switching states of the plurality of switches; and at least one regulator configured to receive the switching output voltage and to dynamically set an output voltage at a converter output line of the plurality of converter output lines. The at least one regulator includes a circuit configured to determine at least one of whether the switching output voltage is above a predefined upper threshold voltage which is greater than a target regulator output voltage or whether the switching output voltage is below a predefined lower threshold voltage which is smaller than the target regulator output voltage, and to use a current from another converter output line of the plurality of converter output lines to regulate the switching output voltage.

In Example 3c, the subject matter of any one of Examples 1c or 2c can optionally include that the plurality of switches includes a first switch coupled between a first terminal of the inductor and the input voltage and a second switch coupled between the first terminal of the inductor and a reference potential.

In Example 4c, the subject matter of any one of Examples 1c to 3c can optionally include that the plurality of switches includes a third switch coupled between a second terminal of the inductor and a reference potential.

Example 5c is a method of operating a single inductor multiple output circuitry. The method may include a plurality of switches providing a switching output voltage at a converter output line of a plurality of converter output lines in response to an input voltage applied to an inductor; controlling the plurality of switches to control the switching output voltage; at least one regulator dynamically setting a respectively associated regulator-specific predefined target output voltage at an associated converter output line of the plurality of converter output lines, and regulating the switching output voltage to stay within a predefined range from the target output voltage using a current from another converter output line of the plurality of converter output lines.

Example 6c is a method of operating a single inductor multiple output circuitry. The method may include controlling a switching stage including an inductor and a plurality of switches to provide a switching output voltage at a converter output line of a plurality of converter output lines in response to an applied input voltage dependent on the switching states of the plurality of switches; at least one regulator receiving the switching output voltage; dynamically setting an output voltage at a converter output line of the plurality of converter output lines; determining at least one of whether the switching output voltage is above a predefined upper threshold voltage which is greater than a target regulator output voltage or whether the switching output voltage is below a predefined lower threshold voltage which is smaller than the target regulator output voltage, and regulating the switching output voltage using a current from another converter output line of the plurality of converter output lines.

Example 1d is a SIMO converter. The SIMO converter may include an inductor; a plurality of switches coupled to the inductor to provide a switching output voltage in response to an input voltage applied to the inductor. The plurality of switches includes a first switch coupled between a first terminal of the inductor and the input voltage, a second switch coupled between the first terminal of the inductor and a reference potential and a third switch coupled between a second terminal of the inductor and a reference potential. The SIMO converter may further include at least one processor configured to operate the circuitry in a discontinuous conduction mode, to control the plurality of switches to provide the switching output voltage to a first output during a first inductor cycle, and to a second output during a second inductor cycle subsequent to the first inductor cycle, and to control the first inductor cycle to have the same duration as the second inductor cycle.

In Example 2d, the subject matter of Example 1d can optionally include that the SIMO converter further includes a plurality of regulators, each regulator to dynamically set a respectively associated regulator-specific predefined target output voltage based on the switching output voltage.

Example 3d is a SIMO converter. The SIMO converter may include an inductor; and a plurality of switches coupled to the inductor to provide a switching output voltage in response to an input voltage applied to the inductor. The plurality of switches includes a first switch coupled between a first terminal of the inductor and the input voltage, a second switch coupled between the first terminal of the inductor and a reference potential and a third switch coupled between a second terminal of the inductor and a reference potential. The SIMO converter may further include at least one processor configured to operate the circuitry in a discontinuous conduction mode, to control the plurality of switches to provide the switching output voltage in disjunct inductor switching cycles to different outputs, and to switch the disjunct inductor switching cycles at a constant switching frequency.

In Example 4d, the subject matter of Example 3d can optionally include that the SIMO converter further includes a plurality of regulators, each regulator to dynamically set a respectively associated regulator-specific predefined target output voltage to a respective output.

Example 5d is a method of operating a SIMO converter. The method may include a plurality of switches providing a switching output voltage in response to an input voltage applied to an inductor. The plurality of switches includes a first switch coupled between a first terminal of the inductor and the input voltage, a second switch coupled between the first terminal of the inductor and a reference potential and a third switch coupled between a second terminal of the inductor and a reference potential. The method may further include controlling the plurality of switches to provide a switching output voltage in response to an input voltage applied to the inductor; at least one processor operating the circuitry in a discontinuous conduction mode, controlling the plurality of switches to provide the switching output voltage to a first output during a first inductor cycle, and to a second output during a second inductor cycle subsequent to the first inductor cycle, and controlling the first inductor cycle to have the same duration as the second inductor cycle.

Example 6d is a method of operating a SIMO converter. The method may include controlling a switching stage including an inductor and a plurality of switches to provide a switching output voltage in response to an input voltage applied to the inductor. The plurality of switches includes a first switch coupled between a first terminal of the inductor and the input voltage, a second switch coupled between the first terminal of the inductor and a reference potential and a third switch coupled between a second terminal of the inductor and a reference potential. The method may further include at least one processor operating the circuitry in a discontinuous conduction mode, controlling the plurality of switches to provide the switching output voltage in disjunct inductor switching cycles to different outputs, and switching the disjunct inductor switching cycles at a constant switching frequency.

Example 1e is a SIMO converter. The SIMO converter may include an inductor; a plurality of switches to provide a switching output voltage in response to an input current supplied to the inductor; a switch controller configured to control the plurality of switches to control the switching output voltage; and a plurality of regulators. Each regulator is configured to dynamically set a respectively associated regulator-specific target output voltage, to regulate the switching output voltage using the input current, the input current flowing through the regulator from a first regulator terminal to a second regulator terminal, to determine at least one of a first voltage at the first regulator terminal or a second voltage at the second regulator terminal, and to use at least one of the first voltage or the second voltage to control the plurality of switches.

In Example 2e, the subject matter of Example 1e can optionally include that each regulator is configured to regulate the switching output voltage to stay within a predefined range from the target output voltage using the input voltage.

In Example 3e, the subject matter of any one of Examples 1e or 2e can optionally include that at least one of the regulators further includes a proportional regulator portion to regulate the regulator-specific target output voltage to provide a regulated target output voltage.

In Example 4e, the subject matter of any one of Examples 1e to 3e can optionally include that at least one of the regulators further includes an integration regulator portion to regulate the regulator-specific target output voltage to provide a regulated target output voltage.

In Example 5e, the subject matter of any one of Examples 1e or 2*e* can optionally include that the SIMO converter further includes an adder to add the target output voltage and at least one of the first voltage or the second voltage to provide an added voltage.

In Example 6e, the subject matter of any one of Examples 3e or 4e can optionally include that the SIMO converter further includes an adder to add the regulated target output voltage and at least one of the first voltage or the second voltage to provide an added voltage.

In Example 7e, the subject matter of any one of Examples 5e or 6e can optionally include that the switch controller is configured to control the plurality of switches to control the switching output voltage using the added voltage. The switch controller is further configured to increase a duty cycle when the added voltage provided by the associated regulator increases or to decrease a duty cycle when the added voltage provided by the associated regulator decreases.

Example 8e is a method of operating a SIMO converter. The method may include a plurality of switches providing a switching output voltage in response to an input current supplied to an inductor; controlling the plurality of switches to control the switching output voltage; and each regulator of a plurality of regulators, dynamically setting a respectively associated regulator-specific target output voltage, regulating the switching output voltage using the input current, the input current flowing through the regulator from a first regulator terminal to a second regulator terminal, determining at least one of a first voltage at the first regulator terminal or a second voltage at the second regulator terminal, and using at least one of the first voltage or the second voltage to control the plurality of switches.

Example 1f is a SIMO converter. The SIMO converter may include an inductor; a plurality of converter outputs; a plurality of switches to provide a switching output voltage in response to an input voltage supplied to the inductor in a duty cycle; and a switch controller configured to control the plurality of switches to control the switching output voltage, to apply the switching output voltage to a first converter output of the plurality of converter outputs during a first time portion of a first duty cycle, to apply the switching output voltage to another converter output of the plurality of converter outputs than the first converter output during a second time portion of the first duty cycle, to apply the switching output voltage to the first converter output of the plurality of converter outputs during a first time portion of a second duty cycle (the second duty cycle is a duty cycle directly subsequent after the first duty cycle), and to apply the switching output voltage to another converter output of the plurality of converter outputs than the first converter output during a second time portion of the second duty cycle.

In Example 2f, the subject matter of Example if can optionally include that the switch controller is configured to control the plurality of switches to energize the inductor during the first time portion of the first duty cycle and the first time portion of the second duty cycle; and to de-energize the inductor during the second time portion of the first duty cycle and the second time portion of the second duty cycle.

In Example 3f, the subject matter of any one of Examples if or 2*f* can optionally include that the switch controller is configured to control the plurality of switches to apply the switching output voltage to a second converter output of the plurality of converter outputs during the second time portion of the first duty cycle; and to apply the switching output voltage to a third converter output of the plurality of converter outputs during the second time portion of the second duty cycle.

Example 4f is a SIMO converter. The SIMO converter may include an inductor; a plurality of converter outputs; and a plurality of switches to provide a switching output voltage in response to an input voltage supplied to the inductor in a duty cycle of a plurality of duty cycles. The duty cycles are grouped into one or more duty cycle groups, each duty cycle group including a number of duty cycles corresponding to the number of converter outputs, each duty cycle including a first time portion and a second time portion. The SIMO converter may further include a switch controller configured to control the plurality of switches to control the switching output voltage, to apply the switching output voltage to a first converter output of the plurality of converter outputs during a first time portion of a plurality of duty cycles within a duty cycle group, and to apply the switching output voltage to another converter output of the plurality of converter outputs than the converter output during a second time portion of the plurality of duty cycles within the same duty cycle group.

In Example 5f, the subject matter of Example 4f can optionally include that the switch controller is configured to control the plurality of switches to energize the inductor during the first time portion of the plurality of duty cycles within the duty cycle group, and to de-energize the inductor during the second time portion of the plurality of duty cycles within the duty cycle group.

In Example 6f, the subject matter of any one of Examples 4f or 5f can optionally include that the switch controller is configured to control the plurality of switches to apply the switching output voltage to a second converter output of the plurality of converter outputs than the converter output during a second time portion of the plurality of duty cycles within the same duty cycle group, and to apply the switching output voltage to a third converter output of the plurality of converter outputs than the converter output during another second time portion of the plurality of duty cycles within the same duty cycle group.

In Example 7f, the subject matter of any one of Examples if to 6f can optionally include that the SIMO converter further includes a plurality of regulators. Each regulator is configured to dynamically set a respectively associated regulator-specific target output voltage to a respective converter output of the plurality of converter outputs.

Example 8f is a method of operating a SIMO converter. The method may include, a plurality of switches providing a switching output voltage to a converter output of a plurality of converter outputs in response to an input current supplied to an inductor; and controlling the plurality of switches to control the switching output voltage, to apply the switching output voltage to a converter output of the plurality of converter outputs, to apply the switching output voltage to a first converter output of the plurality of converter outputs during a first time portion of a first duty cycle, and to apply the switching output voltage to another converter output of the plurality of converter outputs than the converter output during a second time portion of the first duty cycle.

Example 9f is a method of operating a SIMO converter. The method may include, a plurality of switches providing a switching output voltage to a converter output of a plurality of converter outputs in response to an input voltage supplied to the inductor in a duty cycle of a plurality of duty cycles. The duty cycles are grouped into one or more duty cycle groups, each duty cycle group including a number of duty cycles corresponding to the number of converter outputs, each duty cycle including a first time portion and a second time portion. The method may further includes controlling the plurality of switches to control the switching output voltage, to apply the switching output voltage to a first converter output of the plurality of converter outputs during a first time portion of a plurality of duty cycles within a duty cycle group, and to apply the switching output voltage to another converter output of the plurality of converter outputs than the converter output during a second time portion of the plurality of duty cycles within the same duty cycle group.

Example 1g is a SIMO converter. The SIMO converter may include an inductor; a plurality of converter outputs; a plurality of switches to provide a switching output voltage in response to an input voltage supplied to the inductor in a duty cycle; and a switch controller configured to control the plurality of switches to control the switching output voltage, and to apply the switching output voltage to a converter output of the plurality of converter outputs. The SIMO converter may further include an operation mode selector to select an operation mode from a plurality of operation modes of the single inductor multiple output converter based on a received operation target request and to instruct the switch controller to control the plurality of switches in accordance with the selected operation mode. The switch controller is further configured to control the plurality of switches in accordance with the selected operation mode. The operation target request includes at least one of the following requests:

- select an operation mode providing a ripple at the switching output voltage wherein, according to an aspect of the disclosure, the ripple may be approximately one percent of a nominal voltage supply (e.g., 10 mV for a 1V supply), approximately two percent of a nominal voltage supply (e.g., 20 mV for a 1V supply), approximately three percent of a nominal voltage supply (e.g., 30 mV for a 1V supply), or greater than three percent of a nominal voltage supply;
- select an operation mode providing an energy conversion efficiency of at least 80%, at least 85%, or at least 90%;
- select an operation mode providing a cross regulation of less than approximately <1 mV, if the supply tolerance and ripple are approximately 10 mV; approximately <2 mV, if the supply tolerance and ripple are approximately 20 mV; or approximately <3 mV, if the supply tolerance and ripple are approximately 30 mV.

In Example 2g, the subject matter of Example 1 g can optionally include that the operation mode selector is further configured to select the operation mode based on an inductor current.

In Example 3g, the subject matter of any one of Examples 1g or 2g can optionally include that the operation mode selector is further configured to select the operation mode from a group of operation modes consisting of: a Continuous Conduction Mode; a Discontinuous Conduction Mode; an operation mode providing a plurality of different scheduling schemes in the order of selecting the converter outputs of the plurality of converter outputs; an operation mode operating at least one converter output in accordance with a Continuous Conduction Mode and operating at least one other converter output in accordance with a Discontinuous Conduction Mode; and an operation mode minimizing cross regulation between converter outputs.

In Example 4g, the subject matter of any one of Examples 1g to 3g can optionally include that the SIMO converter further includes a power management circuit coupled to the operation mode selector and configured to generate the operation target request and to provide it for the operation mode selector.

In Example 5g, the subject matter of any one of Examples 1g to 4g can optionally include that the switch controller is configured to control the plurality of switches to energize the inductor during a first time portion of a duty cycle; and to de-energize the inductor during a second time portion of the first duty cycle.

In Example 6g, the subject matter of any one of Examples 1g to 5g can optionally include that the SIMO converter further includes a plurality of regulators. Each regulator is configured to provide a respectively associated regulator-specific target output voltage to a respective converter output of the plurality of converter outputs.

Example 7g is a method of operating a SIMO converter. The method may include a plurality of switches providing a switching output voltage to a converter output of a plurality of converter outputs in response to an input voltage supplied to an inductor; controlling the plurality of switches to control the switching output voltage, and to apply the switching output voltage to a converter output of the plurality of converter outputs; electing an operation mode from a plurality of operation modes of the single inductor multiple output converter based on a received operation target request and to instruct the switch controller to control the plurality of switches in accordance with the selected operation mode; and controlling the plurality of switches in accordance with the selected operation mode. The operation target request includes at least one of the following requests: select an operation mode providing a ripple at the switching output voltage, wherein, according to an aspect of the disclosure, the ripple may be approximately one percent of a nominal voltage supply (e.g., 10 mV for a 1V supply), approximately two percent of a nominal voltage supply (e.g., 20 mV for a 1V supply), approximately three percent of a nominal voltage supply (e.g., 30 mV for a 1V supply), or greater than three percent of a nominal voltage supply; select an operation mode providing an energy conversion efficiency of at least 80%, or at least 90%; select an operation mode providing a cross regulation of <1 mV if the supply tolerance and ripple are approximately 10 mV; <2 mV if the supply tolerance and ripple are approximately 20 mV; or <3 mV if the supply tolerance and ripple are approximately 30 mV.

Example 1h is a SIMO converter. The SIMO converter may include an inductor; a plurality of converter outputs; a plurality of switches to provide a switching output voltage in response to an input voltage supplied to the inductor in a duty cycle; at least one analog-to-digital converter to convert the switching output voltage into at least one digital switching output voltage value; and at least one digital processor to receive the at least one digital switching output voltage value, to receive, for each converter output of the plurality of converter outputs, an associated target output voltage value, to determine at least one energizing time representing a duration of an energizing of the inductor using the at least one digital switching output voltage value within a duty cycle, to determine, for at least one converter output of the plurality of converter outputs, at least one de-energizing time representing a duration of a de-energizing of the inductor using the at least one digital switching output voltage value and the respectively associated target output voltage value within a duty cycle.

In Example 2h, the subject matter of Example 1h can optionally include that the at least one digital processor is configured to determine the at least one energizing time and the at least one de-energizing time by implementing at least one software algorithm.

In Example 3h, the subject matter of Example 2h can optionally include that the at least one digital processor is configured to select one computer program out of a plurality of computer programs, each computer program implementing at least one software algorithm to determine the at least one energizing time and the at least one de-energizing time with respect to different optimization criteria.

In Example 4h, the subject matter of any one of Examples 1h to 3h can optionally include that the at least one analog-to-digital converter includes at least one voltage controlled oscillator based analog-to-digital converter.

In Example 5h, the subject matter of any one of Examples 1h to 4h can optionally include that the at least one digital processor is further configured to control the plurality of switches in accordance with the determined at least one energizing time and at least one de-energizing time.

In Example 6h, the subject matter of any one of Examples 1h to 5h can optionally include that the SIMO converter is free from an analog regulator.

Example 7h is a SIMO converter. The SIMO converter may include an inductor; a plurality of converter outputs; a plurality of switches to provide an analog switching output voltage in response to an input voltage supplied to the inductor in a duty cycle; at least one analog-to-digital converter to convert the analog switching output voltage into at least one digital switching output voltage value; and at least one digital processor to receive the at least one digital switching output voltage value, to receive, for each converter output of the plurality of converter outputs, an associated target output voltage value, and to determine the timing parameters related to a plurality of duty cycles, and for each duty cycle, related to an energizing phase, during which the inductor will be energized, and to a de-energizing phase, during which the inductor will be de-energized.

In Example 8h, the subject matter of Example 7h can optionally include that the at least one digital processor is configured to determine the timing parameters by implementing at least one software algorithm.

In Example 9h, the subject matter of Example 8h can optionally include that the at least one digital processor is configured to select one computer program out of a plurality of computer programs, each computer program implementing at least one software algorithm to determine the timing parameters with respect to different optimization criteria.

In Example 10h, the subject matter of any one of Examples 7h to 9h can optionally include that the at least one analog-to-digital converter includes at least one voltage controlled oscillator based analog-to-digital converter.

In Example 11h, the subject matter of any one of Examples 7h to 10h can optionally include that the at least one digital processor is further configured to control the plurality of switches in accordance with the determined at least one energizing time and at least one de-energizing time.

In Example 12h, the subject matter of any one of Examples 7h to 11h can optionally include that the SIMO converter is free of an analog regulator.

Example 13h is a method of operating a SIMO converter. The method may include a plurality of switches providing a switching output voltage to a converter output of a plurality of converter outputs in response to an input voltage supplied to an inductor; at least one analog-to-digital converter converting the switching output voltage into at least one digital switching output voltage value; at least one digital processor receiving the at least one digital switching output voltage value, receiving, for each converter output of the plurality of converter outputs, an associated target output voltage value, determining at least one energizing time representing a duration of an energizing of the inductor using the at least one digital switching output voltage value within a duty cycle, and determining, for at least one converter output of the plurality of converter outputs, at least one de-energizing time representing a duration of a de-energizing of the inductor using the at least one digital switching output voltage value and the respectively associated target output voltage value within a duty cycle.

Example 14h is a method of operating a SIMO converter. The method may include a plurality of switches providing a switching output voltage to a converter output of a plurality of converter outputs in response to an input voltage supplied to the inductor in a duty cycle of a plurality of duty cycles; at least one analog-to-digital converter converting the analog switching output voltage into at least one digital switching output voltage value; at least one digital processor receiving the at least one digital switching output voltage value, receiving, for each converter output of the plurality of converter outputs, an associated target output voltage value, and determining the timing parameters related to a plurality of duty cycles, and for each duty cycle, related to an energizing phase, during which the inductor will be energized, and to a de-energizing phase, during which the inductor will be de-energized.

Example 1i is a SIMO converter. The SIMO converter may include an inductor; a plurality of converter outputs; a plurality of switches to provide a switching output voltage in response to an input voltage supplied to the inductor in a duty cycle; and a plurality of regulators. Each regulator is configured to provide a respectively associated regulator-specific target output voltage to a respective converter output of the plurality of converter outputs by regulating the switching output voltage. The SIMO converter may further include one or more controllers configured to control the plurality of switches to control the switching output voltage, to apply the switching output voltage to a converter output of the plurality of converter outputs, and to select a converter output of the plurality of converter outputs to which the switching output voltage is supplied for a respective duty cycle of a plurality of duty cycles, and within at least one duty cycle of the plurality of duty cycles, for a selected converter output of the plurality of converter outputs, to switch from an inductor energizing phase to an inductor de-energizing phase based on a comparison of a target current representing a respectively associated regulator-specific target output voltage with a course of an inductor current flowing through the inductor.

In Example 2i, the subject matter of Example 1i can optionally include that the one or more controllers include a multiplexer implementing the selecting of the converter output in accordance with a converter output selection signal.

In Example 3i, the subject matter of any one of Examples 1i or 2*i* can optionally include that the one or more controllers are configured to implement the switching from the inductor energizing phase to the inductor de-energizing phase by comparing a first electrical quantity representing the inductor ramp current with a second electrical quantity representing the target current.

In Example 4i, the subject matter of any one of Examples 1i to 3i can optionally include that the one or more controllers include a ramp comparator to receive, at its first input, a first electrical quantity representing the inductor current, and, at its second input, a second electrical quantity representing the target current.

In Example 5i, the subject matter of any one of Examples 1i to 4i can optionally include that one or more controllers include a logic to switch from the inductor energizing phase to the inductor de-energizing phase when the first electrical quantity reaches or approaches the second electrical quantity.

In Example 6i, the subject matter of any one of Examples 4i or 5i can optionally include that the ramp comparator is configured to receive, at its inverting input, the first electrical quantity, and, at its non-inverting input, the second electrical quantity.

In Example 7i, the subject matter of any one of Examples 1i to 6i can optionally include that the one or more controllers include an RS flip flop configured to receive, at its S input, a clock signal, and, at its R input, an output signal of the ramp comparator, and to generate a switch control signal controlling the switching from the inductor energizing phase to the inductor de-energizing phase.

Example 8i is a SIMO converter. The SIMO converter may include an inductor; a plurality of converter outputs; a plurality of switches to provide a switching output voltage in response to an input voltage supplied to the inductor in a duty cycle; and a plurality of regulators. Each regulator is configured to provide a respectively associated target output voltage to a respective converter output of the plurality of converter outputs by regulating the switching output voltage. The SIMO converter may further include one or more controllers configured to control the plurality of switches to control the switching output voltage, to select a converter output of the plurality of converter outputs to which the switching output voltage is supplied during a duty cycle of a plurality of duty cycles, each duty cycle including an inductor energizing phase and an inductor de-energizing phase, and, within at least one duty cycle of the plurality of duty cycles, for a selected converter output of the plurality of converter outputs, to switch from the inductor energizing phase to the inductor de-energizing phase using the course of the inductor current.

In Example 9i, the subject matter of Example 8i can optionally include that the one or more controllers include a multiplexer implementing the selecting of the converter output in accordance with a converter output selection signal.

In Example 10i, the subject matter of any one of Examples 8i or 9i can optionally include that the one or more controllers are configured to implement the switching from the inductor energizing phase to the inductor de-energizing phase by comparing a first electrical quantity representing the inductor ramp current with a second electrical quantity representing the target current.

In Example 11i, the subject matter of any one of Examples 8i to 10i can optionally include that the one or more controllers include a ramp comparator to receive, at its first input, a first electrical quantity representing the inductor current, and, at its second input, a second electrical quantity representing the target current.

In Example 12i, the subject matter of any one of Examples 8i to 10i can optionally include that the one or more controllers include a logic to switch from the inductor energizing phase to the inductor de-energizing phase when the first electrical quantity reaches or approaches the second electrical quantity.

In Example 13i, the subject matter of any one of Examples 11i or 12i can optionally include that the ramp comparator is configured to receive, at its inverting input, the first electrical quantity, and, at its non-inverting input, the second electrical quantity.

In Example 14i, the subject matter of any one of Examples 1i to 13i can optionally include that the one or more controllers include an RS flip flop configured to receive, at its S input, a clock signal, and, at its R input, an output signal of the ramp comparator, and to generate a switch control signal controlling the switching from the inductor energizing phase to the inductor de-energizing phase.

Example 15i is a method of operating a SIMO converter. The method may include a plurality of switches providing a switching output voltage in response to an input voltage supplied to the inductor in a duty cycle; a plurality of regulators, each regulator providing a respectively associated regulator-specific target output voltage to a respective converter output of the plurality of converter outputs by regulating the switching output voltage; controlling the plurality of switches to control the switching output voltage; applying the switching output voltage to a converter output of the plurality of converter outputs; selecting a converter output of the plurality of converter outputs to which the switching output voltage is supplied for a respective duty cycle of a plurality of duty cycles; and within at least one duty cycle of the plurality of duty cycles, for a selected converter output of the plurality of converter outputs, switching from an inductor energizing phase to an inductor de-energizing phase based on a comparison of a target current representing a respectively associated regulator-specific target output voltage with a course of an inductor current flowing through the inductor.

Example 16i is a method of operating a SIMO converter. The method may include a plurality of switches providing a switching output voltage to a converter output of a plurality of converter outputs in response to an input voltage supplied to the inductor in a duty cycle of a plurality of duty cycles; a plurality of regulators, each regulator providing a respectively associated target output voltage to a respective converter output of the plurality of converter outputs by regulating the switching output voltage; controlling the plurality of switches to control the switching output voltage; selecting a converter output of the plurality of converter outputs to which the switching output voltage is supplied during a duty cycle of a plurality of duty cycles, each duty cycle including an inductor energizing phase and an inductor de-energizing phase; within at least one duty cycle of the plurality of duty cycles, for a selected converter output of the plurality of converter outputs, switching from the inductor energizing phase to the inductor de-energizing phase using the course of the inductor current.

Example 1j is a switched converter. The switched converter may include a charge storing component; a plurality of converter outputs; a plurality of switches to provide a switching output voltage in response to an input voltage applied to the charge storing component; a switch controller to control the plurality of switches to control the switching output voltage in a plurality of duty cycles, each duty cycle including an energizing phase during which the charge storing component is energized and a plurality of de-energizing phases during which the charge storing component is de-energized to one or more converter outputs of the plurality of converter outputs; one or more sensors to detect a component input voltage and a component input current at a first node of the charge storing component and the switching output voltage at a second node of the charge storing component; and one or more processors to determine, at the beginning and at the end of the energizing phase, a component input voltage value and a component input current value at the first node of the charge storing component and a switching output voltage value at the second node of the charge storing component, at least one of at the beginning or at the end of at least one de-energizing phase of the plurality of de-energizing phase, a component input voltage value and a component input current value at the first node of the charge storing component and a switching output voltage value at the second node of the charge storing component, and an electrical characteristic of the charge storing component using the determined values.

In Example 2j, the subject matter of Example 1j can optionally include that the switch controller is further configured to control the plurality of switches in accordance with the electrical characteristic.

In Example 3j, the subject matter of Example 2j can optionally include that the switch controller is further configured to control the plurality of switches in accordance with a Discontinuous Current Mode.

In Example 4j, the subject matter of any one of Examples 1j to 3j can optionally include that the one or more processors are further configured to determine the electrical characteristic of the charge storing component by interpolating at least some of the determined values.

In Example 5j, the subject matter of any one of Examples 1j to 4j can optionally include that the charge storing component includes or is a two-terminal component.

In Example 6j, the subject matter of any one of Examples 1j to 5j can optionally include that the charge storing component includes or is an inductor; and that the electrical characteristic of the charge storing component includes or is the inductance of the inductor.

In Example 7j, the subject matter of any one of Examples 1j to 6j can optionally include that the electrical characteristic of the charge storing component includes or is the capacity of the capacitor.

In Example 8j, the subject matter of any one of Examples 1j to 7j can optionally include that the switched converter further includes at least one regulator configured to dynamically set a respectively associated regulator-specific predefined target output voltage at an associated converter output.

Example 9j is a method of operating a switched converter. The method may include a plurality of switches providing a switching output voltage to a converter output of a plurality of converter outputs in response to an input voltage applied to a charge storing component; controlling the plurality of switches to control the switching output voltage in a plurality of duty cycles, each duty cycle including an energizing phase during which the charge storing component is energized and a plurality of de-energizing phases during which the charge storing component is de-energized to one or more converter outputs of the plurality of converter outputs; detecting a component input voltage and a component input current at a first node of the charge storing component and the switching output voltage at a second node of the charge storing component; determining, at the beginning and at the end of the energizing phase, a component input voltage value and a component input current value at the first node of the charge storing component and a switching output voltage value at the second node of the charge storing component; determining, at least one of at the beginning or at the end of at least one de-energizing phase of the plurality of de-energizing phase, a component input voltage value and a component input current value at the first node of the charge storing component and a switching output voltage value at the second node of the charge storing component; determining, an electrical characteristic of the charge storing component using the determined values.

Example 1k is a switched power converter. The switched power converter may include an inductor; at least one converter output; a capacitor coupled to the at least one converter output; an energy storage; a plurality of switches to provide a switching output voltage in response to an input voltage supplied to the inductor; a switch controller configured to control the plurality of switches to control the switching output voltage by energizing the inductor in an inductor energizing time period and de-energizing the inductor in an inductor de-energizing time period, and to discharge the capacitor in a discharge time period outside the inductor energizing time period and the inductor de-energizing time period and to store the discharged energy in the energy storage.

In Example 2k, the subject matter of Example 1k can optionally include that the energy storage is part of an energy source providing the input voltage.

In Example 3k, the subject matter of any one of Examples 1k or 2k can optionally include that the energy storage includes a further capacitor electrically connectable to the capacitor.

In Example 4k, the subject matter of any one of Examples 1k to 3k can optionally include that the switch controller is further configured to determine if a charging state of the capacitor fulfills a predefined criterion and to discharge the capacitor 1*f* the charging state of the capacitor fulfills the predefined criterion.

In Example 5k, the subject matter of Example 4k can optionally include that the predefined criterion is fulfilled if an amount of energy stored in the capacitor is above a predefined energy threshold value.

Example 6k is a SIMO converter. The SIMO converter may include an inductor; a plurality of converter outputs; a plurality of capacitors, each capacitor coupled to at least one associated converter output of the plurality of converter outputs; an energy storage; a plurality of switches to provide a switching output voltage in response to an input voltage supplied to the inductor; and a switch controller configured to control the plurality of switches to control the switching output voltage by energizing the inductor in an inductor energizing time period and de-energizing the inductor in an inductor de-energizing time period, and to discharge at least one capacitor of the plurality of capacitors in at least one discharge time period outside the inductor energizing time period and the inductor de-energizing time period and to store the discharged energy in the energy storage.

In Example 7k, the subject matter of Example 6k can optionally include that the energy storage is part of an energy source providing the input voltage.

In Example 8k, the subject matter of any one of Examples 6k or 7k can optionally include that the energy storage includes a further capacitor electrically connectable to the capacitor.

In Example 9k, the subject matter of any one of Examples 6k to 8k can optionally include that the energy storage includes at least one capacitor of the plurality of capacitors.

In Example 10k, the subject matter of any one of Examples 6k to 9k can optionally include that the switch controller is further configured to determine if a charging state of at least one capacitor of the plurality of capacitors fulfills a predefined criterion and to discharge the at least one capacitor 1*f* the charging state of the at least one capacitor fulfills the predefined criterion.

In Example 11k, the subject matter of Example 10k can optionally include that the predefined criterion is fulfilled if an amount of energy stored in the at least one capacitor is above a predefined energy threshold value.

In Example 12k, the subject matter of any one of Examples 6k to 11k can optionally include that the SIMO converter further includes a plurality of regulators. Each regulator is configured to provide a respectively associated regulator-specific target output voltage to a respective converter output of the plurality of converter outputs.

Example 13k is a method of operating a switched power converter. The method may include a plurality of switches providing a switching output voltage to a converter output of at least one converter output in response to an input voltage supplied to an inductor; a switch controller controlling the plurality of switches to control the switching output voltage by energizing the inductor in an inductor energizing time period and de-energizing the inductor in an inductor de-energizing time period, and to discharge a capacitor coupled to the at least one converter output in a discharge time period outside the inductor energizing time period and the inductor de-energizing time period and to store the discharged energy in an energy storage.

Example 14k is a method of operating a SIMO converter. The method may include a plurality of switches providing a switching output voltage to a converter output of a plurality of converter outputs in response to an input voltage supplied to the inductor; controlling the plurality of switches to control the switching output voltage by energizing the inductor in an inductor energizing time period and de-energizing the inductor in an inductor de-energizing time period, and to discharge at least one capacitor of a plurality of capacitors, each capacitor coupled to at least one associated converter output of the plurality of converter outputs in at least one discharge time period outside the inductor energizing time period and the inductor de-energizing time period and to store the discharged energy in an energy storage.

Example 1l is a converter. The converter may include an inductive component or circuitry including a first end terminal, a second end terminal and at least one tap terminal between the first end terminal and the second end terminal; a plurality of converter outputs; a plurality of switches to provide a switching output voltage in response to an input voltage supplied to the inductive component; at least one tap switch to selectively couple at least one of the plurality of converter outputs to the at least one tap terminal to provide a tapped switching output voltage in response to an input voltage supplied to the inductive component; and a switch controller configured to control the plurality of switches to control the switching output voltage and to control the at least one tap switch to control the tapped switching output voltage.

In Example 2l, the subject matter of Example 1l can optionally include that the at least one tap switch includes a plurality of tap switches; and that the switch controller is further configured to control the plurality of tap switches to control the tapped switching output voltage.

In Example 3l, the subject matter of Example 2l can optionally include that a plurality of tap switches comprising a first tap switch and a second tap switch; that the first tap switch is coupled between or to the at least one tap terminal and an associated converter output of the plurality of converter outputs; and that the second tap switch is coupled between the at least one tap terminal and a reference potential.

In Example 4l, the subject matter of Example 3l can optionally include that the reference potential is the ground potential.

In Example 5l, the subject matter of any one of Examples 1l to 4l can optionally include that the inductive component includes or is an inductor.

In Example 6l, the subject matter of any one of Examples 1l to 4l can optionally include that the inductive component includes or is a transformer.

In Example 7l, the subject matter of any one of Examples 2l to 6l can optionally include that the at least one tap terminal includes a plurality of tap terminals arranged between the first end terminal and the second end terminal; that at least one tap switch of the plurality of tap switches is coupled between a first tap terminal of the plurality of tap terminals and a converter output of the plurality of converter outputs; and that at least one further tap switch of the plurality of tap switches is coupled between a second tap terminal of the plurality of tap terminals and a further converter output of the plurality of converter outputs.

In Example 8l, the subject matter of any one of Examples 1l to 7l can optionally include that the at least one tap terminal includes a plurality of tap terminals arranged between the first end terminal and the second end terminal; and that the converter further includes a storage capacitor coupled between a tap terminal of the plurality of tap terminals and a reference potential.

In Example 9l, the subject matter of Example 8l can optionally include that the reference potential is the ground potential.

In Example 10l, the subject matter of any one of Examples 1l to 9l can optionally include that the converter further includes a plurality of regulators. Each regulator is configured to dynamically set a respectively associated regulator-specific target output voltage to a respective converter output of the plurality of converter outputs.

Example 11l is a method of operating a converter. The method may include a plurality of switches providing a switching output voltage to a converter output of a plurality of converter outputs in response to an input current supplied to an inductive component. The inductive component includes a first end terminal, a second end terminal and at least one tap terminal between the first end terminal and the second end terminal. The method may further include at least one tap switch selectively coupling at least one of the plurality of converter outputs to the at least one tap terminal to provide a tapped switching output voltage in response to an input voltage supplied to the inductive component; controlling the plurality of switches to control the switching output voltage; and controlling the at least one tap switch to control the tapped switching output voltage.

Example 1m is a SIMO converter. The SIMO converter may include an inductor; a plurality of converter output lines; a plurality of switches to provide a switching output voltage at a converter output line of the plurality of converter output lines in response to an input voltage supplied to the inductor; a switch controller configured to control the plurality of switches to control the switching output voltage; and at least one switched capacitor regulator to dynamically set a respectively associated regulator-specific target output voltage for a respective converter output line of the plurality of converter output lines.

In Example 2m, the subject matter of Example 1m can optionally include that the at least one switched capacitor regulator includes a plurality of switched capacitor regulators, each switched capacitor regulator to dynamically set a respectively associated regulator-specific target output voltage to a respective converter output line of the plurality of converter output lines.

In Example 3m, the subject matter of any one of Examples 1m or 2m can optionally include that the at least one switched capacitor regulator includes a plurality of regulator capacitors and a plurality of regulator switches to selectively connect the plurality of regulator capacitors in parallel between a regulator input node on the respective converter output line of the plurality of converter output lines and a regulator output node on the respective converter output line of the plurality of converter output lines.

In Example 4m, the subject matter of any one of Examples 1m to 3m can optionally include that the SIMO converter further includes at least one linear regulator to dynamically set a respectively associated regulator-specific target output voltage to a respective further converter output line of the plurality of converter output lines.

In Example 5m, the subject matter of any one of Examples 1m to 4m can optionally include that the SIMO converter further includes at least one push-pull regulator to dynamically set a respectively associated regulator-specific target output voltage to a respective yet further converter output line of the plurality of converter output lines.

In Example 6m, the subject matter of any one of Examples 1m to 5m can optionally include that the SIMO converter further includes a plurality of regulators. Each regulator is configured to dynamically set a respectively associated regulator-specific target output voltage to a respective converter output of the plurality of converter outputs.

Example 7m is a method of operating a SIMO converter. The method may include a plurality of switches providing a switching output voltage to a converter output line of a plurality of converter output lines in response to an input current supplied to an inductor; controlling the plurality of switches to control the switching output voltage; and at least one switched capacitor regulator dynamically setting a respectively associated regulator-specific target output voltage for a respective converter output line of the plurality of converter output lines.

Example 1n is a SIMO converter. The SIMO converter may include an inductor; a plurality of converter output lines; a plurality of switches to provide a switching output voltage at a converter output line of the plurality of converter output lines in response to an input voltage supplied to the inductor; a switch controller to control the plurality of switches to control the switching output voltage; a switch matrix including a plurality of output line switches to selectively couple converter output lines with each other; and a switch matrix controller to control the plurality of output line switches to dynamically couple converter output lines with each other.

In Example 2n, the subject matter of Example in can optionally include that the switch matrix controller is configured to control the plurality of output line switches to dynamically couple converter output lines with each other based on a change of a load at one or more converter output lines.

In Example 3n, the subject matter of any one of Examples 1n or 2*n* can optionally include that the switch matrix controller is configured to control the plurality of output line switches to dynamically couple converter output lines with each other based on a predicted change of a load at one or more converter output lines.

In Example 4n, the subject matter of any one of Examples 1n to 3n can optionally include that the SIMO converter further includes at least one switched capacitor regulator to dynamically set a respectively associated regulator-specific target output voltage for a respective converter output line of the plurality of converter output lines.

In Example 5n, the subject matter of Example 4n can optionally include that the at least one switched capacitor regulator includes a plurality of switched capacitor regulators, each switched capacitor regulator to dynamically set a respectively associated regulator-specific target output voltage to a respective converter output line of the plurality of converter output lines.

In Example 6n, the subject matter of any one of Examples 4n or 5n can optionally include that the at least one switched capacitor regulator includes a plurality of regulator capacitors and a plurality of regulator switches to selectively connect the plurality of regulator capacitors in parallel between a regulator input node on the respective converter output line of the plurality of converter output lines and a regulator output node on the respective converter output line of the plurality of converter output lines.

In Example 7n, the subject matter of Example 6n can optionally include that the switch matrix includes the plurality of regulator switches; and that the switch matrix controller is configured to control the plurality of regulator switches.

In Example 8n, the subject matter of any one of Examples 1n to 7n can optionally include that the SIMO converter further includes at least one linear regulator to dynamically set a respectively associated regulator-specific target output voltage to a respective further converter output line of the plurality of converter output lines.

In Example 9n, the subject matter of any one of Examples 1n to 8n can optionally include that the SIMO converter further includes at least one push-pull regulator to dynamically set a respectively associated regulator-specific target output voltage to a respective yet further converter output line of the plurality of converter output lines.

In Example 10n, the subject matter of any one of Examples 1n to 9n can optionally include that the SIMO converter further includes a plurality of regulators. Each regulator is configured to dynamically set a respectively associated regulator-specific target output voltage to a respective converter output of the plurality of converter outputs.

Example 11n is a method of operating a SIMO converter. The method may include a plurality of switches providing a switching output voltage to a converter output line of a plurality of converter output lines in response to an input current supplied to an inductor; controlling the plurality of switches to control the switching output voltage; at least one switched capacitor regulator dynamically setting a respectively associated regulator-specific target output voltage for a respective converter output line of the plurality of converter output lines; and controlling a plurality of output line switches of a switch matrix to selectively couple converter output lines with each other.

Example 1o is a radio transmitter. The radio transmitter may include a SIMO converter. The SIMO converter may include an inductor; a plurality of converter outputs including a first converter output and a second converter output; a plurality of switches to provide a switching output voltage in response to an input voltage supplied to the inductor; a switch controller configured to control the plurality of switches to selectively apply the switching output voltage to the first converter output or to the second converter output of the plurality of converter outputs. The radio transmitter may further include a Bluetooth transmitter chain coupled to the first converter output to receive transmit power via the first converter output; a Wireless Local Area Network Low Band transmitter chain coupled to the first converter output to receive transmit power via the first converter output; and a Wireless Local Area Network High Band transmitter chain coupled to the second converter output to receive transmit power via the second converter output.

Example 2o is a radio transmitter. The radio transmitter may include a SIMO converter. The SIMO converter may include an inductor; a plurality of converter outputs; a plurality of switches to provide a switching output voltage in response to an input voltage supplied to the inductor to a converter output of the plurality of converter outputs in a first duty cycle and to a further converter output of the plurality of converter outputs in a second duty cycle; and a switch controller configured to control the plurality of switches to apply the switching output voltage to a converter output of the plurality of converter outputs. The radio transmitter may further include a Bluetooth transmitter chain coupled to the converter output to receive the switching output voltage; a Wireless Local Area Network Low Band transmitter chain coupled to the converter output to receive the switching output voltage; and a Wireless Local Area Network High Band transmitter chain coupled to the further converter output to receive the switching output voltage.

In Example 3o, the subject matter of any one of Examples 1o or 2o can optionally include that the radio transmitter further includes a transmitter chain selector to select the Bluetooth transmitter chain or the Wireless Local Area Network Low Band transmitter chain to transmit radio signals.

In Example 4o, the subject matter of any one of Examples 1o to 3o can optionally include that the Bluetooth transmitter chain is configured to transmit Bluetooth radio signals in a 2.4 GHz frequency band.

In Example 5o, the subject matter of any one of Examples 1o to 4o can optionally include that the Wireless Local Area Network Low Band transmitter chain is configured to transmit Wireless Local Area Network radio signals in a 2.4 GHz frequency band.

In Example 6o, the subject matter of any one of Examples 1o to 5o can optionally include that the Wireless Local Area Network High Band transmitter chain is configured to transmit Wireless Local Area Network radio signals in a 5 GHz frequency band.

In Example 7o, the subject matter of any one of Examples 1o to 6o can optionally include that the Wireless Local Area Network Low Band transmitter chain is configured to transmit radio signals in accordance with at least one of the following Wireless Local Area Network communication standards: IEEE 802.11a; IEEE 802.11b; IEEE 802.11g; IEEE 802.11n; or IEEE 802.11ac.

In Example 8o, the subject matter of any one of Examples 1o to 7o can optionally include that the Wireless Local Area Network High Band transmitter chain is configured to transmit radio signals in accordance with at least one of the following Wireless Local Area Network communication standards: IEEE 802.11 a; IEEE 802.11b; IEEE 802.11 g; IEEE 802.11 n; or IEEE 802.11 ac.

In Example 9o, the subject matter of any one of Examples 1o to 8o can optionally include that the SIMO converter further includes a plurality of regulators. Each regulator is configured to provide a respectively associated regulator-specific target output voltage to a respective converter output of the plurality of converter outputs.

Example 10o is a method of operating a radio transmitter. The method may include a SIMO converter providing a switching output voltage in response to an input voltage supplied to an inductor; and controlling a plurality of switches to selectively apply the switching output voltage to a first converter output or to a second converter output of a plurality of converter. The method may further include a Bluetooth transmitter chain coupled to the first converter output receiving transmit power via the first converter output; a Wireless Local Area Network Low Band transmitter chain coupled to the first converter output receiving transmit power via the first converter output; and a Wireless Local Area Network High Band transmitter chain coupled to the second converter output receiving transmit power via the second converter output.

Example 11o is a method of operating a radio transmitter. The method may include a SIMO converter providing a switching output voltage in response to an input voltage supplied to an inductor to a converter output of a plurality of converter outputs in a first duty cycle and to a further converter output of the plurality of converter outputs in a second duty cycle; and controlling a plurality of switches to apply the switching output voltage to a converter output of the plurality of converter outputs. The method may further include a Bluetooth transmitter chain output receiving the switching output voltage via the converter output; a Wireless Local Area Network Low Band transmitter chain receiving the switching output voltage via the converter output; and a Wireless Local Area Network High Band transmitter chain receiving the switching output voltage via the further converter output.

Example 1p is a radio head circuitry. The radio head circuitry may include a SIMO converter. The SIMO converter may include an inductor; a plurality of converter outputs; a plurality of switches to provide a switching output voltage in response to an input voltage supplied to the inductor; and a switch controller configured to control the plurality of switches to selectively apply the switching output voltage to a converter output of the plurality of converter outputs. The radio head circuitry may further include a radio head radio chip including a plurality of supply voltage domains, each supply voltage domain including a power supply terminal and one or more electronic components configured to operate at the same domain-specific supply voltage and coupled to the power supply terminal. Each power supply terminal is coupled to a converter output of the plurality of converter outputs.

In Example 2p, the subject matter of Example 1p can optionally include that the radio head circuitry further includes at least one antenna directly coupled to the radio head radio chip.

In Example 3p, the subject matter of Example 2p can optionally include that the at least one antenna is directly coupled to the radio head radio chip via an interface cable.

In Example 4p, the subject matter of Example 3p can optionally include that the interface cable is configured to transmit at least one of digital signals or power.

In Example 5p, the subject matter of any one of Examples 1p to 4p can optionally include that the plurality of supply voltage domains includes at least one of the following: a first voltage domain including a transmitter chain including one or more transmitter components configured to operate at a first supply voltage; and/or a second voltage domain including a receiver chain including one or more receiver components configured to operate at a second supply voltage different from the first supply voltage; and/or a third voltage domain including a one or more digital components configured to operate at a third supply voltage different from at least one of the first supply voltage or the second supply voltage.

In Example 6p, the subject matter of any one of Examples 1p to 5p can optionally include that the plurality of supply voltage domains includes a first voltage domain including a transmitter chain including one or more transmitter components configured to operate at a first supply voltage. The one or more transmitter components include a transmit power amplifier.

In Example 7p, the subject matter of any one of Examples 1p to 6p can optionally include that the plurality of supply voltage domains includes a first voltage domain including a second voltage domain including a receiver chain including one or more receiver components configured to operate at a second supply voltage different from the first supply voltage, wherein the one or more receiver components include a low noise amplifier.

In Example 8p, the subject matter of any one of Examples 1p to 7p can optionally include that the plurality of supply voltage domains includes a first voltage domain including a third voltage domain including one or more digital components configured to operate at a third supply voltage different from at least one of the first supply voltage or the second supply voltage, wherein the one or more digital components may include the modem (MAC and PHY layer) implementation, any associated communication processor, any of the digital circuits that implement the signal conditioning and calibration for the analog and RF sections of the radio (e.g., the digital front-end), or any combination thereof.

In Example 9p, the subject matter of any one of Examples 1p to 8p can optionally include that the single inductor multiple output converter further includes a plurality of regulators. Each regulator is configured to provide a respectively associated regulator-specific target output voltage to a respective converter output of the plurality of converter outputs.

Example 1q is a radio communication circuitry. The radio communication circuitry may include a SIMO converter including a first converter output to provide a first supply voltage and a second converter output to provide a second supply voltage; a radio transmitter including a power amplifier to transmit radio signals and galvanically coupled to the first converter output to receive the first supply voltage; and a radio receiver to receive radio signals and galvanically coupled to the second converter output to receive the second supply voltage.

Example 2q is a radio communication circuitry. The radio communication circuitry may include a single inductor multiple output converter including a first output and a second output; a radio transmitter to transmit radio signals and directly galvanically coupled to the first output to receive power from the single inductor multiple output converter; and a radio receiver to receive radio signals and galvanically coupled to the second output to receive power from the single inductor multiple output converter.

In Example 3q, the subject matter of Example 2q can optionally include that the radio transmitter includes a power amplifier.

In Example 4q, the subject matter of any one of Examples 1q or 3q can optionally include that the power amplifier is a digitally controlled power amplifier.

In Example 5q, the subject matter of any one of Examples 1q or 3q or 4q can optionally include that the SIMO converter includes an inductor; a plurality of converter outputs; a plurality of switches to provide a switching output voltage in response to an input voltage supplied to the inductor; a switch controller configured to control the plurality of switches to control the switching output voltage and to supply the switching output voltage to the first converter output or to a regulator. The regulator is configured to provide a regulated target output voltage to the second converter output.

In Example 6q, the subject matter of Example 5q can optionally include that the regulator includes or is a linear regulator.

In Example 7q, the subject matter of any one of Examples 5q or 6q can optionally include that the regulator includes or is a low dropout regulator.

Example 1r is a multi-level voltage power amplifier circuitry. The multi-level voltage power amplifier circuitry may include a SIMO converter including a first converter output to provide a first supply voltage and a second converter output to provide a second supply voltage; and a multi-level voltage power amplifier to selectively galvanically couple to the first converter output or to the second converter output.

In Example 2r, the subject matter of Example 1r can optionally include that the SIMO converter includes a third converter output to provide a third supply voltage; and the multi-level voltage power amplifier further to selectively galvanically couple to the third converter output.

In Example 3r, the subject matter of any one of Examples 1r or 2r can optionally include that the power amplifier is a class G power amplifier.

In Example 4r, the subject matter of any one of Examples 1r to 3r can optionally include that the single inductor multiple output converter includes an inductor; a plurality of converter outputs; a plurality of switches to provide a switching output voltage in response to an input voltage applied to the inductor, a switch controller configured to control the plurality of switches to control the switching output voltage; and a plurality of regulators. Each regulator is configured to dynamically set a respectively associated regulator-specific predefined target output voltage, and to regulate the switching output voltage to stay within a predefined range from the target output voltage using the input voltage.

In Example 5r, the subject matter of Example 4r can optionally include that at least one regulator of the plurality of regulators includes or is a linear regulator.

In Example 6r, the subject matter of any one of Examples 4r or 5r can optionally include that at least one regulator of the plurality of regulators includes or is a low dropout regulator.

In Example 3a, the subject matter of any one of Examples 1a or 2a or 1b to 9b or 1c to 4c or 1d to 4d or 1e to 7e or 1f to 7f or 1g to 6g or 1h to 12h or 1i to 14i or 1j to 8j or 1k to 12k or 11 to 10l or 1m to 6m or 1n to 10n or 1o to 9o or 1p to 9p or 5q to 7q or 4r to 6r can optionally include that the plurality of switches and the plurality of regulators are monolithically integrated on a common chip, and that the inductor is implemented separated from the common chip.

In Example 4a, the subject matter of any one of Examples 1a to 3a or 1b to 9b or 1c to 4c or 1d to 4d or 1e to 7e or 1f to 7f or 1g to 6g or 1h to 12h or 1i to 14i or 1j to 8j or 1k to 12k or 11 to 10l or 1m to 6m or 1*n* to 1o n or 1o to 9o or 1p to 9p or 5q to 7q or 4r to 6r can optionally include that the plurality of switches includes a fourth switch coupled between a second terminal of the inductor and the switching output voltage.

In Example 5a, the subject matter of any one of Examples 1a to 4a or 1b to 9b or 1c to 4c or 1d to 4d or 1e to 7e or 1f to 7f or 1g to 6g or 1h to 12h or 1i to 14i or 1j to 8j or 1k to 12k or 11 to 10l or 1m to 6m or 1*n* to 1o n or 1o to 9o or 1p to 9p or 5q to 7q or 4r to 6r can optionally include that the plurality of switches includes a fifth switch coupled between a second terminal of the inductor and the input voltage.

In Example 6a, the subject matter of any one of Examples 1a to 5a or 1b to 9b or 1c to 4c or 1d to 4d or 1e to 7e or 1f to 7f or 1g to 6g or 1h to 12h or 1i to 14i or 1j to 8j or 1k to 12k or 11 to 10l or 1m to 6m or 1*n* to 1o n or 1o to 9o or 1p to 9p or 5q to 7q or 4r to 6r can optionally include that the SIMO converter or converter further includes at least one capacitor coupled between the switching output voltage and a reference potential.

In Example 7a, the subject matter of Example 6a can optionally include that the at least one capacitor has a capacity in the range from about 2 μF to about 15 μF, e.g. about 1 μF to about 3 μF, e.g. about 1.5 μF to about 2.5 μF.

In Example 8a, the subject matter of any one of Examples 1a to 7a or 1b to 9b or 1c to 4c or 1d to 4d or 1e to 7e or 1f to 7f or 1g to 6g or 1h to 12h or 1i to 14i or 1j to 8j or 1k to 12k or 11 to 10l or 1m to 6m or 1*n* to 1o n or 1o to 9o or 1p to 9p or 5q to 7q or 4r to 6r can optionally include that at least one switch of the plurality of switches includes a transistor.

In Example 9a, the subject matter of any one of Examples 1a to 8a or 1b to 9b or 1c to 4c or 1d to 4d or 1e to 7e or 1f to 7f or 1g to 6g or 1h to 12h or 1i to 14i or 1j to 8j or 1k to 12k or 11 to 10l or 1m to 6m or 1*n* to 1o n or 1o to 9o or 1p to 9p or 5q to 7q or 4r to 6r can optionally include that the reference potential is ground potential.

In Example 10a, the subject matter of any one of Examples 1a to 9a or 1b to 9b or 1c to 4c or 1d to 4d or 1e to 7e or 1f to 7f or 1g to 6g or 1h to 12h or 1i to 14i or 1j to 8j or 1k to 12k or 11 to 10l or 1m to 6m or 1*n* to 1o n or 1o to 9o or 1p to 9p or 5q to 7q or 4r to 6r can optionally include that at least one regulator of the plurality of regulators includes or is configured as a push-pull regulator.

In Example 11a, the subject matter of any one of Examples 1a to 10a or 1b to 9b or 1c to 4c or 1d to 4d or 1e to 7e or 1f to 7f or 1g to 6g or 1h to 12h or 1i to 14i or 1j to 8j or 1k to 12k or 11 to 10l or 1m to 6m or 1*n* to 1o n or 1o to 9o or 1p to 9p or 5q to 7q or 4r to 6r can optionally include that at least one regulator of the plurality of regulators includes a sixth switch coupled between the input voltage and the switching output voltage.

In Example 12a, the subject matter of Example 11a can optionally include that at least one regulator of the plurality of regulators includes a first comparator circuit configured to compare the switching output voltage with a predefined first threshold voltage and to control the sixth switch such that the sixth switch is closed if the switching output voltage is smaller than the predefined first threshold voltage and such that the sixth switch is open if the switching output voltage is higher than the predefined first threshold voltage.

In Example 13a, the subject matter of any one of Examples 1a to 12a or 1b to 9b or 1c to 4c or 1d to 4d or 1e to 7e or 1f to 7f or 1g to 6g or 1h to 12h or 1i to 14i or 1j to 8j or 1k to 12k or 11 to 10l or 1m to 6m or 1*n* to 1o n or 1o to 9o or 1p to 9p or 5q to 7q or 4r to 6r can optionally include that at least one regulator of the plurality of regulators includes a seventh switch coupled between the input voltage and a reference potential.

In Example 14a, the subject matter of Example 13a can optionally include that at least one regulator of the plurality of regulators includes a second comparator circuit configured to compare the switching output voltage with a predefined second threshold voltage and to control the seventh switch such that the seventh switch is closed if the switching output voltage is higher than the predefined second threshold voltage and such that the seventh switch is open if the switching output voltage is smaller than the predefined second threshold voltage.

In Example 15a, the subject matter of any one of Examples 1a to 14a or 1b to 9b or 1c to 4c or 1d to 4d or 1e to 7e or 1f to 7f or 1g to 6g or 1h to 12h or 1i to 14i or 1j to 8j or 1k to 12k or 11 to 10l or 1m to 6m or 1*n* to 1o n or 1o to 9o or 1p to 9p or 5q to 7q or 4r to 6r can optionally include that at least one regulator of the plurality of regulators includes a second capacitor coupled between the switching output voltage and a reference potential.

In Example 16a, the subject matter of Example 15a can optionally include that the second capacitor has a capacity in the range from about 2 μF to about 15 μF, e.g. about 4 μF to about 12 μF, e.g. about 6 μF to about 10 μF In Example 17a, the subject matter of any one of Examples 1a to 16a or 1b to 9b or 1c to 4c or 1d to 4d or 1e to 7e or 1f to 7f or 1g to 6g or 1h to 12h or 1i to 14i or 1j to 8j or 1k to 12k or 11 to 10l or 1m to 6m or 1*n* to 1o n or 1o to 9o or 1p to 9p or 5q to 7q or 4r to 6r can optionally include that the inductor has an inductance in the range from about 0.5 μH to about 5 μH, e.g. about 1 μH to about 3 μH, e.g. about 1.5 μH to about 2.5 μH.

In Example 18a, the subject matter of any one of Examples 1a to 17a or 1b to 9b or 1c to 4c or 1d to 4d or 1e to 7e or 1f to 7f or 1g to 6g or 1h to 12h or 1i to 14i or 1j to 8j or 1k to 12k or 11 to 10l or 1m to 6m or 1n to 1o n or 1o to 9o or 1p to 9p or 5q to 7q or 4r to 6r can optionally include that the SIMO converter or converter is configured as a buck converter.

In Example 19a, the subject matter of any one of Examples 1a or 2a or 1 b to 9b or 1c to 4c or 1d to 4d or 1e to 7e or 1f to 7f or 1g to 6g or 1h to 12h or 1i to 14i or 1j to 8j or 1k to 12k or 11 to 10l or 1m to 6m or 1n to 1o n or 1o to 9o or 1p to 9p or 5q to 7q or 4r to 6r can optionally include that the SIMO converter or converter is configured as a boost converter.

Example 22a is a non-transitory computer readable medium storing instructions which, when executed by one or more processors, implement a method of any one of Examples 20a, 21a, 10b, 11b, 5c, 6c, 5d, 6d, 8e, 8f, 9f, 7g, 13h, 14h, 15i, 16i, 9j, 13k, 14k, 11l, 7m, 11n, 10o, 11o.

Example 23 is a system, including a single inductor multiple output circuitry. The single inductor multiple output circuitry may be configured in accordance with any aspect as described in this disclosure. The system may further include a first device, galvanically connected to a first output line of a plurality of converter output lines of the single inductor multiple output circuitry. The first device is configured to operate at the switching output voltage or the regulator-specific predefined target output voltage specific to the first output line. By way of example, the first device may be a smartphone component such as a transmitter (e.g. configured to transmit a wireless signal or a wireline signal) or a receiver (e.g. configured to receive a wireless signal or a wireline signal) or a transceiver (e.g. configured to transmit and receive a wireless signal or a wireline signal), a processor (e.g. a baseband processor or an application processor), a memory component or the like. Furthermore, the first device may be a wearable device or a hearable device. Furthermore, the first device may be a laptop computer component or tablet computer component such as a transmitter (e.g. configured to transmit a wireless signal or a wireline signal) or a receiver (e.g. configured to receive a wireless signal or a wireline signal) or a transceiver (e.g. configured to transmit and receive a wireless signal or a wireline signal), a processor (e.g. a baseband processor or an application processor), a memory component or the like. The system may further include a second device, galvanically connected to a second output line of the plurality of converter output lines of the single inductor multiple output circuitry. The second device is configured to operate at the switching output voltage or the regulator-specific predefined target output voltage specific to the second output line. The second device may be different from the first device or may operate at a different operation voltage or voltage range than the first device. The second device may a smartphone component such as a transmitter (e.g. configured to transmit a wireless signal or a wireline signal) or a receiver (e.g. configured to receive a wireless signal or a wireline signal) or a transceiver (e.g. configured to transmit and receive a wireless signal or a wireline signal), a processor (e.g. a baseband processor or an application processor), a memory component or the like. Furthermore, the first device may be a wearable device or a hearable device. Furthermore, the first device may be a laptop computer component or tablet computer component such as a transmitter (e.g. configured to transmit a wireless signal or a wireline signal) or a receiver (e.g. configured to receive a wireless signal or a wireline signal) or a transceiver (e.g. configured to transmit and receive a wireless signal or a wireline signal), a processor (e.g. a baseband processor or an application processor), a memory component or the like.

It is to be noted that the inductor is optional within the single inductor multiple output circuitry of all the aspects as described above. In case the inductor is omitted, the single inductor multiple output circuitry may include a first terminal to be coupled to a first (e.g. input) terminal of an inductor if the inductor is provided and a second terminal to be coupled to a second (e.g. output) terminal of the inductor if provided.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A single inductor multiple output circuitry comprising:

an inductor;

a plurality of converter output lines coupled to an output terminal of the inductor;

a plurality of switches, each coupled to the output terminal of the inductor and configured to provide a switching output voltage on a corresponding one of the plurality of converter output lines in response to an input voltage applied to an input terminal of the inductor;

a switch controller configured to control each corresponding one of the plurality of switches based on a respective duty cycle voltage received at the corresponding switch to control the switching output voltage of its corresponding converter output line; and a plurality of regulators, each configured to:

dynamically set a respectively associated regulator-specific predefined target output voltage for its corresponding converter output line; and regulate the switching output voltage to output, for its corresponding converter output line, a regulated target output voltage that stays within a predefined range from the respectively associated regulator-specific predefined target output voltage based on selectively coupling the input voltage to its corresponding converter output line and/or selectively coupling a reference potential to its corresponding converter output line, wherein the switch controller comprises, for each of the plurality of switches:

an adder configured to output an added voltage based on the regulated target output voltage for its corresponding converter output line combined with:

a first voltage indicative of a current sourced from the input voltage being selectively coupled to the corresponding one of the plurality of converter output lines; and/or a second voltage indicative of a current sunk to the reference potential being selectively coupled to the corresponding one of the plurality of converter output lines; and a comparator circuit configured to output the respective duty cycle voltage based on the added voltage compared to a voltage indicative of a current at the input terminal of the inductor.

2. The single inductor multiple output circuitry of claim 1, wherein the plurality of switches comprises a first switch coupled between the input terminal of the inductor and the input voltage and a second switch coupled between the input terminal of the inductor and the reference potential.

3. The single inductor multiple output circuitry of claim 2, wherein the plurality of switches comprises a third switch coupled between the output terminal of the inductor and the reference potential.

4. The single inductor multiple output circuitry of claim 1, wherein each of the plurality of regulators comprises a first comparator circuit configured to compare the switching output voltage with a predefined first threshold voltage of the predefined range and to selectively couple the input voltage to its corresponding converter output line based on the switching output voltage higher than the predefined first threshold voltage and to selectively decouple the input voltage from its corresponding converter output line based on the switching output voltage lower than the predefined first threshold voltage.

5. The single inductor multiple output circuitry of claim 4, wherein each of the plurality of regulators comprises a second comparator circuit configured to compare the switching output voltage with a predefined second threshold voltage of the predefined range and to selectively couple the reference potential to its corresponding converter output line based on the switching output voltage higher than the predefined second threshold voltage and to selectively decouple the reference potential from its corresponding converter output line based on the switching output voltage lower than the predefined second threshold voltage.

6. A system comprising:

the single inductor multiple output circuitry of claim 1; and an electronic component coupled to an associated converter output line of the plurality of converter output lines and configured to operate at the regulated target output voltage of the associated converter output line of the plurality of converter output lines.

7. The system of claim 6, the system further comprising:

a further electronic component coupled to another converter output line of the plurality of converter output lines and configured to operate at the regulated target output voltage of the another converter output line of the plurality of converter output lines.

8. The system of claim 6, wherein the electronic component is selected from a group consisting of:

a transmitter;

a receiver;

a transceiver;

a processor; and a memory component.

9. A single inductor multiple output circuitry comprising:

a switching stage comprising an inductor and a plurality of switches to provide a switching output voltage at a corresponding converter output line of a plurality of converter output lines in response to an input voltage applied to an input terminal of the inductor, wherein the switching output voltage is dependent on respective switching states of the plurality of switches;

at least one regulator configured to receive the switching output voltage and to dynamically set the switching output voltage at the corresponding converter output line of the plurality of converter output lines, wherein the at least one regulator comprises a circuit configured to, based on whether the switching output voltage is within a predefined range of a target regulator output voltage, switch in a current sourced from the input voltage or a current sunk to a reference potential to regulate the switching output voltage; and a switch controller configured to control respective switching states of the plurality of switches based on a respective duty cycle voltage at a corresponding switch, wherein the switch controller is configured to provide the switching output voltage at its corresponding converter output line, the switch controller comprising, for each of the plurality of switches:

an adder configured to output an added voltage based on the target regulator output voltage for its corresponding converter output line combined with a first voltage indicative of the current sourced from the input voltage and/or a second voltage indicative of the current sunk to the reference potential; and a comparator circuit configured to output the respective duty cycle voltage based on the added voltage compared to a voltage indicative of a current at the input terminal of the inductor.

10. The single inductor multiple output circuitry of claim 9, wherein the plurality of switches comprises a first switch coupled between the input terminal of the inductor and the input voltage and a second switch coupled between the input terminal of the inductor and the reference potential.

11. The single inductor multiple output circuitry of claim 10, wherein the plurality of switches comprises a third switch coupled between an output terminal of the inductor and the reference potential.

12. The single inductor multiple output circuitry of claim 9, wherein the at least one regulator comprises a first comparator circuit configured to compare the switching output voltage with a predefined lower threshold voltage of the predefined range and to selectively couple the input voltage to its corresponding converter output line based on the switching output voltage higher than the predefined lower threshold voltage and to selectively decouple the input voltage from its corresponding converter output line based on the switching output voltage lower than the predefined lower threshold voltage.

13. The single inductor multiple output circuitry of claim 12, wherein the at least one regulator comprises a second comparator circuit configured to compare the switching output voltage with a predefined upper threshold voltage of the predefined range and to selectively couple the reference potential to its corresponding converter output line based on the switching output voltage higher than the predefined upper threshold voltage and to selectively decouple the reference potential from its corresponding converter output line based on the switching output voltage lower than the predefined upper threshold voltage.

14. A non-transitory computer readable medium storing instructions which, when executed by one or more processors, implement a method of operating a single inductor multiple output circuitry, the method comprising:

providing by a plurality of switches a switching output voltage at a corresponding converter output line of a plurality of converter output lines in response to an input voltage applied to an input terminal of an inductor;

controlling each of the plurality of switches based on a respective duty cycle voltage to control the switching output voltage at its corresponding converter output line; and operating at least one regulator for regulating the switching output voltage at its corresponding converter output line by:

dynamically setting a respectively associated regulator-specific predefined target output voltage for its corresponding first converter output line; and regulating the switching output voltage to output, for its corresponding converter output line, a regulated target output voltage that stays within a predefined range from the respectively associated regulator-specific predefined target output voltage based on selectively coupling the input voltage to its corresponding converter output line and/or selectively coupling a reference potential to its corresponding converter output line, wherein the controlling each of the plurality of switches further comprises:

outputting an added voltage based on the regulated target output voltage for its corresponding converter output line combined with:

a first voltage indicative of a current sourced from the input voltage being selectively coupled to the corresponding one of the plurality of converter output lines; and/or a second voltage indicative of a current sunk to the reference potential being selectively coupled to the corresponding one of the plurality of converter output lines; and outputting the respective duty cycle voltage based on the added voltage compared to a voltage indicative of a current at the input terminal of the inductor.

15. A non-transitory computer readable medium storing instructions which, when executed by one or more processors, implement a method of operating a single inductor multiple output circuitry, the method comprising:

controlling a switching stage comprising an inductor and a plurality of switches to provide a switching output voltage at a corresponding converter output line of a plurality of converter output lines in response to an input voltage applied to an input terminal of the inductor, wherein the switching output voltage is dependent on respective switching states of the plurality of switches, wherein the controlling the switching stage further comprises controlling the respective switching states based on a respective duty cycle voltage at a corresponding switch of the plurality of switches;

operating at least one regulator that:

receives the switching output voltage;

dynamically set a target regulator output voltage for its corresponding output line of the plurality of converter output lines;

switches in, based on whether the switching output voltage is above a predefined upper threshold voltage which is greater than the target regulator output voltage or whether the switching output voltage is below a predefined lower threshold voltage which is smaller than the target regulator output voltage; and regulates the switching output voltage to output, for its corresponding output line, a regulated target output voltage by selectively coupling the input voltage to its corresponding output line and/or selectively coupling a reference potential to its corresponding output line based on whether the switching output voltage is above the predefined upper threshold voltage that is greater than the target regulator output voltage or whether the switching output voltage is below the predefined lower threshold voltage that is smaller than the target regulator output voltage;

providing the respective duty cycle voltage to the corresponding switch by outputting an added voltage based on the regulated target output voltage for its corresponding output line combined with:

a first voltage indicative of a current sourced from the input voltage being selectively coupled to the corresponding one of the plurality of converter output lines; and/or a second voltage indicative of a current sunk to the reference potential being selectively coupled to the corresponding one of the plurality of converter output lines; and outputting the respective duty cycle voltage based on the added voltage compared to a voltage indicative of a current at the input terminal of the inductor.

* * * * *